(12) United States Patent
Uchimura et al.

(10) Patent No.: US 11,483,029 B2
(45) Date of Patent: Oct. 25, 2022

(54) ANTENNA, WIRELESS COMMUNICATION DEVICE, WIRELESS COMMUNICATION SYSTEM, VEHICLE, MOTORCYCLE, AND MOVABLE BODY

(71) Applicant: KYOCERA Corporation, Kyoto (JP)

(72) Inventors: Hiroshi Uchimura, Kagoshima (JP); Takanori Ikuta, Kyoto (JP); Nobuki Hiramatsu, Yokohama (JP); Susumu Kashiwase, Machida (JP); Katsuro Nakamata, Yokohama (JP); Hiromichi Yoshikawa, Yokohama (JP); Sunao Hashimoto, Yokohama (JP); Yasuhiko Fukuoka, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 169 days.

(21) Appl. No.: 16/964,177

(22) PCT Filed: Jan. 7, 2019

(86) PCT No.: PCT/JP2019/000110
§ 371 (c)(1),
(2) Date: Jul. 22, 2020

(87) PCT Pub. No.: WO2019/142677
PCT Pub. Date: Jul. 25, 2019

(65) Prior Publication Data
US 2021/0036736 A1 Feb. 4, 2021

(30) Foreign Application Priority Data

Jan. 22, 2018 (JP) .............................. JP2018-008401
Jan. 22, 2018 (JP) .............................. JP2018-008403
(Continued)

(51) Int. Cl.
*H01Q 21/06* (2006.01)
*H04B 3/52* (2006.01)
(Continued)

(52) U.S. Cl.
CPC ................. *H04B 3/52* (2013.01); *H01Q 1/38* (2013.01); *H04B 3/54* (2013.01); *H01Q 1/32* (2013.01)

(58) Field of Classification Search
CPC ........ H01Q 1/286; H01Q 1/38; H01Q 1/2283; H01Q 1/243; H01Q 13/10; H01Q 13/18;
(Continued)

(56) References Cited

U.S. PATENT DOCUMENTS 4,931,806 A * 6/1990 Wunderlich ......... H01Q 1/1285
343/900
5,343,214 A * 8/1994 Hadzoglou .......... H01Q 1/1285
343/846
(Continued)

FOREIGN PATENT DOCUMENTS

EP 3605736 A1 2/2020
GB 2067842 A 7/1981
(Continued)

OTHER PUBLICATIONS

Yasutaka Murakami et al., Low-Profile Design and Bandwidth Characteristics of Artificial Magnetic Conductor with Dielectric Substrate, 2015, pp. 172-179, vol. J98-B, No. 2, IEEE, Japan, 9pp.
(Continued)

*Primary Examiner* — Linh V Nguyen
(74) *Attorney, Agent, or Firm* — Hauptman Ham, LLP

(57) ABSTRACT

A wireless communication system includes a first wireless communication device installed on an installation surface of a vehicle and a second wireless communication device. The first wireless communication device includes an antenna and a sensor. The antenna includes a first conductor, a second conductor, one or more third conductors, a fourth conductor, and a feeding line. The first wireless communication device transmits a signal from the antenna to the second wireless
(Continued)

communication device, based on information detected by the sensor.

9 Claims, 116 Drawing Sheets

(30) Foreign Application Priority Data

| | | |
|---|---|---|
| Jan. 22, 2018 | (JP) | JP2018-008407 |
| Jan. 22, 2018 | (JP) | JP2018-008409 |

(51) Int. Cl.
*H01Q 1/38* (2006.01)
*H04B 3/54* (2006.01)
*H01Q 1/32* (2006.01)

(58) Field of Classification Search
CPC ...... H01Q 21/26; H01Q 21/30; H01Q 9/0421; H01Q 1/27; H01Q 1/44; H01Q 13/20; H01Q 21/065; H01Q 21/08; H01Q 5/328
USPC .................................................. 343/702, 846
See application file for complete search history.

(56) References Cited

U.S. PATENT DOCUMENTS

| | | | | |
|---|---|---|---|---|
| 5,463,405 | A * | 10/1995 | Liu | H01Q 1/1285 343/715 |
| 6,774,745 | B2 * | 8/2004 | Apostolos | H01Q 13/28 333/164 |
| 6,900,770 | B2 * | 5/2005 | Apostolos | H01Q 13/085 343/767 |
| 7,609,215 | B2 * | 10/2009 | Apostolos | H01Q 19/30 343/793 |
| 7,623,075 | B2 * | 11/2009 | Apostolos | H01Q 1/3275 343/797 |
| 9,515,366 | B2 * | 12/2016 | Herbsommer | H01Q 1/50 |
| 2004/0257288 | A1 * | 12/2004 | Robertson, Jr. | H01P 1/182 343/778 |
| 2005/0179529 | A1 | 8/2005 | Sato | |
| 2008/0278306 | A1 | 11/2008 | Uehara et al. | |
| 2015/0130673 | A1 | 5/2015 | Ng et al. | |
| 2019/0027805 | A1 * | 1/2019 | Min | H01Q 1/2291 |
| 2019/0304887 | A1 * | 10/2019 | Ganesan | H01L 23/552 |

FOREIGN PATENT DOCUMENTS

| | | |
|---|---|---|
| JP | 2004166202 A | 6/2004 |
| JP | 200567453 A | 3/2005 |
| JP | 200584940 A | 3/2005 |
| JP | 2005297835 A | 10/2005 |
| JP | 200880985 A | 4/2008 |
| JP | 201576638 A | 4/2015 |
| WO | 2017031272 A1 | 2/2017 |

OTHER PUBLICATIONS

Yasutaka Murakami et al., Optimum Configuration of Reflector for Dipole Antenna with AMC Reflector, 2015, pp. 1212-1220, vol. 98-B, No. 11, IEEE, 10pp.

* cited by examiner

FIG.2
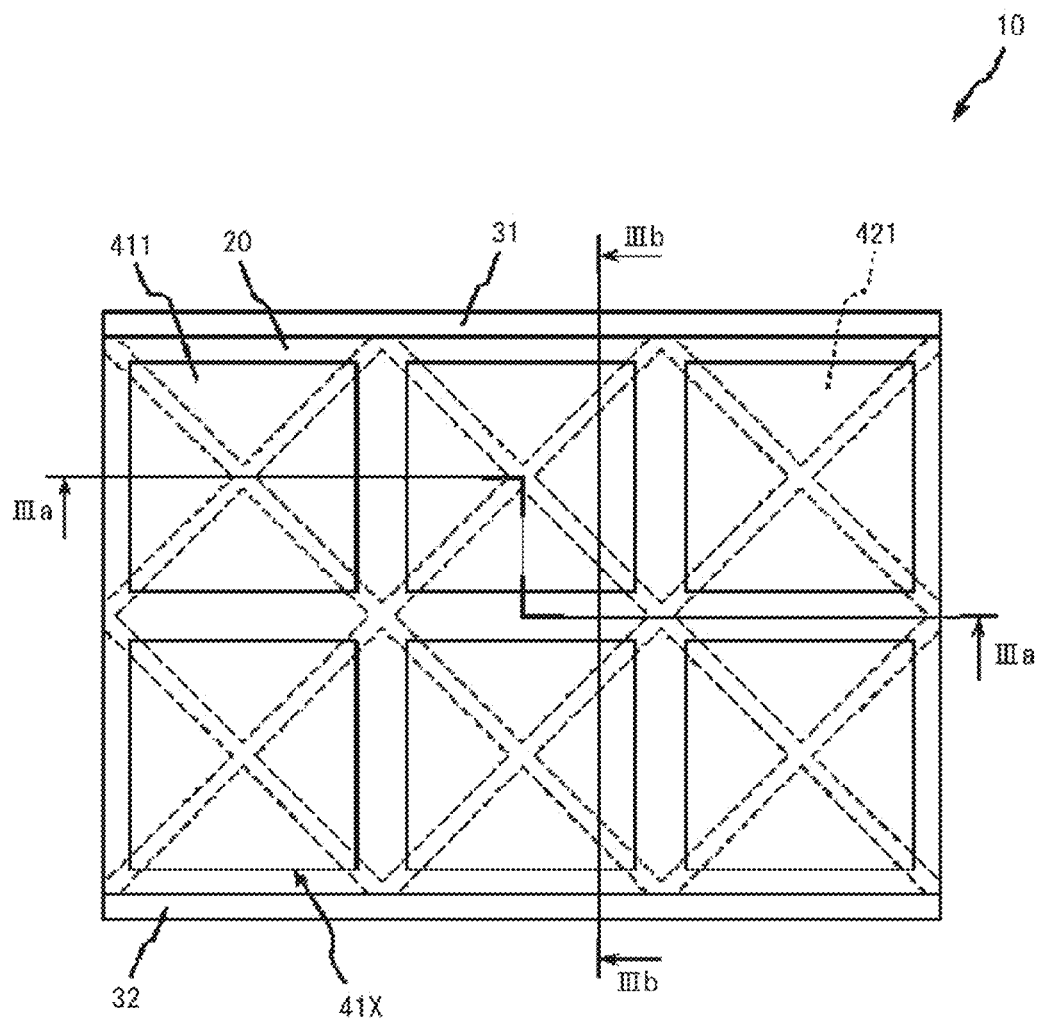
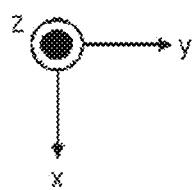

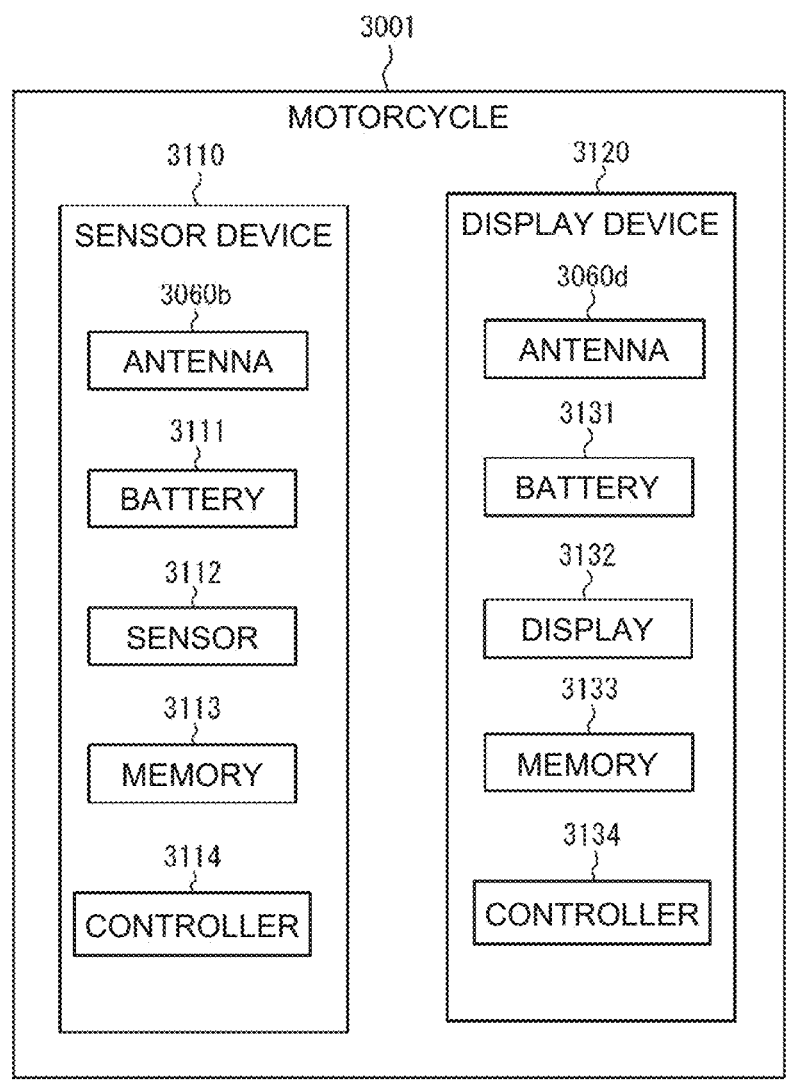

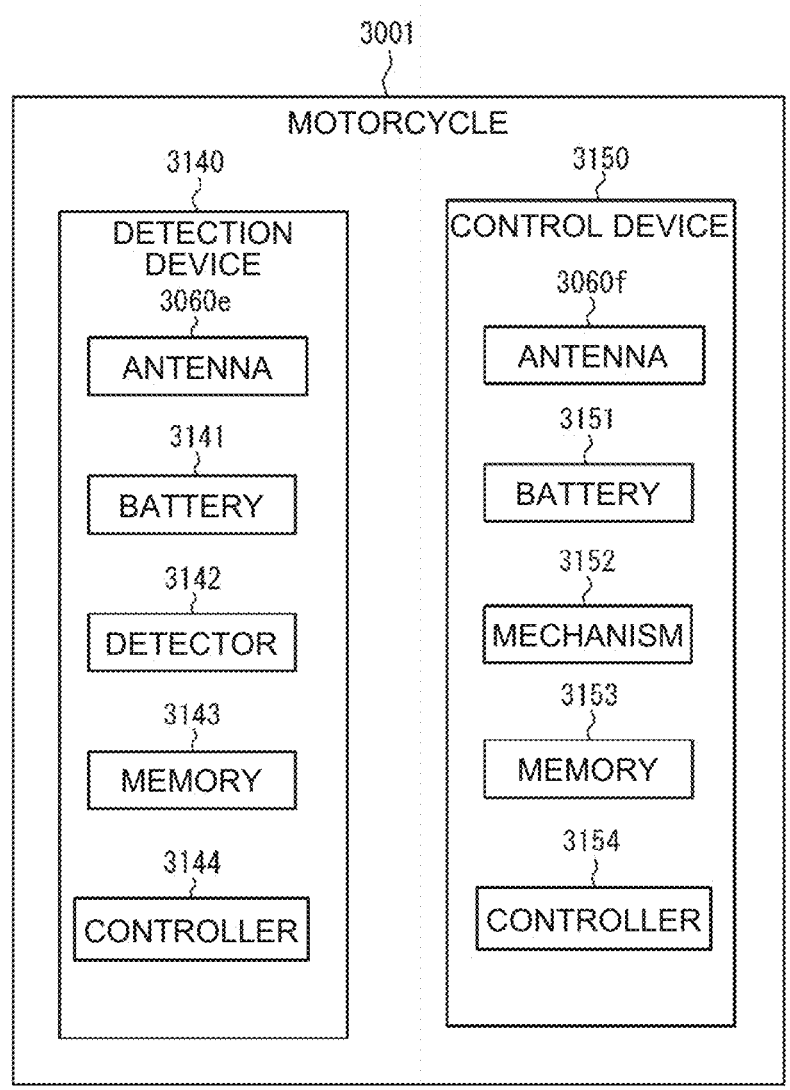

ANTENNA, WIRELESS COMMUNICATION DEVICE, WIRELESS COMMUNICATION SYSTEM, VEHICLE, MOTORCYCLE, AND MOVABLE BODY

CROSS REFERENCE TO RELATED APPLICATIONS

This application is a National Stage of PCT international application Ser. No. PCT/JP2019/000110 filed on Jan. 7, 2019 which designates the United States, incorporated herein by reference, and which is based upon and claims the benefit of priority from Japanese Patent Application No. 2018-008401 filed on Jan. 22, 2018, Japanese Patent Application No. 2018-008403 filed on Jan. 22, 2018, Japanese Patent Application No. 2018-008407 filed on Jan. 22, 2018, and Japanese Patent Application No. 2018-008409 filed on Jan. 22, 2018, the entire contents of which are incorporated herein by reference.

FIELD

The present disclosure relates to an antenna, a wireless communication device, a wireless communication system, a vehicle, a motorcycle, and a movable body.

BACKGROUND

Conventionally, wireless communication techniques using an antenna installed on a conductive body such as metal are known. Wireless communication techniques using an antenna installed on a conductive body such as metal or a human body and the like are also known. The human body has a water content of about 60% and thus can be considered as a conductive body and a dielectric body.

Electromagnetic waves emitted from an antenna are reflected by a conductive body or a dielectric body. The electromagnetic wave reflected by the conductive body or the dielectric body is phase-shifted by 180°. The reflected electromagnetic wave is synthesized with the electromagnetic wave emitted from the antenna. The electromagnetic wave reflected by the antenna may have the amplitude reduced due to the synthesis with the phase-shifted electromagnetic wave. Consequently, the amplitude of the electromagnetic wave emitted from the antenna becomes smaller. The distance between the antenna and the conductive body or the dielectric body is set to ¼ of the wavelength λ of the emitted electromagnetic wave, whereby the effect by the reflected wave is reduced.

In comparison, a technique that reduces the effect by the reflected wave using an artificial magnetic conductor has been proposed. This technique is described in, for example, Non Patent Literatures 1 and 2.

CITATION LIST

Non Patent Literatures

Non Patent Literature 1: Murakami et al., "Low-Profile Design and Bandwidth Characteristics of Artificial Magnetic Conductor with Dielectric Substrate" IEICE trans. B, Vol. J98-B No. 2, pp. 172-179
Non Patent Literature 2: Murakami et al., "Optimum Configuration of Reflector for Dipole Antenna with AMC Reflector" IEICE trans. B, Vol. J98-B No. 11, pp. 1212-1220

SUMMARY

According to an aspect of the present disclosure, a wireless communication system includes a first wireless communication device and a second wireless communication device. The first wireless communication device is installed on an installation surface of a vehicle. The first wireless communication device includes an antenna and a sensor. The antenna includes a first conductor, a second conductor, one or more third conductors, a fourth conductor, and a feeding line. The first conductor and the second conductor are opposed to each other in a first axis. The one or more third conductors are positioned between the first conductor and the second conductor and extend in the first axis. The fourth conductor is connected to the first conductor and the second conductor and extends in the first axis. The feeding line is electromagnetically connected to the third conductor. The first conductor and the second conductor are capacitively connected to each other through the third conductor. A surface of the fourth conductor is opposed to the installation surface of the vehicle in a second axis vertical to the first axis. The first wireless communication device transmits a signal from the antenna to the second wireless communication device, based on information detected by the sensor.

According to an aspect of the present disclosure, a vehicle includes a first wireless communication device and a second wireless communication device. The first wireless communication device includes an antenna and a sensor. The antenna includes a first conductor, a second conductor, one or more third conductors, a fourth conductor, and a feeding line. The first conductor and the second conductor are opposed to each other in a first axis. The one or more third conductors are positioned between the first conductor and the second conductor and extend in the first axis. The fourth conductor is connected to the first conductor and the second conductor and extends in the first axis. The feeding line is electromagnetically connected to the third conductor. The first conductor and the second conductor are capacitively connected to each other through the third conductor. A surface of the fourth conductor is arranged in such a manner as to be opposed to the installation surface of the vehicle in a second axis vertical to the first axis. The first wireless communication device transmits a signal from the antenna to the second wireless communication device, based on information detected by the sensor.

According to an aspect of the present disclosure, an antenna is installed on an installation surface of a vehicle, the antenna includes a first conductor, a second conductor, one or more third conductors, a fourth conductor, and a feeding line. The first conductor and the second conductor are opposed to each other in a first axis. The one or more third conductors are positioned between the first conductor and the second conductor and extend in the first axis. The fourth conductor is connected to the first conductor and the second conductor and extends in the first axis. The feeding line is connected to the third conductor. The first conductor and the second conductor are capacitively connected to each other through the third conductor. A surface of the fourth conductor is opposed to the installation surface of the vehicle in a second axis vertical to the first axis.

According to an aspect of the present disclosure, a wireless communication device is installed on an installation surface of a vehicle. The wireless communication device includes an antenna. The antenna includes a first conductor, a second conductor, one or more third conductors, a fourth conductor, and a feeding line. The first conductor and the second conductor are opposed to each other in a first axis.

The one or more third conductors are positioned between the first conductor and the second conductor and extend in the first axis. The fourth conductor is connected to the first conductor and the second conductor and extends in the first axis. The feeding line is connected to the third conductor. The first conductor and the second conductor are capacitively connected to each other through the third conductor. A surface of the fourth conductor is opposed to the installation surface of the vehicle in a second axis vertical to the first axis.

According to an aspect of the present disclosure, a vehicle includes an antenna. The antenna includes a first conductor, a second conductor, one or more third conductors, a fourth conductor, and a feeding line. The first conductor and the second conductor are opposed to each other in a first axis. The one or more third conductors are positioned between the first conductor and the second conductor and extend in the first axis. The fourth conductor is connected to the first conductor and the second conductor and extends in the first axis. The feeding line is connected to the third conductor. The first conductor and the second conductor are capacitively connected to each other through the third conductor. A surface of the fourth conductor is opposed to the installation surface of the vehicle in a second axis vertical to the first axis.

According to an aspect of the present disclosure, an antenna is installed at an interior member of a movable body. The antenna includes a first conductor, a second conductor, one or more third conductors, a fourth conductor, and a feeding line. The first conductor and the second conductor are opposed to each other in a first axis. The one or more third conductors are positioned between the first conductor and the second conductor and extend in the first axis. The fourth conductor is connected to the first conductor and the second conductor and extends in the first axis. The feeding line is electromagnetically connected to the third conductor. The first conductor and the second conductor are capacitively connected to each other through the third conductor. A surface of the fourth conductor is opposed to an occupant in a second axis vertical to the first axis when the occupant rides in the movable body.

According to an aspect of the present disclosure, a wireless communication device is installed at an interior member of a movable body. The wireless communication device includes an antenna. The antenna includes a first conductor, a second conductor, one or more third conductors, a fourth conductor, and a feeding line. The first conductor and the second conductor are opposed to each other in a first axis. The one or more third conductors are positioned between the first conductor and the second conductor and extend in the first axis. The fourth conductor is connected to the first conductor and the second conductor and extends in the first axis. The feeding line is electromagnetically connected to the third conductor. The first conductor and the second conductor are capacitively connected to each other through the third conductor. A surface of the fourth conductor is opposed to an occupant in a second axis vertical to the first axis when the occupant rides in the movable body.

According to an aspect of the present disclosure, a movable body includes an antenna. The antenna includes a first conductor, a second conductor, one or more third conductors, a fourth conductor, and a feeding line. The first conductor and a second conductor are opposed to each other in a first axis. The one or more third conductors are positioned between the first conductor and the second conductor and extend in the first axis. A fourth conductor is connected to the first conductor and the second conductor and extends in the first axis. The feeding line is electromagnetically connected to the third conductor. The first conductor and the second conductor are capacitively connected to each other through the third conductor. A surface of the fourth conductor is opposed to an occupant in a second axis vertical to the first axis when the occupant rides in the movable body.

According to an aspect of the present disclosure, an antenna includes a first conductor, a second conductor opposed to the first conductor in a first axis, a third conductor, a fourth conductor, and a feeding line electromagnetically connected to the third conductor. The third conductor is positioned between the first conductor and the second conductor at a distance from the first conductor and the second conductor and extends in the first axis. The fourth conductor is connected to the first conductor and the second conductor and extends in the first axis. The first conductor and the second conductor are capacitively connected to each other through the third conductor. The antenna is disposed at a motorcycle.

According to an aspect of the present disclosure, a motorcycle is equipped with an antenna. The antenna includes a first conductor, a second conductor opposed to the first conductor in a first axis, a third conductor, a fourth conductor, and a feeding line electromagnetically connected to the third conductor. The third conductor is positioned between the first conductor and the second conductor at a distance from the first conductor and the second conductor and extends in the first axis. The fourth conductor is connected to the first conductor and the second conductor and extends in the first axis. The first conductor and the second conductor are capacitively connected to each other through the third conductor.

BRIEF DESCRIPTION OF DRAWINGS

FIG. 2 is a planar view of the resonator illustrated in FIG. 1.

FIG. 97 is a schematic diagram illustrating members of a vehicle on which an antenna may be installed.

FIG. 98 is a schematic diagram illustrating members of a vehicle on which an antenna may be installed.

FIG. 99 is a schematic diagram illustrating an embodiment of a member on which a wireless communication device is installed.

FIG. 100 is a schematic diagram illustrating an embodiment of a member on which a wireless communication device is installed.

FIG. 101 is a schematic diagram illustrating an embodiment of a wireless communication device installed on a movable body.

FIG. 102 is a schematic diagram illustrating interior members of a movable body on which an antenna may be installed.

FIG. 103 is a schematic diagram illustrating interior members of a movable body on which an antenna may be installed.

FIG. 104 is a schematic diagram illustrating an embodiment of an interior member on which a wireless communication device is installed.

FIG. 105A is a schematic diagram illustrating an embodiment of an interior member on which a wireless communication device is installed.

FIG. 105B is an enlarged view illustrating an embodiment of an interior member on which a wireless communication device is installed.

FIG. 106 is a cross-sectional view illustrating an embodiment of an interior member on which a wireless communication device is installed.

FIG. 107 is a schematic diagram illustrating an embodiment of an interior member on which a wireless communication device is installed.

Figure 108:
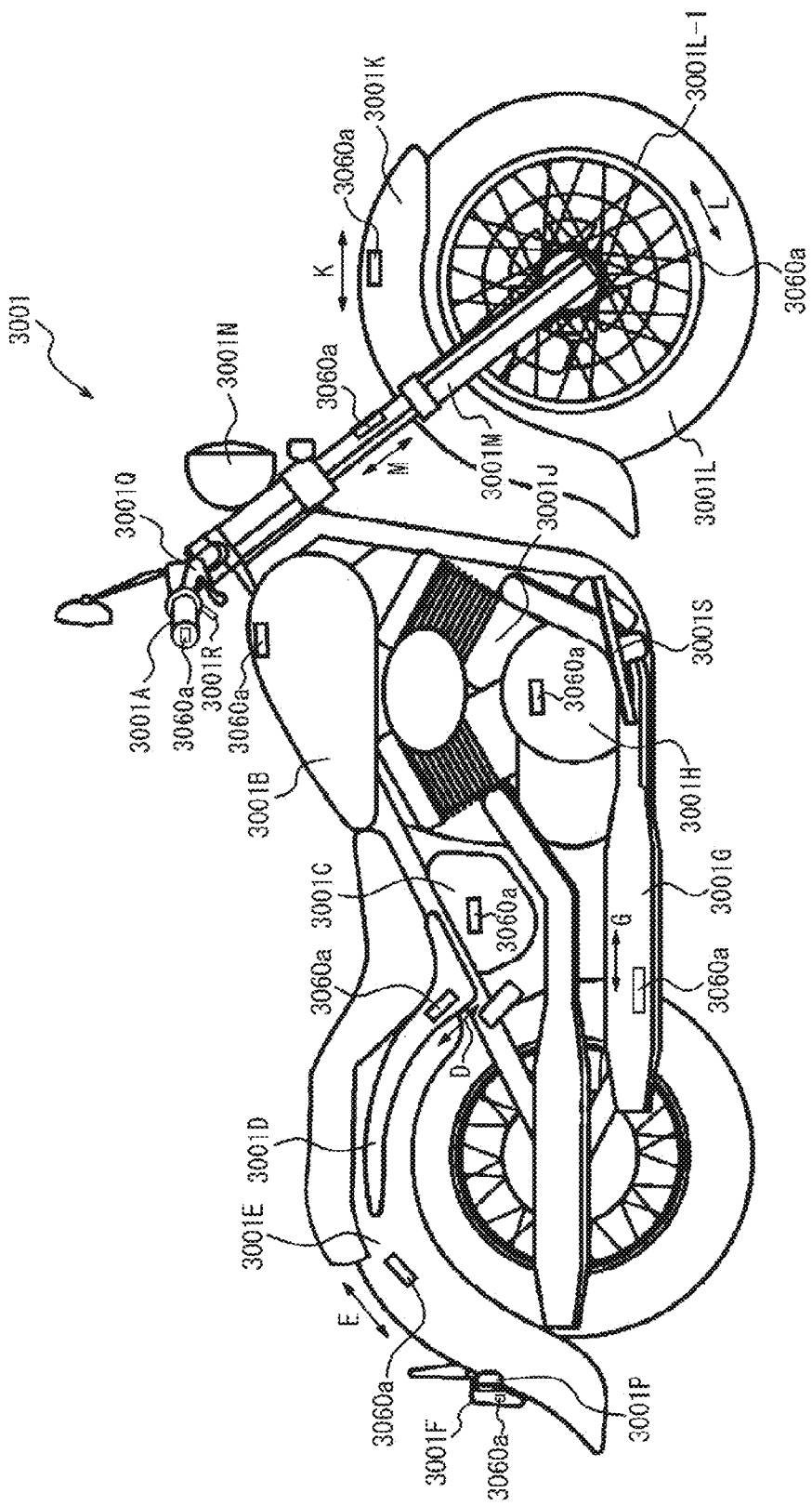

FIG. 108 is an external view illustrating an embodiment of a motorcycle.

Figure 109:
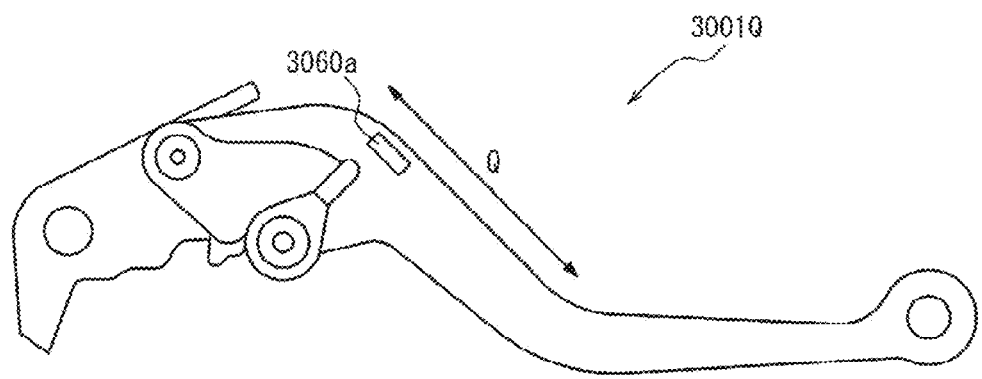

FIG. 109 is a diagram illustrating the brake lever illustrated in FIG. 108.

Figure 110:
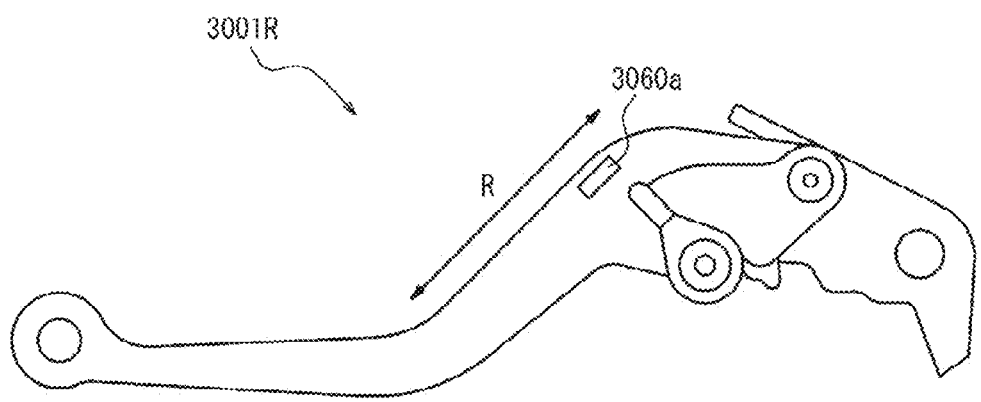

FIG. 110 is a diagram illustrating the clutch lever illustrated in FIG. 108.

Figure 111:
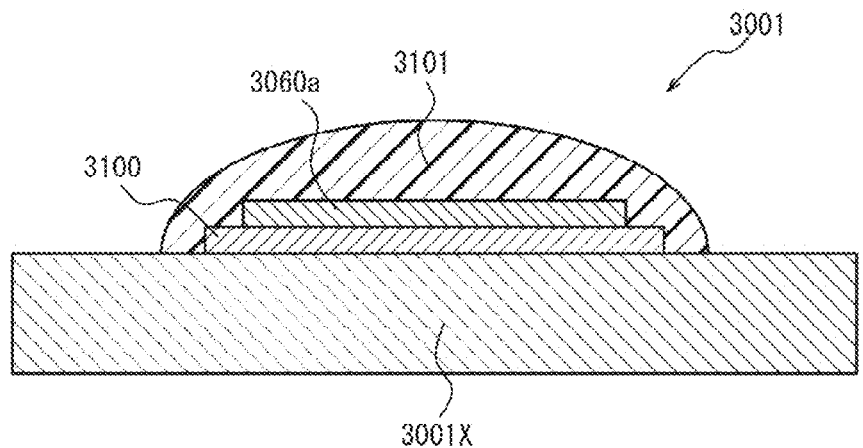

FIG. 111 is a diagram illustrating an example of the arrangement of the first antenna illustrated in FIG. 108.

Figure 112:
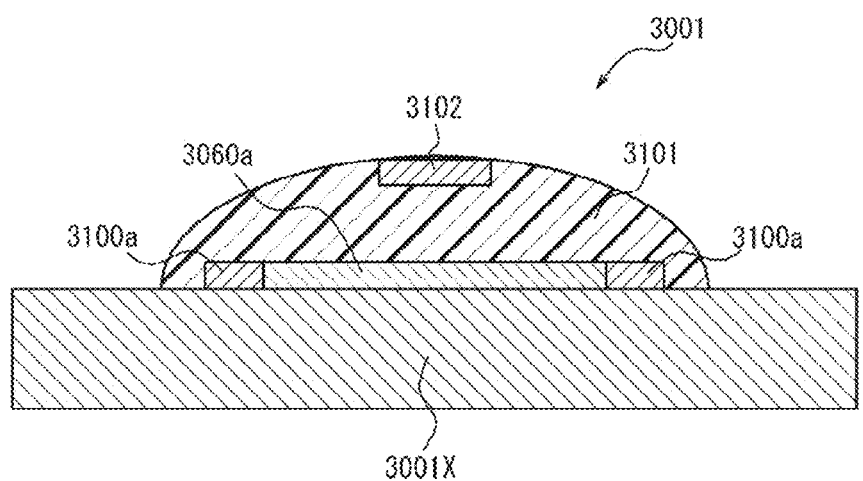

FIG. 112 is a diagram illustrating another example of the arrangement of the first antenna illustrated in FIG. 108.

Figure 113:
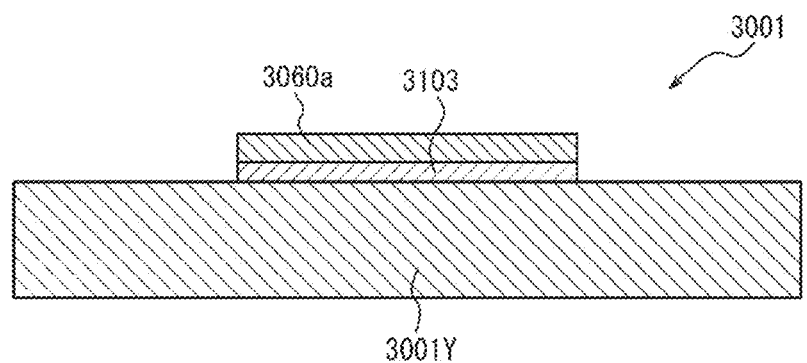

FIG. 113 is a diagram illustrating yet another example of the arrangement of the first antenna illustrated in FIG. 108.

Figure 114:
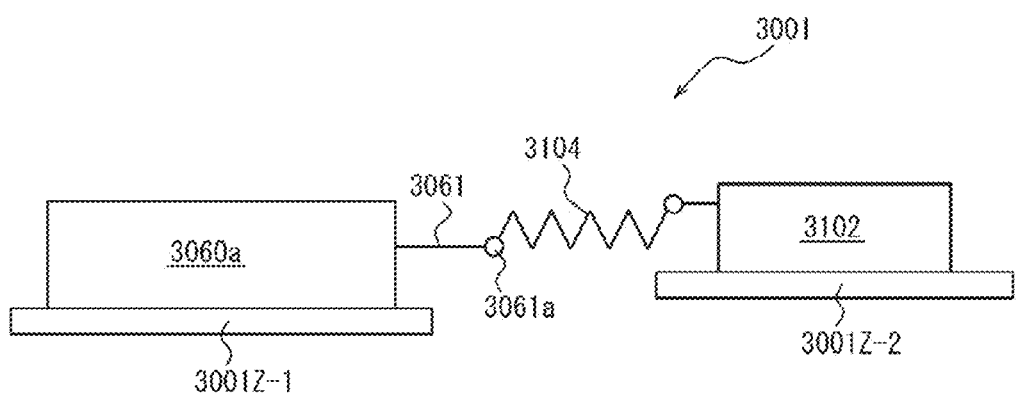

FIG. 114 is a diagram illustrating yet another example of the arrangement of the first antenna illustrated in FIG. 108.

Figure 115:
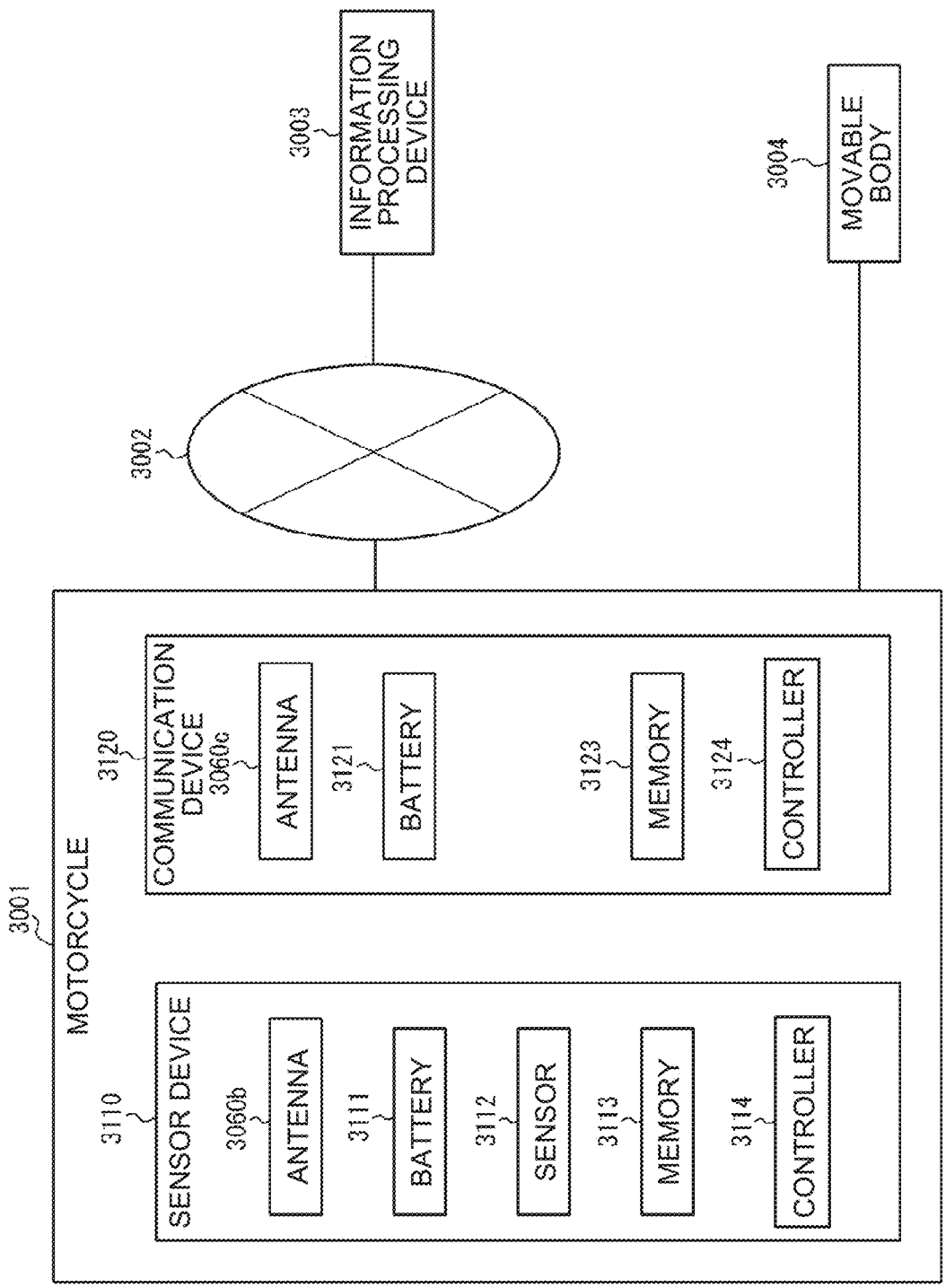

FIG. 115 is a functional block diagram of an example of the motorcycle illustrated in FIG. 108.

FIG. 116 is a functional block diagram of another example of the motorcycle illustrated in FIG. 108.

FIG. 117 is a functional block diagram of yet another example of the motorcycle illustrated in FIG. 108.

DESCRIPTION OF EMBODIMENTS

The present disclosure relates to provision of a wireless communication system, an antenna, a wireless communication device, a vehicle, a motorcycle, and a movable body, in which the usability of wireless communication techniques is improved when an antenna is installed on a member of a conductive body such as metal of a vehicle, a motorcycle, or a movable body. According to the present disclosure, the usability of wireless communication techniques is improved when an antenna is installed on a member of a conductive body such as metal of a vehicle, a motorcycle, or a movable body. Embodiments of the present disclosure will be described below with reference to the drawings.

(Antenna)

An antenna according to an embodiment of the present disclosure will be described below. A resonant structure may include a resonator. The resonant structure includes a resonator and other members and may be implemented in a complex form. A resonator 10 illustrated in FIG. 1 to FIG. 62 includes a base 20, pair conductors 30, a third conductor 40, and a fourth conductor 50. The base 20 is in contact with the pair conductors 30, the third conductor 40, and the fourth conductor 50. In the resonator 10, the pair conductors 30, the third conductor 40, and the fourth conductor 50 function as resonators. The resonator 10 may resonate at a plurality of resonance frequencies. Of the resonance frequencies of the resonator 10, one resonance frequency is referred to as a first frequency $f_1$. The first frequency $f_1$ has a wavelength of $\lambda_1$. The resonator 10 may have at least one of at least one resonance frequency as an operating frequency. The resonator 10 has the first frequency $f_1$ as an operating frequency.

The base 20 may include any one of a ceramic material and a resin material as its composition. Examples of the ceramic material include sintered aluminum oxide, sintered aluminum nitride, sintered mullite, sintered glass ceramics, crystallized glass including a crystalline component deposited in a glass base material, and sintered fine crystals such as mica or aluminum titanate. Examples of the resin material include those obtained by curing uncured products such as epoxy resins, polyester resins, polyimide resins, polyamide-imide resins, polyetherimide resins, and liquid crystal polymers.

The pair conductors 30, the third conductor 40, and the fourth conductor 50 may include any of a metal material, an alloy of a metal material, a hardened product of metal paste, and a conductive polymer as their compositions. All of the pair conductors 30, the third conductor 40, and the fourth conductor 50 may be of the same material. All of the pair conductors 30, the third conductor 40, and the fourth conductor 50 may be of different materials. The combination of any of the pair conductors 30, the third conductor 40, and the fourth conductor 50 may be of the same material. Examples of the metal material include copper, silver, palladium, gold, platinum, aluminum, chromium, nickel, cadmium lead, selenium, manganese, tin, vanadium, lithium, cobalt, and titanium. The alloy includes a plurality of metal materials. Examples of the metal paste agent include those obtained by mixing powder of a metal material with an organic solvent and a binder. Examples of the binder include epoxy resins, polyester resins, polyimide resins, polyamide-imide resins, and polyetherimide resins. Examples of the conductive polymer include polythiophene-based polymers, polyacethylene-based polymers, polyaniline-based polymers, and polypyrrole-based polymers.

The resonator 10 has two pair conductors 30. The pair conductors 30 include a plurality of conductive bodies. The pair conductors 30 include a first conductor 31 and a second conductor 32. The pair conductors 30 may include three or more conductive bodies. Each conductor of the pair conductors 30 is spaced apart from another conductor in a first axis. In the conductors of the pair conductors 30, one conductor may be paired with another conductor. Each conductor of the pair conductors 30 can be viewed as an electric conductor from the resonator between the paired conductors. The first conductor 31 is positioned away from the second conductor 32 in the first axis. The conductors 31 and 32 extend along a second plane intersecting the first axis.

In the present disclosure, the first axis (first axis) is denoted as x direction. In the present disclosure, a third axis (third axis) is denoted as y direction. In the present disclosure, a second axis (second axis) is denoted as z direction. In the present disclosure, a first plane (first plane) is denoted as xy plane. In the present disclosure, a second plane (second plane) is denoted as yz plane. In the present disclosure, a third plane (third plane) is denoted as zx plane. These planes are planes (plane) in a coordinate space (coordinate space) and are not intended to indicate a particular plate (plate) or a particular surface (surface). In the present disclosure, the surface integral (surface integral) in the xy plane may be denoted as first surface integral. In the present disclosure, the surface integral in the yz plane may be denoted as second surface integral. In the present disclosure, the surface integral in the zx plane may be denoted as third surface integral. The surface integral (surface integral) is represented by a unit such as square meter (square meter). In the present disclosure, the length in the x direction may be simply referred to as "length". In the present disclosure, the length in the y direction may be simply referred to as "width". In the present disclosure, the length in the z direction may be simply referred to as "height".

In an example, the conductors 31 and 32 are positioned at end portions of the base 20 in the x direction. A part of each of the conductors 31, 32 may partially face the outside of the base 20. A part of each of the conductors 31, 32 may be positioned inside the base 20 and another part thereof may be positioned outside the base 20. Each of the conductors 31, 32 may be positioned in the base 20.

The third conductor 40 functions as a resonator. The third conductor 40 may include at least one type of line-type, patch-type, and slot-type resonators. In an example, the third conductor 40 is positioned on the base 20. In an example, the third conductor 40 is positioned at an end of the base 20 in the z direction. In an example, the third conductor 40 may be positioned in the base 20. A part of the third conductor 40 may be positioned inside the base 20 and another part may be positioned outside the base 20. The surface of a part of the third conductor 40 may face the outside of the base 20.

The third conductor 40 includes at least one conductive body. The third conductor 40 may include a plurality of conductive bodies. When the third conductor 40 includes a plurality of conductive bodies, the third conductor 40 may be called a third conductor group. The third conductor 40 includes at least one conductive layer. The third conductor 40 includes at least one conductive body in one conductive layer. The third conductor 40 may include a plurality of conductive layers. For example, the third conductor 40 may include three or more conductive layers. The third conductor 40 includes at least one conductive body in each of a plurality of conductive layers. The third conductor 40 extends in the xy plane. The xy plane includes the x direction. Each conductive layer of the third conductor 40 extends along the xy plane.

In an example of a plurality of embodiments, the third conductor 40 includes a first conductive layer 41 and a second conductive layer 42. The first conductive layer 41 extends along the xy plane. The first conductive layer 41 may be positioned on the base 20. The second conductive layer 42 extends along the xy plane. The second conductive layer 42 may be capacitively coupled to the first conductive layer 41. The second conductive layer 42 may be electrically connected to the first conductive layer 41. Two conductive layers capacitively coupled may be opposed to each other in the y direction. Two conductive layers capacitively coupled may be opposed to each other in the x direction. Two conductive layers capacitively coupled may be opposed to each other in the first plane. Two conductive layers opposed to each other in the first plane may be paraphrased as "two conductive bodies are present in one conductive layer". At least a part of the second conductive layer 42 may overlap the first conductive layer 41 as viewed in the z direction. The second conductive layer 42 may be positioned in the base 20.

The fourth conductor 50 is positioned away from the third conductor 40. The fourth conductor 50 is electrically connected to each conductor 31, 32 of the pair conductors 30. The fourth conductor 50 is electrically connected to the first conductor 31 and the second conductor 32. The fourth conductor 50 extends along the third conductor 40. The fourth conductor 50 extends along the first plane. The fourth conductor 50 extends from the first conductor 31 to the second conductor 32. The fourth conductor 50 is positioned on the base 20. The fourth conductor 50 may be positioned in the base 20. A part of the fourth conductor 50 may be positioned inside the base 20 and another part may be positioned outside the base 20. The surface of a part of the fourth conductor 50 may face the outside of the base 20.

In an example of a plurality of embodiments, the fourth conductor 50 may function as a ground conductor in the resonator 10. The fourth conductor 50 may serve as a potential reference of the resonator 10. The fourth conductor 50 may be connected to the ground of a device having the resonator 10.

In an example of a plurality of embodiments, the resonator 10 may include the fourth conductor 50 and a reference potential layer 51. The reference potential layer 51 is positioned away from the fourth conductor 50 in the z direction. The reference potential layer 51 is electrically insulated from the fourth conductor 50. The reference potential layer 51 may serve as a potential reference of the resonator 10. The reference potential layer 51 may be electrically connected to the ground of a device having the resonator 10. The fourth conductor 50 may be electrically isolated from the ground of a device having the resonator 10. The reference potential layer 51 is opposed to the third conductor 40 or the fourth conductor 50 in the z direction.

In an example of a plurality of embodiments, the reference potential layer 51 is opposed to the third conductor 40 with the fourth conductor 50 interposed therebetween. The fourth conductor 50 is positioned between the third conductor 40 and the reference potential layer 51. The spacing between the reference potential layer 51 and the fourth conductor 50 is narrower than the spacing between the third conductor 40 and the fourth conductor 50.

In the resonator 10 including the reference potential layer 51, the fourth conductor 50 may include one or more conductive bodies. In the resonator 10 including the reference potential layer 51, the fourth conductor 50 may include one or more conductive bodies, and the third conductor 40 may be one conductive body connected to the pair conductors 30. In the resonator 10 including the reference potential layer 51, each of the third conductor 40 and the fourth conductor 50 may include at least one resonator.

In the resonator 10 including the reference potential layer 51, the fourth conductor 50 may include a plurality of conductive layers. For example, the fourth conductor 50 may include a third conductive layer 52 and a fourth conductive layer 53. The third conductive layer 52 may be capacitively coupled to the fourth conductive layer 53. The third conductive layer 52 may be electrically connected to the first conductive layer 41. Two conductive layers capacitively coupled may be opposed to each other in the y direction. Two conductive layers capacitively coupled may be opposed to each other in the x direction. Two conductive layers capacitively coupled may be opposed to each other in the xy plane.

The distance between two conductive layers opposed to each other in the z direction and capacitively coupled is shorter than the distance between the conductor group and the reference potential layer 51. For example, the distance between the first conductive layer 41 and the second conductive layer 42 is shorter than the distance between the third conductor 40 and the reference potential layer 51. For example, the distance between the third conductive layer 52 and the fourth conductive layer 53 is shorter than the distance between the fourth conductor 50 and the reference potential layer 51.

Each of the first conductor 31 and the second conductor 32 may include one or more conductive bodies. Each of the first conductor 31 and the second conductor 32 may be one conductive body. Each of the first conductor 31 and the second conductor 32 may include a plurality of conductive bodies. Each of the first conductor 31 and the second conductor 32 may include at least one fifth conductive layer 301 and a plurality of fifth conductors 302. The pair conductors 30 include at least one fifth conductive layer 301 and a plurality of fifth conductors 302.

The fifth conductive layer 301 extends in the y direction. The fifth conductive layer 301 extends along the xy plane. The fifth conductive layer 301 is a conductive body in the form of a layer. The fifth conductive layer 301 may be positioned on the base 20. The fifth conductive layer 301 may be positioned in the base 20. A plurality of fifth conductive layers 301 are spaced apart from each other in the z direction. A plurality of fifth conductive layers 301 are arranged in the z direction. A plurality of fifth conductive layers 301 partially overlap as viewed in the z direction. The fifth conductive layer 301 electrically connects a plurality of fifth conductors 302. The fifth conductive layer 301 is a connecting conductor that connects a plurality of fifth conductors 302. The fifth conductive layer 301 may be electrically connected to any conductive layer of the third conductor 40. In an embodiment, the fifth conductive layer 301 is electrically connected to the second conductive layer 42. The fifth conductive layer 301 may be integrated with the second conductive layer 42. In an embodiment, the fifth conductive layer 301 may be electrically connected to the fourth conductor 50. The fifth conductive layer 301 may be integrated with the fourth conductor 50.

Each fifth conductor 302 extends in the z direction. A plurality of fifth conductors 302 are spaced apart from each other in the y direction. The distance between the fifth conductors 302 is equal to or less than ½ wavelength of $\lambda_1$. When the distance between the fifth conductors 302 electrically connected is equal to or shorter than $\lambda_1/2$, each of the first conductor 31 and the second conductor 32 can reduce leakage of electromagnetic waves in the resonance frequency band from between the fifth conductors 302. The pair conductors 30 can be viewed as electric conductors from a unit structure since leakage of electromagnetic waves in the resonance frequency band is small. At least a part of a plurality of fifth conductors 302 is electrically connected to the fourth conductor 50. In an embodiment, a part of a plurality of fifth conductors 302 may electrically connect the fourth conductor 50 to the fifth conductive layer 301. In an embodiment, a plurality of fifth conductors 302 may be electrically connected to the fourth conductor 50 through the fifth conductive layer 301. One or more of a plurality of fifth conductors 302 may electrically connect one fifth conductive layer 301 to another fifth conductive layer 301. A via conductor and a through hole conductor may be employed as the fifth conductor 302.

The resonator 10 includes the third conductor 40 functioning as a resonator. The third conductor 40 may function as an artificial magnetic conductor (AMC; Artificial Magnetic Conductor). The artificial magnetic conductor may be referred to as a reactive impedance surface (RIS; Reactive Impedance Surface).

The resonator 10 includes the third conductor 40 functioning as a resonator between two pair conductors 30 opposed to each other in the x direction. Two pair conductors 30 can be viewed as electric conductors (Electric Conductor) extending from the third conductor 40 in the yz plane. The resonator 10 is electrically open at an end thereof in the y direction. The resonator 10 has a high impedance in the zx planes at both ends thereof in the y direction. The zx planes at both ends in the y direction of the resonator 10 are viewed as magnetic conductors (Magnetic Conductor) from the third conductor 40. Since the resonator 10 is surrounded by two electric conductors and two high-impedance planes (magnetic conductors), the resonator of the third conductor 40 has an artificial magnetic conductor character (Artificial Magnetic Conductor Character) in the z direction. Surrounded by two electric conductors and two high-impedance planes, the resonator of the third conductor 40 has an artificial magnetic conductor character in a finite number.

In the "artificial magnetic conductor character", the phase difference between an incident wave and a reflected wave at an operating frequency is 0 degrees. In the resonator 10, the phase difference between an incident wave and a reflected wave at a first frequency $f_1$ is 0 degrees. In the "artificial magnetic conductor character", the phase difference between an incident wave and a reflected wave in an operating frequency band is −90 degrees to +90 degrees. The operating frequency band is a frequency band between a second frequency $f_2$ and a third frequency $f_3$. The second frequency $f_2$ is a frequency at which the phase difference between an incident wave and a reflected wave is +90 degrees. The third frequency $f_3$ is a frequency at which the phase difference between an incident wave and a reflected wave is −90 degrees. The width of the operating frequency band determined based on the second and the third frequencies may be equal to or greater than 100 MHz, for example, when the operating frequency is about 2.5 GHz. The width of the operating frequency band may be equal to or greater than 5 MHz, for example, when the operating frequency is about 400 MHz.

The operating frequency of the resonator 10 may be different from the resonance frequency of each resonator of the third conductor 40. The operating frequency of the resonator 10 may vary depending on the length, size, shape, material, etc. of the base 20, the pair conductors 30, the third conductor 40, and the fourth conductor 50.

In an example of a plurality of embodiments, the third conductor 40 may include at least one unit resonator 40X. The third conductor 40 may include one unit resonator 40X. The third conductor 40 may include a plurality of unit resonators 40X. The unit resonator 40X is positioned overlapping with the fourth conductor 50 as viewed in the z direction. The unit resonator 40X is opposed to the fourth conductor 50. The unit resonator 40X may function as a frequency selective surface (FSS; Frequency Selective Surface). A plurality of unit resonators 40X are arranged along the xy plane. A plurality of unit resonators 40X may be arranged regularly in the xy plane. The unit resonators 40X may be arranged in the form of a square grid (square grid), an oblique grid (oblique grid), a rectangular grid (rectangular grid), and a hexagonal grid (hexagonal grid).

The third conductor 40 may include a plurality of conductive layers arranged in the z direction. Each of the plurality of conductive layers of the third conductor 40 includes an equivalent of at least one unit resonator. For example, the third conductor 40 includes a first conductive layer 41 and a second conductive layer 42.

The first conductive layer 41 includes an equivalent of at least one first unit resonator 41X. The first conductive layer 41 may include one first unit resonator 41X. The first conductive layer 41 may include a plurality of first divisional resonators 41Y obtained by dividing one first unit resonator 41X into a plurality of pieces. The plurality of first divisional resonators 41Y may be an equivalent of at least one first unit resonator 41X with an adjacent unit structure 10X. A plurality of first divisional resonators 41Y are positioned at an end portion of the first conductive layer 41. The first unit resonator 41X and the first divisional resonator 41Y may be called a third conductor.

The second conductive layer 42 includes an equivalent of at least one second unit resonator 42X. The second conductive layer 42 may include one second unit resonator 42X. The second conductive layer 42 may include a plurality of second divisional resonators 42Y obtained by dividing one second unit resonator 42X into a plurality of pieces. The plurality of second divisional resonators 42Y may be an equivalent of at least one second unit resonator 42X with an adjacent unit structure 10X. The plurality of second divisional resonators 42Y are positioned at an end portion of the second conductive layer 42. The second unit resonator 42X and the second divisional resonator 42Y may be called a third conductor.

At least a part of the second unit resonator 42X and the second divisional resonator 42Y is positioned overlapping with the first unit resonator 41X and the first divisional resonator 41Y as viewed in the Z direction. In the third conductor 40, at least a part of the unit resonator and the divisional resonator in each layer is stacked in the Z direction to form one unit resonator 40X. The unit resonator 40X includes an equivalent of at least one unit resonator in each layer.

When the first unit resonator 41X includes a line-type or patch-type resonator, the first conductive layer 41 has at least one first unit conductor 411. The first unit conductor 411 may function as a first unit resonator 41X or a first divisional resonator 41Y. The first conductive layer 41 has a plurality of first unit conductors 411 arranged in n rows and m columns in the xy directions, where n and m are natural numbers of 1 or greater independent of each other. In an example illustrated in FIGS. 1 to 9, etc., the first conductive layer 41 has six first unit conductors 411 arranged in a grid of two rows and three columns. The first unit conductors 411 may be arranged in the form of a square grid, an oblique grid, a rectangular grid, and a hexagonal grid. The first unit conductor 411 corresponding to the first divisional resonator 41Y is positioned at an end portion in the xy plane of the first conductive layer 41.

When the first unit resonator 41X is a slot-type resonator, at least one conductive layer of the first conductive layer 41 extends in the xy directions. The first conductive layer 41 has at least one first unit slot 412. The first unit slot 412 may function as a first unit resonator 41X or a first divisional resonator 41Y. The first conductive layer 41 may include a plurality of first unit slots 412 arranged in n rows and m columns in the xy directions, where n and m are natural numbers of 1 or greater independent of each other. In an example illustrated in FIGS. 6 to 9, etc., the first conductive layer 41 has six first unit slots 412 arranged in a grid of two rows and three columns. The first unit slots 412 may be arranged in the form of a square grid, an oblique grid, a rectangular grid, and a hexagonal grid. The first unit slot 412 corresponding to the first divisional resonator 41Y is positioned at an end portion in the xy plane of the first conductive layer 41.

When the second unit resonator 42X is a line-type or patch-type resonator, the second conductive layer 42 includes at least one second unit conductor 421. The second conductive layer 42 may include a plurality of second unit conductors 421 arranged in the xy directions. The second unit conductors 421 may be arranged in the form of a square grid, an oblique grid, a rectangular grid, and a hexagonal grid. The second unit conductor 421 may function as a second unit resonator 42X or a second divisional resonator 42Y. The second unit conductor 421 corresponding to the second divisional resonator 42Y is positioned at an end portion in the xy plane of the second conductive layer 42.

At least a part of the second unit conductor 421 overlaps with at least one of the first unit resonator 41X and the first divisional resonator 41Y as viewed in the z direction. The second unit conductor 421 may overlap with a plurality of first unit resonators 41X. The second unit conductor 421 may overlap with a plurality of first divisional resonators 41Y. The second unit conductor 421 may overlap with one first unit resonator 41X and four first divisional resonators 41Y. The second unit conductor 421 may overlap only with one first unit resonator 41X. The centroid of the second unit conductor 421 may overlap with one first unit resonator 41X. The centroid of the second unit conductor 421 may be positioned between a plurality of first unit resonators 41X and the first divisional resonator 41Y. The centroid of the second unit conductor 421 may be positioned between two first unit resonators 41X arranged in the x direction or the y direction.

At least a part of the second unit conductor 421 may overlap with two first unit conductors 411. The second unit conductor 421 may overlap only with one first unit conductor 411. The centroid of the second unit conductor 421 may be positioned between two first unit conductors 411. The centroid of the second unit conductor 421 may overlap with one first unit conductor 411. At least a part of the second unit conductor 421 may overlap with the first unit slot 412. The second unit conductor 421 may overlap only with one first unit slot 412. The centroid of the second unit conductor 421 may be positioned between two first unit slots 412 arranged in the x direction or the y direction. The centroid of the second unit conductor 421 may overlap with one first unit slot 412.

When the second unit resonator 42X is a slot-type resonator, at least one conductive layer of the second conductive layer 42 extends along the xy plane. The second conductive layer 42 has at least one second unit slot 422. The second unit slot 422 may function as a second unit resonator 42X or a second divisional resonator 42Y. The second conductive layer 42 may include a plurality of second unit slots 422 arranged in the xy plane. The second unit slots 422 may be arranged in the form of a square grid, an oblique grid, a rectangular grid, and a hexagonal grid. The second unit slot 422 corresponding to the second divisional resonator 42Y is positioned at an end portion in the xy plane of the second conductive layer 42.

At least a part of the second unit slot 422 overlaps with at least one of the first unit resonator 41X and the first divisional resonator 41Y in the y direction. The second unit slot 422 may overlap with a plurality of first unit resonators 41X. The second unit slot 422 may overlap with a plurality of first divisional resonators 41Y. The second unit slot 422 may overlap with one first unit resonator 41X and four first divisional resonators 41Y. The second unit slot 422 may overlap only with one first unit resonator 41X. The centroid of the second unit slot 422 may overlap with one first unit resonator 41X. The centroid of the second unit slot 422 may be positioned between a plurality of first unit resonators 41X. The centroid of the second unit slot 422 may be positioned between two first unit resonators 41X and the first divisional resonator 41Y arranged in the x direction or the y direction.

At least a part of the second unit slot 422 may overlap with two first unit conductors 411. The second unit slot 422 may overlap only with one first unit conductor 411. The centroid of the second unit slot 422 may be positioned between two first unit conductors 411. The centroid of the second unit slot 422 may overlap with one first unit conductor 411. At least a part of the second unit slot 422 may overlap with the first unit slot 412. The second unit slot 422 may overlap only with one first unit slot 412. The centroid of the second unit slot 422 may be positioned between two first unit slots 412 arranged in the x direction or the y direction. The center of the second unit slot 422 may overlap with one first unit slot 412.

The unit resonator 40X includes an equivalent of at least one first unit resonator 41X and an equivalent of at least one second unit resonator 42X. The unit resonator 40X may include one first unit resonator 41X. The unit resonator 40X may include a plurality of first unit resonators 41X. The unit resonator 40X may include one first divisional resonator 41Y. The unit resonator 40X may include a plurality of first divisional resonators 41Y. The unit resonator 40X may include a part of the first unit resonator 41X. The unit resonator 40X may include one or more partial first unit resonators 41X. The unit resonator 40X includes a plurality of partial resonators among one or more partial first unit resonators 41X and one or more first divisional resonators 41Y. A plurality of partial resonators included in the unit resonator 40X are combined into a first unit resonator 41X equivalent to at least one. The unit resonator 40X does not necessarily include a first unit resonator 41X but may include a plurality of first divisional resonators 41Y. The unit resonator 40X may include, for example, four first divisional resonators 41Y. The unit resonator 40X may include only a plurality of partial first unit resonators 41X. The unit resonator 40X may include one or more partial first unit resonators 41X and one or more first divisional resonators 41Y. The unit resonator 40X may include, for example, two partial first unit resonators 41X and two first divisional resonators 41Y. In the unit resonator 40X, the mirror images of the included first conductive layer 41 at the ends in the x direction may be substantially identical. In the unit resonator 40X, the included first conductive layer 41 may be substantially symmetric with respect to the center line extending in the z direction.

The unit resonator 40X may include one second unit resonator 42X. The unit resonator 40X may include a plurality of second unit resonators 42X. The unit resonator 40X may include one second divisional resonator 42Y. The unit resonator 40X may include a plurality of second divisional resonators 42Y. The unit resonator 40X may include a part of the second unit resonator 42X. The unit resonator 40X may include one or more partial second unit resonators 42X. The unit resonator 40X includes a plurality of partial resonators among one or more partial second unit resonators 42X and one or more second divisional resonators 42Y. A plurality of partial resonators included in the unit resonator 40X are combined into a second unit resonator 42X equivalent to one. The unit resonator 40X does not necessarily include a second unit resonator 42X but may include a plurality of second divisional resonators 42Y. The unit resonator 40X may include, for example, four second divisional resonators 42Y. The unit resonator 40X may include only a plurality of partial second unit resonators 42X. The unit resonator 40X may include one or more partial second unit resonators 42X and one or more second divisional resonators 42Y. The unit resonator 40X may include, for example, two partial second unit resonators 42X and two second divisional resonators 42Y. In the unit resonator 40X, the mirror images of the included second conductive layer 42 at the ends in the x direction may be substantially identical. In the unit resonator 40X, the included second conductive layer 42 may be substantially symmetric with respect to the centerline extending in the y direction.

In an example of a plurality of embodiments, the unit resonator 40X includes one first unit resonator 41X and a plurality of partial second unit resonators 42X. For example, the unit resonator 40X includes one first unit resonator 41X and half of four second unit resonators 42X. This unit resonator 40X includes an equivalent of one first unit resonator 41X and an equivalent of two second unit resonators 42X. The configuration of the unit resonator 40X is not limited to this example.

The resonator 10 may include at least one unit structure 10X. The resonator 10 may include a plurality of unit structures 10X. The plurality of unit structures 10X may be arranged in the xy plane. The plurality of unit structures 10X may be arranged in the form of a square grid, an oblique grid, a rectangular grid, and a hexagonal grid. The unit structure 10X includes a repetition unit of any one of a square grid (square grid), an oblique grid (oblique grid), a rectangular grid (rectangular grid), and a hexagonal grid (hexagonal grid). The unit structures 10X may be arranged infinitely along the xy plane to function as an artificial magnetic conductor (AMC).

The unit structure 10X may include at least a part of the base 20, at least a part of the third conductor 40, and at least a part of the fourth conductor 50. The sections of the base 20, the third conductor 40, and the fourth conductor 50 included in the unit structure 10X overlap as viewed in the z direction. The unit structure 10X includes a unit resonator 40X, a part of the base 20 overlapping with the unit resonator 40X as viewed in the z direction, and the fourth conductor 50 overlapping with the unit resonator 40X as viewed in the z direction. The resonator 10 may include, for example, six unit structures 10X arranged in two rows and three columns.

The resonator 10 may have at least one unit structure 10X between two pair conductors 30 opposed to each other in the x direction. Two pair conductors 30 can be viewed as electric conductors extending from the unit structure 10X in the yz plane. The unit structure 10X is open at an end in the y direction. The unit structure 10X has a high impedance in the zx planes at both ends in the y direction. The unit structure 10X can be viewed as magnetic conductors in the zx planes at both ends in the y direction. The unit structures 10X may be in line symmetry with respect to the z direction when repeatedly arranged. Surrounded by two electric conductors and two high-impedance planes (magnetic conductors), the unit structure 10X has an artificial magnetic conductor character in the z direction. Surrounded by two electric conductors and two high-impedance planes (magnetic conductors), the unit structure 10X has an artificial magnetic conductor character in a finite number.

The operating frequency of the resonator 10 may be different from the operating frequency of the first unit resonator 41X. The operating frequency of the resonator 10 may be different from the operating frequency of the second unit resonator 42X. The operating frequency of the resonator 10 may vary depending on, for example, coupling of the first unit resonator 41X and the second unit resonator 42X that constitute the unit resonator 40X.

The third conductor 40 may include a first conductive layer 41 and a second conductive layer 42. The first conductive layer 41 includes at least one first unit conductor 411. The first unit conductor 411 includes a first connecting conductor 413 and a first floating conductor 414. The first connecting conductor 413 is connected to one of the pair conductors 30. The first floating conductor 414 is not connected to the pair conductors 30. The second conductive layer 42 includes at least one second unit conductor 421. The second unit conductor 421 includes a second connecting conductor 423 and a second floating conductor 424. The second connecting conductor 423 is connected to one of the pair conductors 30. The second floating conductor 424 is not connected to the pair conductors 30. The third conductor 40 may include a first unit conductor 411 and a second unit conductor 421.

The first connecting conductor 413 may have a length along the x direction longer than the first floating conductor 414. The first connecting conductor 413 may have a length along the x direction shorter than the first floating conductor 414. The first connecting conductor 413 may have half of the length along the x direction, compared with the first floating conductor 414. The second connecting conductor 423 may have a length along the x direction longer than the second floating conductor 424. The second connecting conductor 423 may have a length along the x direction shorter than the second floating conductor 424. The second connecting conductor 423 may have half of the length along the x direction, compared with the second floating conductor 424.

The third conductor 40 may include a current path 40I serving as a current path between the first conductor 31 and the second conductor 32 when the resonator 10 resonates. The current path 40I may be connected to the first conductor 31 and the second conductor 32. The current path 40I has capacitance between the first conductor 31 and the second conductor 32. The capacitance of the current path 40I is connected electrically in series between the first conductor 31 and the second conductor 32. In the current path 40I, a conductive body is isolated between the first conductor 31 and the second conductor 32. The current path 40I may include a conductive body connected to the first conductor 31 and a conductive body connected to the second conductor 32.

In a plurality of embodiments, in the current path 40I, the first unit conductor 411 and the second unit conductor 421 are partially opposed to each other in the z direction. In the current path 40I, the first unit conductor 411 and the second unit conductor 421 are capacitively coupled. The first unit conductor 411 has a capacitance component at an end portion in the x direction. The first unit conductor 411 may have a capacitance component at an end portion in the y direction opposed to the second unit conductor 421 in the z direction. The first unit conductor 411 may have a capacitance component at an end portion in the x direction opposed to the second unit conductor 421 in the z direction and at an end portion in the y direction. The second unit conductor 421 has a capacitance component at an end portion in the x direction. The second unit conductor 421 may have a capacitance component at an end portion in the y direction opposed to the first unit conductor 411 in the z direction. The second unit conductor 421 may have a capacitance component at an end portion in the x direction opposed to the first unit conductor 411 in the z direction and at an end portion in the y direction.

The resonator 10 can have a lower resonance frequency by increasing the capacitive coupling in the current path 40I. When achieving a desired operating frequency, the resonator 10 can have a shorter length along the x direction by increasing the capacitance coupling of the current path 40I. In the third conductor 40, the first unit conductor 411 and the second unit conductor 421 are opposed to each other in the stacking direction of the base 20 and capacitively coupled. The third conductor 40 can adjust the capacitance between the first unit conductor 411 and the second unit conductor 421 by the opposing surface integrals.

In a plurality of embodiments, the length along the y direction of the first unit conductor 411 differs from the length along the y direction of the second unit conductor 421. When the relative position between the first unit conductor 411 and the second unit conductor 421 is shifted along the xy plane from an ideal position, the resonator 10 can reduce variation in magnitude of the capacitance since the length along the third axis differs between the first unit conductor 411 and the second unit conductor 421.

In a plurality of embodiments, the current path 40I is formed of one conductive body spatially away from the first conductor 31 and the second conductor 32 and capacitively coupled to the first conductor 31 and the second conductor 32.

In a plurality of embodiments, the current path 40I includes a first conductive layer 41 and a second conductive layer 42. This current path 40I includes at least one first unit conductor 411 and at least one second unit conductor 421. This current path 40I includes two first connecting conductors 413, two second connecting conductors 423, and one of one first connecting conductor 413 and one second connecting conductor 423. In this current path 40I, the first unit conductor 411 and the second unit conductor 421 may be alternately arranged along the first axis.

In a plurality of embodiments, the current path 40I includes a first connecting conductor 413 and a second connecting conductor 423. This current path 40I includes at least one first connecting conductor 413 and at least one second connecting conductor 423. In this current path 40I, the third conductor 40 has capacitance between the first connecting conductor 413 and the second connecting conductor 423. In an example of embodiments, the first connecting conductor 413 may be opposed to the second connecting conductor 423 and have capacitance. In an example of embodiments, the first connecting conductor 413 may be capacitively connected to the second connecting conductor 423 through another conductive body.

In a plurality of embodiments, the current path 40I includes a first connecting conductor 413 and a second floating conductor 424. This current path 40I includes two first connecting conductors 413. In this current path 40I, the third conductor 40 has capacitance between two first connecting conductors 413. In an example of embodiments, two first connecting conductors 413 may be capacitively connected to each other through at least one second floating conductor 424. In an example of embodiments, two first connecting conductors 413 may be capacitively connected to each other through at least one first floating conductor 414 and a plurality of second floating conductors 424.

In a plurality of embodiments, the current path 40I includes a first floating conductor 414 and a second connecting conductor 423. This current path 40I includes two second connecting conductors 423. In this current path 40I, the third conductor 40 has capacitance between two second connecting conductors 423. In an example of embodiments, two second connecting conductors 423 may be capacitively connected to each other through at least one first floating conductor 414. In an example of embodiments, two second connecting conductors 423 may be capacitively connected to each other through a plurality of first floating conductors 414 and at least one second floating conductor 424.

In a plurality of embodiments, each of the first connecting conductor 413 and the second connecting conductor 423 may have a length one-fourth of the wavelength $\lambda$ at a resonance frequency. Each of the first connecting conductor 413 and the second connecting conductor 423 may function as a resonator with half a length of the wavelength $\lambda$. Each of the first connecting conductor 413 and the second connecting conductor 423 may oscillate in the odd mode and the even mode when the individual resonators are capacitively coupled. In the resonator 10, the resonance frequency in the even mode after capacitively coupling may be the operating frequency.

The current path 40I may be connected to the first conductor 31 at a plurality of points. The current path 40I may be connected to the second conductor 32 at a plurality of points. The current path 40I may include a plurality of electric conductive paths that conduct electricity independently, from the first conductor 31 to the second conductor 32.

In the second floating conductor 424 capacitively coupled to the first connecting conductor 413, an end of the second floating conductor 424 on the capacitively coupled side has a shorter distance to the first connecting conductor 413 than the distance to the pair conductor 30. In the first floating conductor 414 capacitively coupled to the second connecting conductor 423, an end of the first floating conductor 414 on the capacitively coupled side has a shorter distance to the second connecting conductor 423 than the distance to the pair conductor 30.

In the resonator 10 in a plurality of embodiments, the conductive layers of the third conductor 40 may have individually different lengths in the y direction. A conductive layer of the third conductor 40 is capacitively coupled to another conductive layer in the z direction. In the resonator 10, when the conductive layers differ in length in the y direction, variation in capacitance is reduced even when the conductive layers are shifted in the y direction. When the conductive layers differ in length in the y direction, the resonator 10 can expand the acceptable range of shift in the y direction of the conductive layers.

In the resonator 10 in a plurality of embodiments, the third conductor 40 has capacitance by capacitive coupling between the conductive layers. A plurality of capacitance bodies having the capacitance may be arranged in the y direction. The plurality of capacitance bodies arranged in the y direction may be electromagnetically parallel. When the resonator 10 has a plurality of capacitance bodies arranged electrically in parallel, the individual capacitance errors can complement each other.

When the resonator 10 is in a resonant state, current flowing through the pair conductors 30, the third conductor 40, and the fourth conductor 50 loops. When the resonator 10 is in a resonant state, alternating current flows through the resonator 10. In the resonator 10, current flowing through the third conductor 40 is referred to as first current, and current flowing through the fourth conductor 50 is referred to as second current. When the resonator 10 is in a resonant state, the first current flows in a direction different from the second current in the x direction. For example, when the first current flows in the +x direction, the second current flows in the −x direction. For example, when the first current flows in the −x direction, the second current flows in the +x direction. That is, when the resonator 10 is in a resonant state, loop current flows alternately in the +x direction and the −x direction. The loop current forming a magnetic field is repeatedly inverted whereby the resonator 10 emits electromagnetic waves.

In a plurality of embodiments, the third conductor 40 includes a first conductive layer 41 and a second conductive layer 42. Since the third conductor 40 has the first conductive layer 41 and the second conductive layer 42 capacitively coupled, current appears to flow in one direction globally in a resonant state. In a plurality of embodiments, current flowing through each conductor has a higher density at an end portion in the y direction.

In the resonator 10, the first current and the second current loop through the pair conductors 30. In the resonator 10, the first conductor 31, the second conductor 32, the third conductor 40, and the fourth conductor 50 form a resonant circuit. The resonance frequency of the resonator 10 is the resonance frequency of a unit resonator. When the resonator 10 includes one unit resonator or when the resonator 10 includes a part of a unit resonator, the resonance frequency of the resonator 10 varies depending on the base 20, the pair conductors 30, the third conductor 40, and the fourth conductor 50, and electromagnetic coupling of the resonator 10 with the surroundings. For example, when the periodicity of the third conductor 40 is poor, the entire resonator 10 is one unit resonator or the entire resonator 10 is a part of one unit resonator. For example, the resonance frequency of the resonator 10 varies depending on the length in the z direction of the first conductor 31 and the second conductor 32, the length in the x direction of the third conductor 40 and the fourth conductor 50, and the capacitance of the third conductor 40 and the fourth conductor 50. For example, in the resonator 10 having a large capacitance between the first unit conductor 411 and the second unit conductor 421, the resonance frequency can be lowered while the length in the z direction of the first conductor 31 and the second conductor 32 and the length in the x direction of the third conductor 40 and the fourth conductor 50 are reduced.

In a plurality of embodiments, in the resonator 10, the first conductive layer 41 is an effective radiation plane of electromagnetic waves in the z direction. In a plurality of embodiments, in the resonator 10, the first surface integral of the first conductive layer 41 is larger than the first surface integral of another conductive layer. In this resonator 10, increasing the first surface integral of the first conductive layer 41 can increase radiation of electromagnetic waves.

In a plurality of embodiments, the resonator 10 may include one or more impedance elements 45. The impedance element 45 has an impedance value between a plurality of terminals. The impedance element 45 changes the resonance frequency of the resonator 10. The impedance element 45 may include a resistor (Resistor), a capacitor (Capacitor), and an inductor (Inductor). The impedance element 45 may include a variable element that can change the impedance value. The variable element may change the impedance value by an electrical signal. The variable element may change the impedance value by a physical mechanism.

The impedance element 45 may be connected to two unit conductors arranged in the x direction of the third conductor 40. The impedance element 45 may be connected to two first unit conductors 411 arranged in the x direction. The impedance element 45 may be connected to the first connecting conductor 413 and the first floating conductor 414 arranged in the x direction. The impedance element 45 is connected to the first conductor 31 and the first floating conductor 414. The impedance element 45 may be connected to a unit conductor of the third conductor 40 at a central portion in the y direction. The impedance element 45 may be connected to a central portion in the y direction of two first unit conductors 411.

The impedance element 45 is connected electrically in series between two conductive bodies arranged in the x direction in the xy plane. The impedance element 45 may be connected electrically in series between two first unit conductors 411 arranged in the x direction. The impedance element 45 may be connected electrically in series between the first connecting conductor 413 and the first floating conductor 414 arranged in the x direction. The impedance element 45 may be connected electrically in series between the first conductor 31 and the first floating conductor 414.

The impedance element 45 may be connected electrically in parallel to two first unit conductors 411 and the second unit conductor 421 stacked in the z direction and having capacitance. The impedance element 45 may be connected electrically in parallel to the second connecting conductor 423 and the first floating conductor 414 stacked in the z direction and having capacitance.

The resonator 10 can additionally include a capacitor as the impedance element 45 to make the resonance frequency lower. The resonator 10 may additionally include an inductor as the impedance element 45 to make the resonance frequency higher. The resonator 10 may include impedance elements 45 having different impedance values. The resonator 10 may include capacitors with different electric capacitances as the impedance elements 45. The resonator 10 may include inductors with different inductances as the impedance elements 45. The resonator 10 additionally includes impedance elements 45 with different impedance values to increase the adjustment range of the resonance frequency. The resonator 10 may include both a capacitor and an inductor as impedance elements 45. The resonator 10 additionally includes both a capacitor and an inductor as impedance elements 45 to increase the adjustment range of the resonance frequency. With the provision of the impedance element 45, the entire resonator 10 may be one unit resonator or the entire resonator 10 may be a part of one unit resonator.

Figure 1:
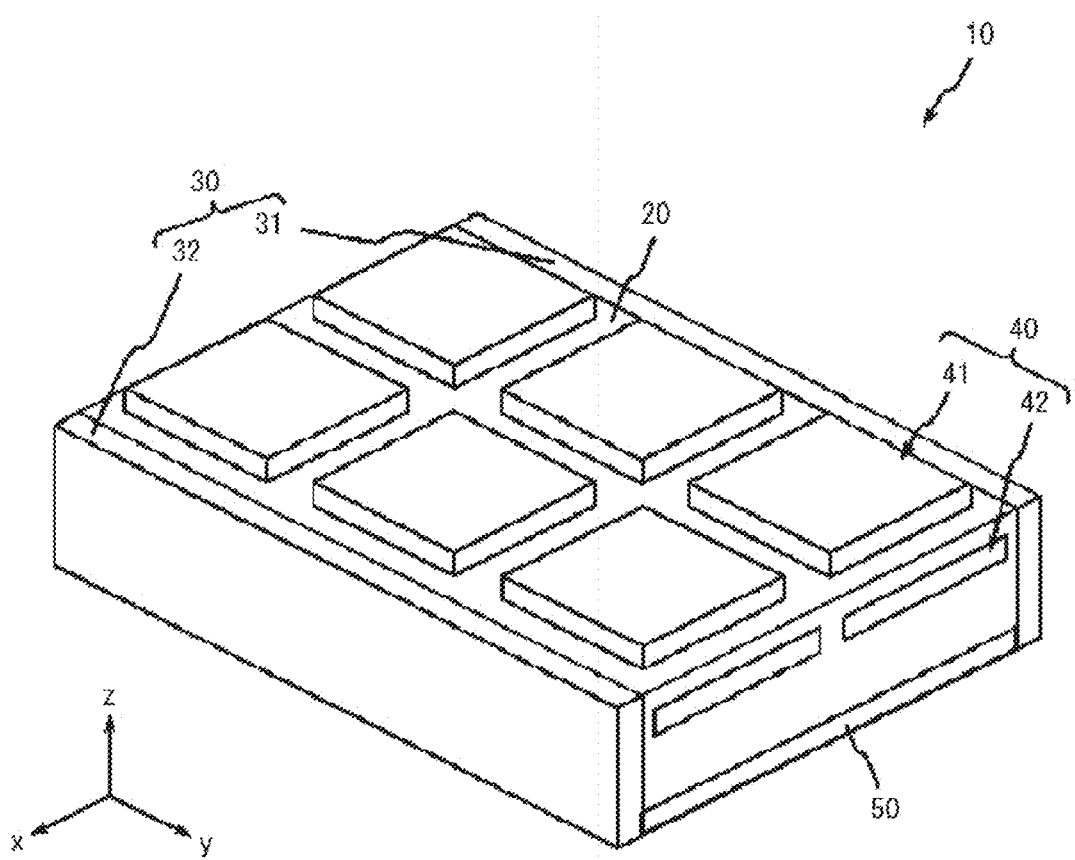
FIG. 1 is a perspective view illustrating an embodiment of a resonator.
Figure 3A:
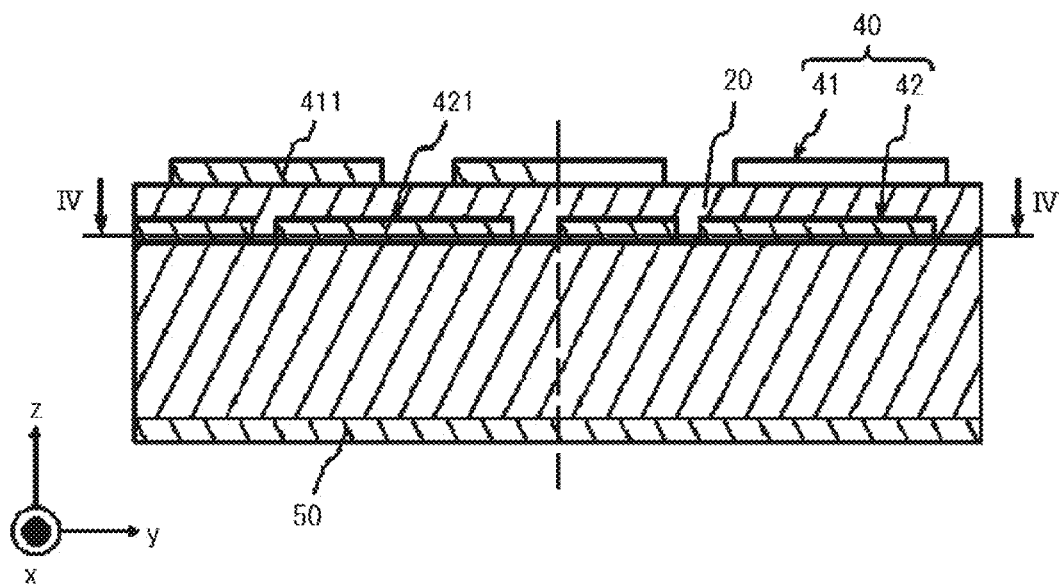
FIG. 3A is a cross-sectional view of the resonator illustrated in FIG. 1.
Figure 3B:
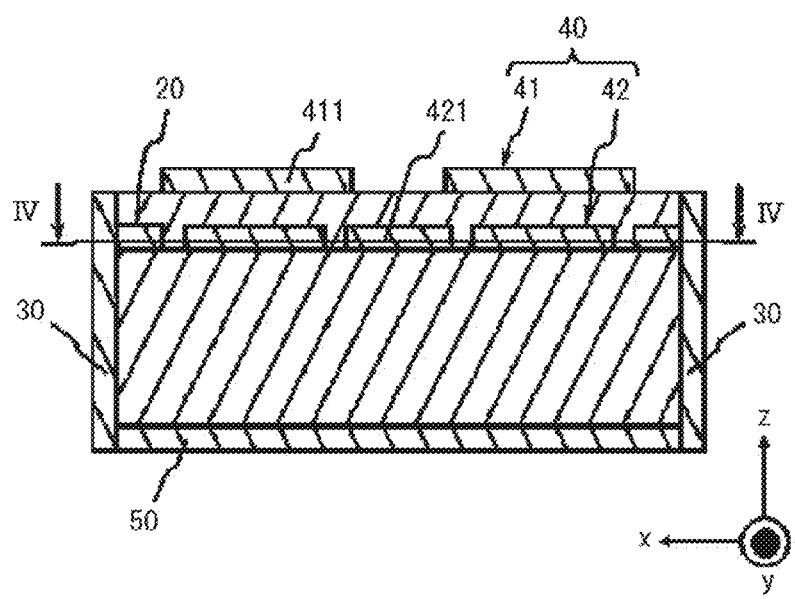
FIG. 3B is a cross-sectional view of the resonator illustrated in FIG. 1.
Figure 4:
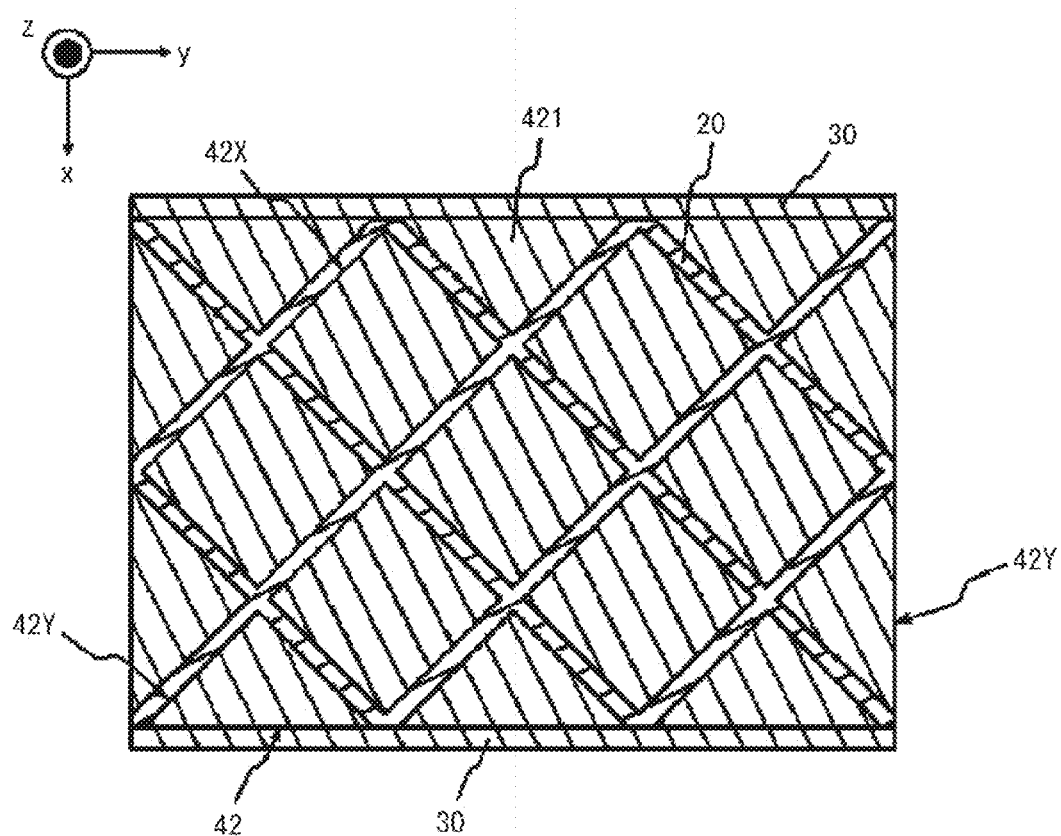
FIG. 4 is a cross-sectional view of the resonator illustrated in FIG. 1.
Figure 5:
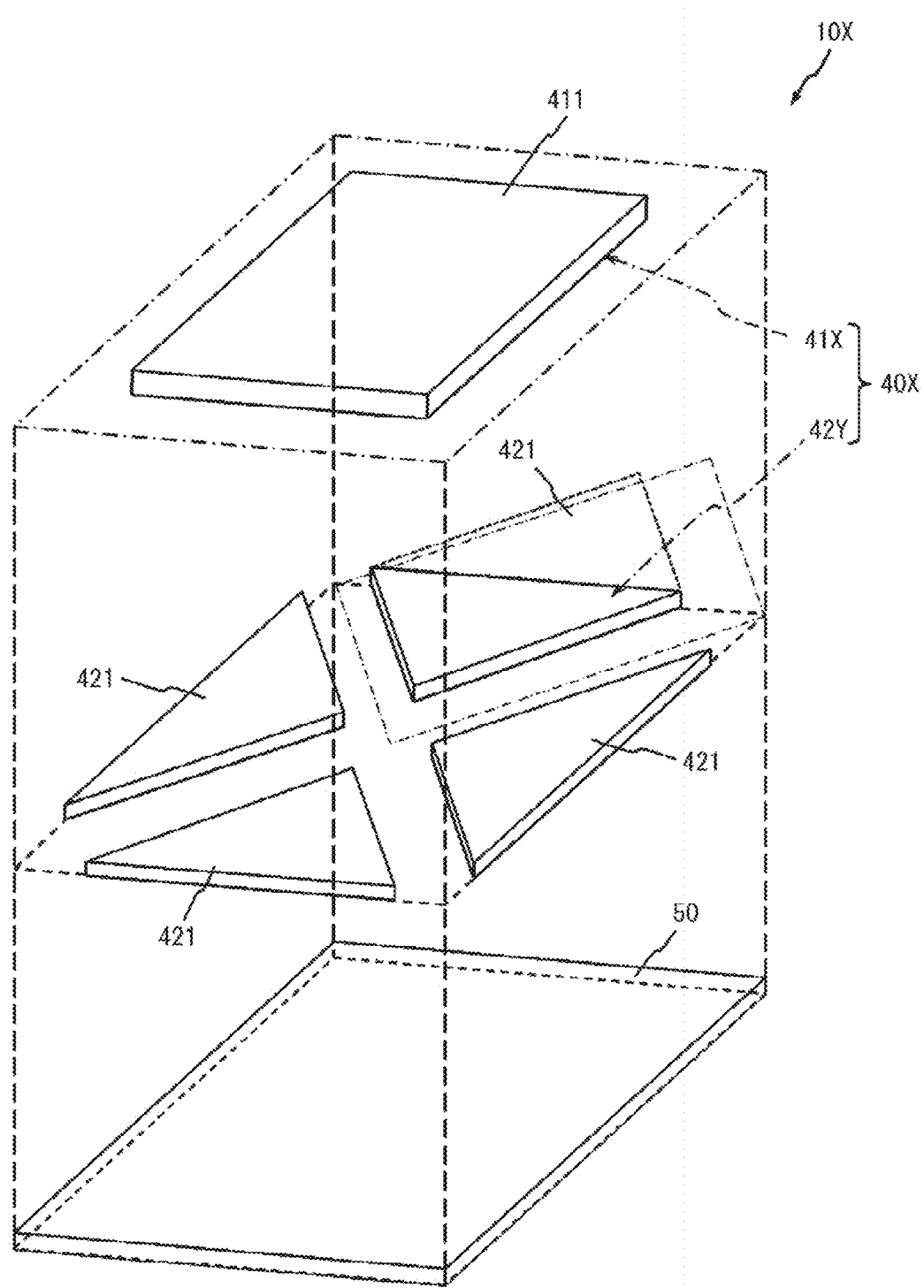
FIG. 5 is a conceptual diagram illustrating a unit structure of the resonator illustrated in FIG. 1.

FIGS. 1 to 5 are diagrams illustrating a resonator 10 that is an example of a plurality of embodiments. FIG. 1 is a schematic diagram of the resonator 10. FIG. 2 is a planar view of the xy plane from the z direction. FIG. 3A is a cross-sectional view taken along line IIIa-IIIa illustrated in FIG. 2. FIG. 3B is a cross-sectional view taken along line IIIb-IIIb illustrated in FIG. 2. FIG. 4 is a cross-sectional view taken along line IV-IV illustrated in FIGS. 3A and 3B. FIG. 5 is a conceptual diagram illustrating a unit structure 10X that is an example of a plurality of embodiments.

In the resonator 10 illustrated in FIGS. 1 to 5, a first conductive layer 41 includes a patch-type resonator as a first unit resonator 41X. A second conductive layer 42 includes a patch-type resonator as a second unit resonator 42X. The unit resonator 40X includes one first unit resonator 41X and four second divisional resonators 42Y. The unit structure 10X includes a unit resonator 40X as well as a part of the base 20 and a part of the fourth conductor 50 that overlap with the unit resonator 40X as viewed in the z direction.

Figure 6:
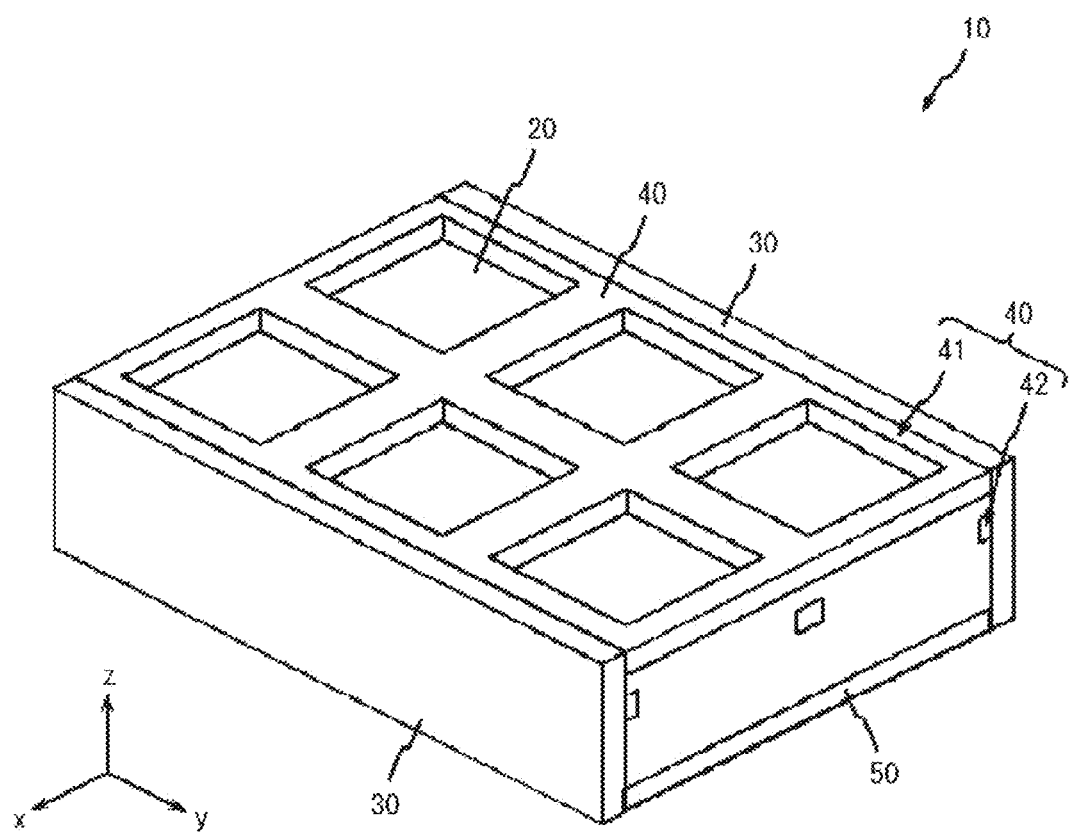
FIG. 6 is a perspective view illustrating an embodiment of a resonator.
Figure 7:
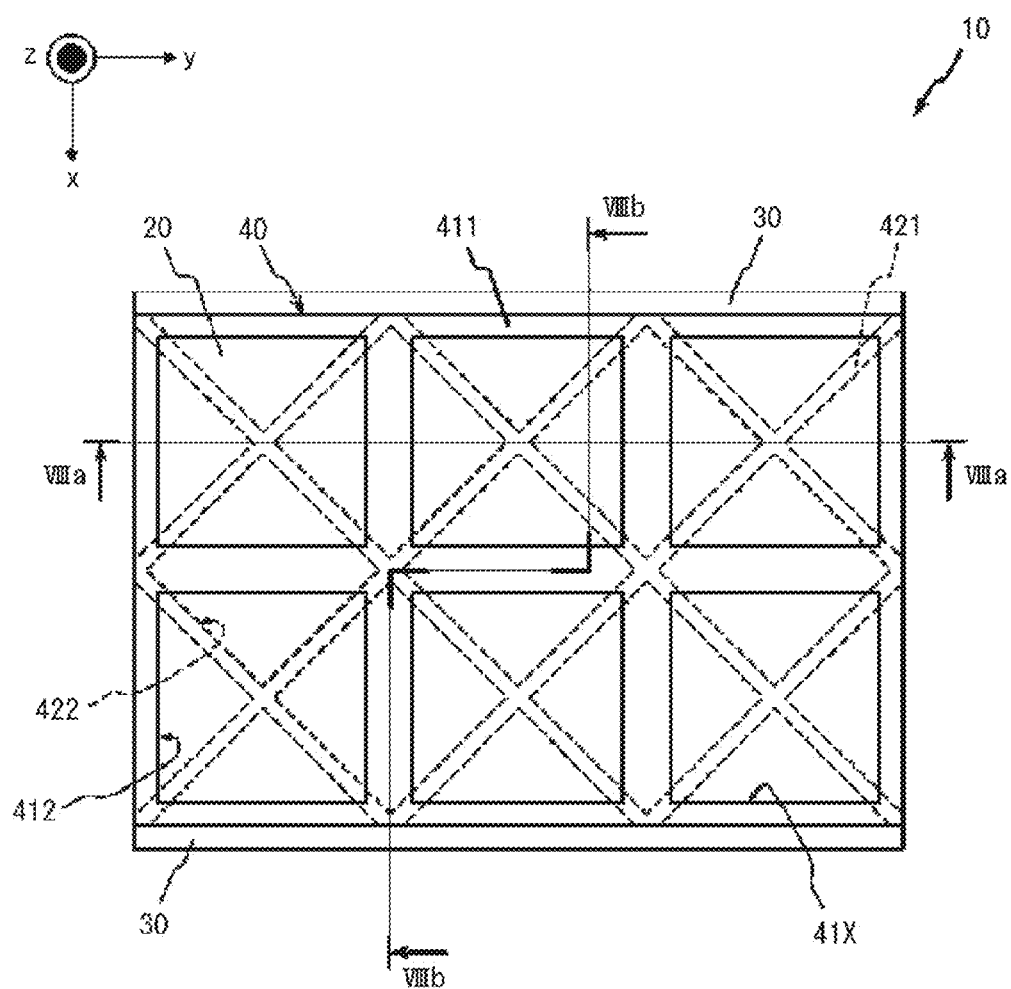
FIG. 7 is a planar view of the resonator illustrated in FIG. 6.
Figure 8A:
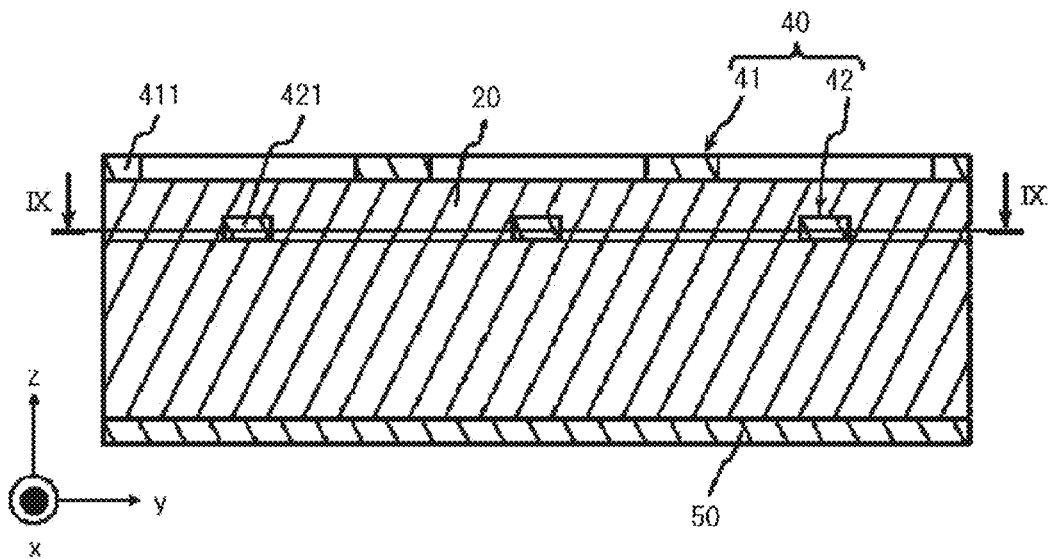
FIG. 8A is a cross-sectional view of the resonator illustrated in FIG. 6.
Figure 8B:
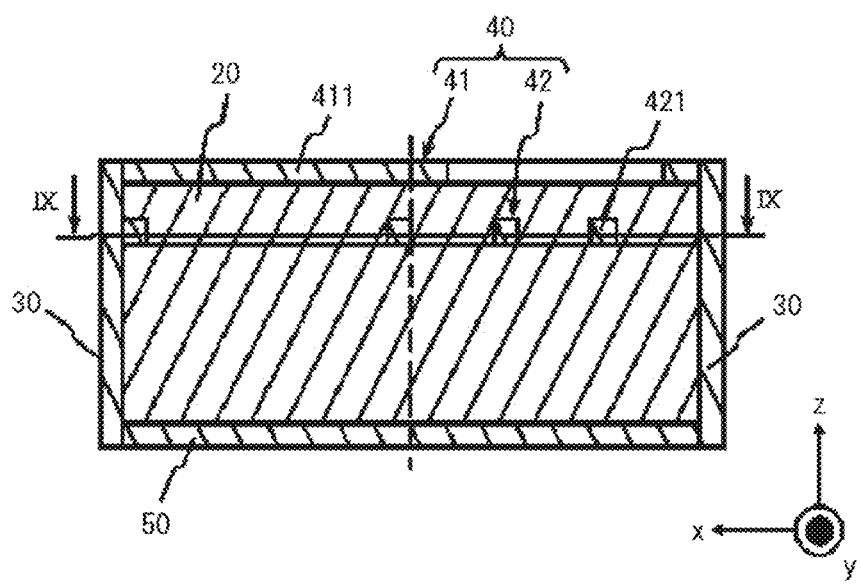
FIG. 8B is a cross-sectional view of the resonator illustrated in FIG. 6.
Figure 9:
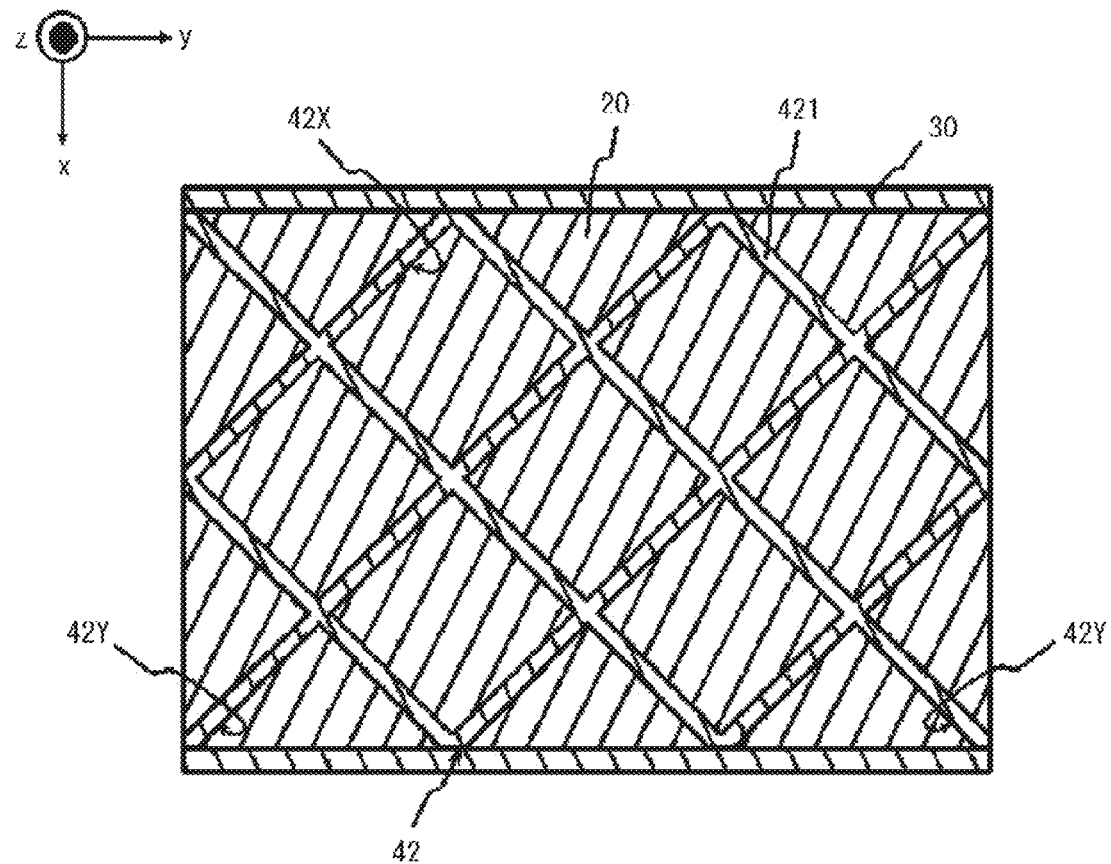
FIG. 9 is a cross-sectional view of the resonator illustrated in FIG. 6.

FIGS. 6 to 9 are diagrams illustrating a resonator 10 that is an example of a plurality of embodiments. FIG. 6 is a schematic diagram of the resonator 10. FIG. 7 is a planar view of the xy plane from the z direction. FIG. 8A is a cross-sectional view taken along line VIIIa-VIIIa illustrated in FIG. 7. FIG. 8B is a cross-sectional view taken along line VIIIb-VIIIb illustrated in FIG. 7. FIG. 9 is a cross-sectional view taken along line IX-IX illustrated in FIGS. 8A and 8B.

In the resonator 10 illustrated in FIGS. 6 to 9, the first conductive layer 41 includes a slot-type resonator as a first unit resonator 41X. The second conductive layer 42 includes a slot-type resonator as a second unit resonator 42X. The unit resonator 40X includes one first unit resonator 41X and four second divisional resonators 42Y. The unit structure 10X includes a unit resonator 40X as well as a part of the base 20 and a part of the fourth conductor 50 that overlap with the unit resonator 40X as viewed in the z direction.

Figure 10:
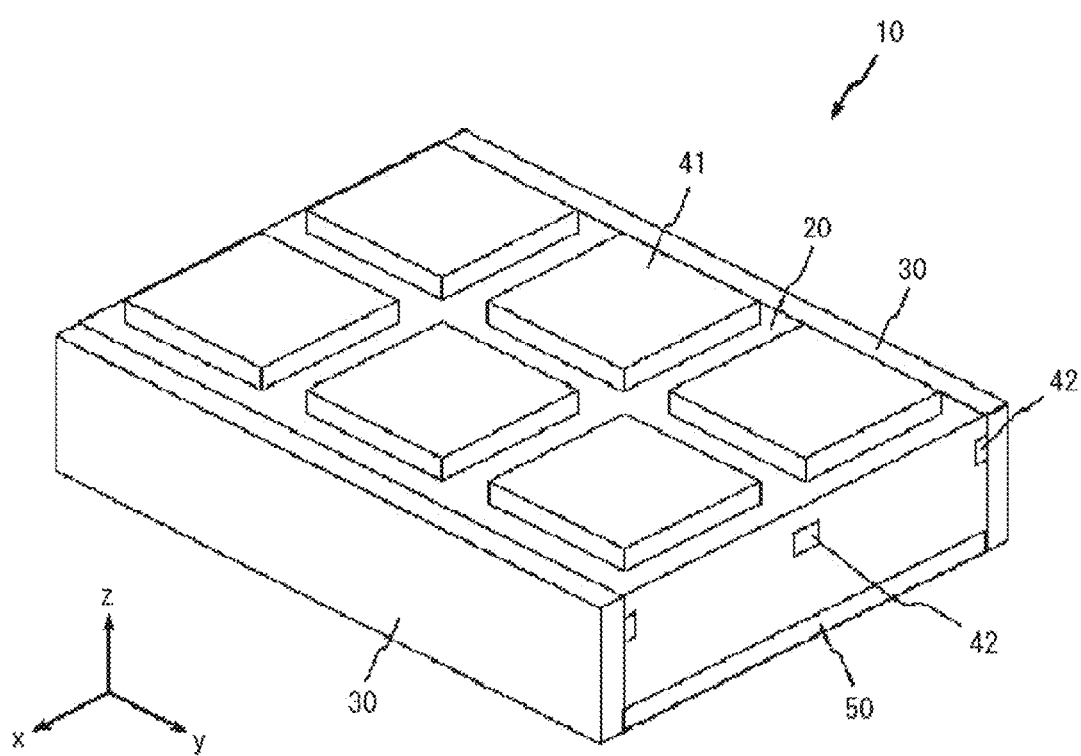
FIG. 10 is a perspective view illustrating an embodiment of a resonator.
Figure 11:
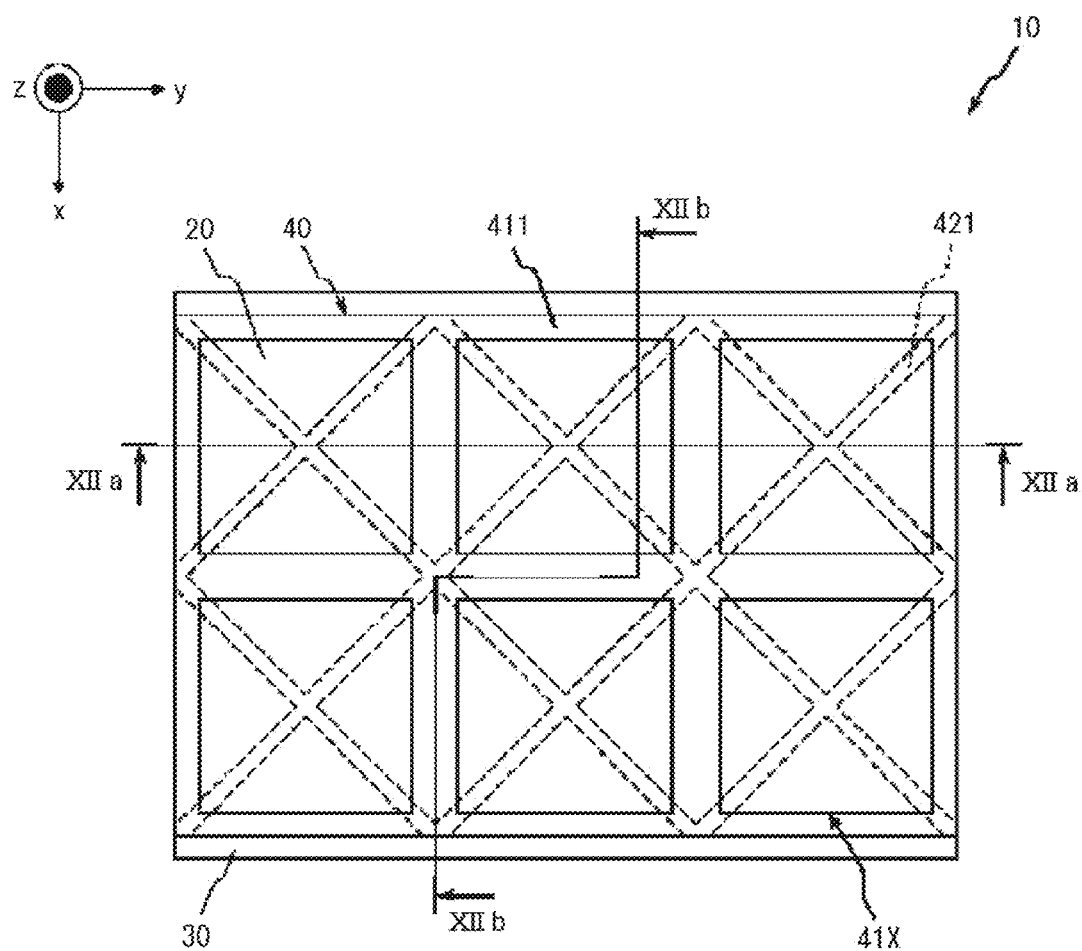
FIG. 11 is a planar view of the resonator illustrated in FIG. 10.
Figure 12A:
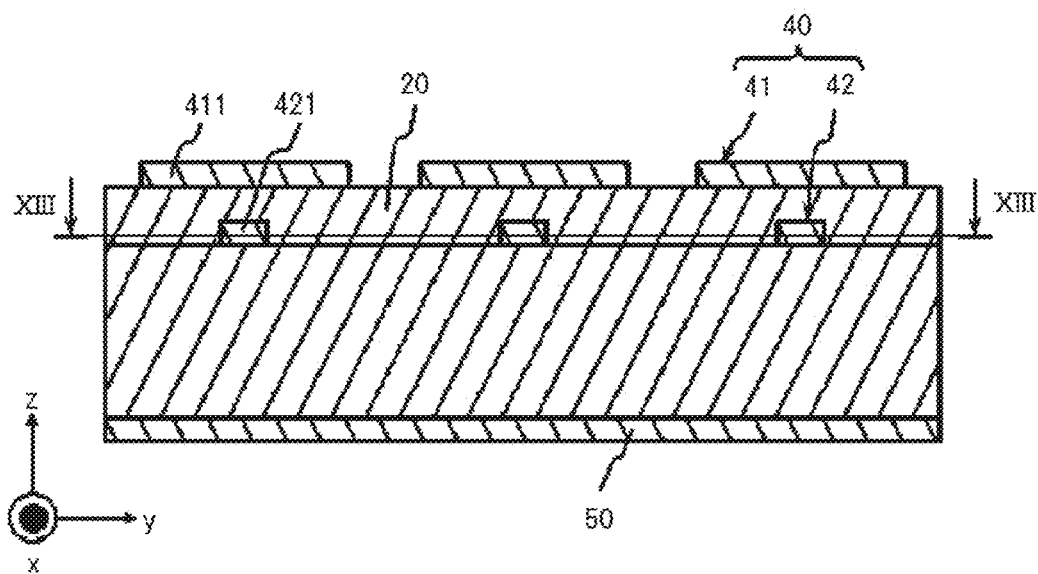
FIG. 12A is a cross-sectional view of the resonator illustrated in FIG. 10.
Figure 12B:
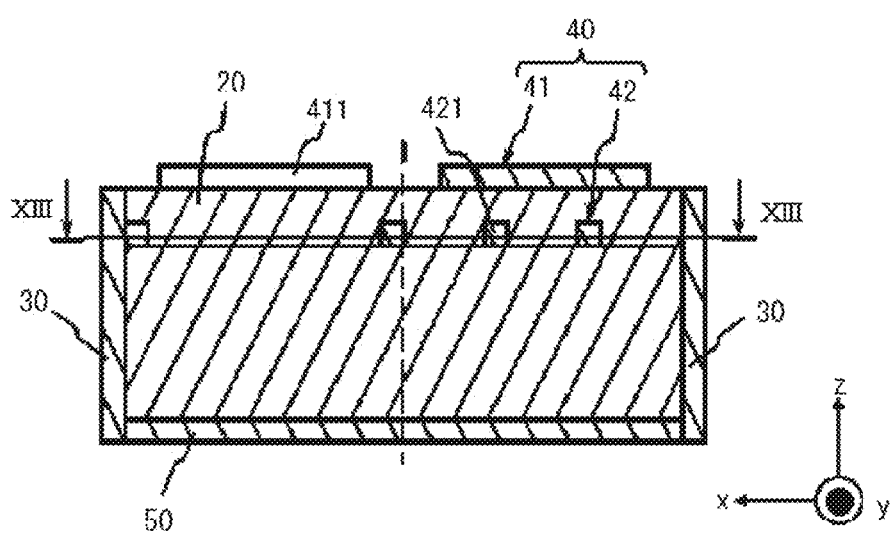
FIG. 12B is a cross-sectional view of the resonator illustrated in FIG. 10.
Figure 13:
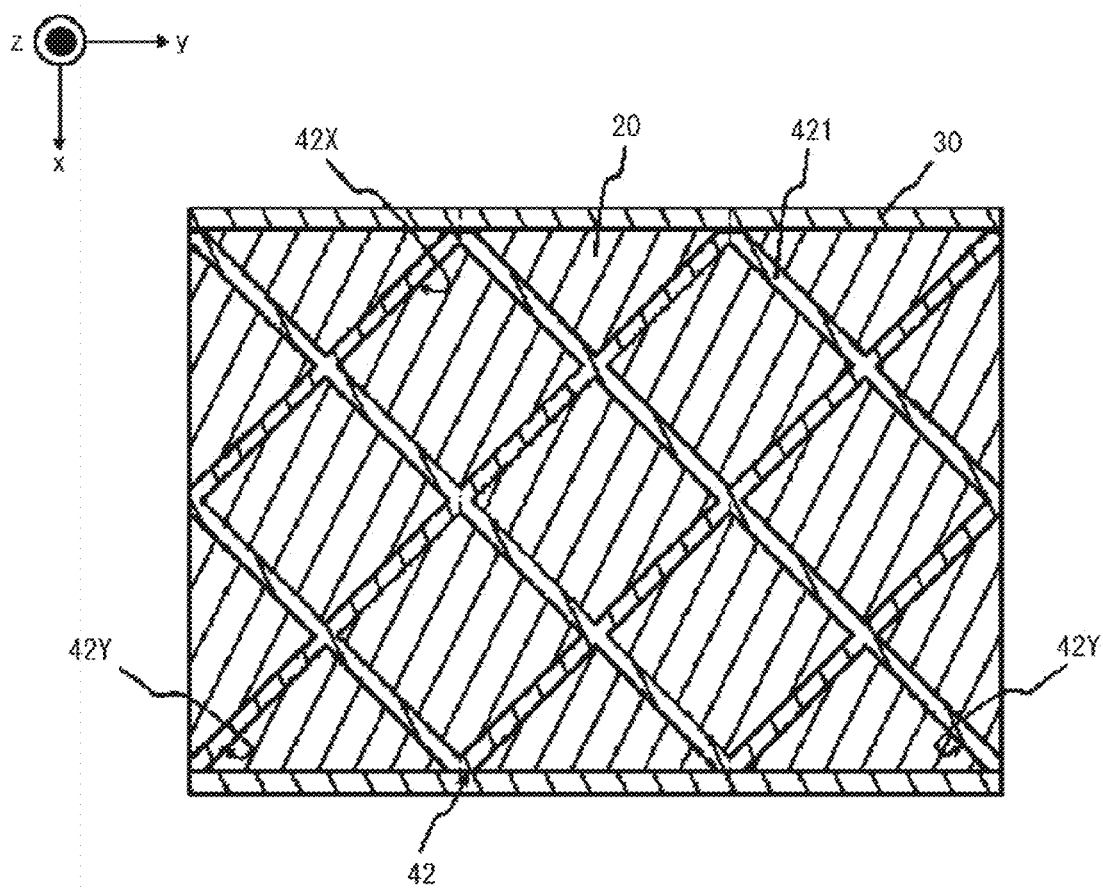
FIG. 13 is a cross-sectional view of the resonator illustrated in FIG. 10.

FIGS. 10 to 13 are diagrams illustrating a resonator 10 that is an example of a plurality of embodiments. FIG. 10 is a schematic diagram of the resonator 10. FIG. 11 is a planar view of the xy plane from the z direction. FIG. 12A is a cross-sectional view taken along line XIIa-XIIa illustrated in FIG. 11. FIG. 12B is a cross-sectional view taken along line XIIb-XIIb illustrated in FIG. 11. FIG. 13 is a cross-sectional view taken along line XIII-XIII illustrated in FIGS. 12A and 12B.

In the resonator 10 illustrated in FIGS. 10 to 13, the first conductive layer 41 includes a patch-type resonator as a first unit resonator 41X. The second conductive layer 42 includes a slot-type resonator as a second unit resonator 42X. The unit resonator 40X includes one first unit resonator 41X and four second divisional resonators 42Y. The unit structure 10X includes a unit resonator 40X as well as a part of the base 20 and a part of the fourth conductor 50 that overlap with the unit resonator 40X as viewed in the z direction.

Figure 14:
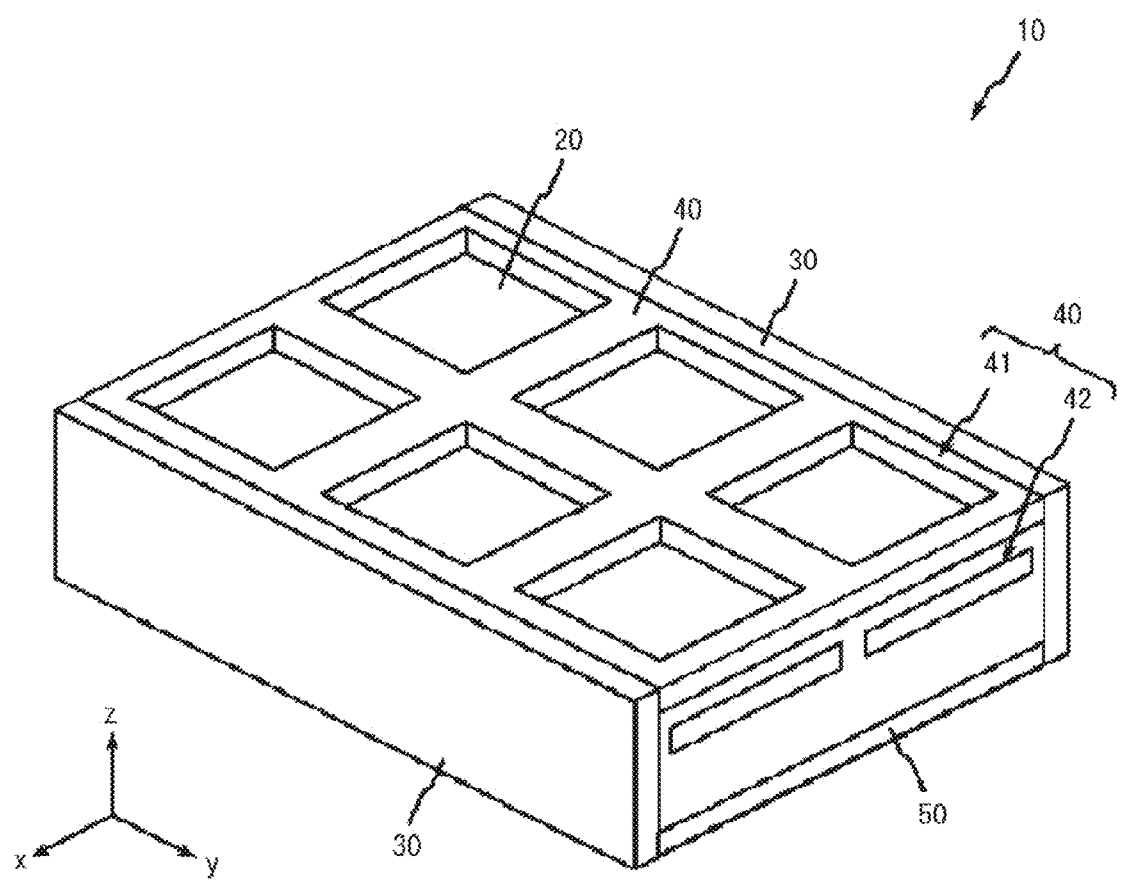
FIG. 14 is a perspective view illustrating an embodiment of a resonator.
Figure 15:
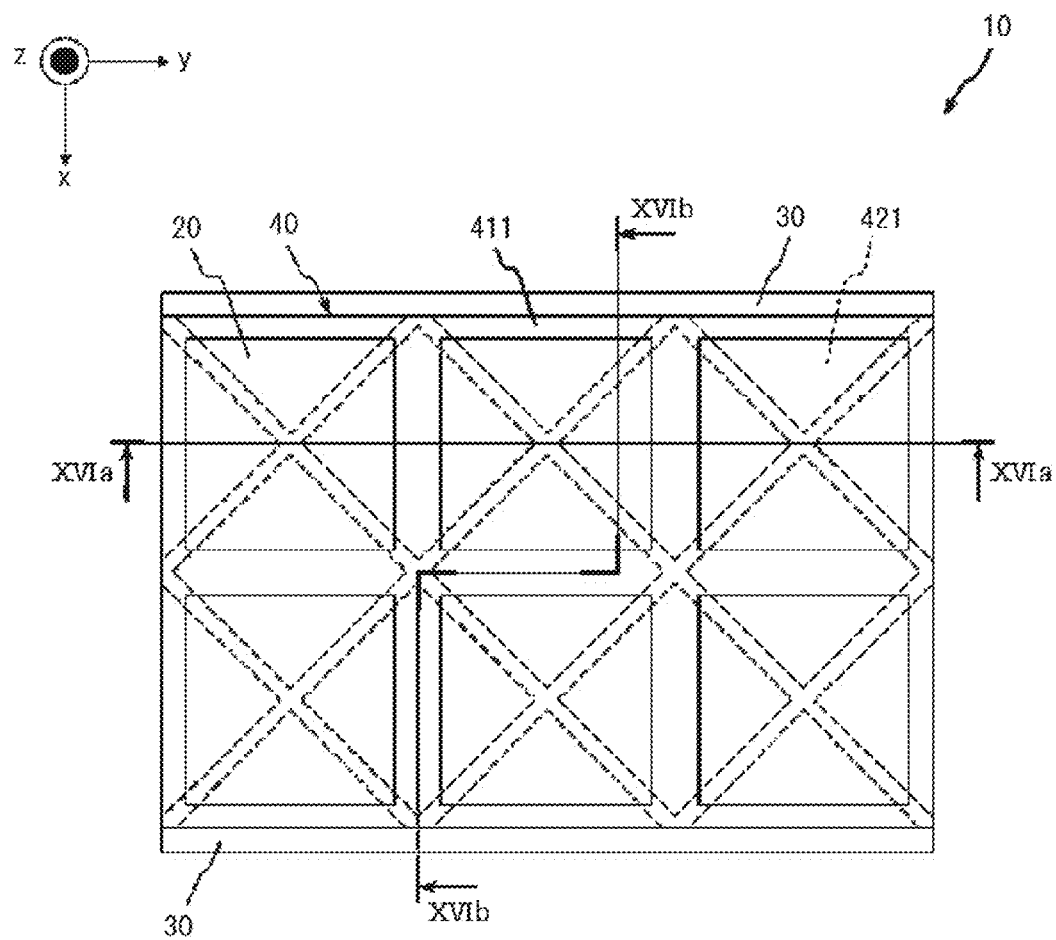
FIG. 15 is a planar view of the resonator illustrated in FIG. 14.
Figure 16A:
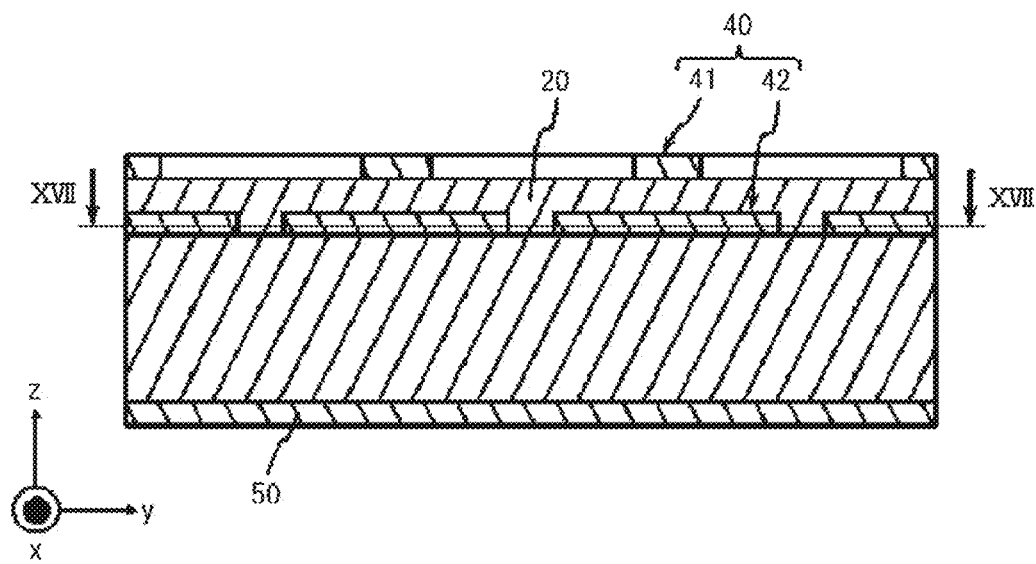
FIG. 16A is a cross-sectional view of the resonator illustrated in FIG. 14.
Figure 16B:
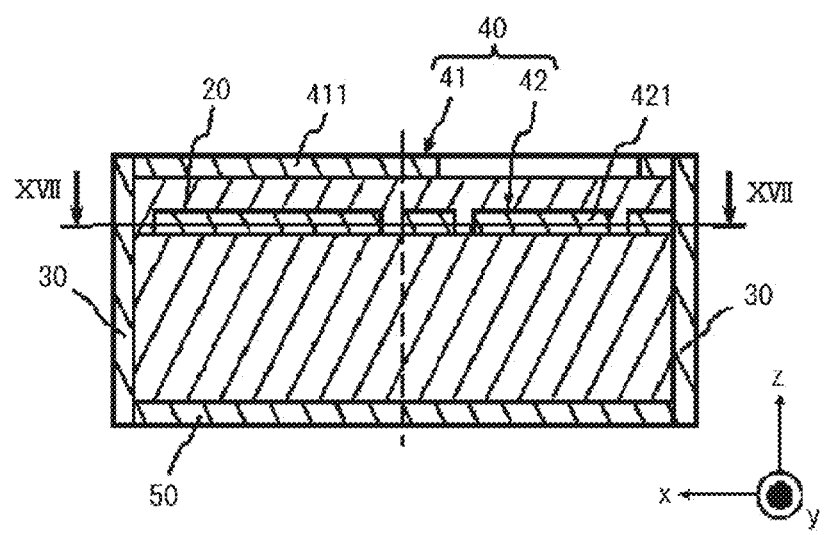
FIG. 16B is a cross-sectional view of the resonator illustrated in FIG. 14.
Figure 17:
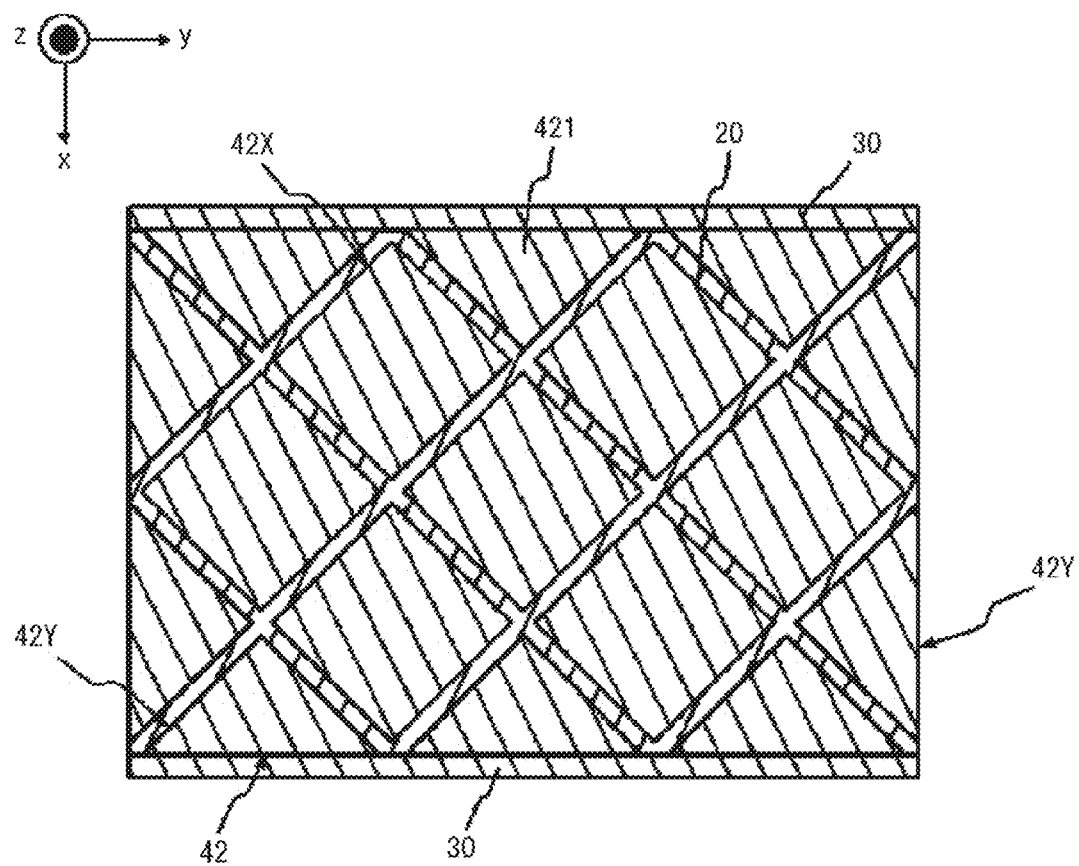
FIG. 17 is a cross-sectional view of the resonator illustrated in FIG. 14.

FIGS. 14 to 17 are diagrams illustrating a resonator 10 that is an example of a plurality of embodiments. FIG. 14 is a schematic diagram of the resonator 10. FIG. 15 is a planar view of the xy plane from the z direction. FIG. 16A is a cross-sectional view taken along line XVIa-XVIa illustrated in FIG. 15. FIG. 16B is a cross-sectional view taken along line XVIb-XVIb illustrated in FIG. 15. FIG. 17 is a cross-sectional view taken along line XVII-XVII illustrated in FIGS. 16A and 16B.

In the resonator 10 illustrated in FIGS. 14 to 17, the first conductive layer 41 includes a slot-type resonator as a first unit resonator 41X. The second conductive layer 42 includes a patch-type resonator as a second unit resonator 42X. The unit resonator 40X includes one first unit resonator 41X and four second divisional resonators 42Y. The unit structure 10X includes a unit resonator 40X as well as a part of the base 20 and a part of the fourth conductor 50 that overlap with the unit resonator 40X as viewed in the z direction.

Figure 18:
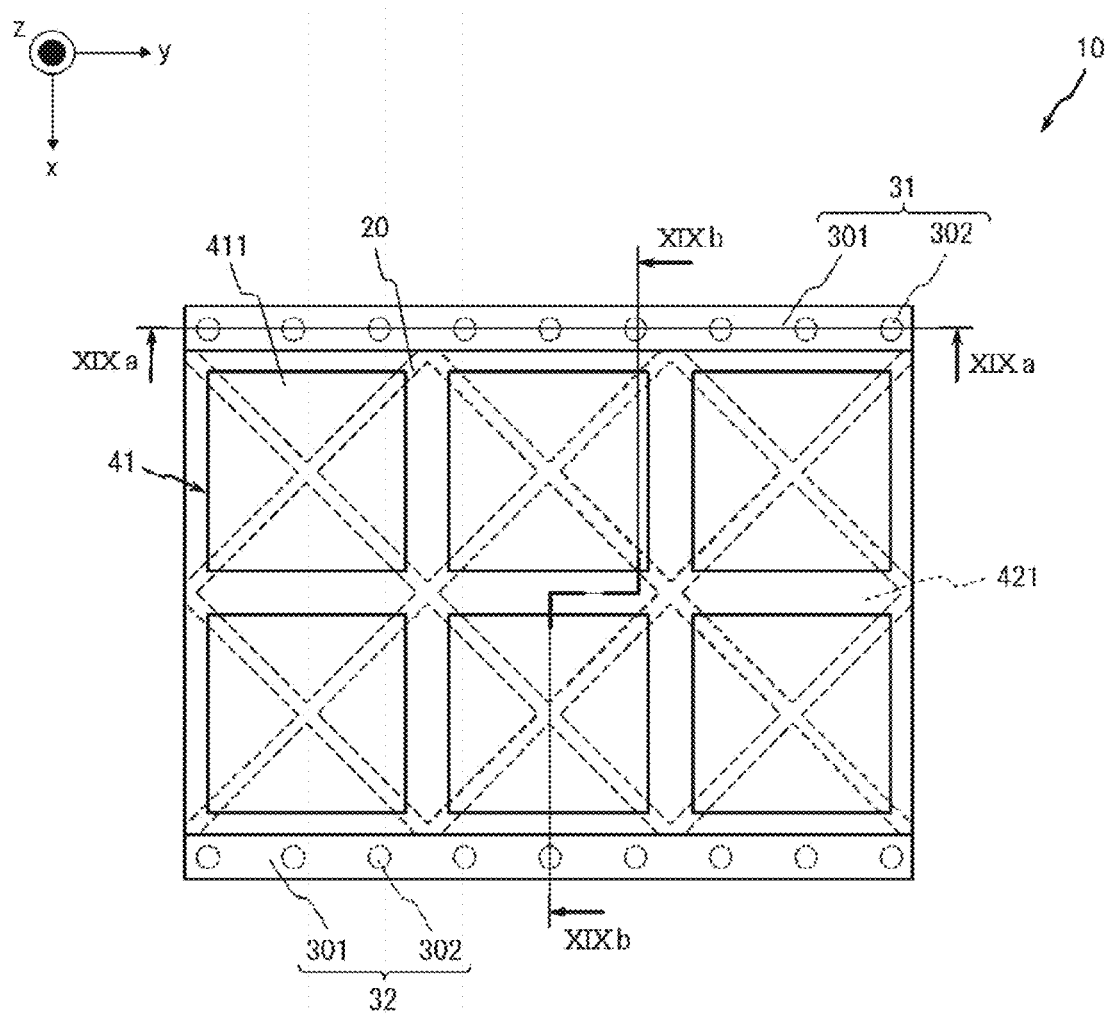
FIG. 18 is a planar view illustrating an embodiment of a resonator.
Figure 19A:
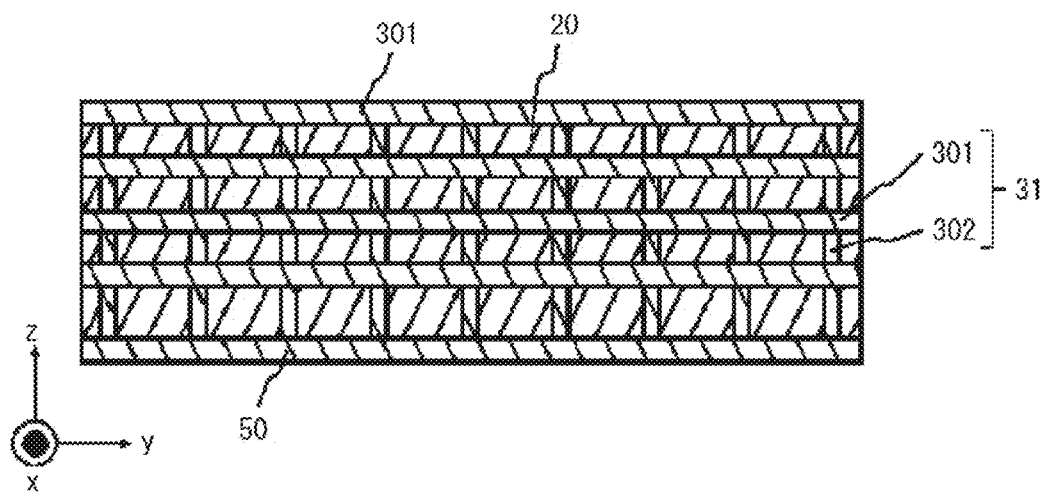
FIG. 19A is a cross-sectional view of the resonator illustrated in FIG. 18.
Figure 19B:
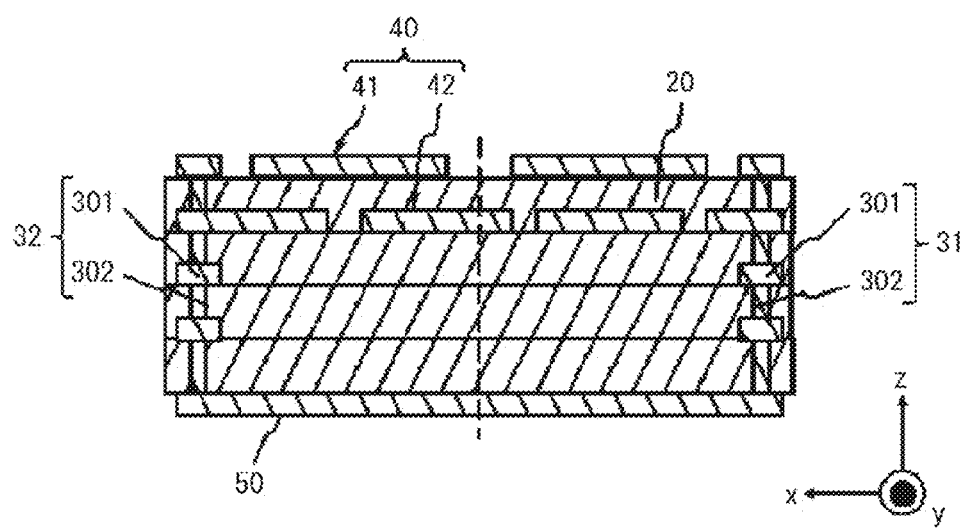
FIG. 19B is a cross-sectional view of the resonator illustrated in FIG. 18.

The resonator 10 in FIGS. 1 to 17 is illustrated by way of example. The configuration of the resonator 10 is not limited to the structures illustrated in FIGS. 1 to 17. FIG. 18 is a diagram illustrating a resonator 10 including pair conductors 30 in another configuration. FIG. 19A is a cross-sectional view taken along line XIXa-XIXa illustrated in FIG. 18. FIG. 19B is a cross-sectional view taken along line XIXb-XIXb illustrated in FIG. 18.

Figure 20:
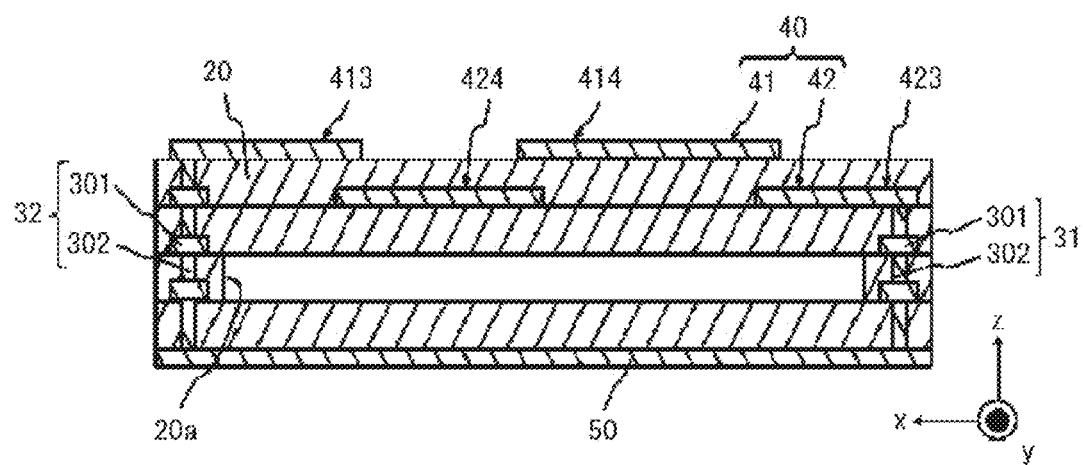
FIG. 20 is a cross-sectional view illustrating an embodiment of a resonator.

The base 20 in FIGS. 1 to 19A and 19B is illustrated by way of example. The configuration of the base 20 is not limited to the configuration illustrated in FIGS. 1 to 19A and 19B. The base 20 may include a cavity 20*a* in the inside as illustrated in FIG. 20. In the z direction, the cavity 20*a* is positioned between the third conductor 40 and the fourth conductor 50. The dielectric constant of the cavity 20*a* is lower than the dielectric constant of the base 20. When the base 20 has the cavity 20*a*, the electromagnetic distance between the third conductor 40 and the fourth conductor 50 can be reduced.

Figure 21:
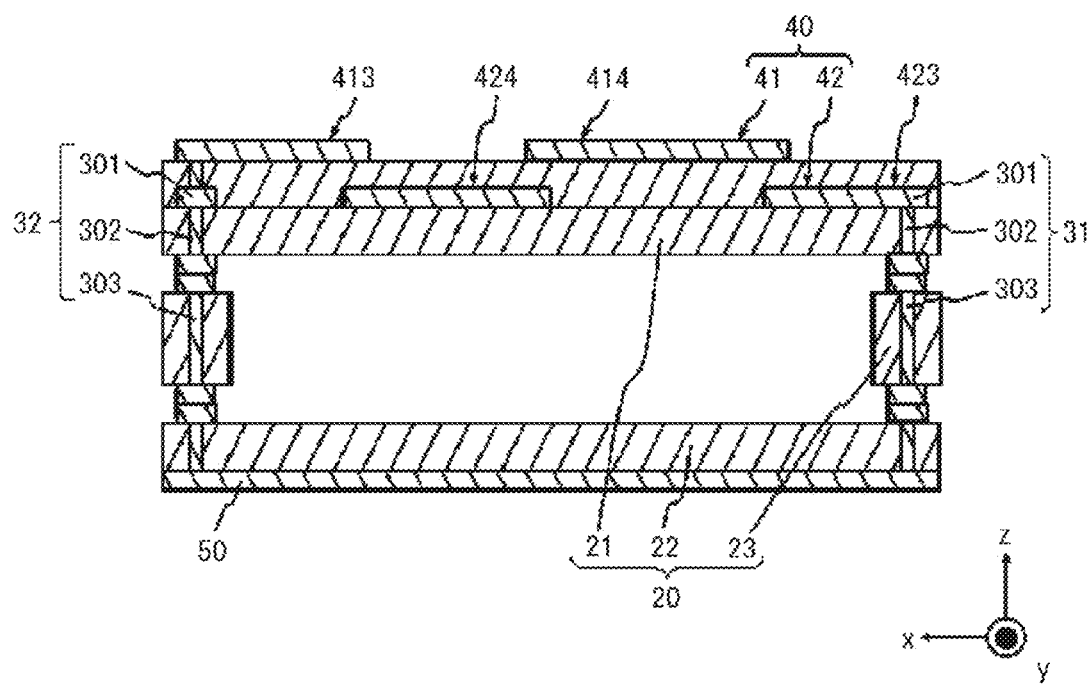
FIG. 21 is a planar view of an embodiment of a resonator.

As illustrated in FIG. 21, the base 20 may include a plurality of members. The base 20 may include a first base 21, a second base 22, and a connector 23. The first base 21 and the second base 22 may be mechanically connected to each other through the connector 23. The connector 23 may include a sixth conductor 303 in the inside. The sixth conductor 303 is electrically connected to the fifth conductive layer 301 or the fifth conductor 302. The sixth conductor 303 is combined with the fifth conductive layer 301 and the fifth conductor 302 into a first conductor 31 or a second conductor 32.

Figure 22A:
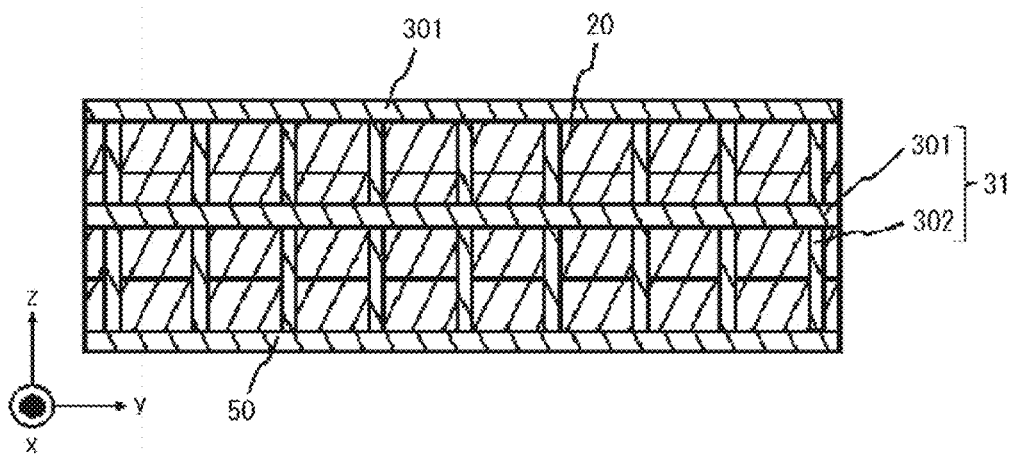
FIG. 22A is a cross-sectional view illustrating an embodiment of a resonator.
Figure 22B:
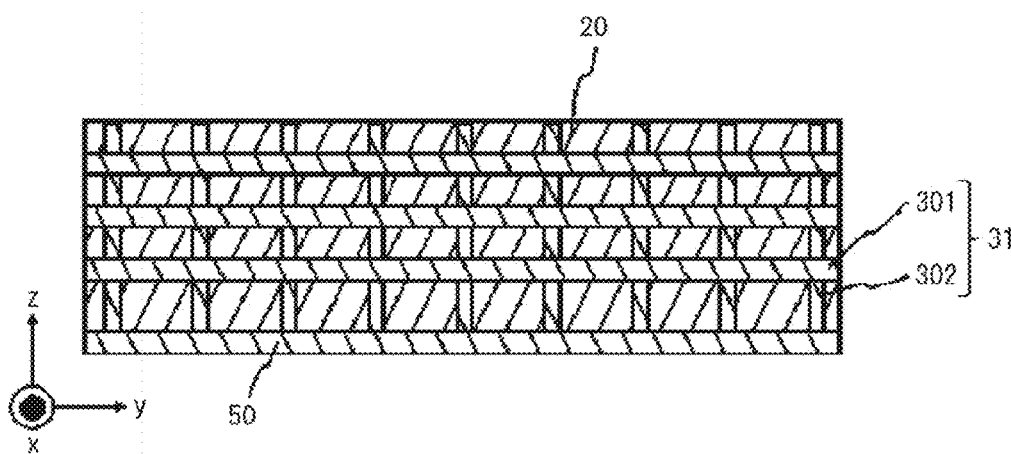
FIG. 22B is a cross-sectional view illustrating an embodiment of a resonator.
Figure 22C:
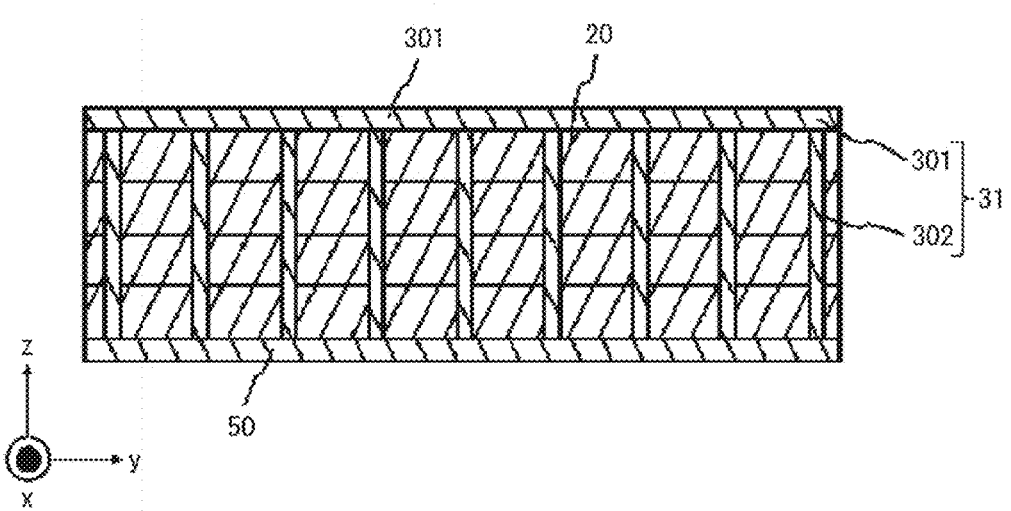
FIG. 22C is a cross-sectional view illustrating an embodiment of a resonator.

The pair conductors 30 in FIGS. 1 to 21 are illustrated by way of example. The configuration of the pair conductors 30 is not limited to the configuration illustrated in FIGS. 1 to 21. FIGS. 22 to 28 are diagrams illustrating a resonator 10 including pair conductors 30 in another configuration. FIGS. 22A to 22C are cross-sectional views corresponding to FIG. 19A. As illustrated in FIG. 22A, the number of fifth conductive layers 301 may be changed as appropriate. As illustrated in FIG. 22B, the fifth conductive layer 301 is not necessarily positioned on the base 20. As illustrated in FIG. 22C, the fifth conductive layer 301 is not necessarily positioned in the base 20.

Figure 23:
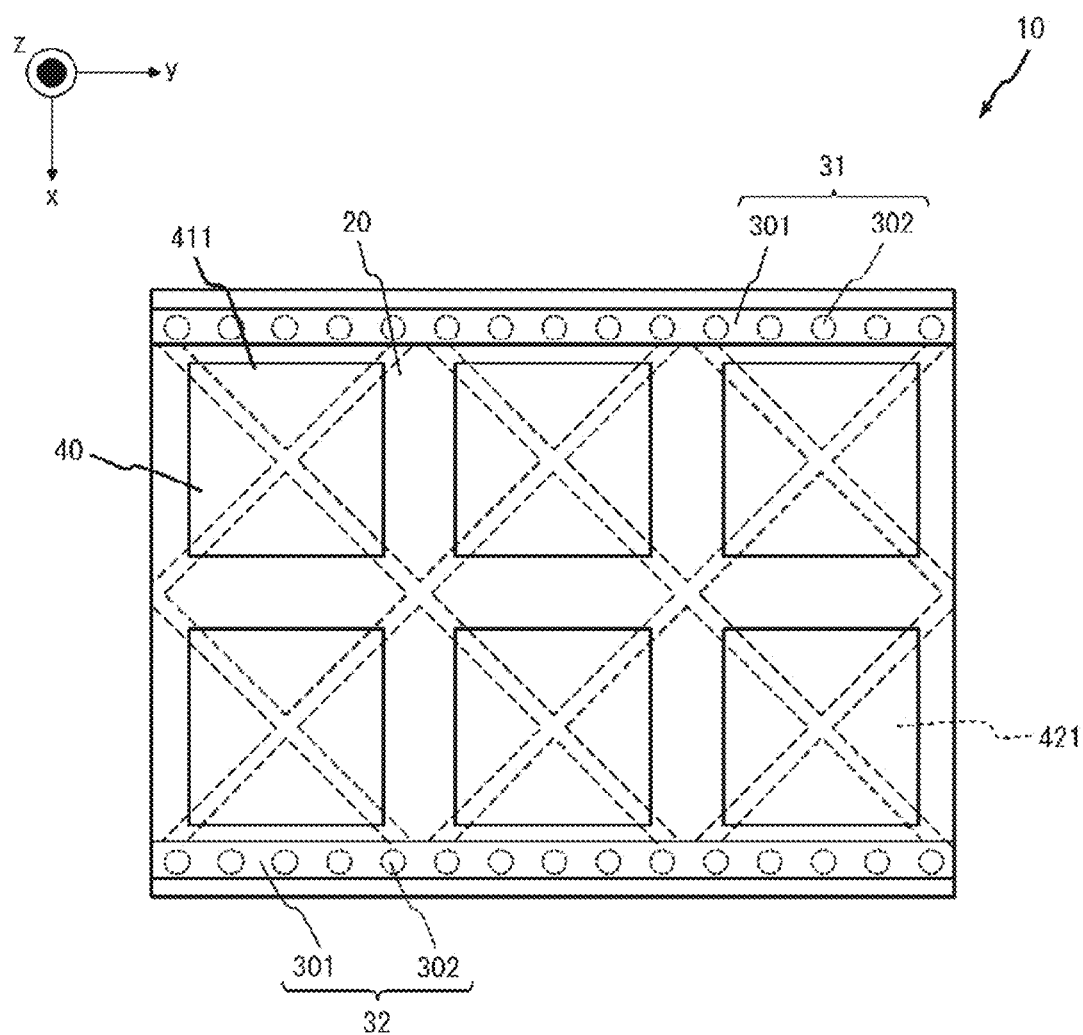
FIG. 23 is a planar view of an embodiment of a resonator.
Figure 24:
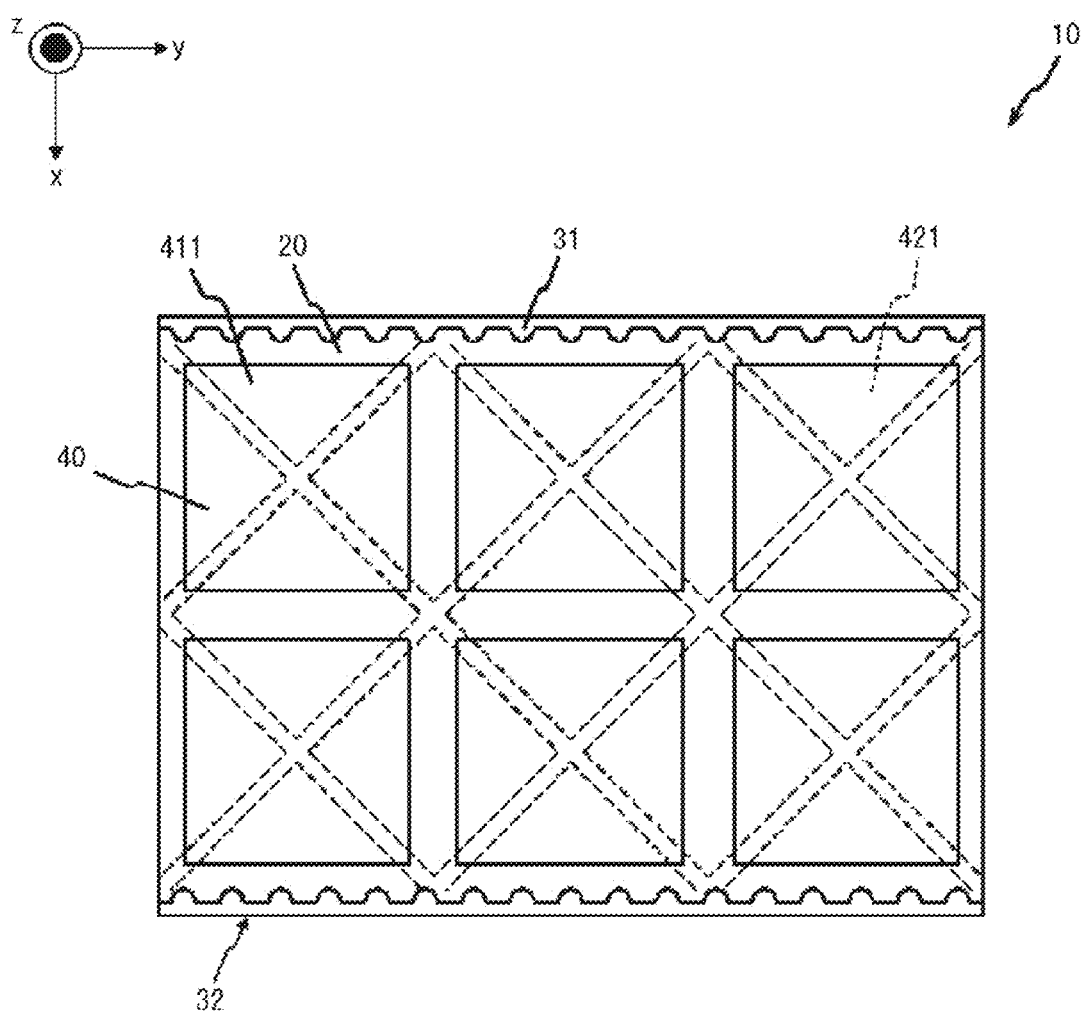
FIG. 24 is a planar view of an embodiment of a resonator.

FIG. 23 is a plan view corresponding to FIG. 18. As illustrated in FIG. 23, the resonator 10 may have the fifth conductor 302 away from the boundary of the unit resonator 40X. FIG. 24 is a plan view corresponding to FIG. 18. As illustrated in FIG. 24, two pair conductors 30 each may have protrusions protruding toward the other pair conductor 30 to be paired. Such a resonator 10 may be formed by, for example, applying metal paste to the base 20 having depressions and hardening the applied metal paste.

Figure 25:
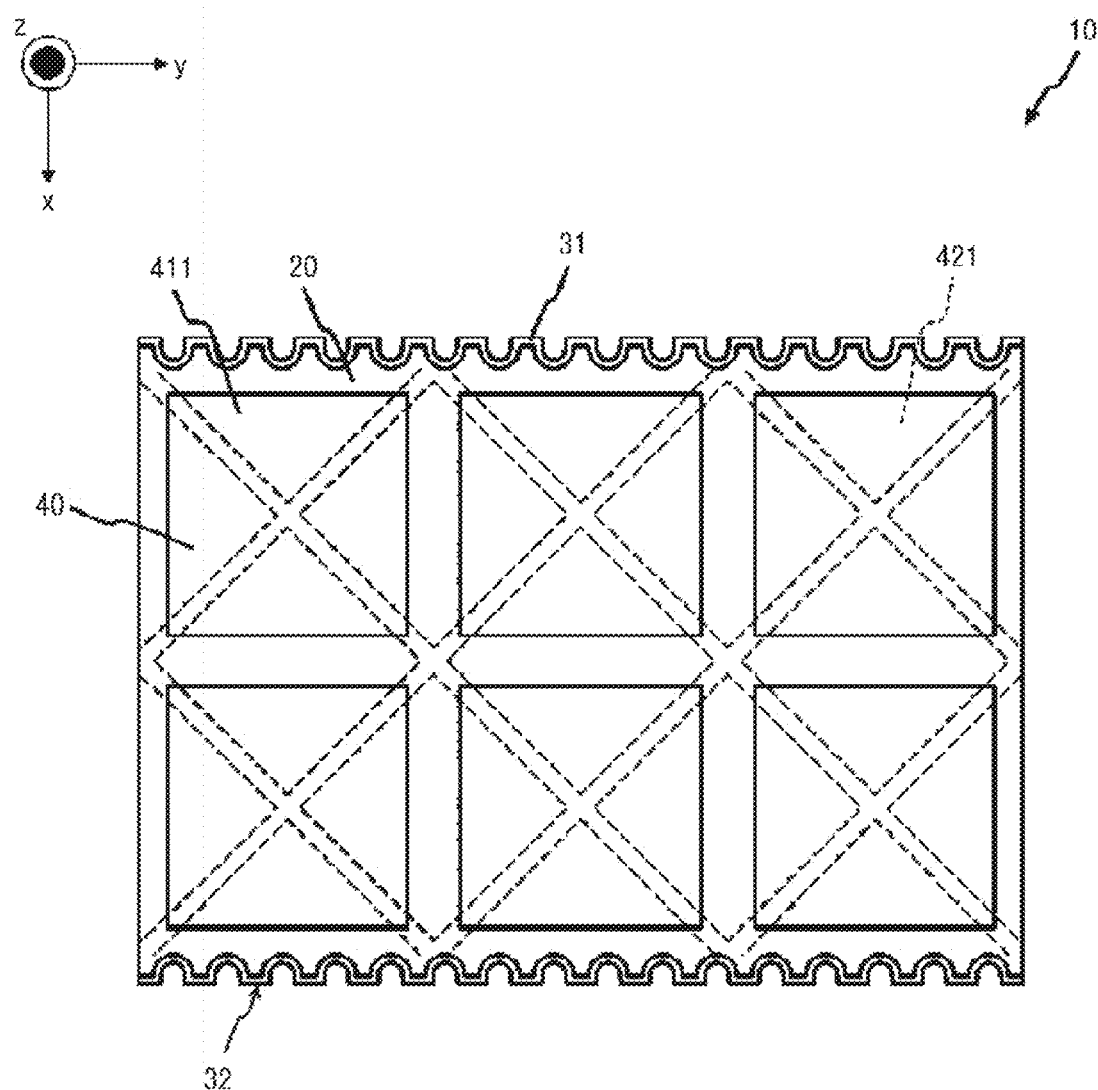
FIG. 25 is a planar view of an embodiment of a resonator.

FIG. 25 is a plan view corresponding to FIG. 18. As illustrated in FIG. 25, the base 20 may have depressions. As illustrated in FIG. 25, the pair conductors 30 have depressions recessed from the outer surface to the inside in the x direction. As illustrated in FIG. 25, the pair conductors 30 extend along the surfaces of the base 20. Such a resonator 10 may be formed by, for example, spraying a fine metal material to the base 20 having depressions.

Figure 26:
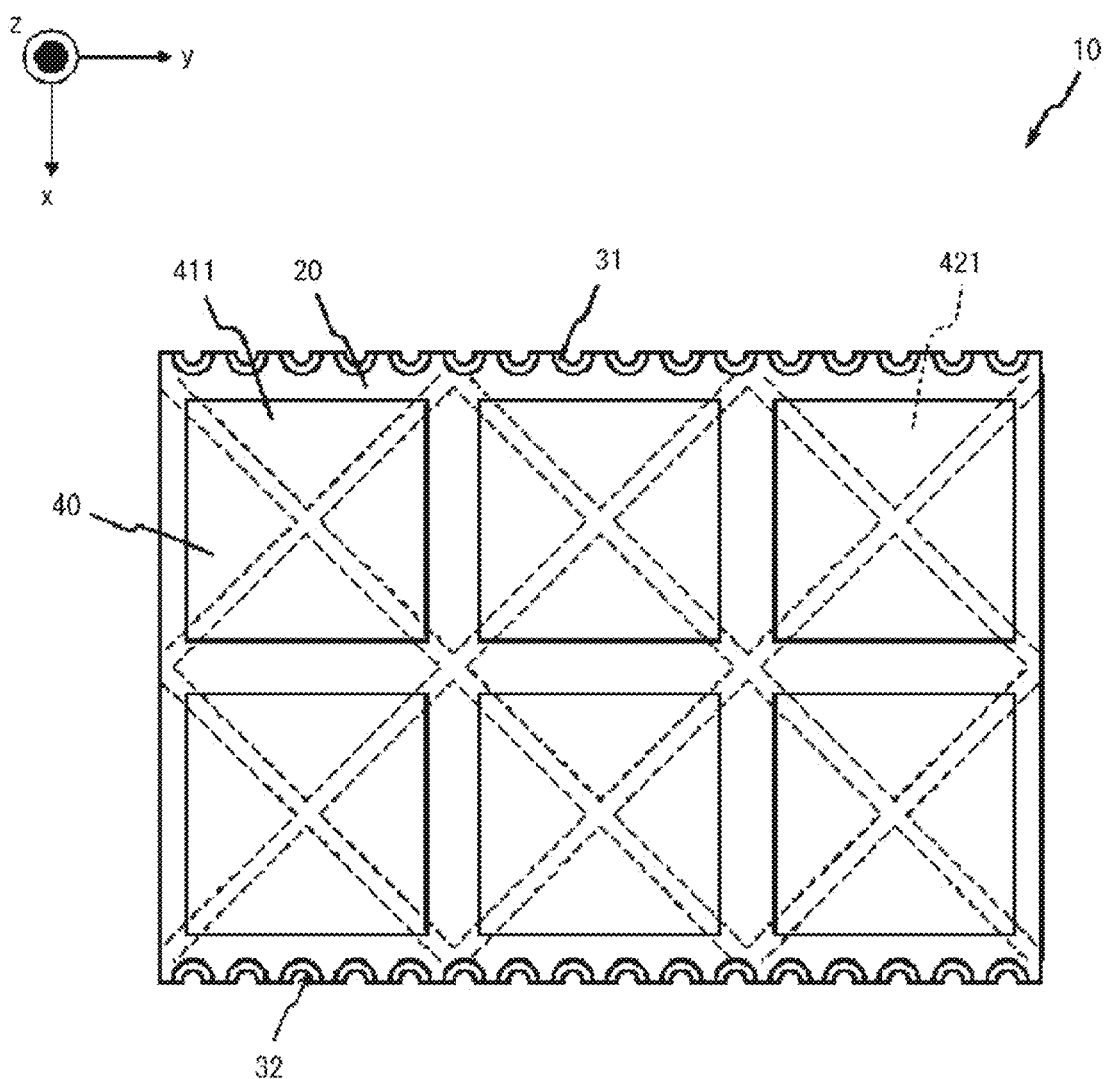
FIG. 26 is a planar view of an embodiment of a resonator.

FIG. 26 is a plan view corresponding to FIG. 18. As illustrated in FIG. 26, the base 20 may have depressions. As illustrated in FIG. 26, the pair conductors 30 have depressions recessed from the outer surface to the inside in the x direction. As illustrated in FIG. 26, the pair conductors 30 extend along the depressions of the base 20. Such a resonator 10 may be produced by, for example, dividing a motherboard along an alignment of through hole conductors. Such pair conductors 30 may be called end-face through holes.

Figure 27:
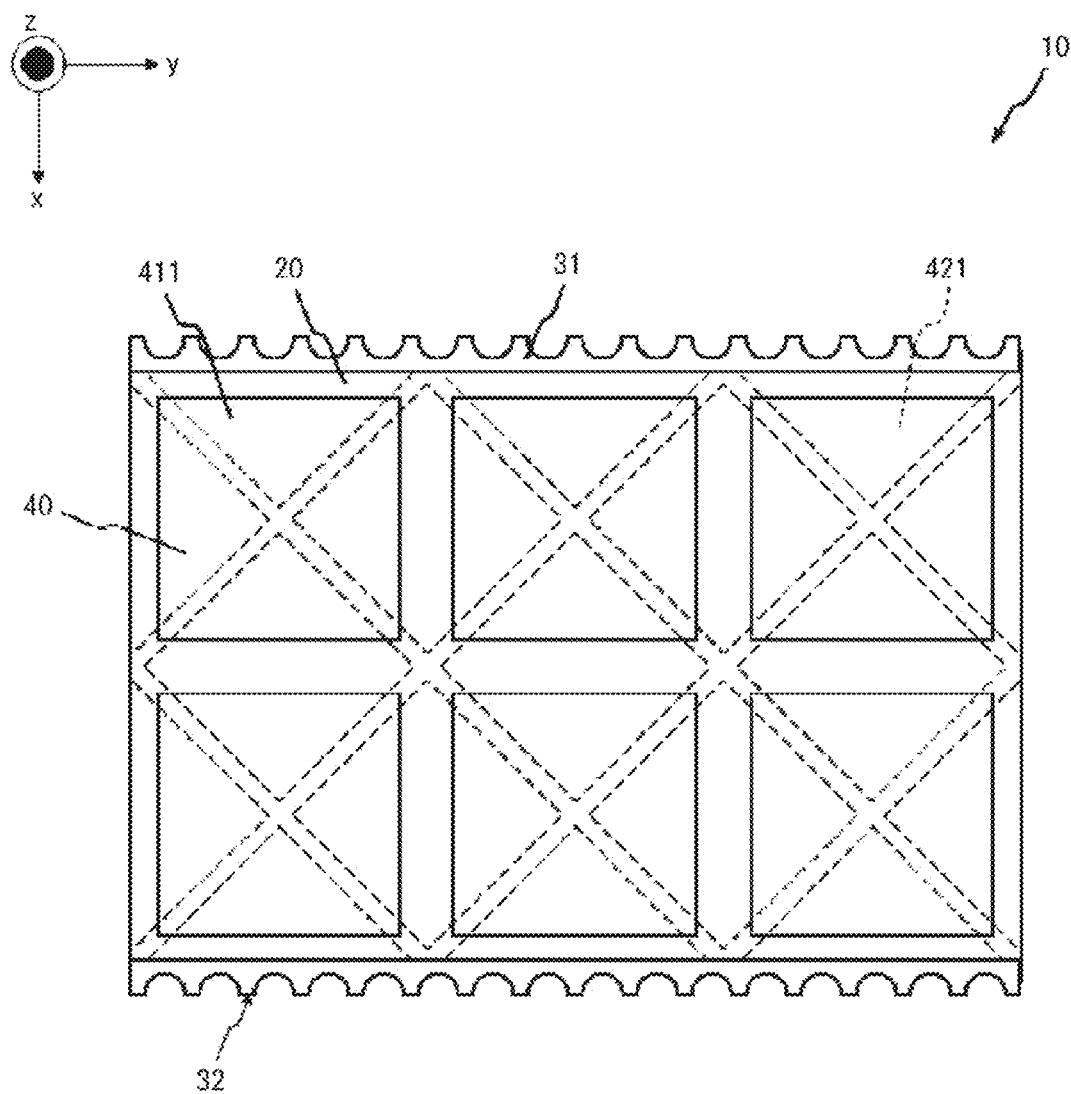
FIG. 27 is a planar view of an embodiment of a resonator.

FIG. 27 is a plan view corresponding to FIG. 18. As illustrated in FIG. 27, the base 20 may have depressions. As illustrated in FIG. 27, the pair conductors 30 have depressions recessed from the outer surface to the inside in the x direction. Such a resonator 10 may be produced by, for example, dividing a motherboard along an alignment of through hole conductors. Such pair conductors 30 may be called end-face through holes.

Figure 28:
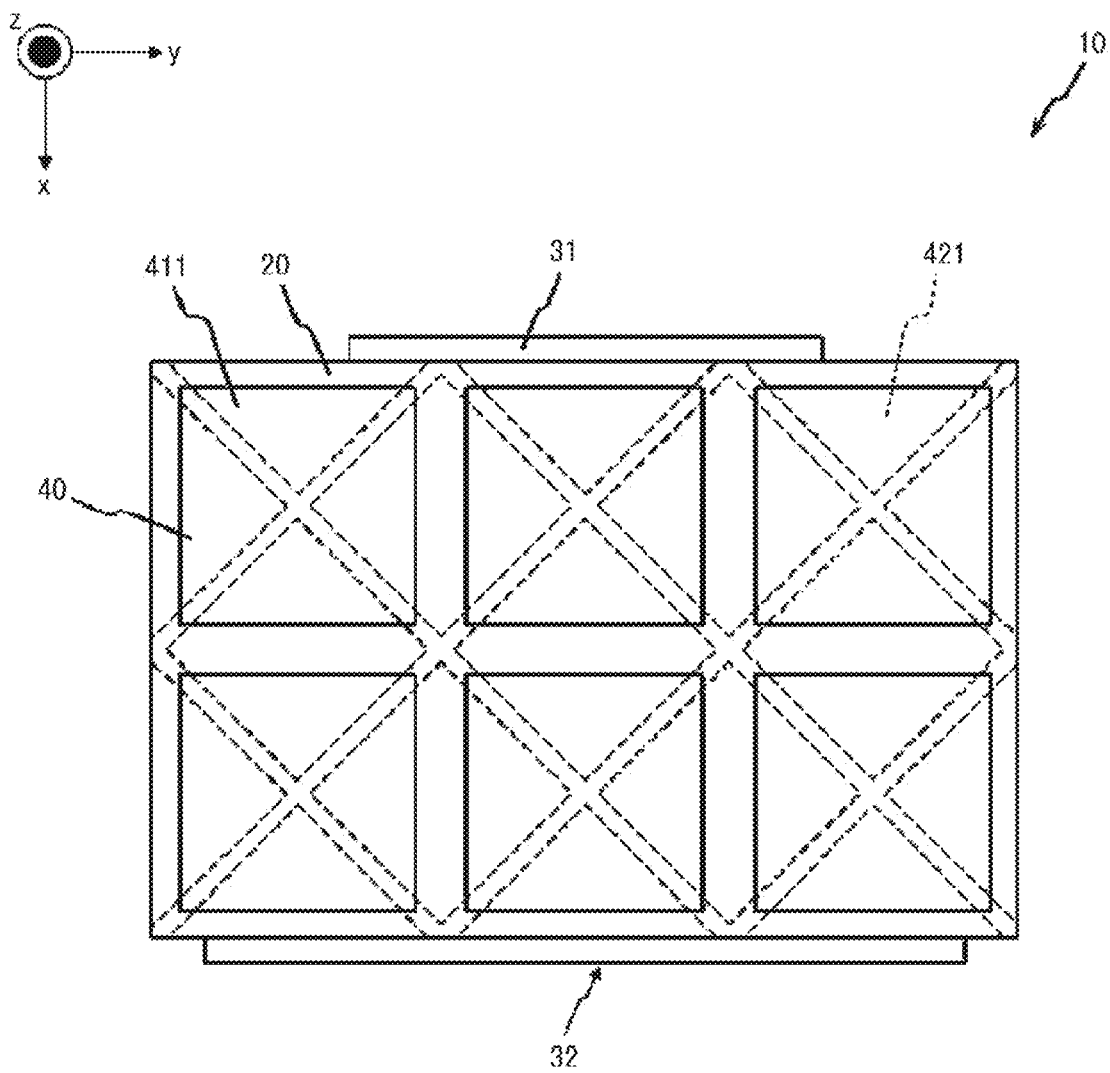
FIG. 28 is a planar view of an embodiment of a resonator.

FIG. 28 is a plan view corresponding to FIG. 18. As illustrated in FIG. 28, the length in the x direction of the pair conductors 30 may be shorter than that of the base 20. The configuration of the pair conductors 30 is not limited to these. Two pair conductors 30 may have configurations different from each other. For example, one pair conductor 30 may include a fifth conductive layer 301 and a fifth conductor 302, and the other pair conductor 30 may be end-face through holes.

Figure 29A:
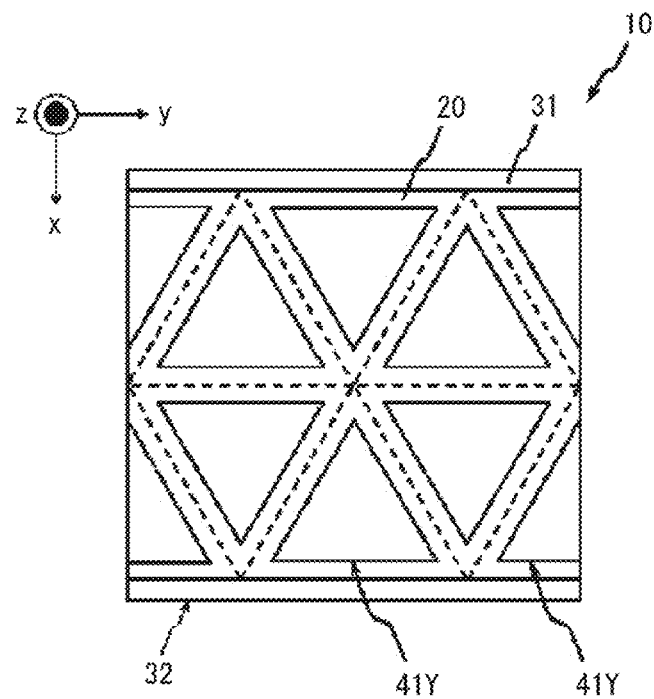
FIG. 29A is a planar view of an embodiment of a resonator.
Figure 29B:
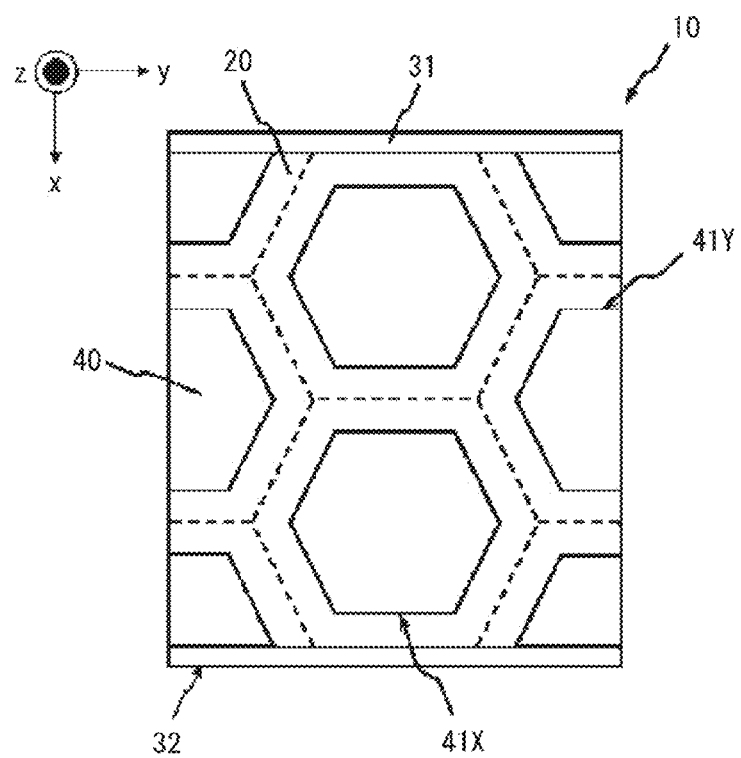
FIG. 29B is a planar view of an embodiment of a resonator.
Figure 30:
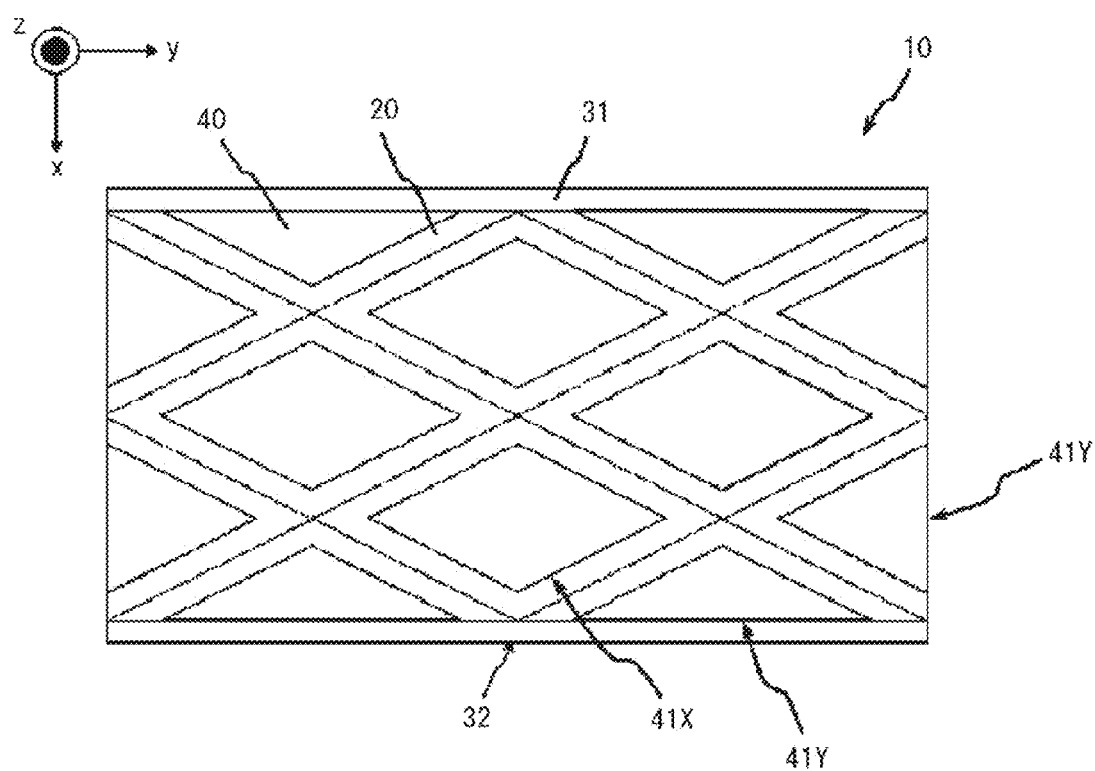
FIG. 30 is a planar view of an embodiment of a resonator.

The third conductor 40 in FIGS. 1 to 28 is illustrated by way of example. The configuration of the third conductor 40 is not limited to the configurations illustrated in FIGS. 1 to 28. The unit resonator 40X, the first unit resonator 41X, and the second unit resonator 42X are not limited to a quadrature shape. The unit resonator 40X, the first unit resonator 41X, and the second unit resonator 42X may be called a unit resonator 40X and the like. For example, the unit resonator 40X and the like may be triangular as illustrated in FIG. 29A or may be hexagonal as illustrated in FIG. 29B. The sides of the unit resonator 40X and the like may extend in directions different from the x direction and the y direction as illustrated in FIG. 30. The third conductor 40 may have the second conductive layer 42 positioned on the base 20 and the first conductive layer 41 positioned in the base 20. In the third conductor 40, the second conductive layer 42 may be positioned farther from the fourth conductor 50 than the first conductive layer 41 is.

Figure 31A:
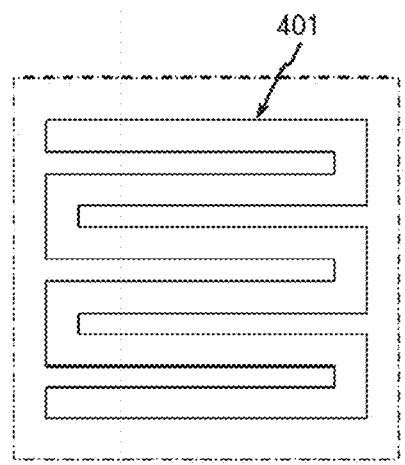
FIG. 31A is a schematic diagram illustrating an example of a resonator.
Figure 31B:
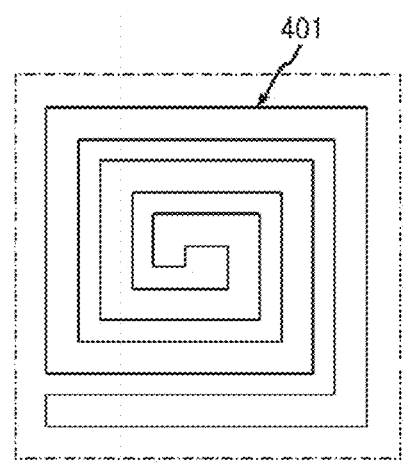
FIG. 31B is a schematic diagram illustrating an example of a resonator.
Figure 31C:
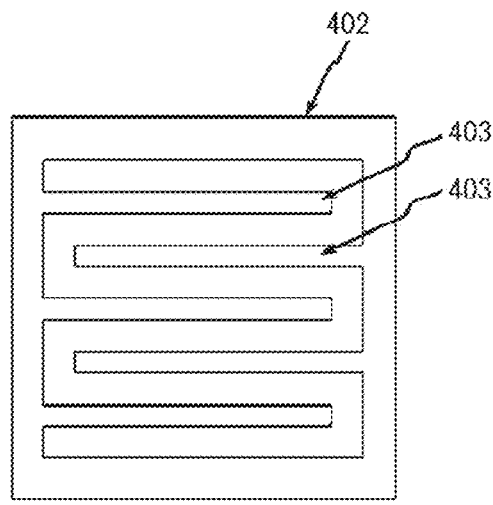
FIG. 31C is a schematic diagram illustrating an example of a resonator.
Figure 31D:
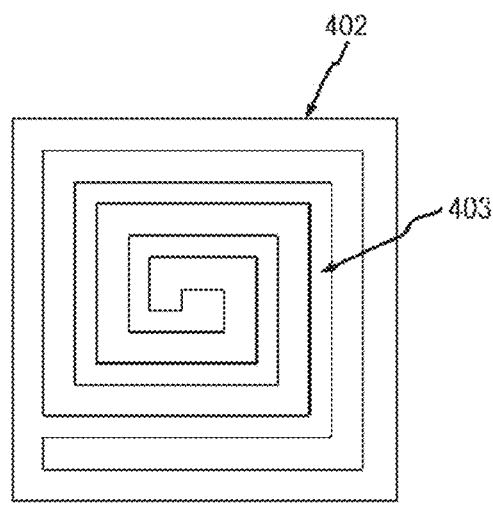
FIG. 31D is a schematic diagram illustrating an example of a resonator.
Figure 32A:
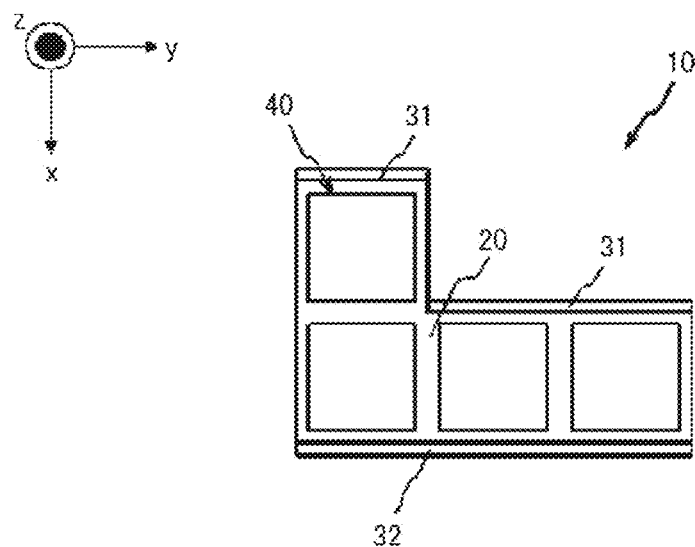
FIG. 32A is a planar view of an embodiment of a resonator.
Figure 32B:
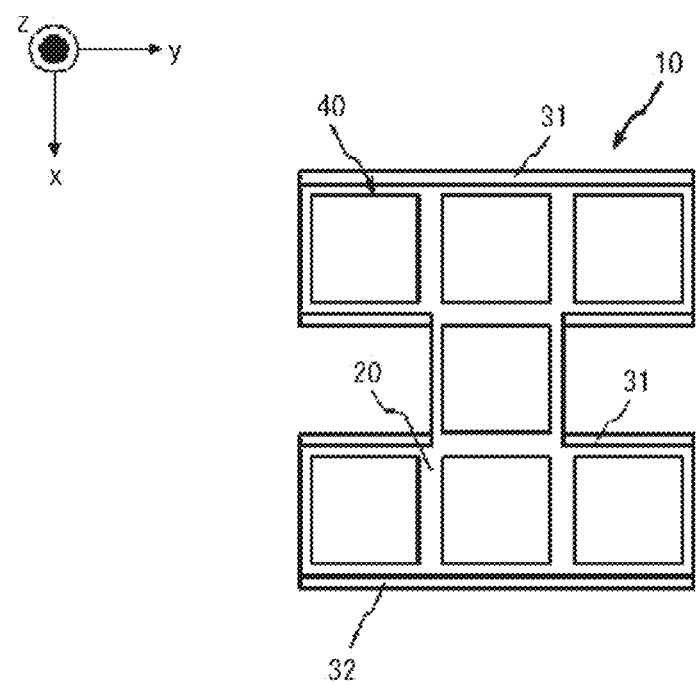
FIG. 32B is a planar view of an embodiment of a resonator.
Figure 32C:
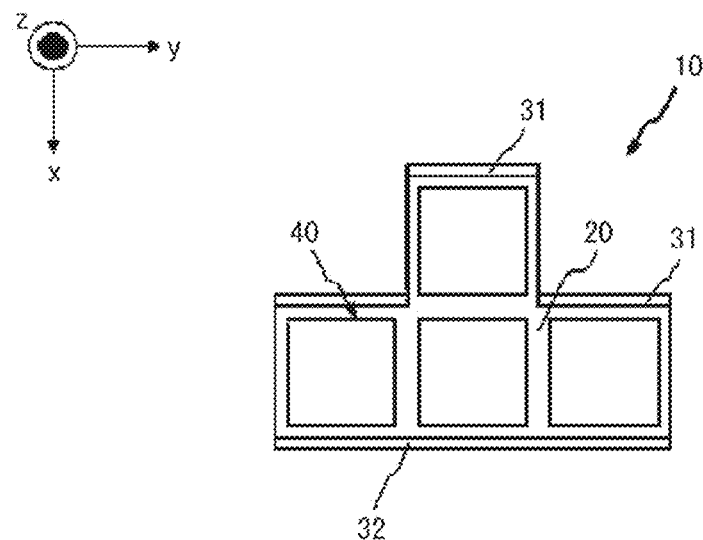
FIG. 32C is a planar view of an embodiment of a resonator.
Figure 32D:
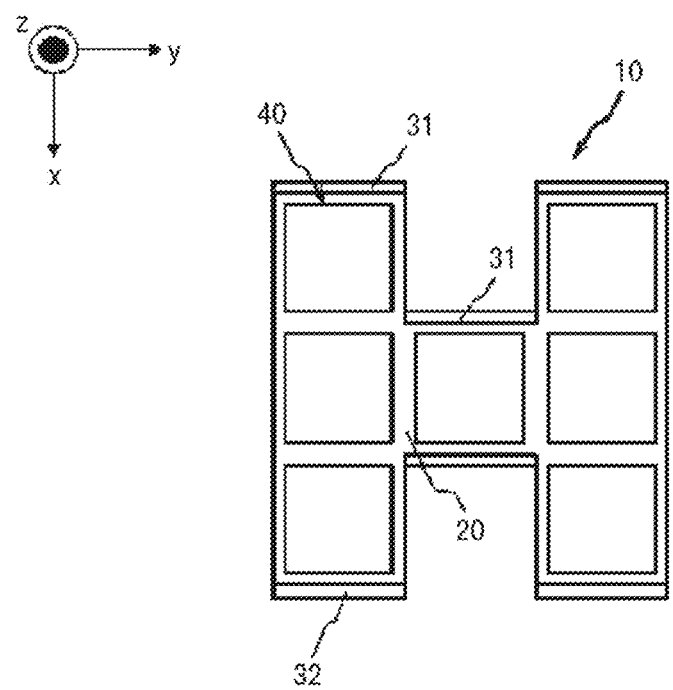
FIG. 32D is a planar view of an embodiment of a resonator.
Figure 33A:
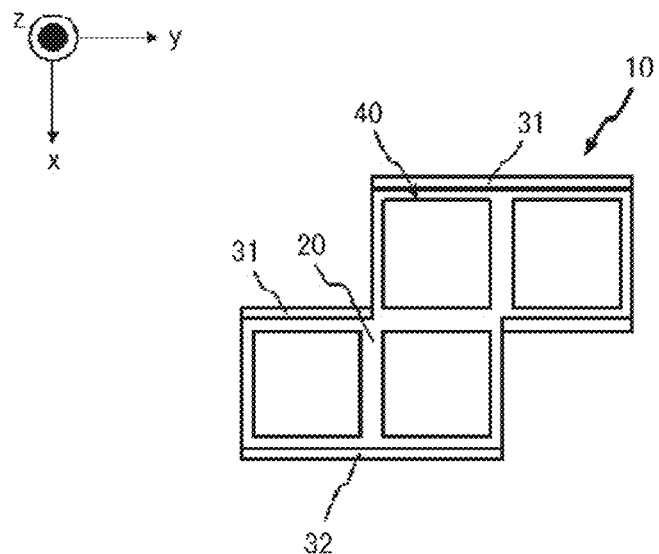
FIG. 33A is a planar view of an embodiment of a resonator.
Figure 33B:
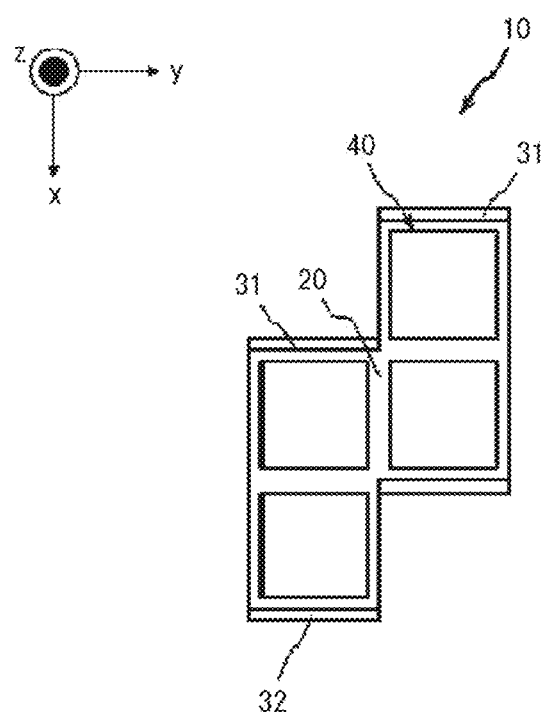
FIG. 33B is a planar view of an embodiment of a resonator.
Figure 33C:
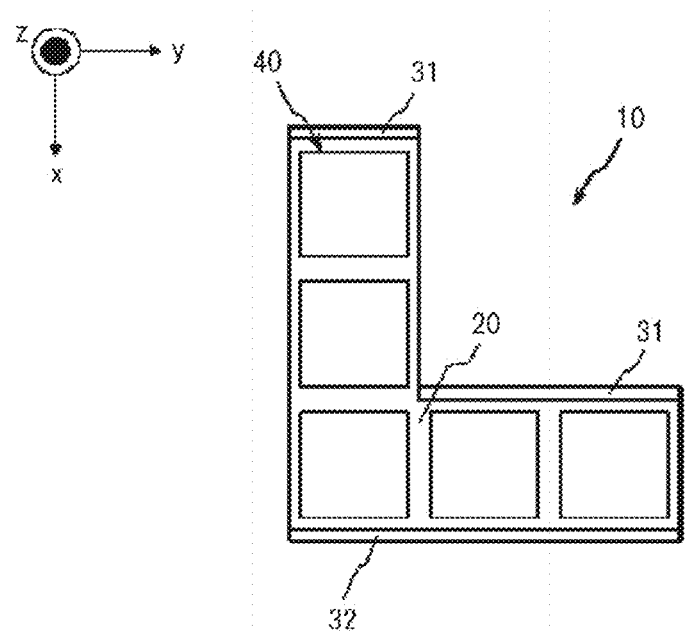
FIG. 33C is a planar view of an embodiment of a resonator.
Figure 33D:
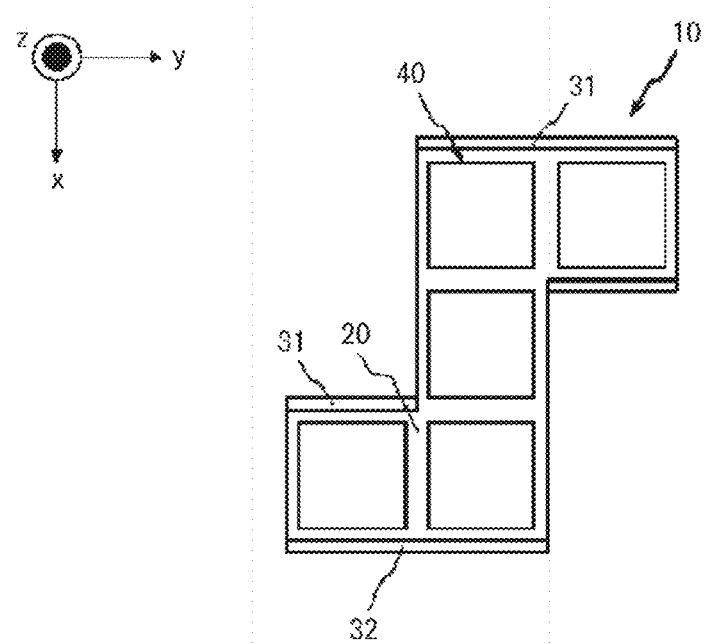
FIG. 33D is a planar view of an embodiment of a resonator.
Figure 34A:
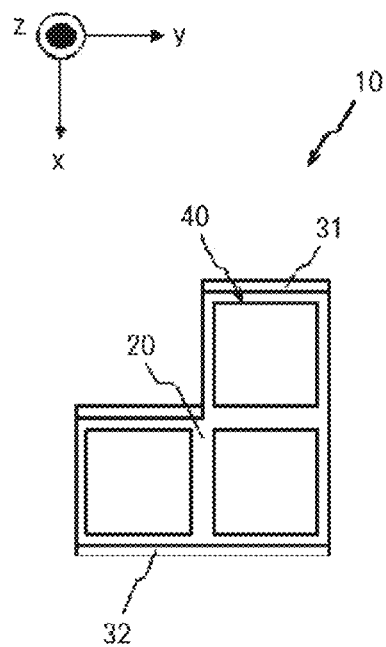
FIG. 34A is a planar view of an embodiment of a resonator.
Figure 34B:
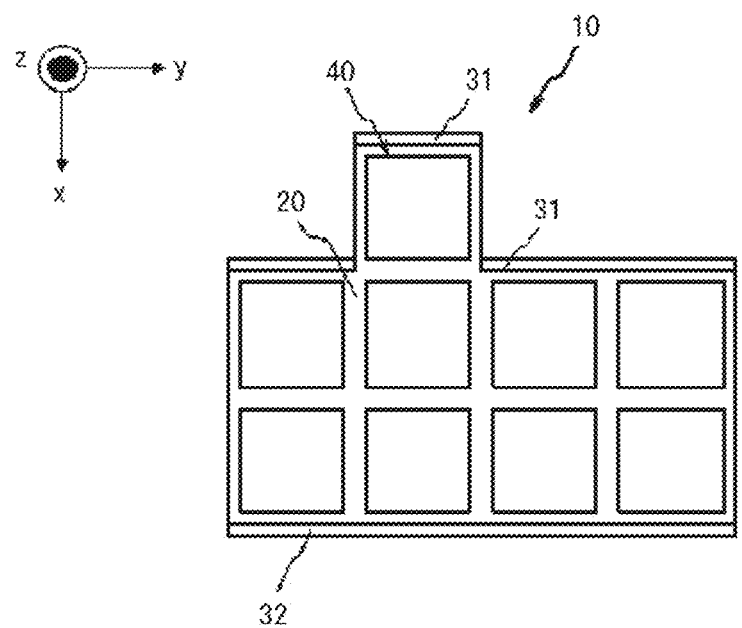
FIG. 34B is a planar view of an embodiment of a resonator.
Figure 34C:
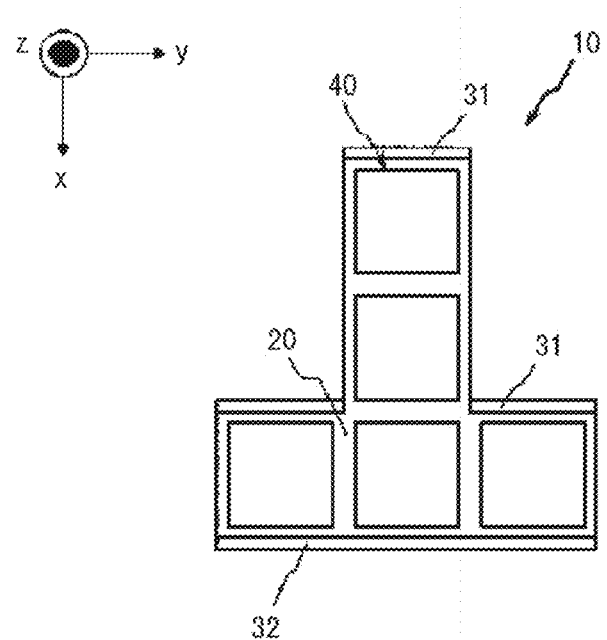
FIG. 34C is a planar view of an embodiment of a resonator.
Figure 34D:
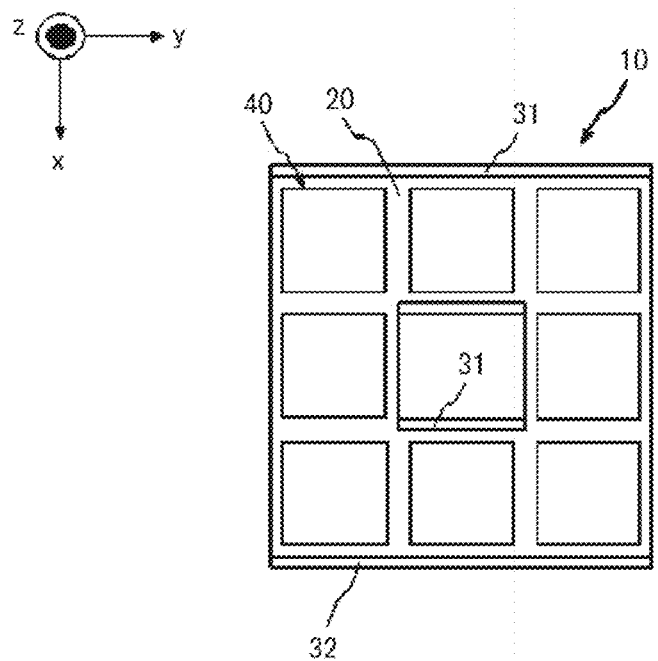
FIG. 34D is a planar view of an embodiment of a resonator.

The third conductor 40 in FIGS. 1 to 30 is illustrated by way of example. The configuration of the third conductor 40 is not limited to the configurations illustrated in FIGS. 1 to 30. The resonator including the third conductor 40 may be a line-type resonator 401. Illustrated in FIG. 31A is a meander line-type resonator 401. Illustrated in FIG. 31B is a spiral-type resonator 401. The resonator of the third conductor 40 may be a slot-type resonator 402. The slot-type resonator 402 may have one or more seventh conductors 403 in an opening. The seventh conductor 403 in an opening has one end opened and the other end electrically connected to a conductor that defines the opening. The unit slot illustrated in FIG. 31C has five seventh conductors 403 positioned in the opening. The unit slot has a shape corresponding to a meander line with the seventh conductors 403. The unit slot illustrated in FIG. 31D has one seventh conductor 403 positioned in an opening. The unit slot has a shape corresponding to a spiral with the seventh conductor 403.

The configurations of the resonator 10 in FIGS. 1 to 31 are illustrated by way of example. The configuration of the resonator 10 is not limited to the configurations illustrated in FIGS. 1 to 31. For example, the resonator 10 may include three or more pair conductors 30. For example, one pair conductor 30 may be opposed to two pair conductors 30 in the x direction. The two pair conductors 30 differ in distance from the one pair conductor 30. For example, the resonator 10 may include two pairs of pair conductors 30. Two pairs of pair conductors 30 may differ in distance of each pair and length of each pair. The resonator 10 may include five or more first conductors. A unit structure 10X of the resonator 10 may be aligned with another unit structure 10X in the y direction. The unit structure 10X of the resonator 10 may be aligned with another unit structure 10X in the x direction without the pair conductors 30 interposed therebetween. FIGS. 32 to 34 are diagrams illustrating examples of the resonator 10. In the resonator 10 illustrated in FIGS. 32 to 34, the unit resonator 40X of the unit structure 10X is a square, but the embodiments are not limited thereto.

Figure 35:
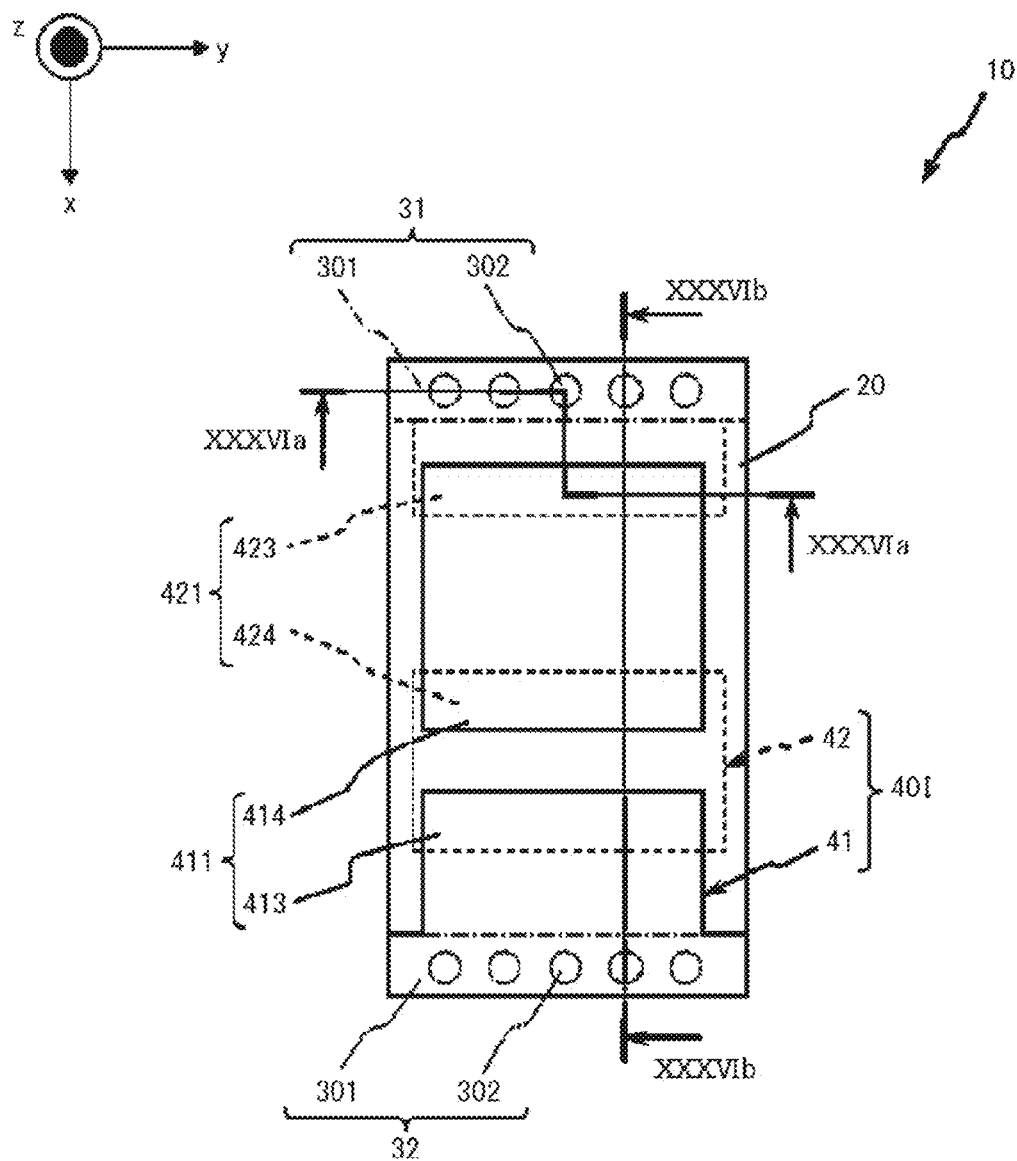
FIG. 35 is a planar view of an embodiment of a resonator.
Figure 36A:
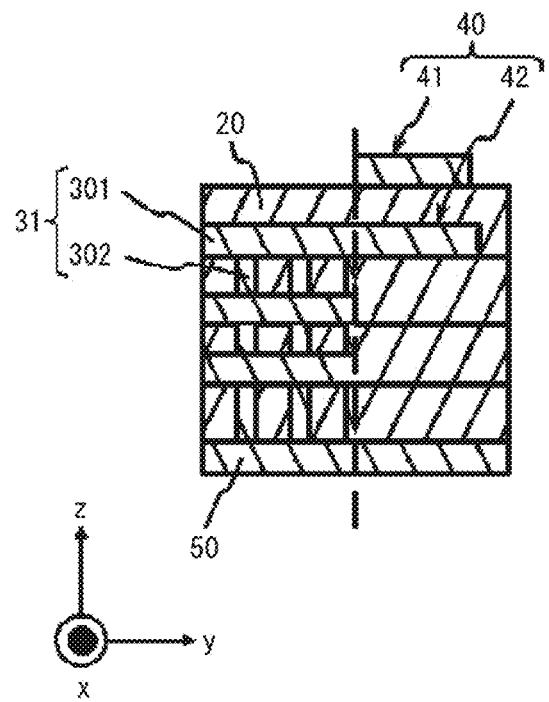
FIG. 36A is a cross-sectional view illustrating an embodiment of a resonator.
Figure 36B:
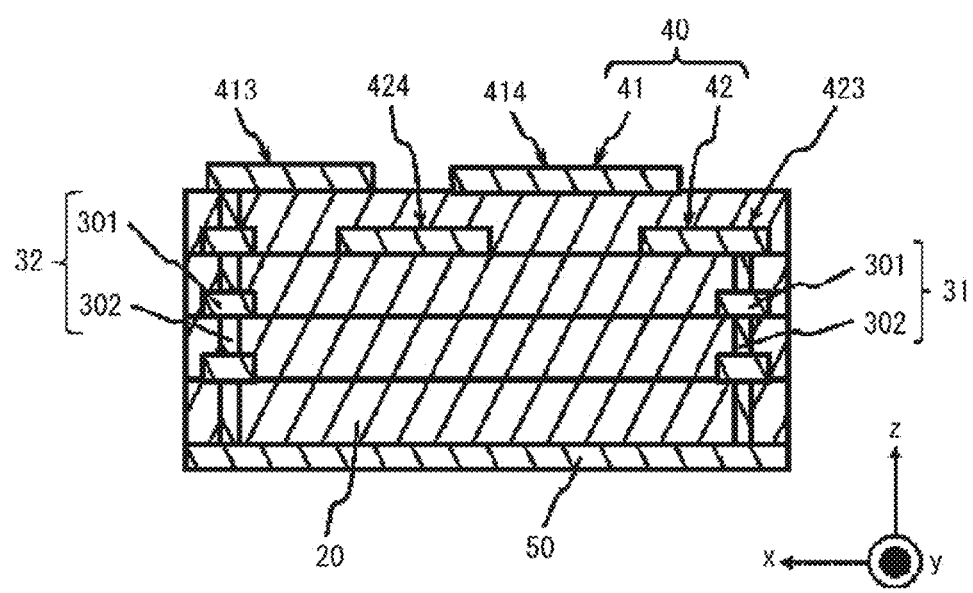
FIG. 36B is a cross-sectional view illustrating an embodiment of a resonator.

The configurations of the resonator 10 in FIGS. 1 to 34 are illustrated by way of example. The configuration of the resonator 10 is not limited to the configurations illustrated in FIGS. 1 to 34. FIG. 35 is a planar view of the xy plane from the z direction. FIG. 36A is a cross-sectional view taken along line XXXVIa-XXXVIa illustrated in FIG. 35. FIG. 36B is a cross-sectional view taken along line XXXVIb-XXXVIb illustrated in FIG. 35.

In the resonator 10 illustrated in FIGS. 35 and 36, the first conductive layer 41 includes a half of a patch-type resonator as the first unit resonator 41X. The second conductive layer 42 includes a half of a patch-type resonator as the second unit resonator 42X. The unit resonator 40X includes one first divisional resonator 41Y and one second divisional resonator 42Y. The unit structure 10X includes a unit resonator 40X as well as a part of the base 20 and a part of the fourth conductor 50 that overlap with the unit resonator 40X as viewed in the Z direction. The resonator 10 illustrated in FIG. 35 has three unit resonators 40X arranged in the x direction. The first unit conductor 411 and the second unit conductor 421 included in three unit resonators 40X form one current path 40I.

Figure 37:
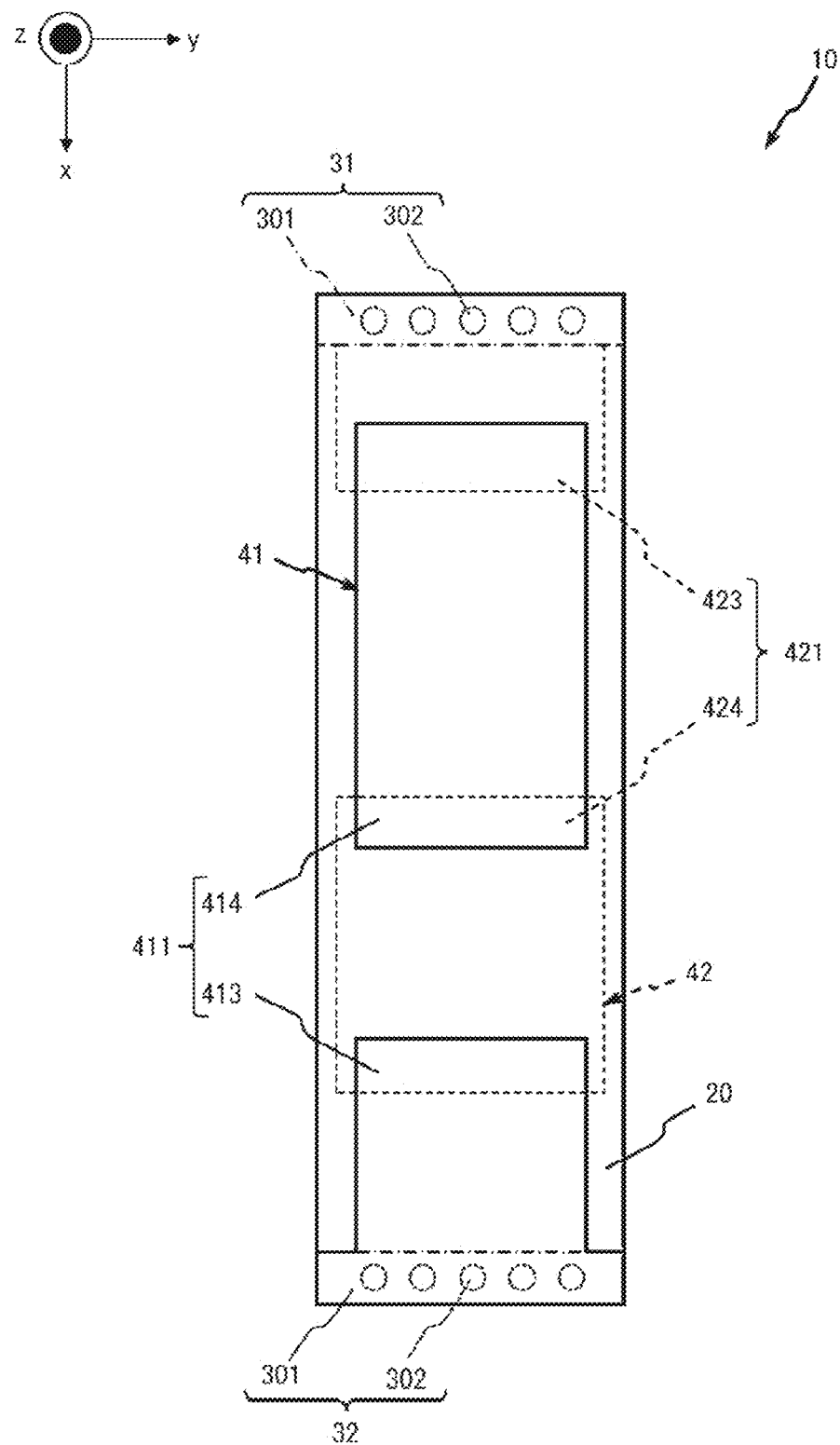
FIG. 37 is a planar view of an embodiment of a resonator.
Figure 38:
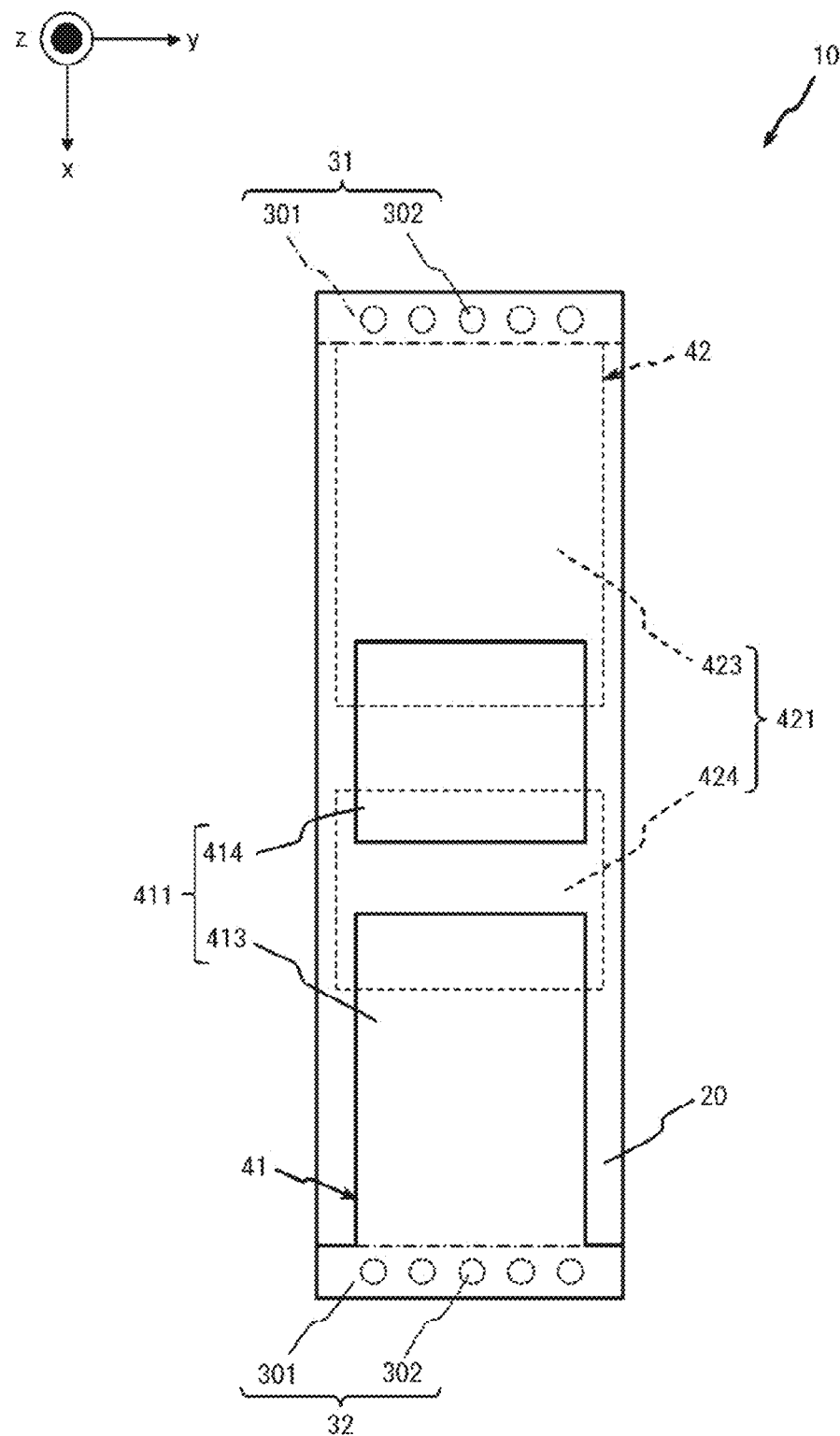
FIG. 38 is a planar view of an embodiment of a resonator.

FIG. 37 illustrates another example of the resonator 10 illustrated in FIG. 35. The resonator 10 illustrated in FIG. 37 is longer in the x direction than the resonator 10 illustrated in FIG. 35. The dimensions of the resonator 10 are not limited to the resonator 10 illustrated in FIG. 37 and may be changed as appropriate. In the resonator 10 in FIG. 37, the first connecting conductor 413 differs from the first floating conductor 414 in length in the x direction. In the resonator 10 in FIG. 37, the length in the x direction of the first connecting conductor 413 is shorter than that of the first floating conductor 414. FIG. 38 illustrates another example of the resonator 10 illustrated in FIG. 35. In the resonator 10 illustrated in FIG. 38, the third conductor 40 differs in length in the x direction. In the resonator 10 in FIG. 38, the length in the x direction of the first connecting conductor 413 is longer than that of the first floating conductor 414.

Figure 39:
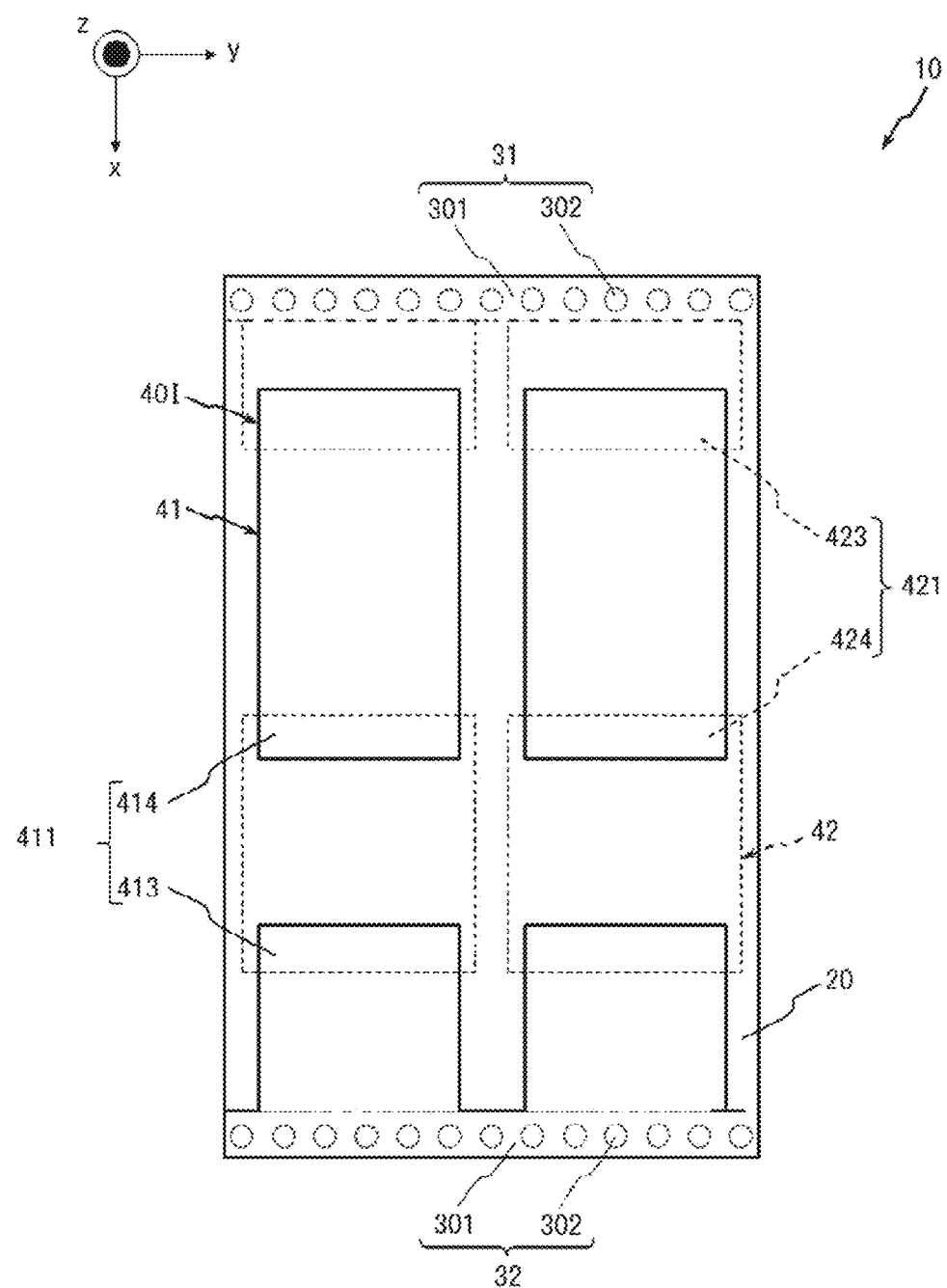
FIG. 39 is a planar view of an embodiment of a resonator.

FIG. 39 illustrates another example of the resonator 10. FIG. 39 illustrates another example of the resonator 10 illustrated in FIG. 37. In a plurality of embodiments, in the resonator 10, a plurality of first unit conductors 411 and second unit conductors 421 arranged in the x direction are capacitively coupled. In the resonator 10, two current paths 40I may be arranged in the y direction, in which current does not flow from one to the other.

Figure 40:
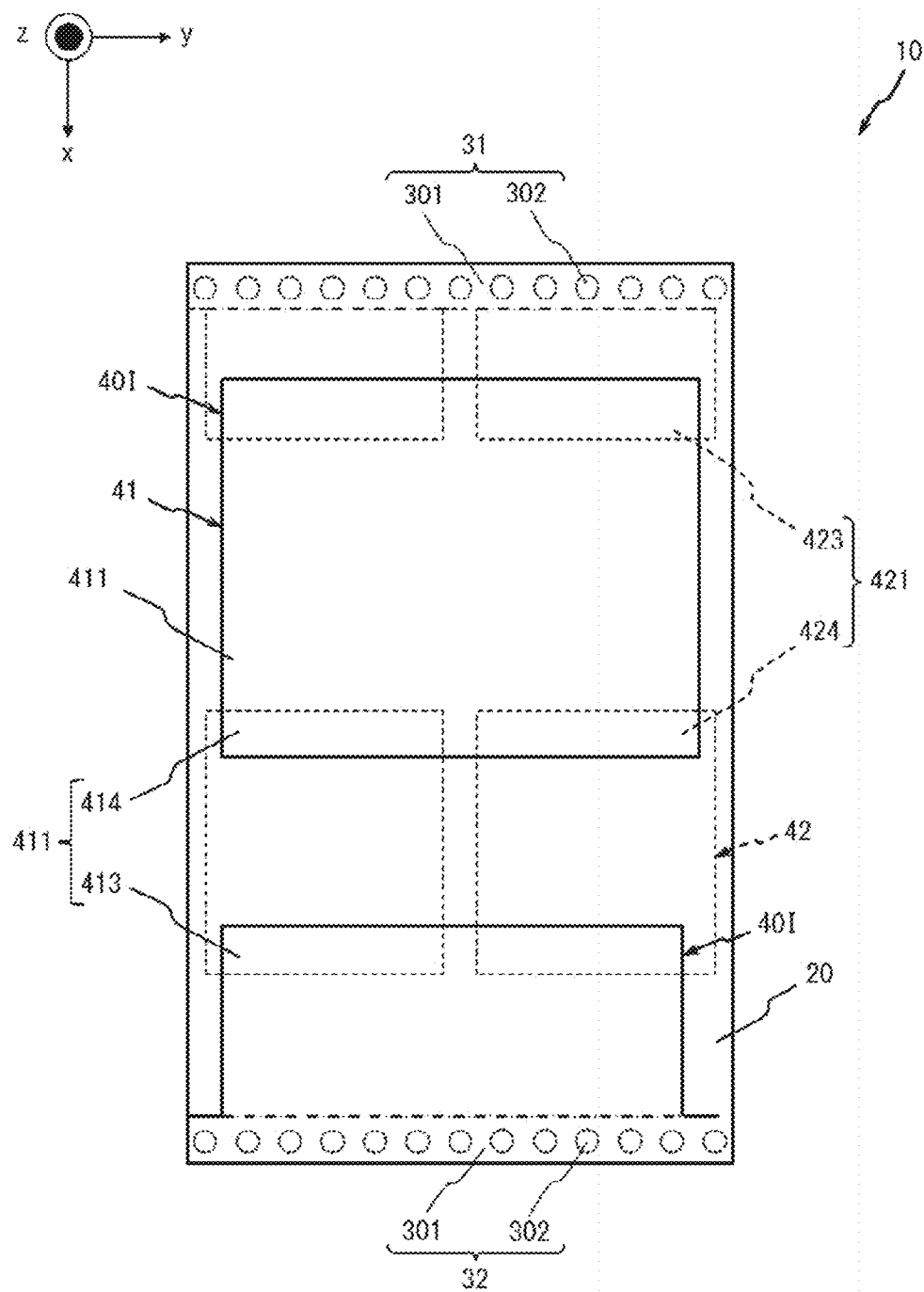
FIG. 40 is a planar view of an embodiment of a resonator.

FIG. 40 illustrates another example of the resonator 10. FIG. 40 illustrates another example of the resonator 10 illustrated in FIG. 39. In a plurality of embodiments, in the resonator 10, the number of conductive bodies connected to the first conductor 31 may differ from the number of conductive bodies connected to the second conductor 32. In the resonator 10 in FIG. 40, one first connecting conductor 413 are capacitively coupled to two second floating conductors 424. In the resonator 10 in FIG. 40, two second connecting conductors 423 are capacitively coupled to one first floating conductor 414. In a plurality of embodiments, the number of first unit conductors 411 may differ from the number of second unit conductors 421 capacitively coupled to the first unit conductors 411.

Figure 41:
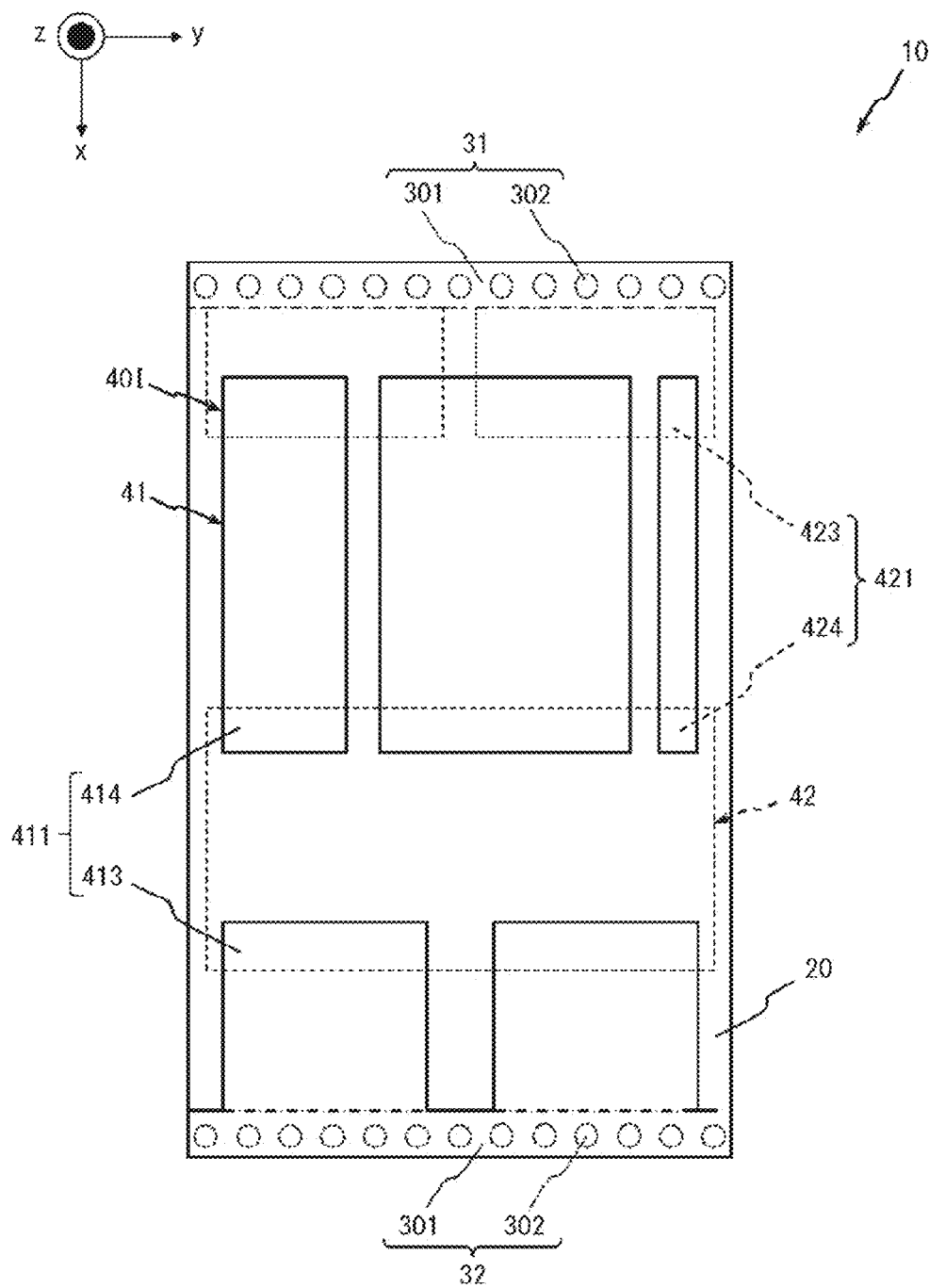
FIG. 41 is a planar view of an embodiment of a resonator.

FIG. 41 illustrates another example of the resonator 10 illustrated in FIG. 39. In a plurality of embodiments, the number of second unit conductors 421 capacitively coupled at a first end portion in the x direction of the first unit conductor 411 may differ from the number of second unit conductors 421 capacitively coupled at a second end portion in the x direction. In the resonator 10 in FIG. 41, two first connecting conductors 413 are capacitively coupled to a first end portion in the x direction of one second floating conductor 424, and three first floating conductors 414 are capacitively coupled to a second end portion thereof. In a plurality of embodiments, a plurality of conductive bodies arranged in the y direction may differ in length in the y direction. In the resonator 10 in FIG. 41, three first floating conductors 414 arranged in the y direction differ in length in the y direction.

Figure 42:
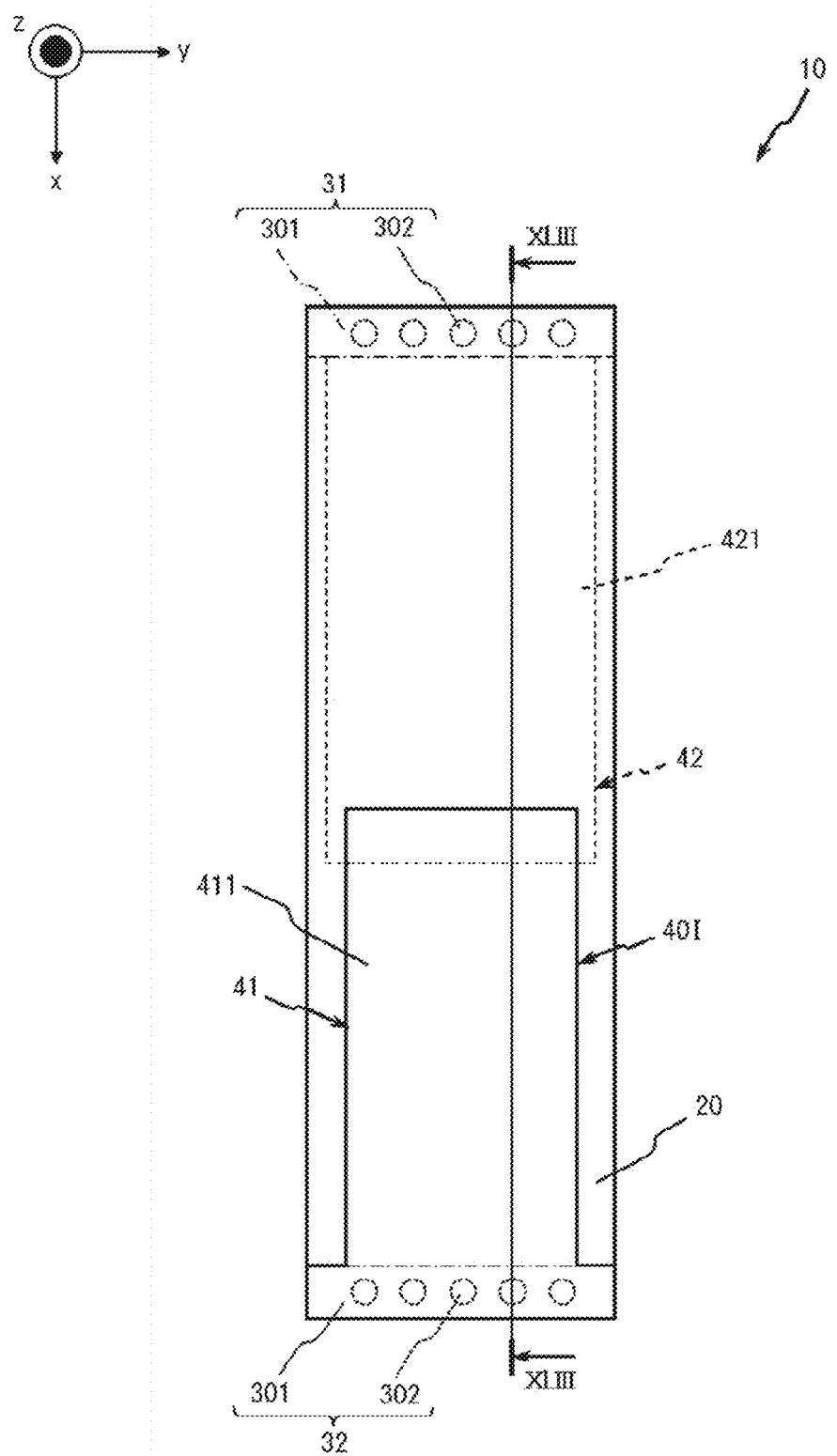
FIG. 42 is a planar view of an embodiment of a resonator.
Figure 43:
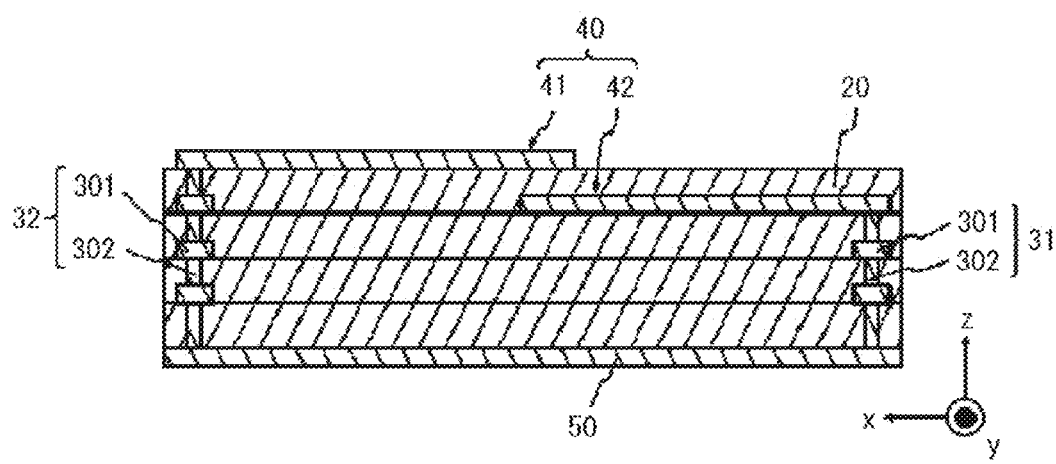
FIG. 43 is a cross-sectional view illustrating an embodiment of a resonator.

FIG. 42 illustrates another example of the resonator 10. FIG. 43 is a cross-sectional view taken along line XLIII-XLIII illustrated in FIG. 42. In the resonator 10 illustrated in FIGS. 42 and 43, the first conductive layer 41 includes a half of a patch-type resonator as a first unit resonator 41X. The second conductive layer 42 includes a half of a patch-type resonator as a second unit resonator 42X. The unit resonator 40X includes one first divisional resonator 41Y and one second divisional resonator 42Y. The unit structure 10X includes a unit resonator 40X and a part of the base 20 and a part of the fourth conductor 50 that overlap with the unit resonator 40X in the z direction. In the resonator 10 illustrated in FIG. 42, one unit resonator 40X extends in the x direction.

Figure 44:
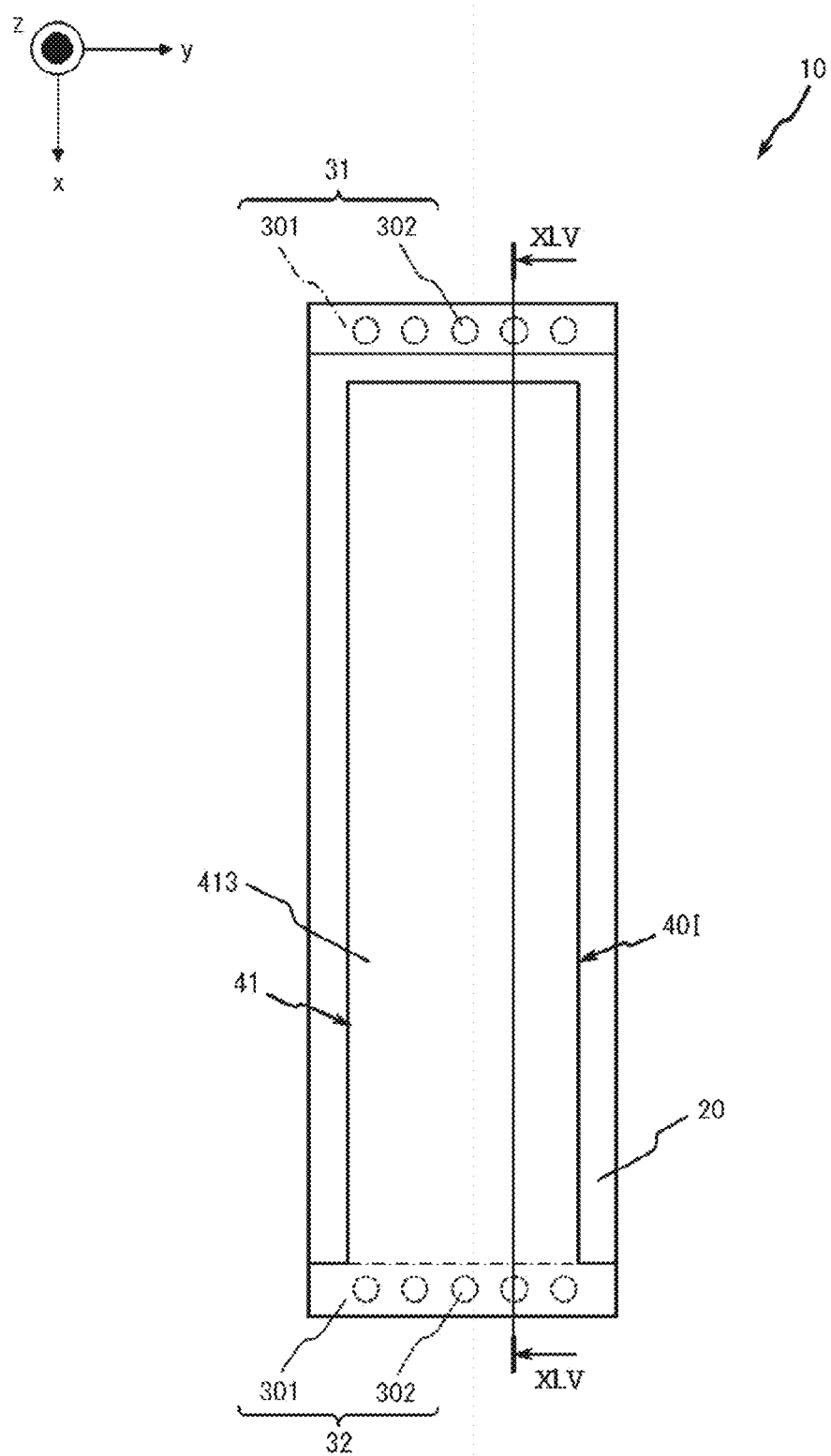
FIG. 44 is a planar view of an embodiment of a resonator.
Figure 45:
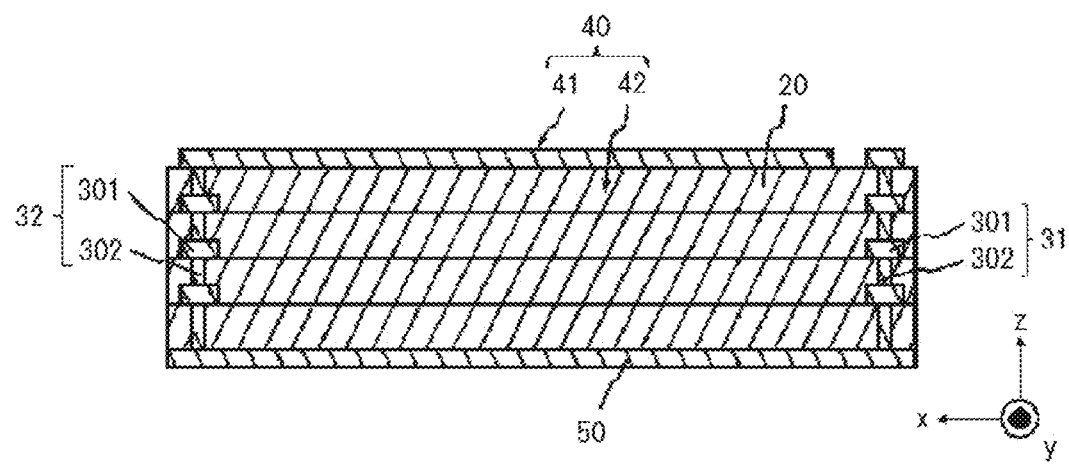
FIG. 45 is a cross-sectional view illustrating an embodiment of a resonator.

FIG. 44 illustrates another example of the resonator 10. FIG. 45 is a cross-sectional view taken along line XLV-XLV illustrated in FIG. 44. In the resonator 10 illustrated in FIGS. 44 and 45, the third conductor 40 includes only the first connecting conductor 413. The first connecting conductor 413 is opposed to the first conductor 31 in the xy plane. The first connecting conductor 413 is capacitively coupled to the first conductor 31.

Figure 46:
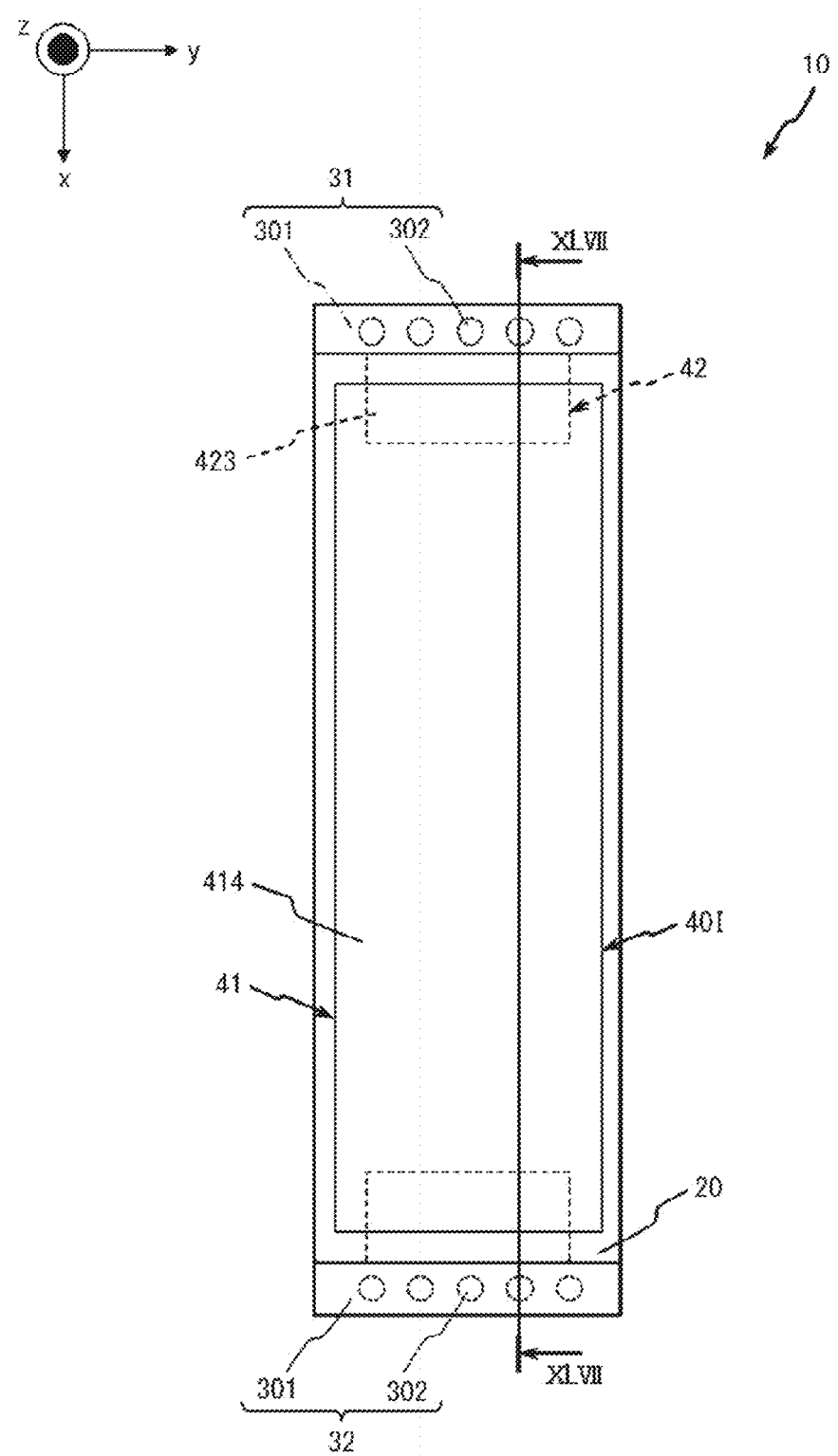
FIG. 46 is a planar view of an embodiment of a resonator.
Figure 47:
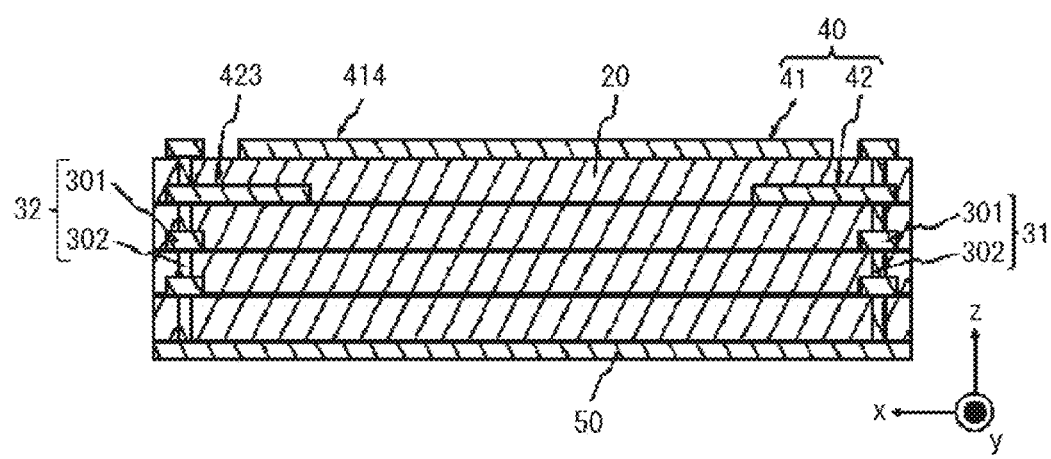
FIG. 47 is a cross-sectional view illustrating an embodiment of a resonator.

FIG. 46 illustrates another example of the resonator 10. FIG. 47 is a cross-sectional view taken along line XLVII-XLVII illustrated in FIG. 46. In the resonator 10 illustrated in FIGS. 46 and 47, the third conductor 40 has a first conductive layer 41 and a second conductive layer 42. The first conductive layer 41 has one first floating conductor 414. The second conductive layer 42 has two second connecting conductors 423. The first conductive layer 41 is opposed to the pair conductors 30 in the xy plane. Two second connecting conductors 423 overlap with one first floating conductor 414 as viewed in the z direction. One first floating conductor 414 is capacitively coupled to two second connecting conductors 423.

Figure 48:
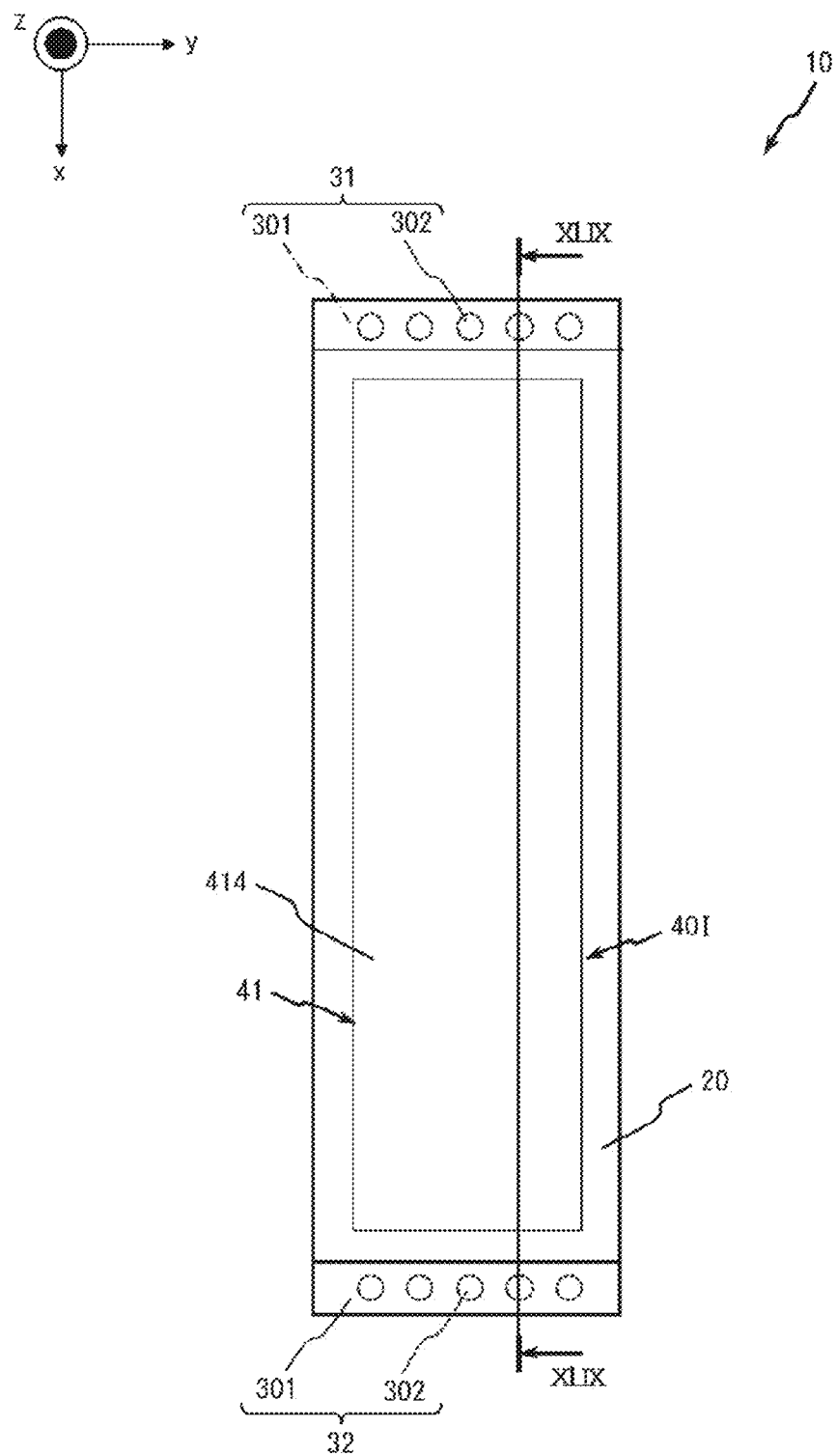
FIG. 48 is a planar view of an embodiment of a resonator.
Figure 49:
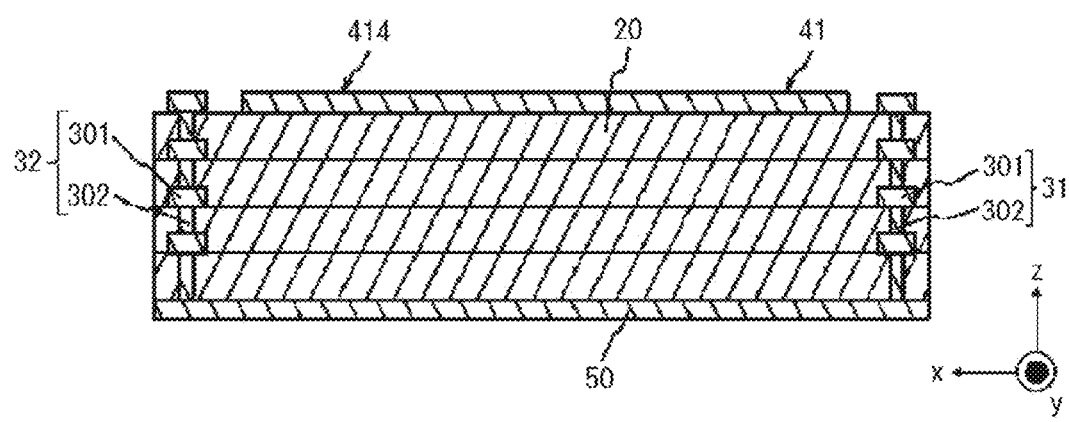
FIG. 49 is a cross-sectional view illustrating an embodiment of a resonator.

FIG. 48 illustrates another example of the resonator 10. FIG. 49 is a cross-sectional view taken along line XLIX-XLIX illustrated in FIG. 48. In the resonator 10 illustrated in FIGS. 48 and 49, the third conductor 40 includes only the first floating conductor 414. The first floating conductor 414 is opposed to the pair conductors 30 in the xy plane. The first connecting conductor 413 is capacitively coupled to the pair conductors 30.

Figure 50:
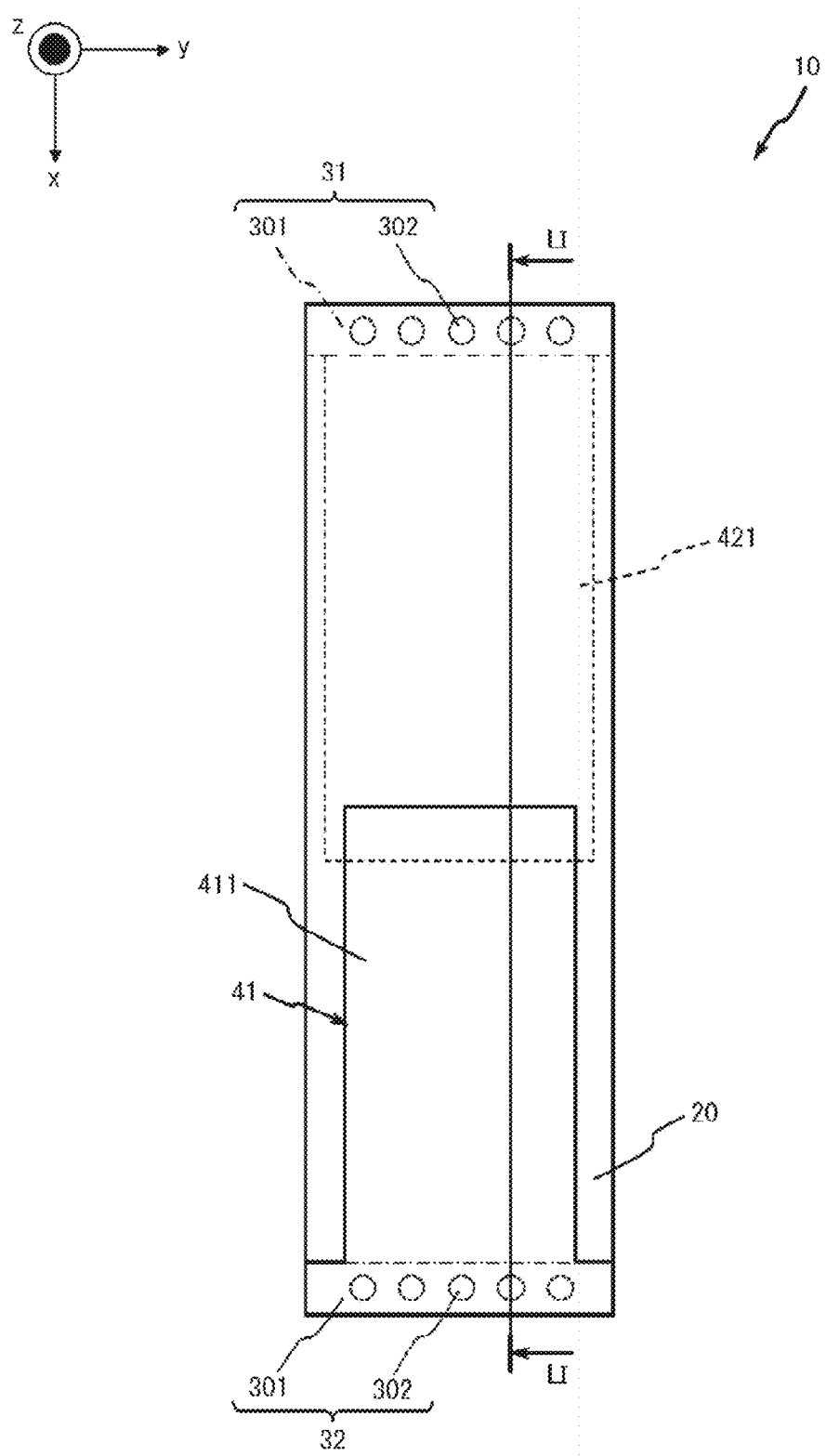
FIG. 50 is a planar view of an embodiment of a resonator.
Figure 51:
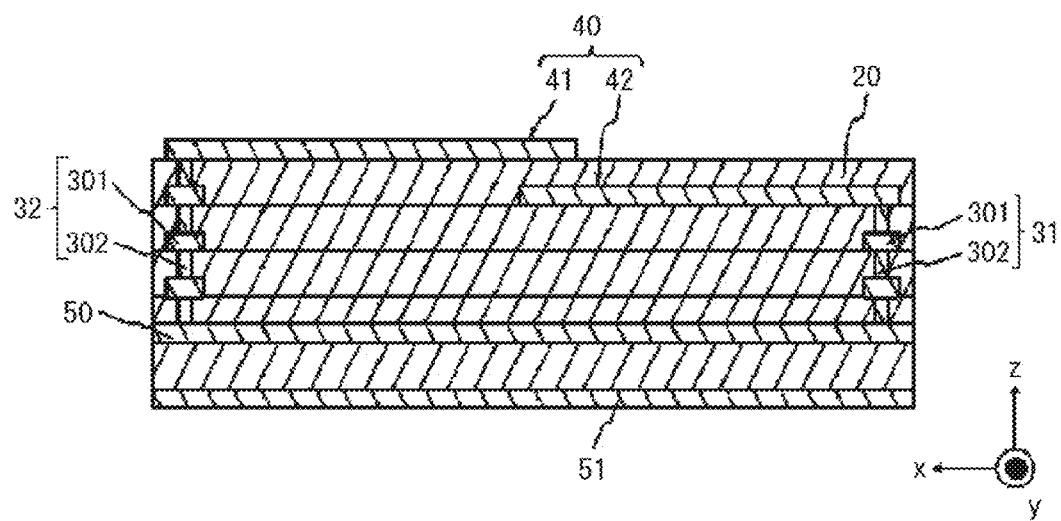
FIG. 51 is a cross-sectional view illustrating an embodiment of a resonator.

FIG. 50 illustrates another example of the resonator 10. FIG. 51 is a cross-sectional view taken along line LI-LI illustrated in FIG. 50. The resonator 10 illustrated in FIGS. 50 and 51 differs from the resonator 10 illustrated in FIGS. 42 and 43 in configuration of the fourth conductor 50. The resonator 10 illustrated in FIGS. 50 and 51 includes a fourth conductor 50 and a reference potential layer 51. The reference potential layer 51 is electrically connected to the ground of a device having the resonator 10. The reference potential layer 51 is opposed to the third conductor 40 with the fourth conductor 50 interposed therebetween. The fourth conductor 50 is positioned between the third conductor 40 and the reference potential layer 51. The spacing between the reference potential layer 51 and the fourth conductor 50 is narrower than the spacing between the third conductor 40 and the fourth conductor 50.

Figure 52:
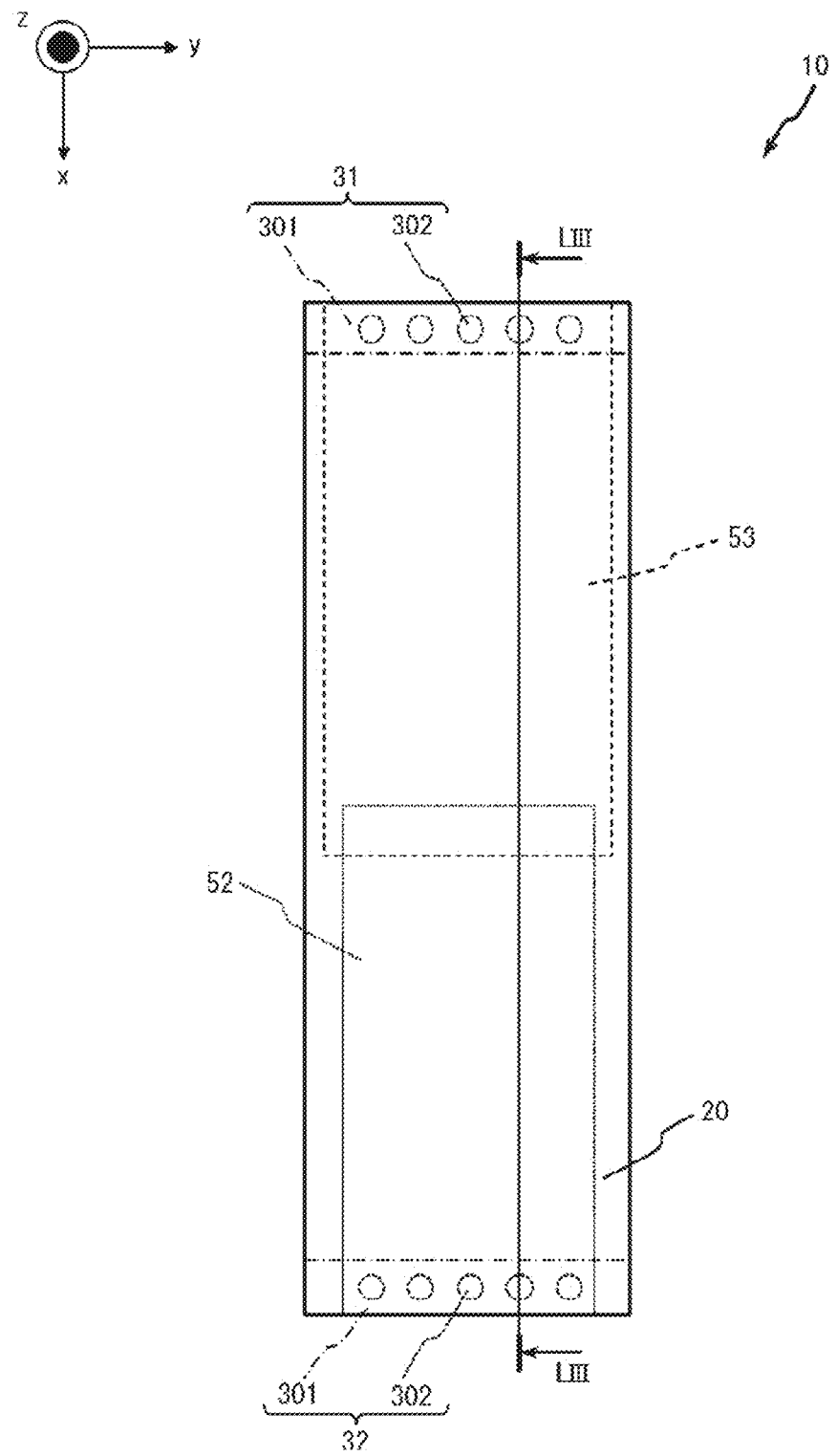
FIG. 52 is a planar view of an embodiment of a resonator.
Figure 53:
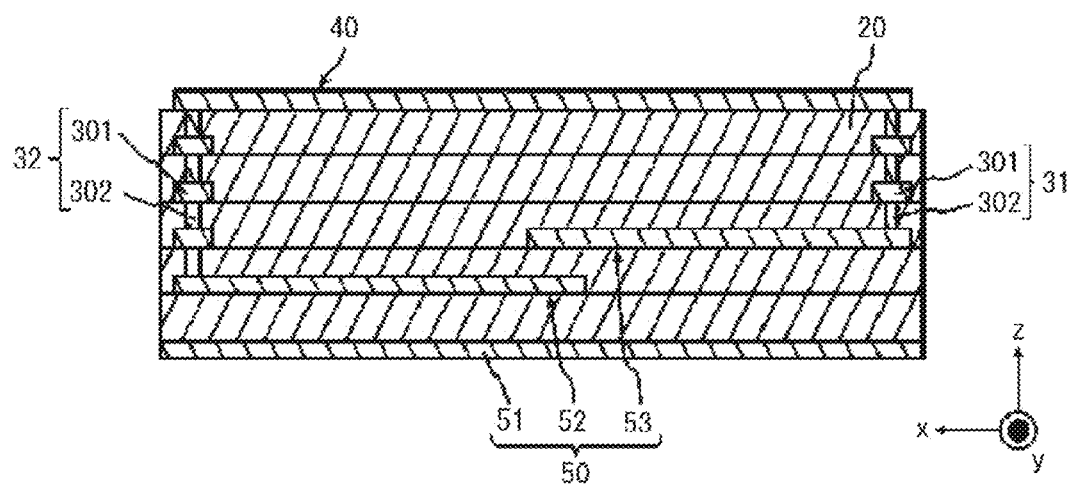
FIG. 53 is a cross-sectional view illustrating an embodiment of a resonator.

FIG. 52 illustrates another example of the resonator 10. FIG. 53 is a cross-sectional view taken along line LIII-LIII illustrated in FIG. 52. The resonator 10 includes a fourth conductor 50 and a reference potential layer 51. The reference potential layer 51 is electrically connected to the ground of a device having the resonator 10. The fourth conductor 50 includes a resonator. The fourth conductor 50 includes a third conductive layer 52 and a fourth conductive layer 53. The third conductive layer 52 and the fourth conductive layer 53 are capacitively coupled. The third conductive layer 52 and the fourth conductive layer 53 are opposed to each other in the z direction. The distance between the third conductive layer 52 and the fourth conductive layer 53 is shorter than the distance between the fourth conductive layer 53 and the reference potential layer 51. The distance between the third conductive layer 52 and the fourth conductive layer 53 is shorter than the distance between the fourth conductor 50 and the reference potential layer 51. The third conductor 40 is one conductive layer.

Figure 54:
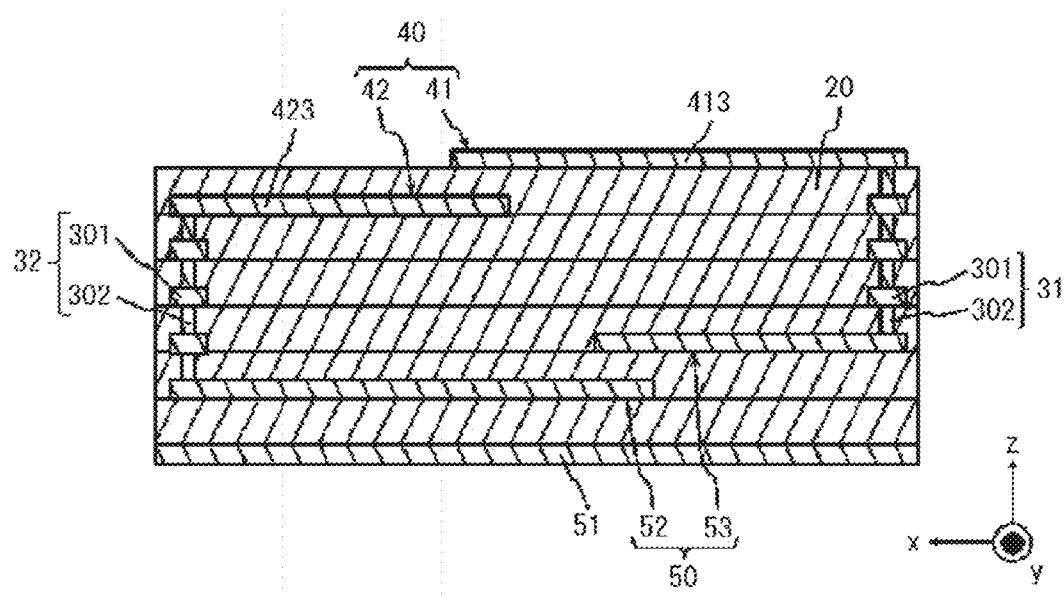
FIG. 54 is a cross-sectional view illustrating an embodiment of a resonator.

FIG. 54 illustrates another example of the resonator 10 illustrated in FIG. 53. The resonator 10 includes a third conductor 40, a fourth conductor 50, and a reference potential layer 51. The third conductor 40 includes a first conductive layer 41 and a second conductive layer 42. The first conductive layer 41 includes a first connecting conductor 413. The second conductive layer 42 includes a second connecting conductor 423. The first connecting conductor 413 is capacitively coupled to the second connecting conductor 423. The reference potential layer 51 is electrically connected to the ground of a device having the resonator 10. The fourth conductor 50 includes a third conductive layer 52 and a fourth conductive layer 53. The third conductive layer 52 and the fourth conductive layer 53 are capacitively coupled. The third conductive layer 52 and the fourth conductive layer 53 are opposed to each other in the z direction. The distance between the third conductive layer 52 and the fourth conductive layer 53 is shorter than the distance between the fourth conductive layer 53 and the reference potential layer 51. The distance between the third conductive layer 52 and the fourth conductive layer 53 is shorter than the distance between the fourth conductor 50 and the reference potential layer 51.

Figure 55:
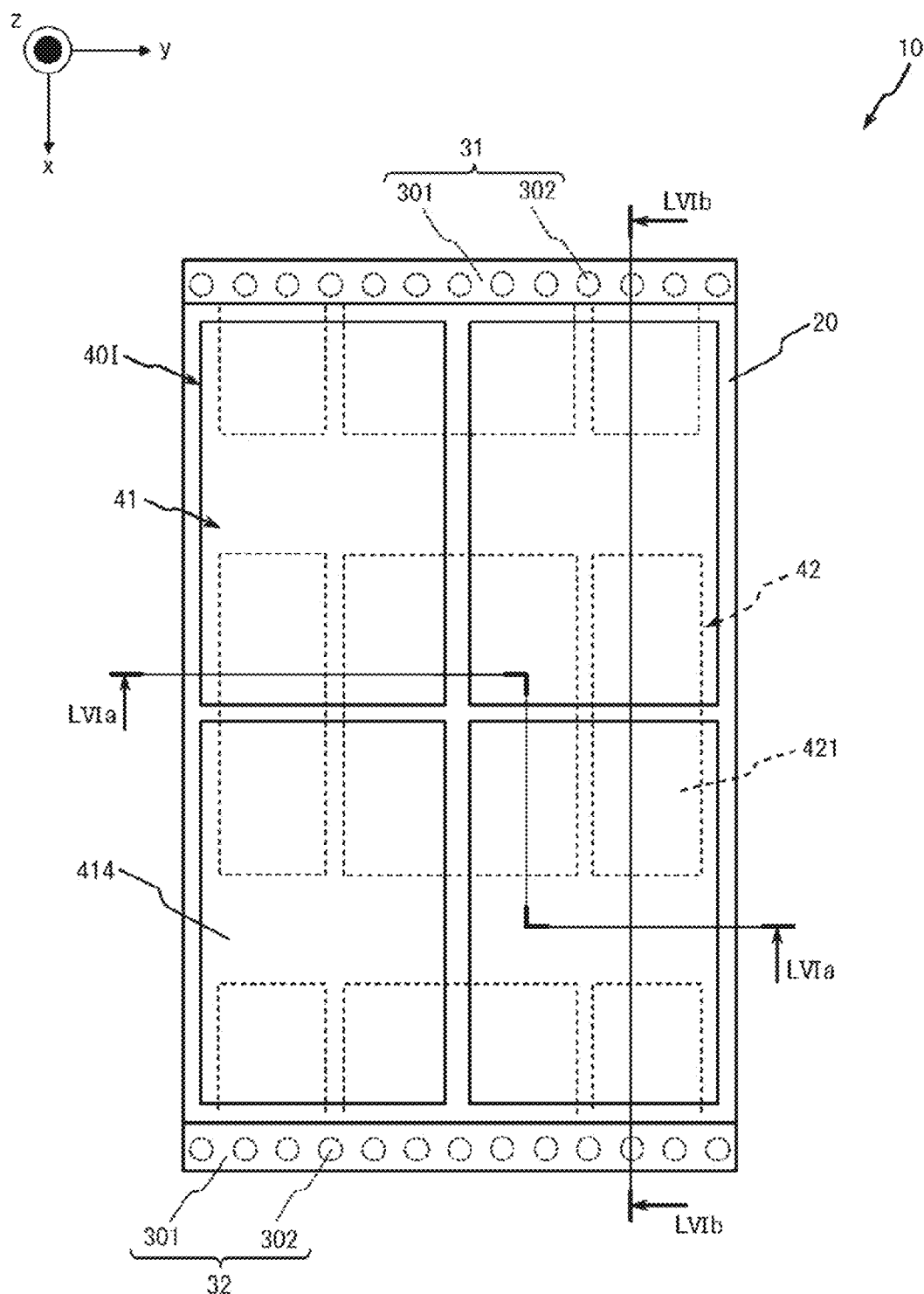
FIG. 55 is a planar view of an embodiment of a resonator.
Figure 56A:
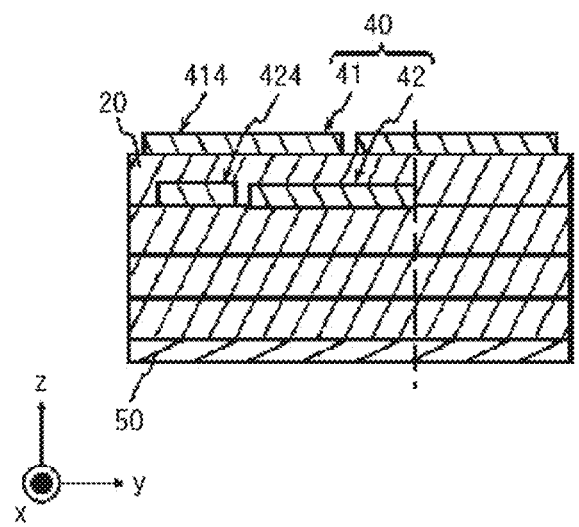
FIG. 56A is a cross-sectional view illustrating an embodiment of a resonator.
Figure 56B:
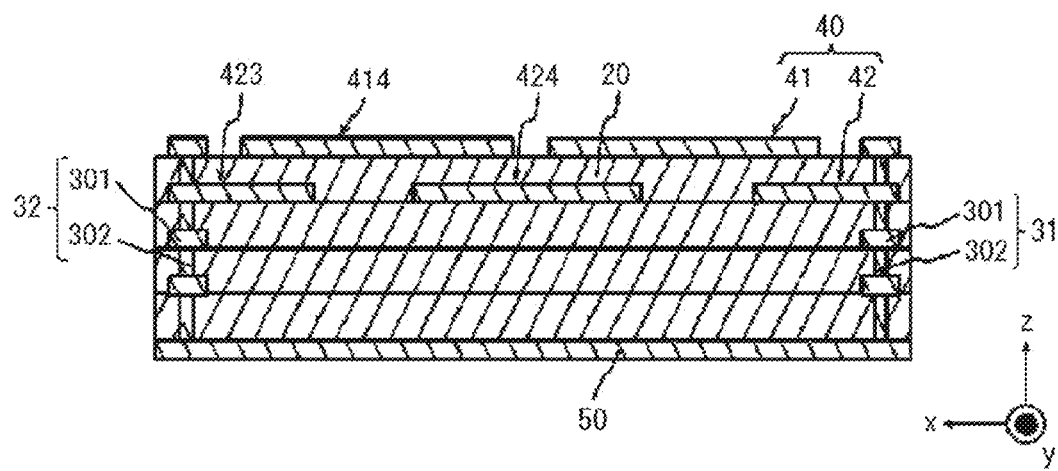
FIG. 56B is a cross-sectional view illustrating an embodiment of a resonator.

FIG. 55 illustrates another example of the resonator 10. FIG. 56A is a cross-sectional view taken along line LVIa-LVIa illustrated in FIG. 55. FIG. 56B is a cross-sectional view taken along line LVIb-LVIb illustrated in FIG. 55. In the resonator 10 illustrated in FIG. 55, the first conductive layer 41 has four first floating conductors 414. The first conductive layer 41 illustrated in FIG. 55 does not have a first connecting conductor 413. In the resonator 10 illustrated in FIG. 55, the second conductive layer 42 has six second connecting conductors 423 and three second floating conductors 424. Each of two second connecting conductors 423 is capacitively coupled to two first floating conductors 414. One second floating conductor 424 is capacitively coupled to four first floating conductors 414. Two second floating conductors 424 are capacitively coupled to two first floating conductors 414.

Figure 57:
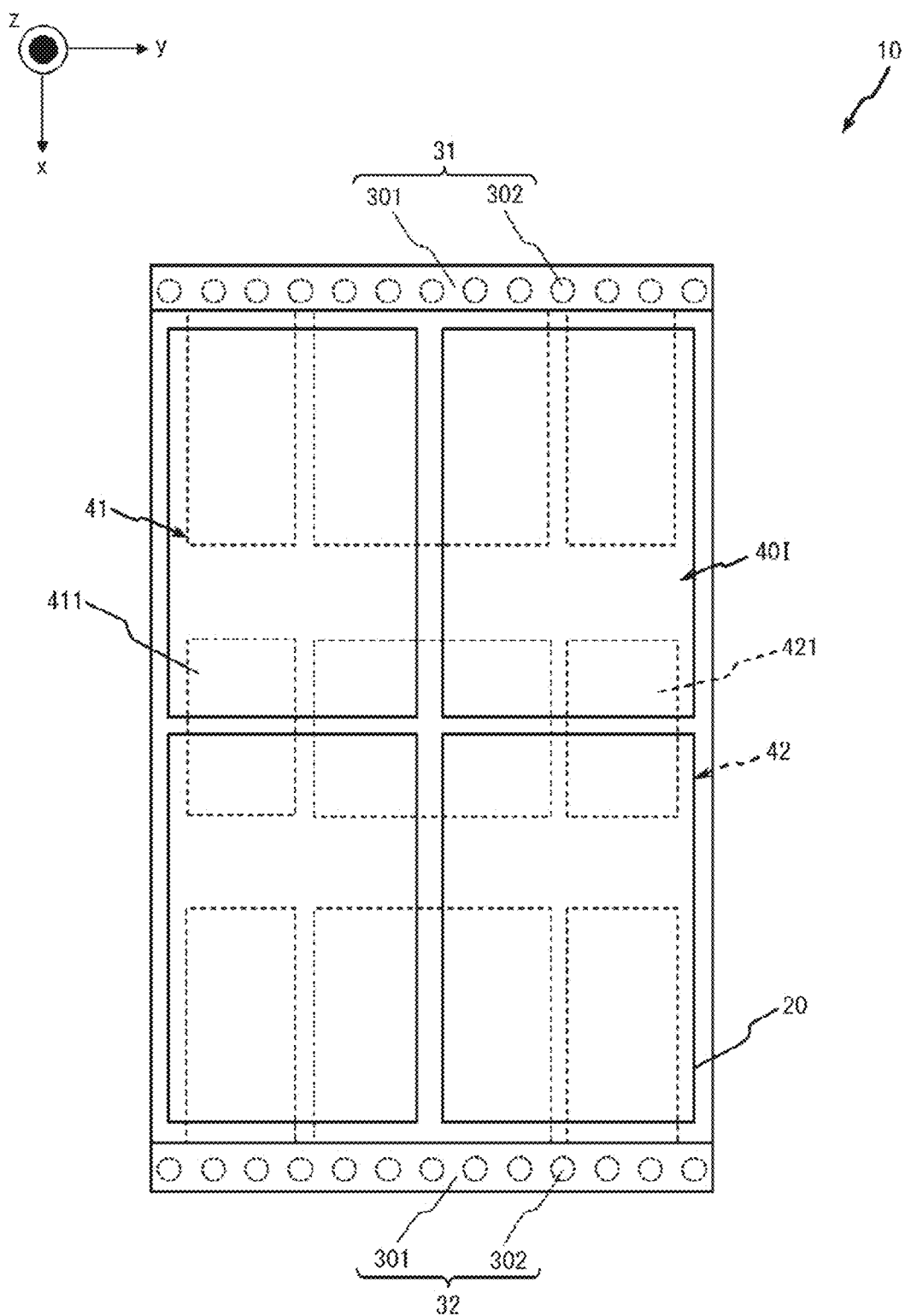
FIG. 57 is a planar view of an embodiment of a resonator.

FIG. 57 illustrates another example of the resonator illustrated in FIG. 55. The resonator 10 in FIG. 57 differs from the resonator 10 illustrated in FIG. 55 in size of the second conductive layer 42. In the resonator 10 illustrated in FIG. 57, the length along the x direction of the second floating conductor 424 is shorter than the length along the x direction of the second connecting conductor 423.

Figure 58:
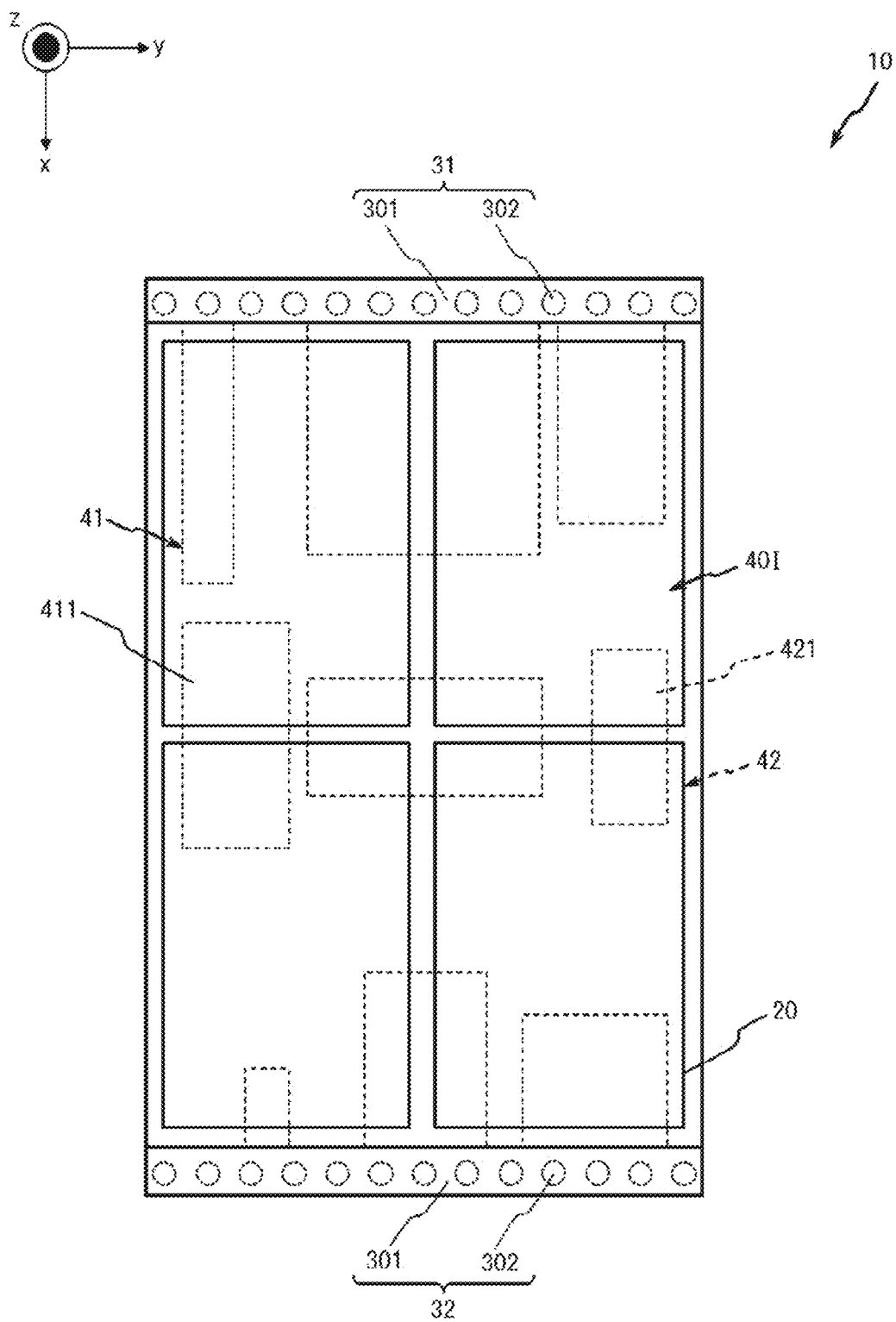
FIG. 58 is a planar view of an embodiment of a resonator.

FIG. 58 illustrates another example of the resonator illustrated in FIG. 55. The resonator 10 in FIG. 58 differs from the resonator 10 illustrated in FIG. 55 in size of the second conductive layer 42. In the resonator 10 illustrated in FIG. 58, a plurality of second unit conductors 421 differ in first surface integral. In the resonator 10 illustrated in FIG. 58, a plurality of second unit conductors 421 differ in length in the x direction. In the resonator 10 illustrated in FIG. 58, a plurality of second unit conductors 421 differ in length in the y direction. In FIG. 58, a plurality of second unit conductors 421 differ from each other in first surface integral, length, and width, but the embodiments are not limited thereto. In FIG. 58, a plurality of second unit conductors 421 may differ from each other in part of first surface integral, length, and width. A plurality of second unit conductor 421 may be equal to each other in some or all of first surface integral, length, and width. A plurality of second unit conductor 421 may differ from each other in some or all of first surface integral, length, and width. A plurality of second unit conductors 421 may be equal to each other in some or all of first surface integral, length, and width. Some of a plurality of second unit conductors 421 may be equal to each other in some or all of first surface integral, length, and width.

In the resonator 10 illustrated in FIG. 58, a plurality of second connecting conductors 423 arranged in the y direction differ from each other in first surface integral. In the resonator 10 illustrated in FIG. 58, a plurality of second connecting conductors 423 arranged in the y direction differ from each other in length in the x direction. In the resonator 10 illustrated in FIG. 58, a plurality of second connecting conductors 423 arranged in the y direction differ from each other in length in the y direction. In FIG. 58, a plurality of second connecting conductors 423 differ from each other in first surface integral, length, and width, but the embodiments are not limited thereto. In FIG. 58, a plurality of second connecting conductors 423 may differ from each other partially in first surface integral, length, and width. A plurality of second connecting conductors 423 may be equal to each other in some or all of first surface integral, length, and width. A plurality of second connecting conductors 423 may differ from each other in some or all of first surface integral, length, and width. A plurality of second connecting conductors 423 may be equal to each other in some or all of first surface integral, length, and width. Some of a plurality of second connecting conductors 423 may be equal to each other in some or all of first surface integral, length, and width.

In the resonator 10 illustrated in FIG. 58, a plurality of second floating conductors 424 arranged in the y direction differ from each other in first surface integral. In the resonator 10 illustrated in FIG. 58, a plurality of second floating conductors 424 arranged in the y direction differ from each other in length in the x direction. In the resonator 10 illustrated in FIG. 58, a plurality of second floating conductors 424 arranged in the y direction differ from each other in length in the y direction. In FIG. 58, a plurality of second floating conductors 424 differ from each other in first surface integral, length, and width, but the embodiments are not limited thereto. In FIG. 58, a plurality of second floating conductors 424 may differ from each other partially in first surface integral, length, and width. A plurality of second floating conductors 424 may be equal to each other in some or all of first surface integral, length, and width. A plurality of second floating conductors 424 may differ from each other in some or all of first surface integral, length, and width. A plurality of second floating conductors 424 may be equal to each other in some or all of first surface integral, length, and width. Some of a plurality of second floating conductors 424 may be equal to each other in some or all of first surface integral, length, and width.

Figure 59:
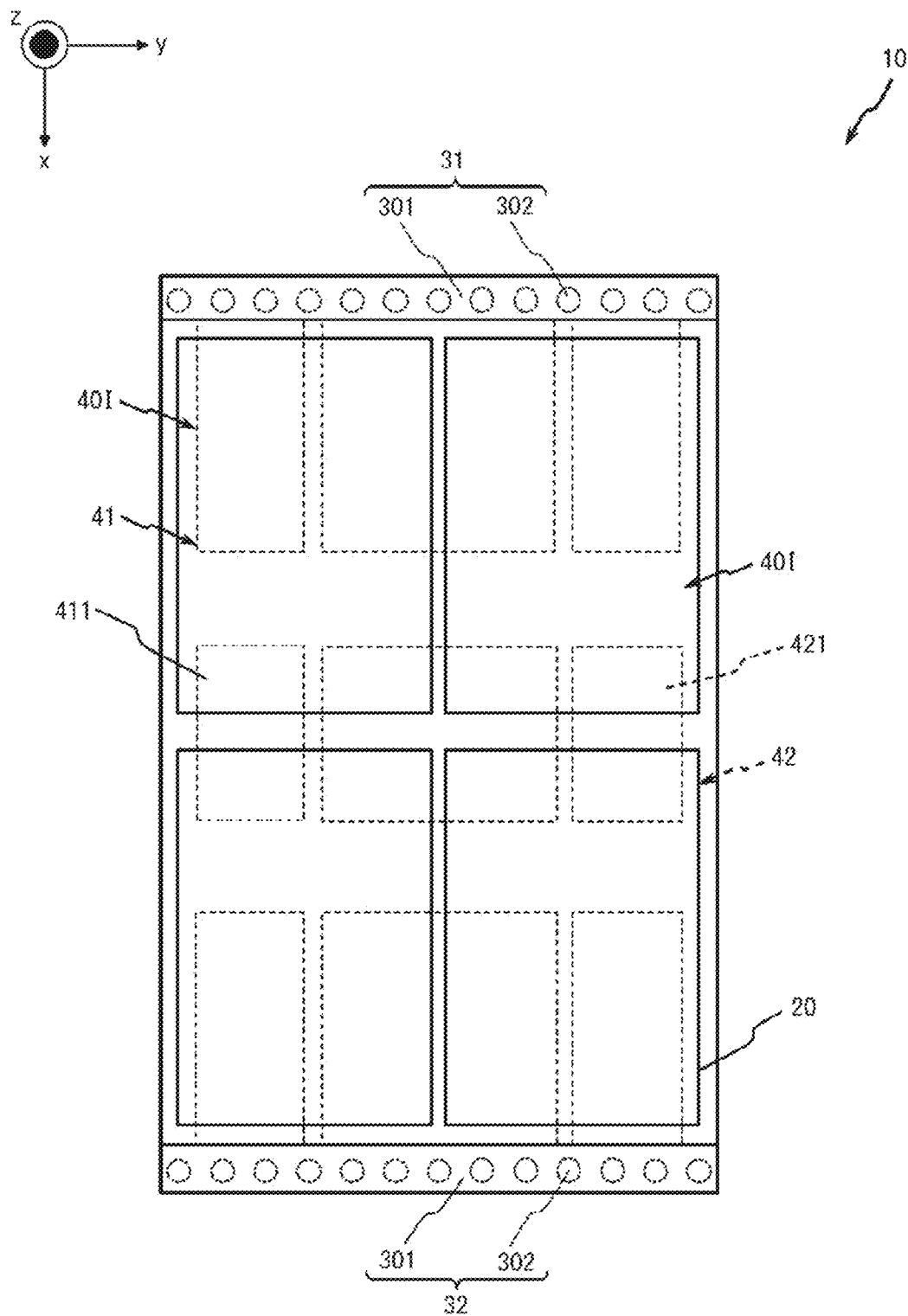
FIG. 59 is a planar view of an embodiment of a resonator.

FIG. 59 illustrates another example of the resonator 10 illustrated in FIG. 57. In the resonator 10 in FIG. 59, the spacing between the first unit conductors 411 in the y direction differs from that of the resonator 10 illustrated in FIG. 57. In the resonator 10 in FIG. 59, the spacing between the first unit conductors 411 in the y direction is smaller than the spacing between the first unit conductors 411 in the x direction. In the resonator 10, current flows in the x direction since the pair conductors 30 can function as electric conductors. In this resonator 10, current flowing through the third conductor 40 in the y direction can be ignored. The spacing between the first unit conductors 411 in the y direction may be shorter than the spacing between the first unit conductors 411 in the x direction. Shortening the spacing between the first unit conductors 411 in the y direction can increase the surface integral of the first unit conductors 411.

Figure 60:
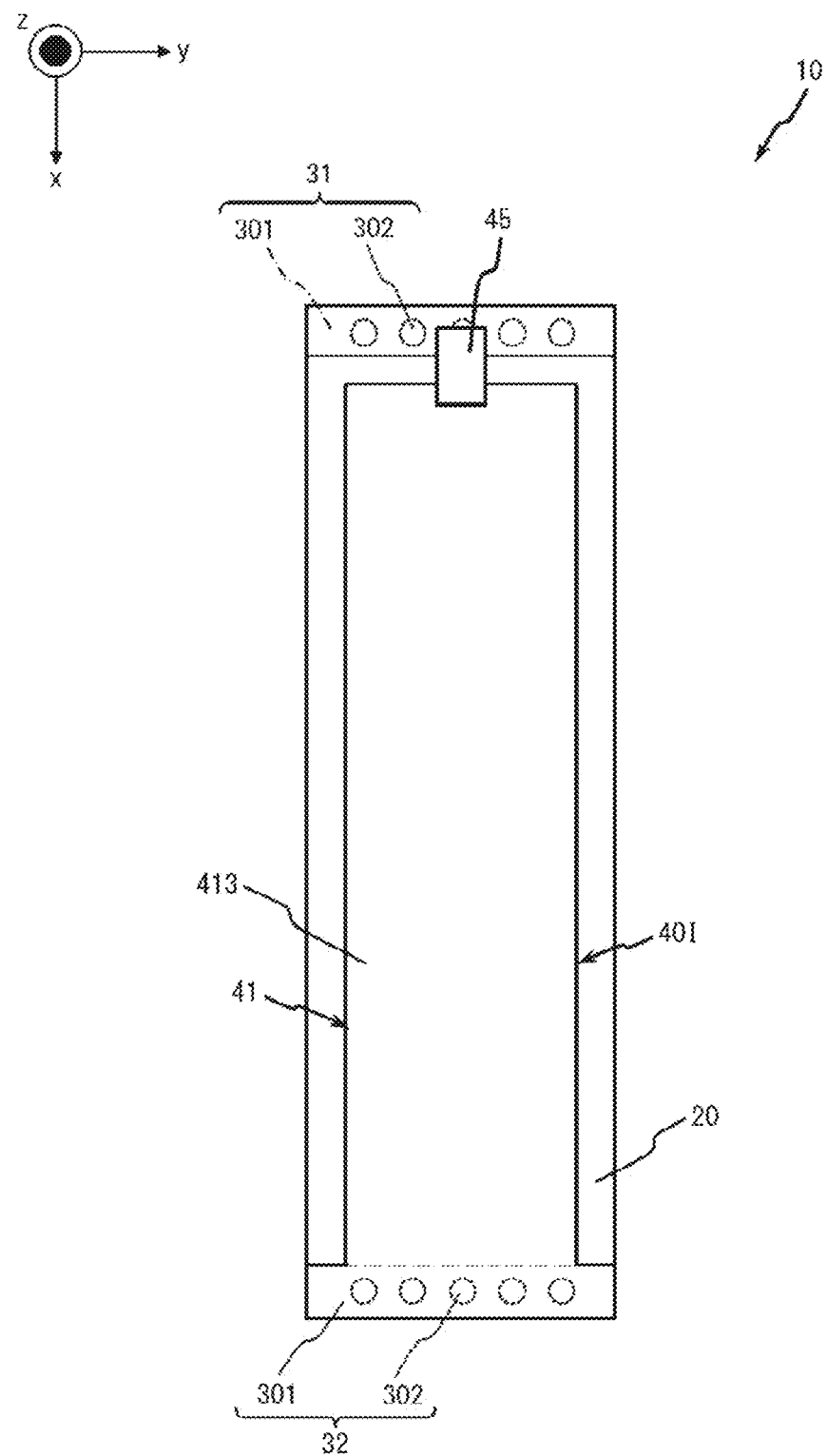
FIG. 60 is a planar view of an embodiment of a resonator.
Figure 61:
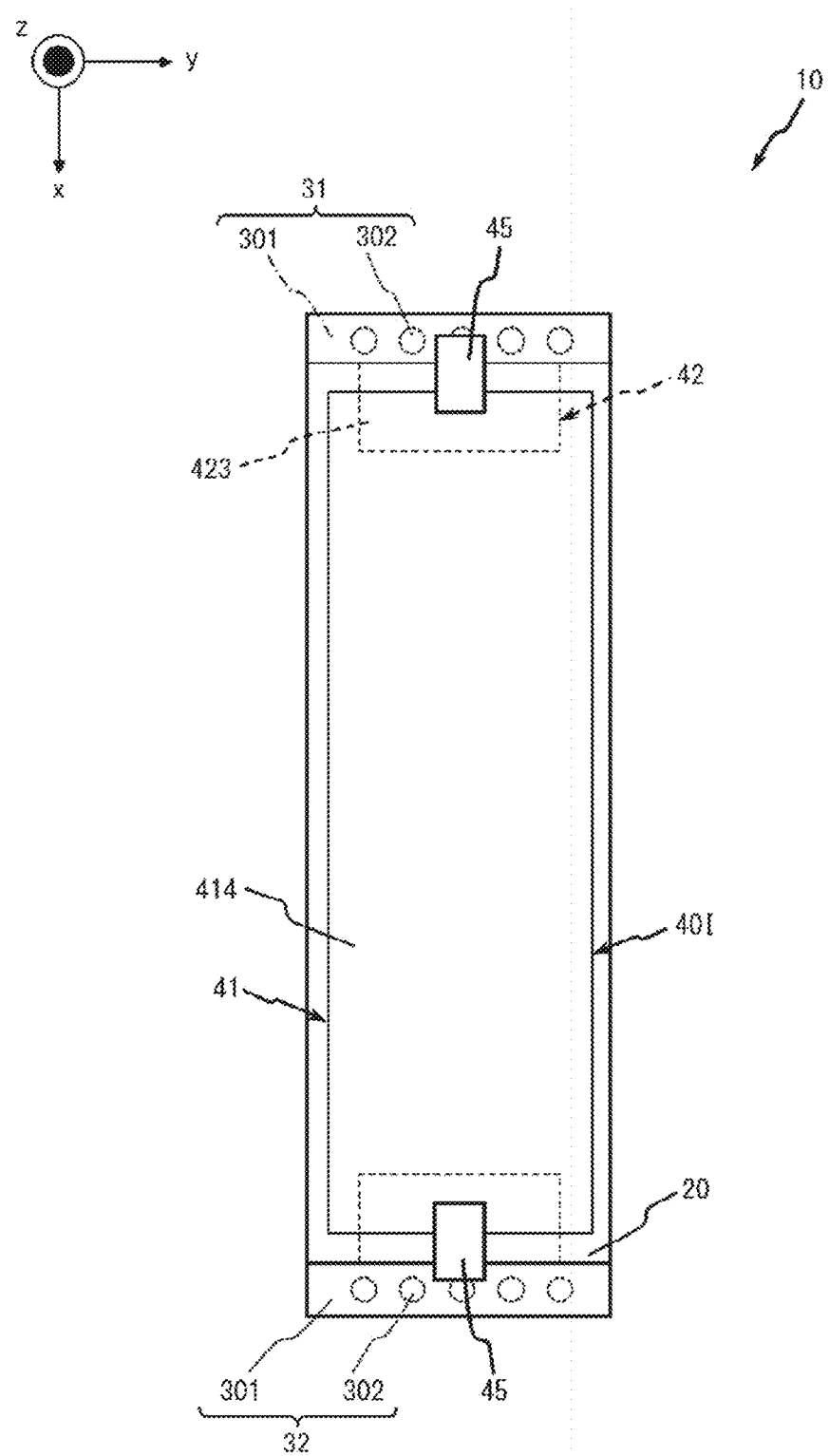
FIG. 61 is a planar view of an embodiment of a resonator.
Figure 62:
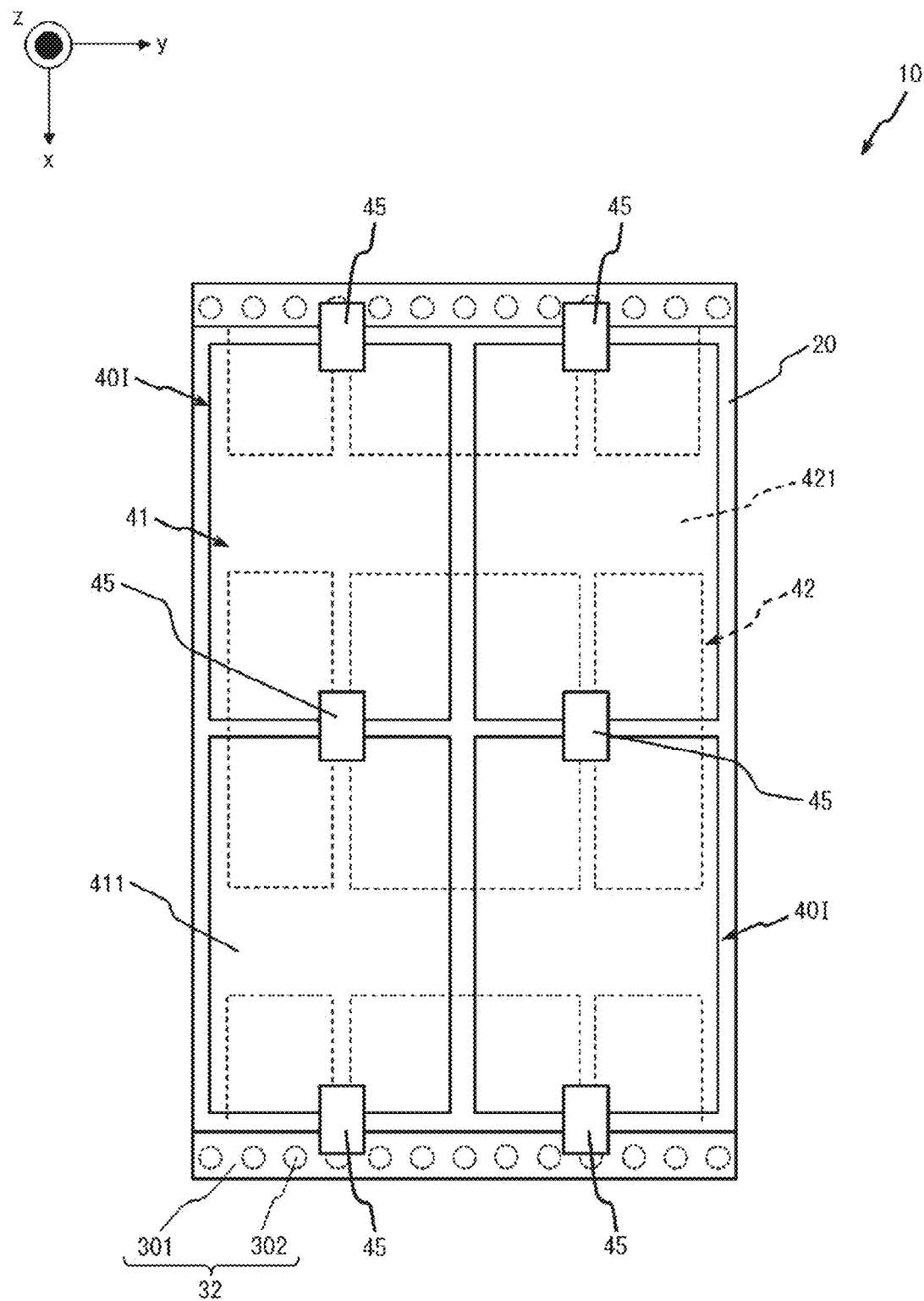
FIG. 62 is a planar view of an embodiment of a resonator.

FIGS. 60 to 62 are diagrams illustrating other examples of the resonator 10. These resonators 10 have an impedance element 45. A unit conductor connected to the impedance element 45 is not limited to the example illustrated in FIGS. 60 to 62. The impedance elements 45 illustrated in FIGS. 60 to 62 can be partially omitted. The impedance element 45 may have a capacitance character. The impedance element 45 may have an inductance character. The impedance element 45 may be a mechanical or electrical variable element. The impedance element 45 may connect two different conductors in one layer.

An antenna has at least one of a function of emitting electromagnetic waves and a function of receiving electromagnetic waves. The antenna in the present disclosure includes a first antenna 60 and a second antenna 70, but the embodiments are not limited thereto.

The first antenna 60 includes a base 20, pair conductors 30, a third conductor 40, a fourth conductor 50, and a first feeding line 61. In an example, the first antenna 60 has a third base 24 on the base 20. The third base 24 may have a composition different from the base 20. The third base 24 may be positioned on the third conductor 40. FIGS. 63 to 76 are diagrams illustrating the first antenna 60 that is an example of a plurality of embodiments.

The first feeding line 61 feeds power to at least one of resonators arranged periodically as artificial magnetic conductors. When power is fed to a plurality of resonators, the first antenna 60 may have a plurality of first feeding lines. The first feeding line 61 may be electromagnetically connected to any one of the resonators arranged periodically as artificial magnetic conductors. The first feeding line 61 may be electromagnetically connected to any one of a pair of conductors viewed as electric conductors from the resonators arranged periodically as artificial magnetic conductors.

The first feeding line 61 feeds power to at least one of the first conductor 31, the second conductor 32, and the third conductor 40. When power is fed to a plurality of portions of the first conductor 31, the second conductor 32, and the third conductor 40, the first antenna 60 may have a plurality of first feeding lines. The first feeding line 61 may be electromagnetically connected to any of the first conductor 31, the second conductor 32, and the third conductor 40. When the first antenna 60 includes a reference potential layer 51 in addition to the fourth conductor 50, the first feeding line 61 may be electromagnetically connected to any one of the first conductor 31, the second conductor 32, the third conductor 40, and the fourth conductor 50. The first feeding line 61 is electrically connected to one of the fifth conductive layer 301 and the fifth conductor 302 of the pair conductor 30. A part of the first feeding line 61 may be integrated with the fifth conductive layer 301.

The first feeding line 61 may be electromagnetically connected to the third conductor 40. For example, the first feeding line 61 is electromagnetically connected to one of the first unit resonators 41X. For example, the first feeding line 61 is electromagnetically connected to one of the second unit resonators 42X. The first feeding line 61 is electromagnetically connected to a unit conductor of the third conductor 40 at a point different from the center in the x direction. In an embodiment, the first feeding line 61 supplies power to at least one resonator included in the third conductor 40. In an embodiment, the first feeding line 61 feeds power from at least one resonator included in the third conductor 40 to the outside. At least a part of the first feeding line 61 may be positioned in the base 20. The first feeding line 61 may face the outside from two zx planes, two yz planes, or two xy planes of the base 20.

The first feeding line 61 may be in contact with the third conductor 40 from the forward direction and the reverse direction of the z direction. The fourth conductor 50 may be omitted on the periphery of the first feeding line 61. The first feeding line 61 may be electromagnetically connected to the third conductor 40 through an opening of the fourth conductor 50. The first conductive layer 41 may be omitted on the periphery of the first feeding line 61. The first feeding line 61 may be connected to the second conductive layer 42 through an opening of the first conductive layer 41. The first feeding line 61 may be in contact with the third conductor 40 along the xy plane. The pair conductor 30 may be omitted on the periphery of the first feeding line 61. The first feeding line 61 may be connected to the third conductor 40 through an opening of the pair conductor 30. The first feeding line 61 is connected to a unit conductor of the third conductor 40 at a distance from the central portion of the unit conductor.

Figure 63:
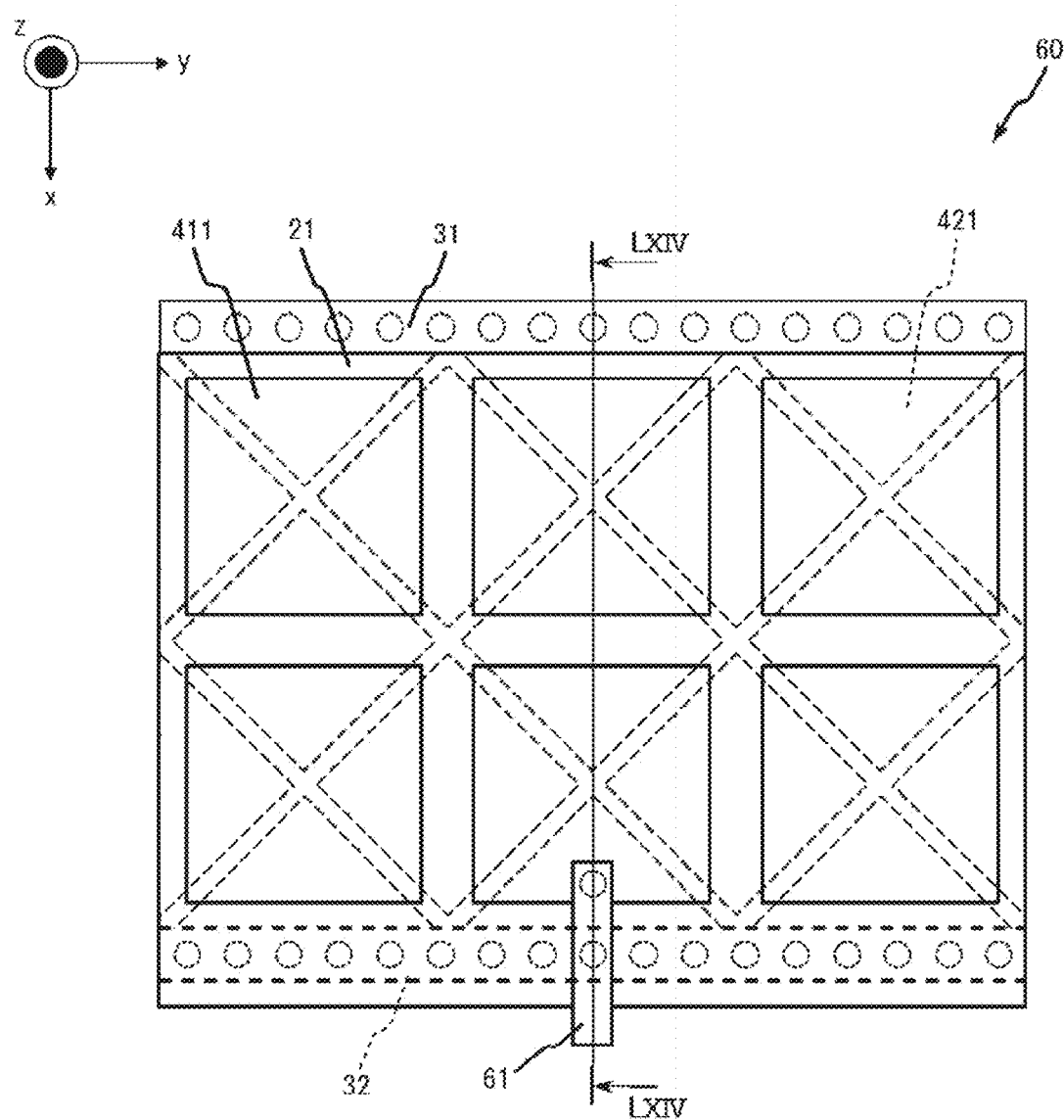
FIG. 63 is a planar view of an embodiment of an antenna.
Figure 64:
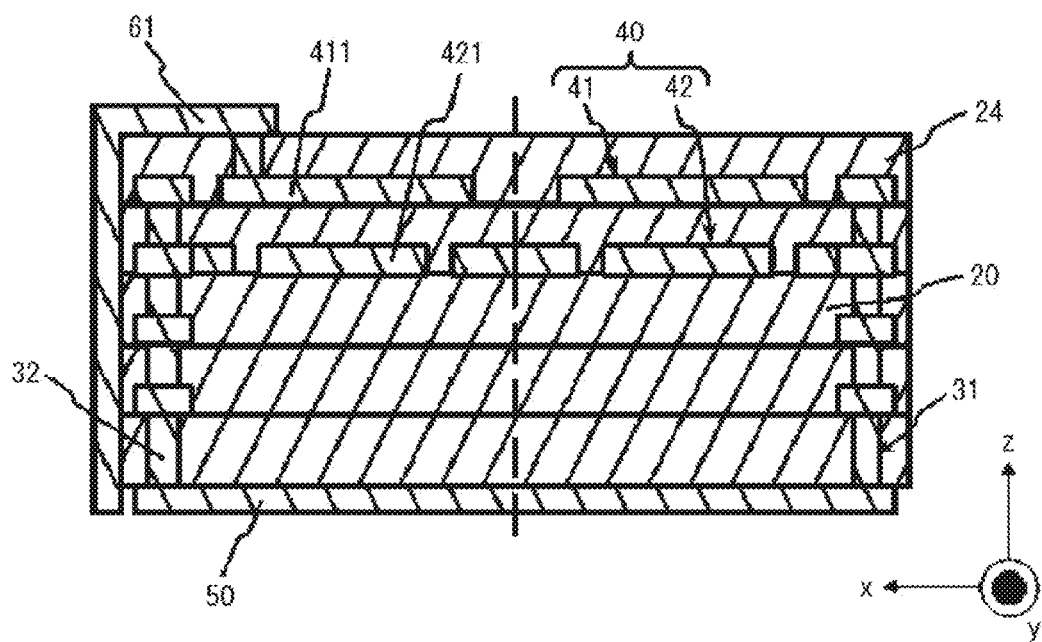
FIG. 64 is a cross-sectional view illustrating an embodiment of an antenna.

FIG. 63 is a planar view of the first antenna 60 on the xy plane from the z direction. FIG. 64 is a cross-sectional view taken along line LXIV-LXIV illustrated in FIG. 63. The first antenna 60 illustrated in FIGS. 63 and 64 has the third base 24 on the third conductor 40. The third base 24 has an opening on the first conductive layer 41. The first feeding line 61 is electrically connected to the first conductive layer 41 through the opening of the third base 24.

Figure 65:
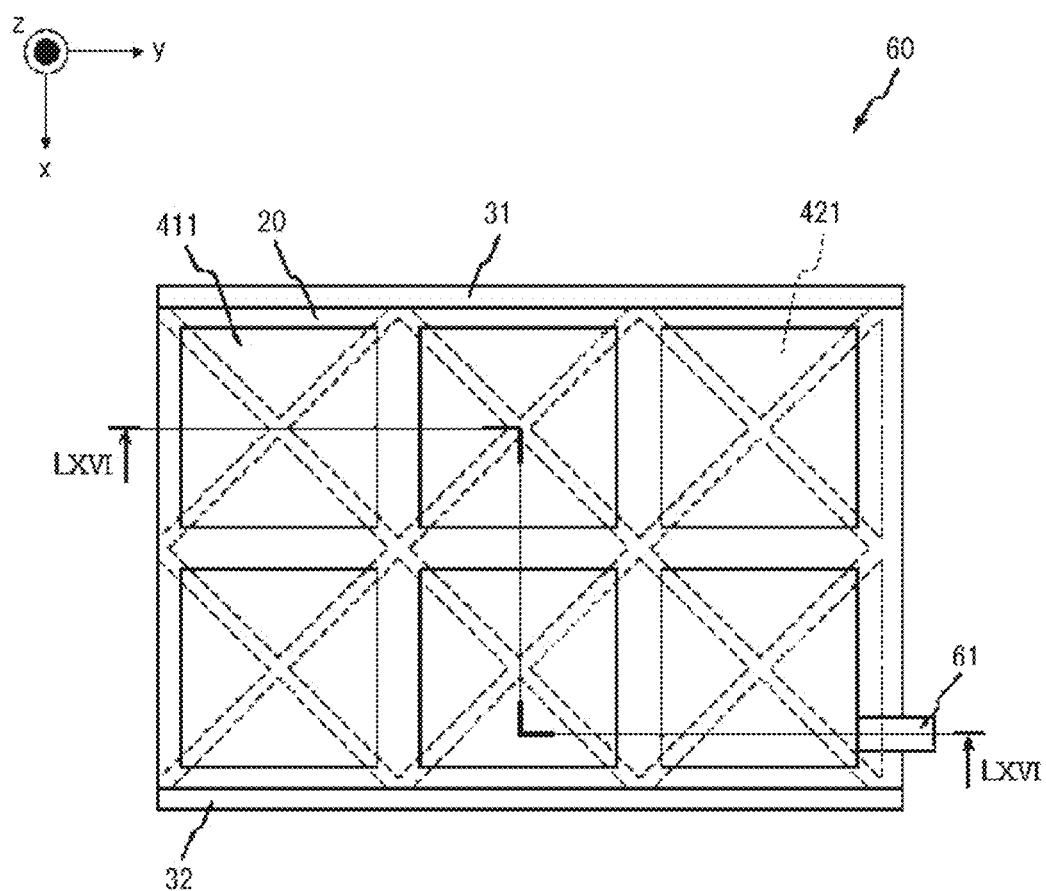
FIG. 65 is a planar view of an embodiment of an antenna.
Figure 66:
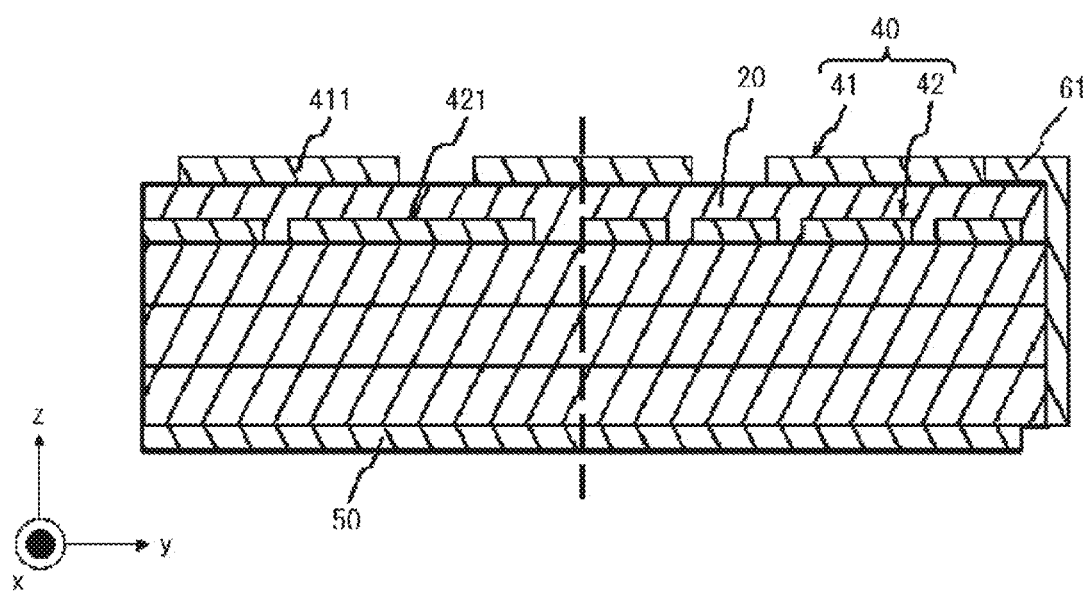
FIG. 66 is a cross-sectional view illustrating an embodiment of an antenna.

FIG. 65 is a planar view of the first antenna 60 on the xy plane from the z direction. FIG. 66 is a cross-sectional view taken along line LXVI-LXVI illustrated in FIG. 65. In the first antenna 60 illustrated in FIGS. 65 and 66, a part of the first feeding line 61 is positioned on the base 20. The first feeding line 61 may be connected to the third conductor 40 in the xy plane. The first feeding line 61 may be connected to the first conductive layer 41 in the xy plane. In an embodiment, the first feeding line 61 may be connected to the second conductive layer 42 in the xy plane.

Figure 67:
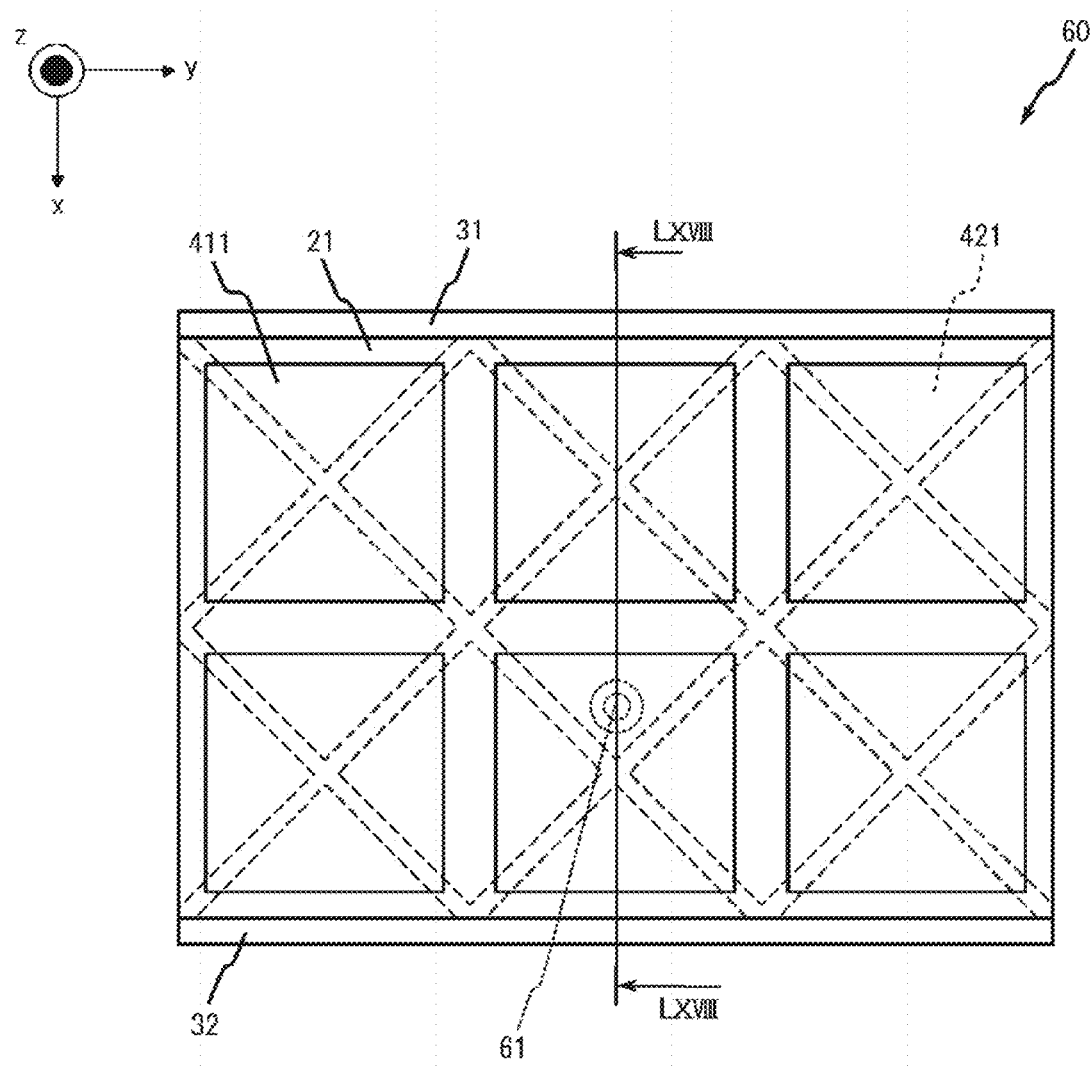
FIG. 67 is a planar view of an embodiment of an antenna.
Figure 68:
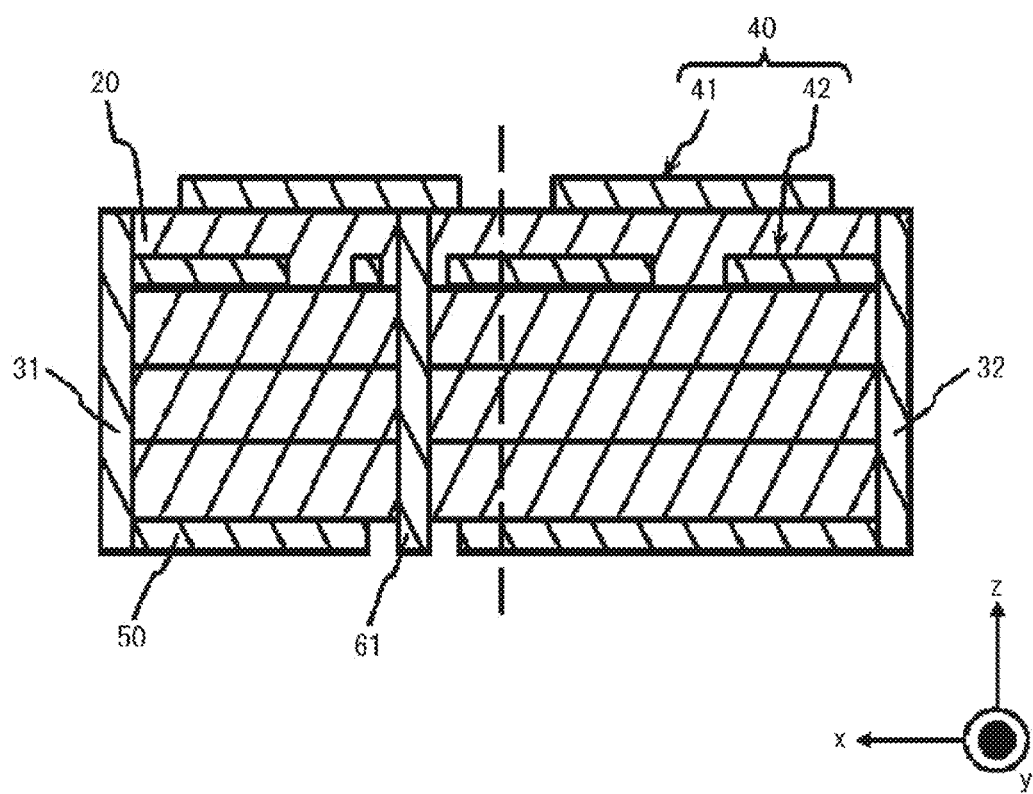
FIG. 68 is a cross-sectional view illustrating an embodiment of an antenna.

FIG. 67 is a planar view of the first antenna 60 on the xy plane from the z direction. FIG. 68 is a cross-sectional view taken along line LXVIII-LXVIII illustrated in FIG. 67. In the first antenna 60 illustrated in FIGS. 67 and 68, the first feeding line 61 is positioned in the base 20. The first feeding line 61 may be connected to the third conductor 40 from the reverse direction of the z direction. The fourth conductor 50 may have an opening. The fourth conductor 50 may have an opening at a position where it overlaps with the third conductor 40 as viewed in the z direction. The first feeding line 61 may face the outside of the base 20 through the opening.

Figure 69:
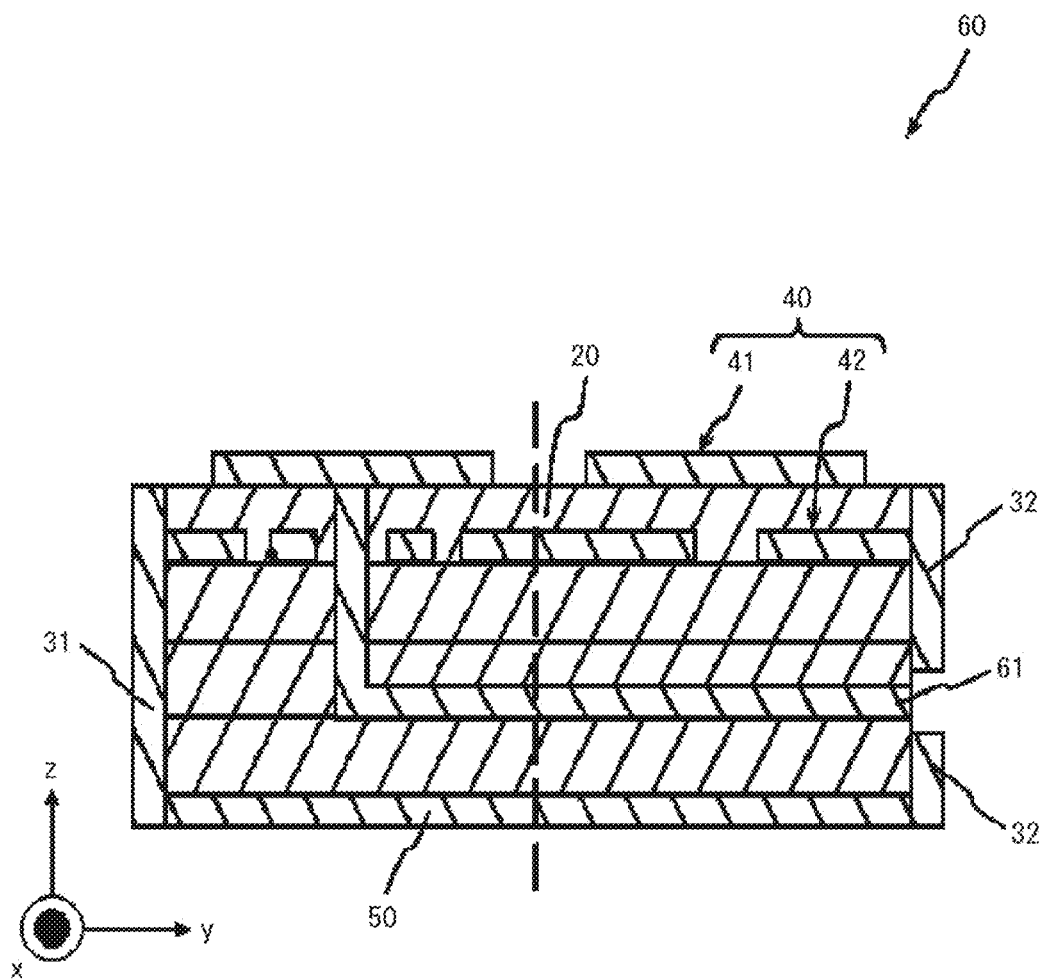
FIG. 69 is a cross-sectional view illustrating an embodiment of an antenna.

FIG. 69 is a cross-sectional view of the first antenna 60 when the yz plane is viewed from the x direction. The pair conductor 30 may have an opening. The first feeding line 61 may face the outside of the base 20 through the opening.

The electromagnetic wave emitted by the first antenna 60 has a polarization component in the x direction larger than a polarization component in the y direction in the first plane. The polarization component in the x direction attenuates less than a horizontal polarization component when a metal plate comes closer to the fourth conductor 50 from the z direction. The first antenna 60 may keep the radiation efficiency when a metal plate comes closer from the outside.

Figure 70:
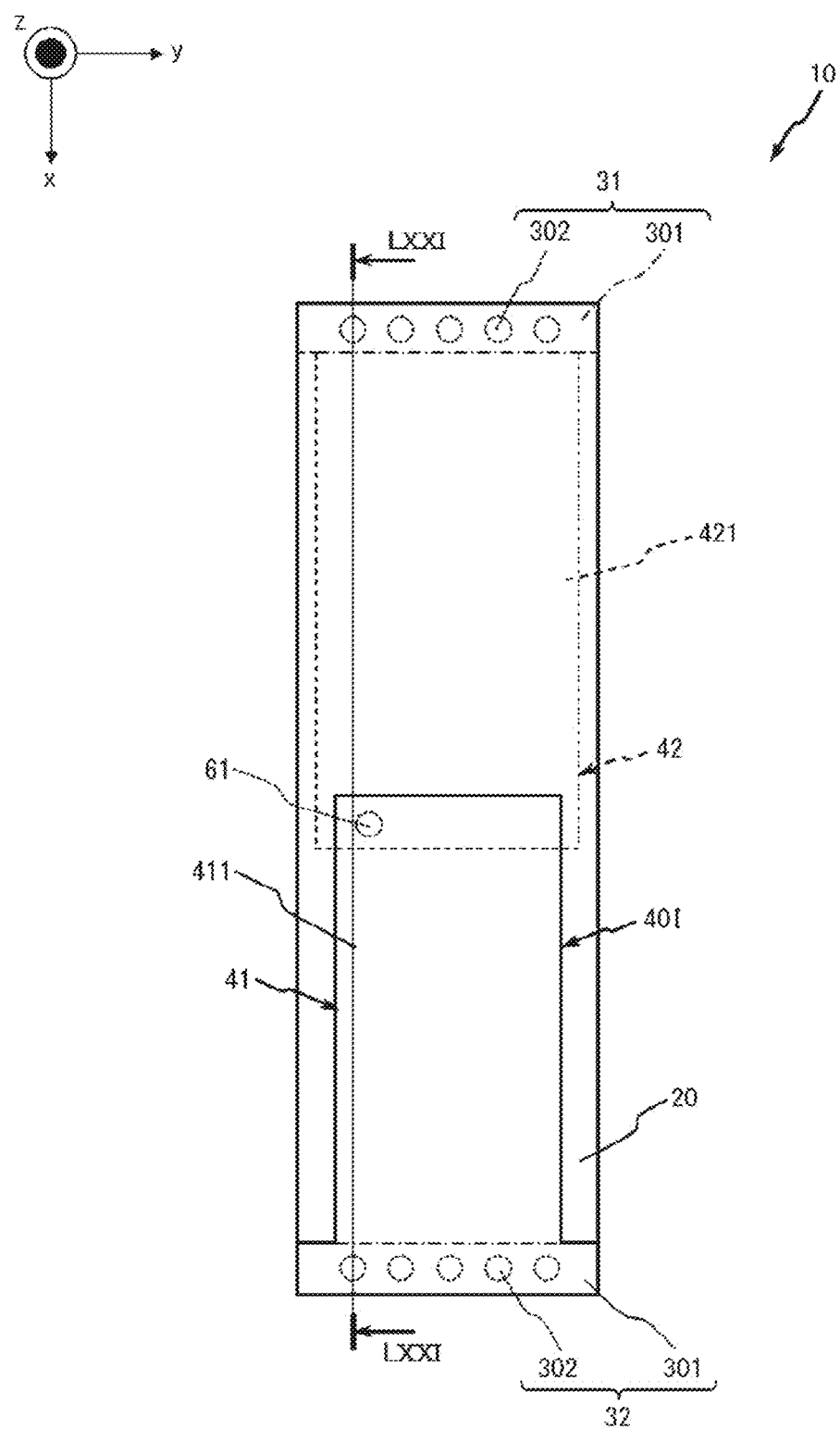
FIG. 70 is a planar view of an embodiment of an antenna.
Figure 71:
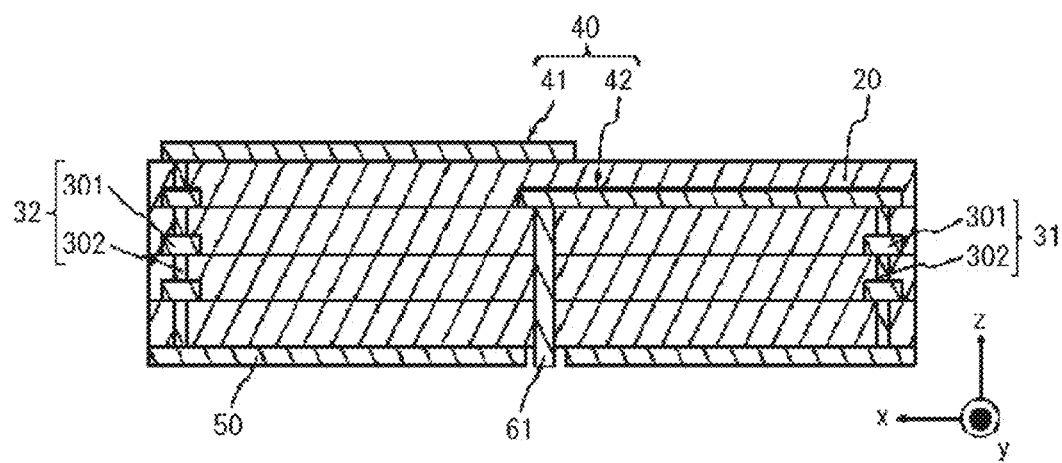
FIG. 71 is a cross-sectional view illustrating an embodiment of an antenna.
Figure 72:
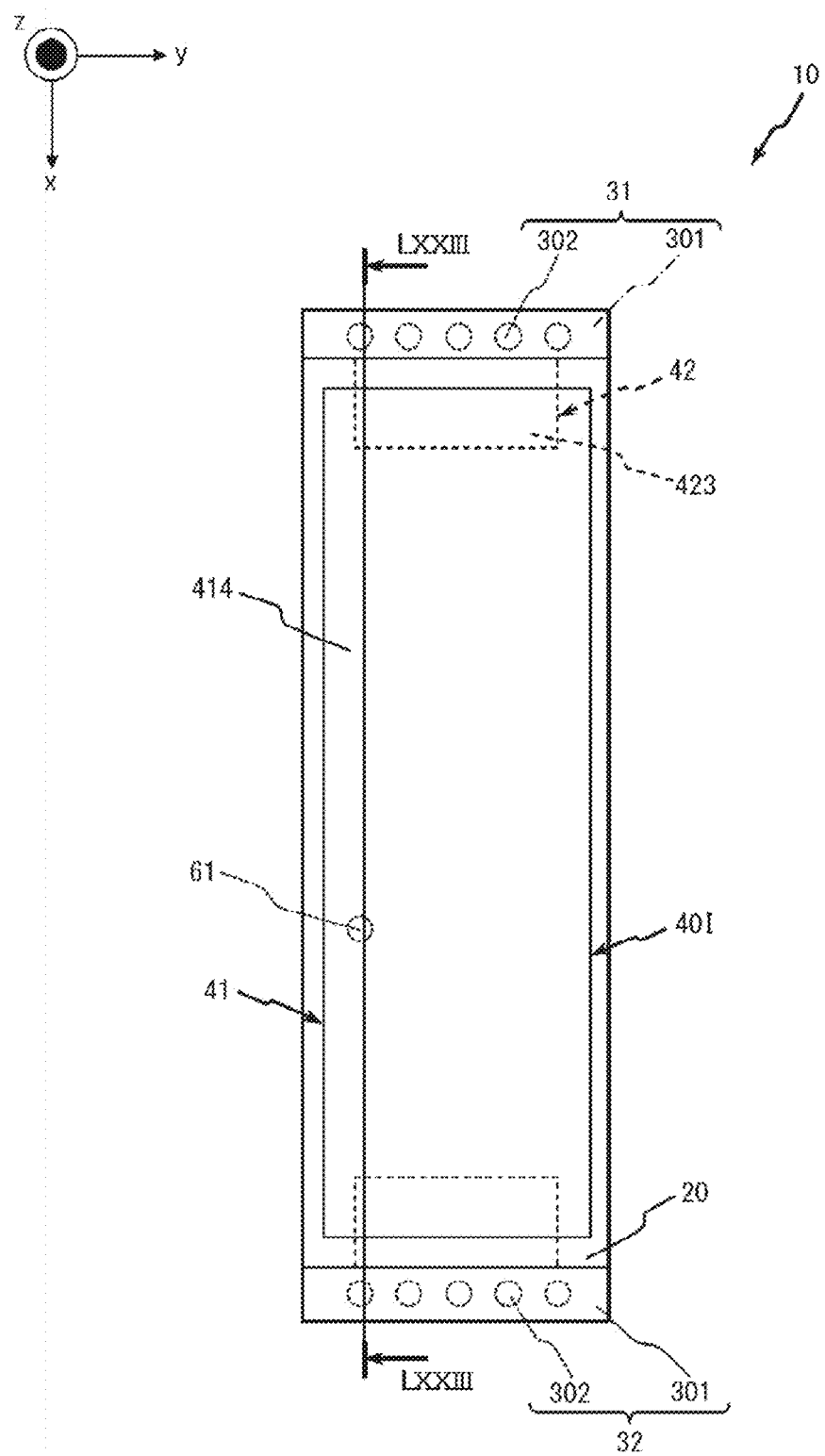
FIG. 72 is a planar view of an embodiment of an antenna.
Figure 73:
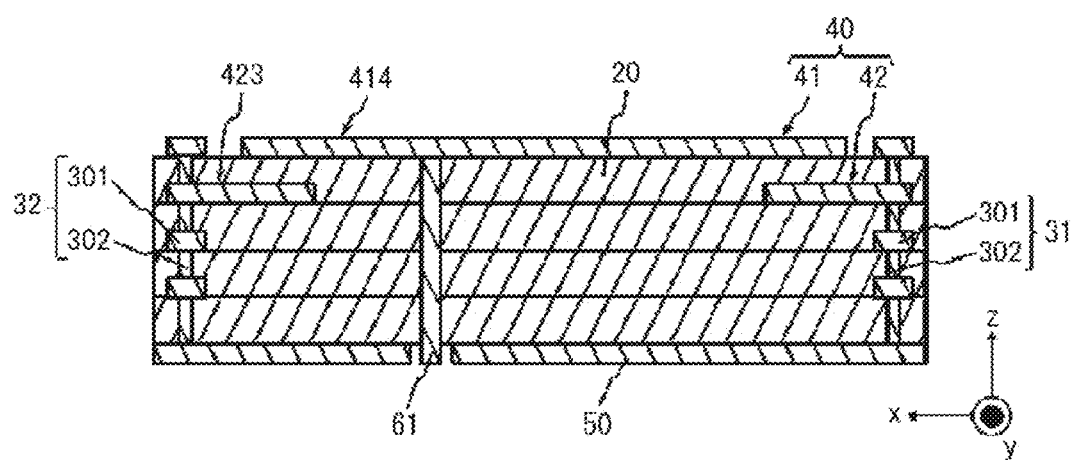
FIG. 73 is a cross-sectional view illustrating an embodiment of an antenna.
Figure 74:
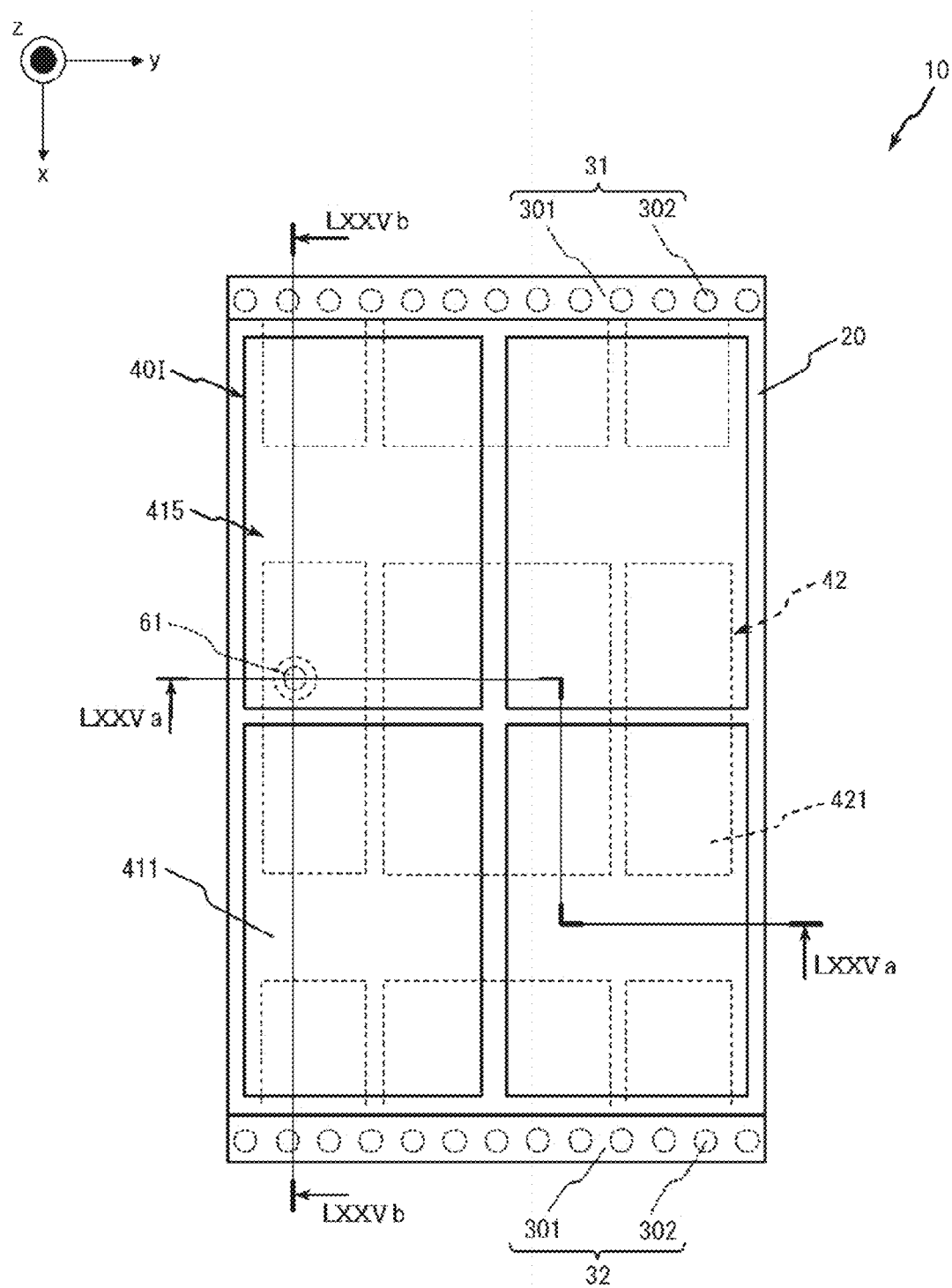
FIG. 74 is a planar view of an embodiment of an antenna.
Figure 75A:
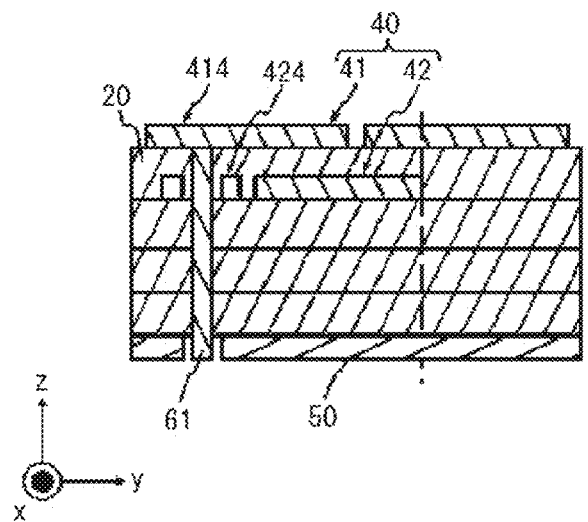
FIG. 75A is a cross-sectional view illustrating an embodiment of an antenna.
Figure 75B:
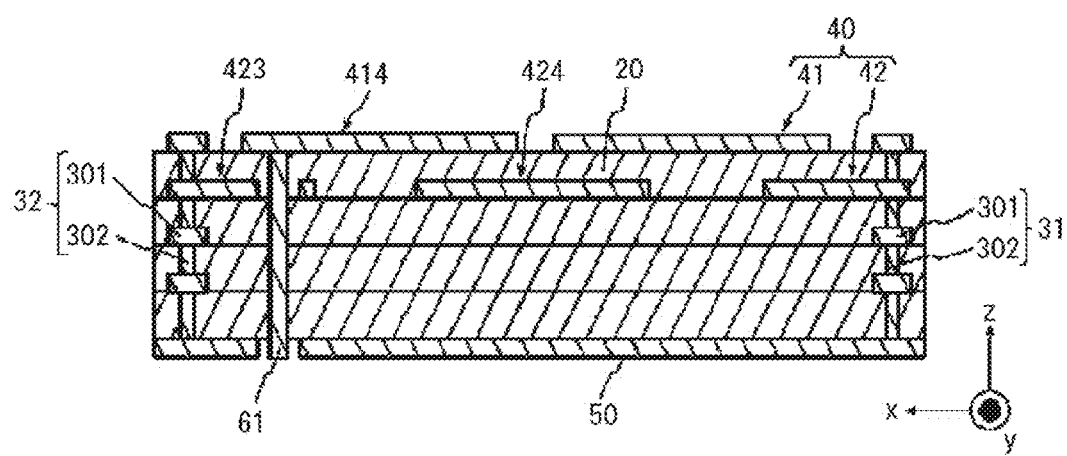
FIG. 75B is a cross-sectional view illustrating an embodiment of an antenna.
Figure 76:
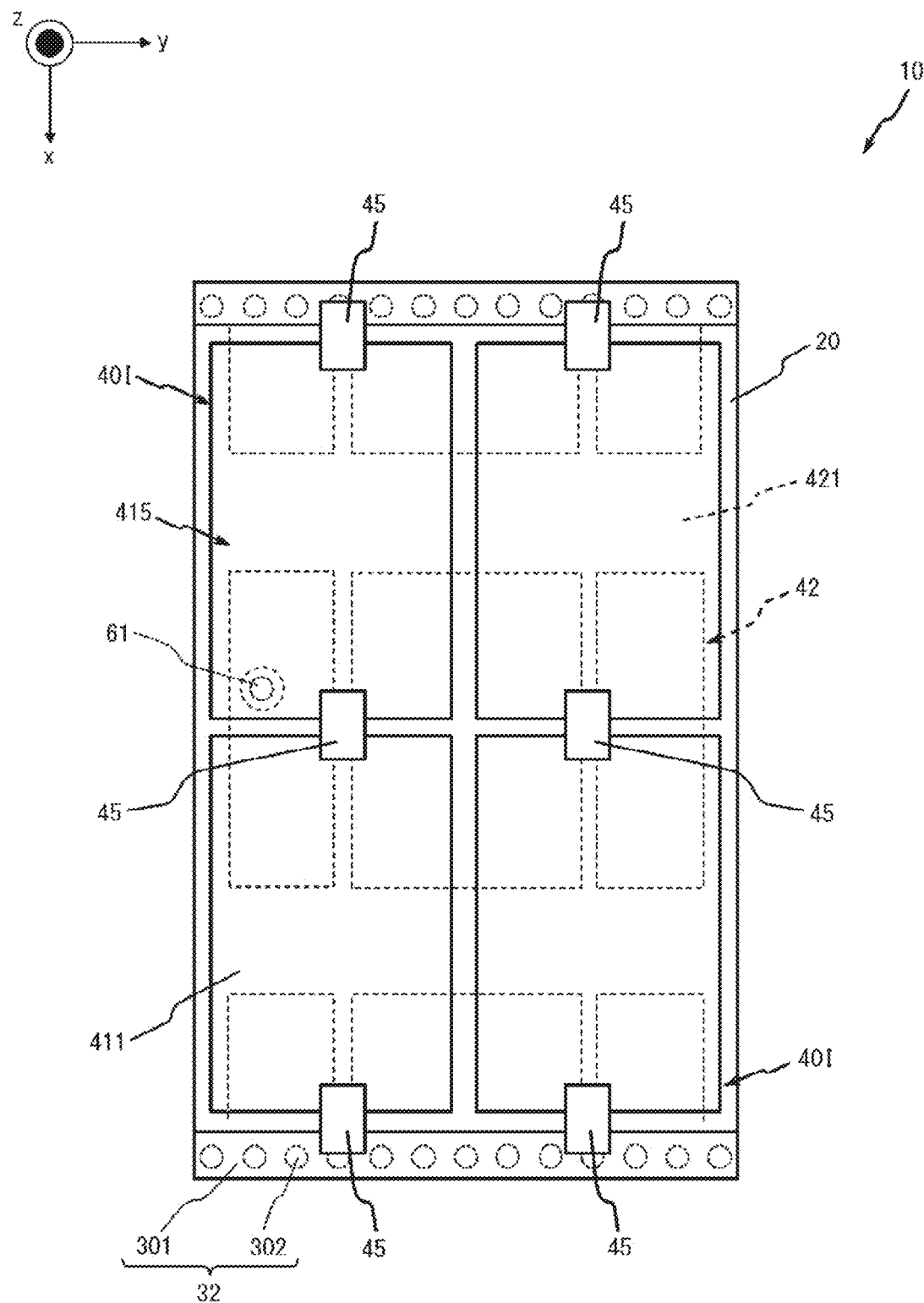
FIG. 76 is a planar view of an embodiment of an antenna.

FIG. 70 illustrates another example of the first antenna 60. FIG. 71 is a cross-sectional view taken along line LXXI-LXXI illustrated in FIG. 70. FIG. 72 illustrates another example of the first antenna 60. FIG. 73 is a cross-sectional view taken along line LXXIII-LXXIII illustrated in FIG. 72. FIG. 74 illustrates another example of the first antenna 60. FIG. 75A is a cross-sectional view taken along line LXXVa-LXXVa illustrated in FIG. 74. FIG. 75B is a cross-sectional view taken along line LXXVb-LXXVb illustrated in FIG. 74. FIG. 76 illustrates another example of the first antenna 60. The first antenna 60 illustrated in FIG. 76 has an impedance element 45.

The first antenna 60 can change the operating frequency by the impedance element 45. The first antenna 60 includes a first feeding conductor 415 connected to the first feeding line 61 and a first unit conductor 411 not connected to the first feeding line 61. Impedance match changes when the impedance element 45 is connected to the first feeding conductor 415 and another conductive body. In the first antenna 60, impedance matching can be adjusted by connecting the first feeding conductor 415 and another conductive body by the impedance element 45. In the first antenna 60, the impedance element 45 may be inserted between the first feeding conductor 415 and another conductive body in order to adjust impedance match. In the first antenna 60, the impedance element 45 may be inserted between two first unit conductors 411 not connected to the first feeding line 61 in order to adjust the operating frequency. In the first antenna 60, the impedance element 45 may be inserted between the first unit conductor 411 not connected to the first feeding line 61 and any one of the pair conductors 30 in order to adjust the operating frequency.

The second antenna 70 includes a base 20, pair conductors 30, a third conductor 40, a fourth conductor 50, a second feeding layer 71, and a second feeding line 72. In an example, the third conductor 40 is positioned in the base 20. In an example, the second antenna 70 has a third base 24 on the base 20. The third base 24 may have a composition different from the base 20. The third base 24 may be positioned on the third conductor 40. The third base 24 may be positioned on the second feeding layer 71.

The second feeding layer 71 is positioned above the third conductor 40 with a space. The base 20 or the third base 24 may be positioned between the second feeding layer 71 and the third conductor 40. The second feeding layer 71 includes line-type, patch-type, and slot-type resonators. The second feeding layer 71 may be referred to as an antenna element. In an example, the second feeding layer 71 may be electromagnetically coupled to the third conductor 40. The resonance frequency of the second feeding layer 71 changes from an independent resonance frequency by electromagnetic coupling with the third conductor 40. In an example, the second feeding layer 71 receives transmission of power from the second feeding line 72 and resonates together with the third conductor 40. In an example, the second feeding layer 71 receives transmission of power from the second feeding line 72 and resonates together with the third conductor 40 and the third conductor.

The second feeding line 72 is electrically connected to the second feeding layer 71. In an embodiment, the second feeding line 72 transmits power to the second feeding layer 71. In an embodiment, the second feeding line 72 transmits power from the second feeding layer 71 to the outside.

Figure 77:
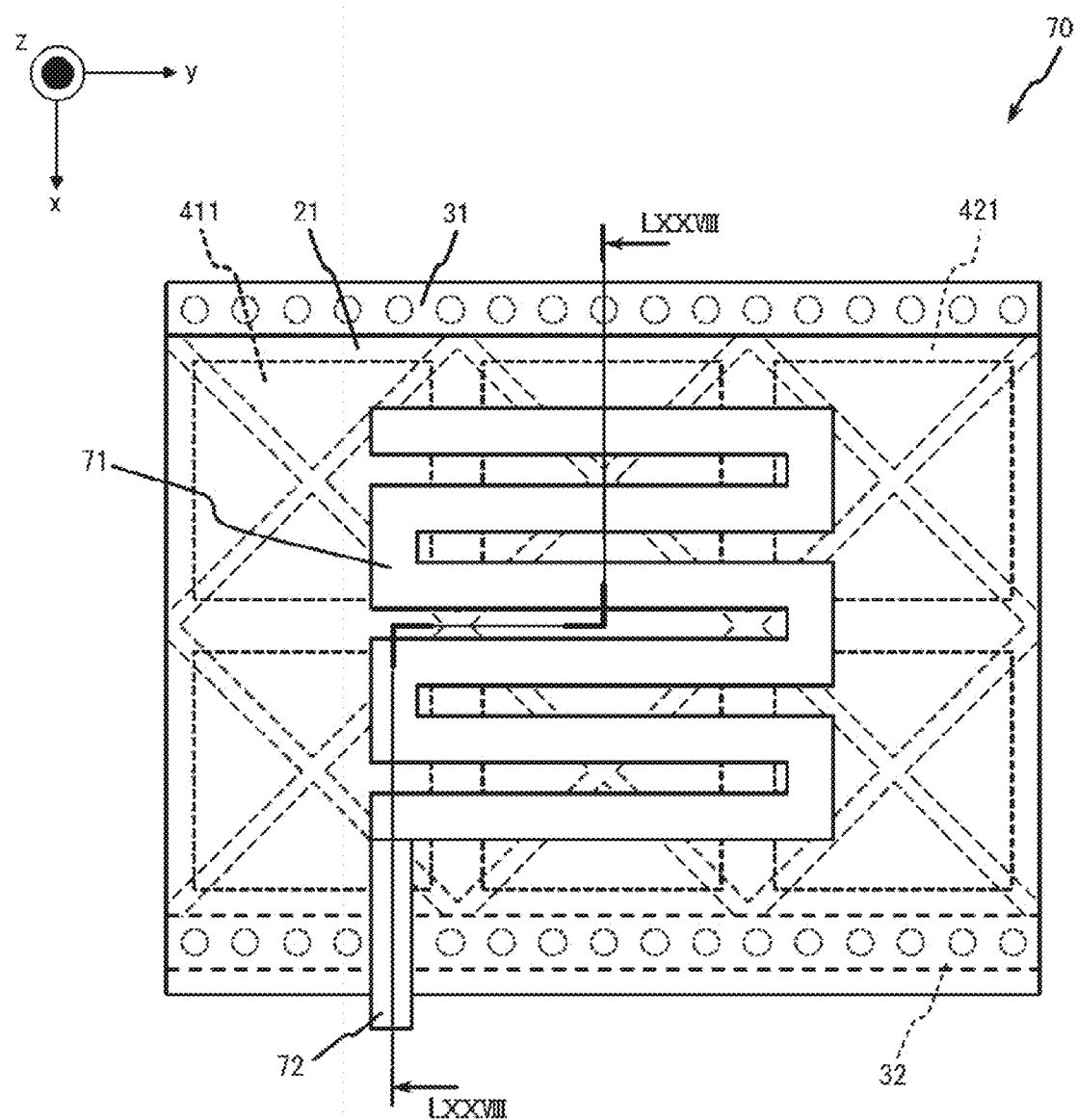
FIG. 77 is a planar view of an embodiment of an antenna.
Figure 78:
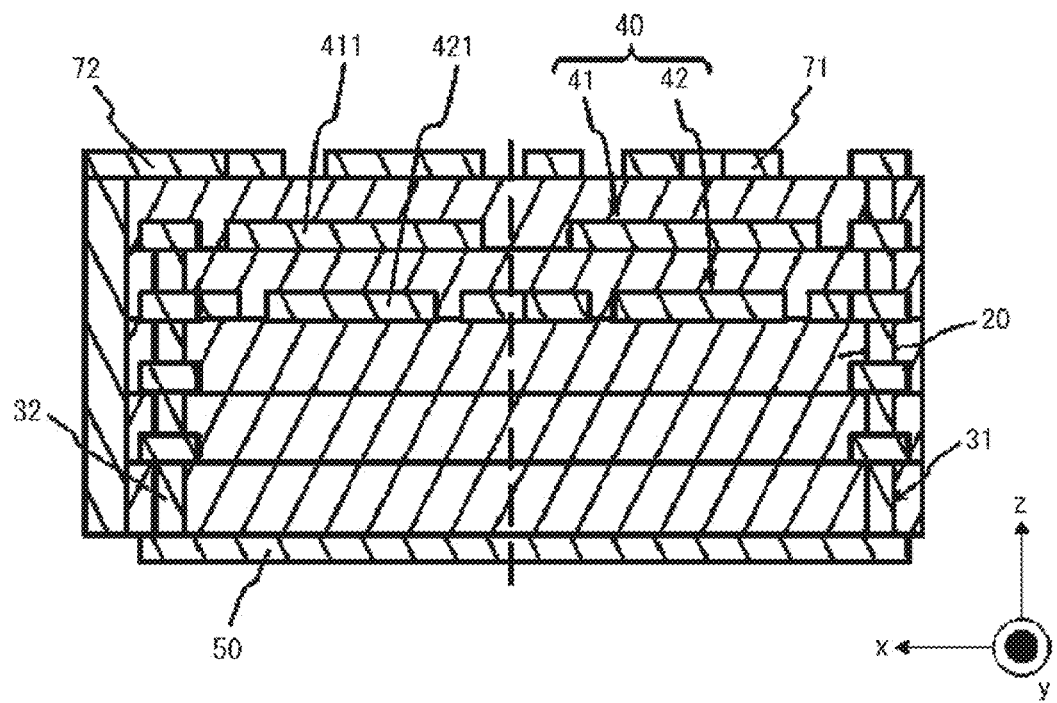
FIG. 78 is a cross-sectional view of the antenna illustrated in FIG. 43.

FIG. 77 is a planar view of the second antenna 70 on the xy plane from the z direction. FIG. 78 is a cross-sectional view taken along line LXXVIII-LXXVIII in FIG. 77. In the second antenna 70 illustrated in FIGS. 77 and 78, the third conductor 40 is positioned in the base 20. The second feeding layer 71 is positioned on the base 20. The second feeding layer 71 is positioned overlapping with the unit structure 10X as viewed in the z direction. The second feeding line 72 is positioned on the base 20. The second feeding line 72 is electromagnetically connected to the second feeding layer 71 in the xy plane.

(Wireless Communication Module)

Figure 79:
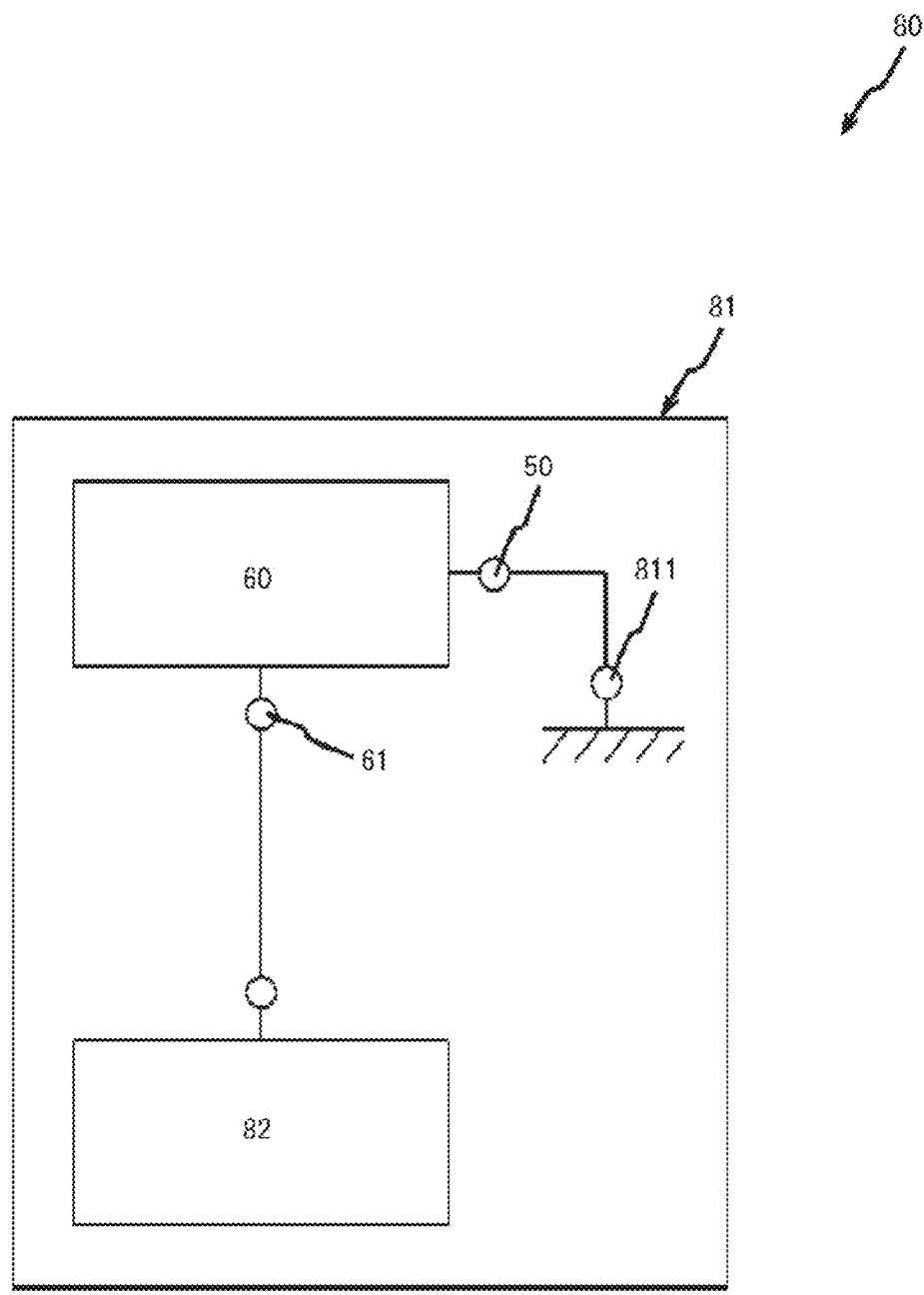
FIG. 79 is a block diagram illustrating an embodiment of a wireless communication module.
Figure 80:
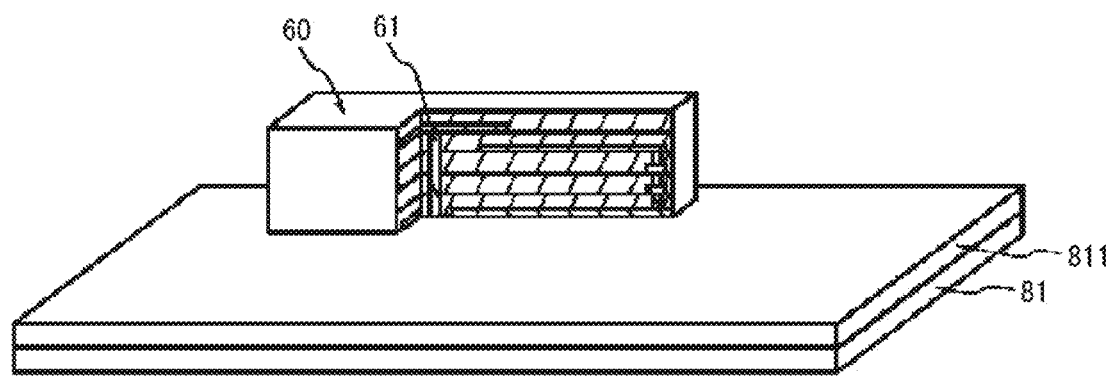
FIG. 80 is a perspective view partly in section illustrating an embodiment of a wireless communication module.

A wireless communication module in the present disclosure includes a wireless communication module 80 as an example of a plurality of embodiments. FIG. 79 is a block structure diagram of the wireless communication module 80. FIG. 80 is a schematic configuration diagram of the wireless communication module 80. The wireless communication module 80 includes a first antenna 60, a circuit board 81, and an RF module 82. The wireless communication module 80 may include a second antenna 70 instead of the first antenna 60.

The first antenna 60 is positioned on the circuit board 81. The first feeding line 61 of the first antenna 60 is electromagnetically connected to the RF module 82 through the circuit board 81. The fourth conductor 50 of the first antenna 60 is electromagnetically coupled to a ground conductor 811 of the circuit board 81.

The ground conductor 811 may extend on the xy plane. The surface integral of the ground conductor 811 on the xy plane is larger than that of the fourth conductor 50. The ground conductor 811 is longer than the fourth conductor 50 in the y direction. The ground conductor 811 is longer than the fourth conductor 50 in the x direction. The first antenna 60 may be positioned on the end side with respect to the center of the ground conductor 811 in the y direction. The center of the first antenna 60 may differ from the center of the ground conductor 811 on the xy plane. The center of the first antenna 60 may differ from the centers of the first conductive layer 41 and the second conductive layer 42. The point at which the first feeding line 61 is connected to the third conductor 40 may differ from the center of the ground conductor 811 on the xy plane.

In the first antenna 60, first current and second current loop through the pair conductors 30. The first antenna 60 is positioned on the end side in the y direction with respect to the center of the ground conductor 811, whereby the second current flowing through the ground conductor 811 is asymmetric. When the second current flowing through the ground conductor 811 is asymmetric, the antenna structure including the first antenna 60 and the ground conductor 811 has a larger polarization component in the x direction of radiation waves. Increasing the polarization component in the x direction of radiation waves can improve the total radiation efficiency.

The RF module 82 may control power supplied to the first antenna 60. The RF module 82 modulates a baseband signal and supplies the modulated signal to the first antenna 60. The RF module 82 may modulate an electrical signal received by the first antenna 60 to a baseband signal.

In the first antenna 60, variation in resonance frequency is small because of the conductor on the circuit board 81 side. The wireless communication module 80 has the first antenna 60 and thereby can reduce the effect from an external environment.

The first antenna 60 may be integrally configured with the circuit board 81. When the first antenna 60 and the circuit board 81 are integrally configured, the fourth conductor 50 and the ground conductor 811 are integrally configured.

(Wireless Communication Device)

Figure 81:
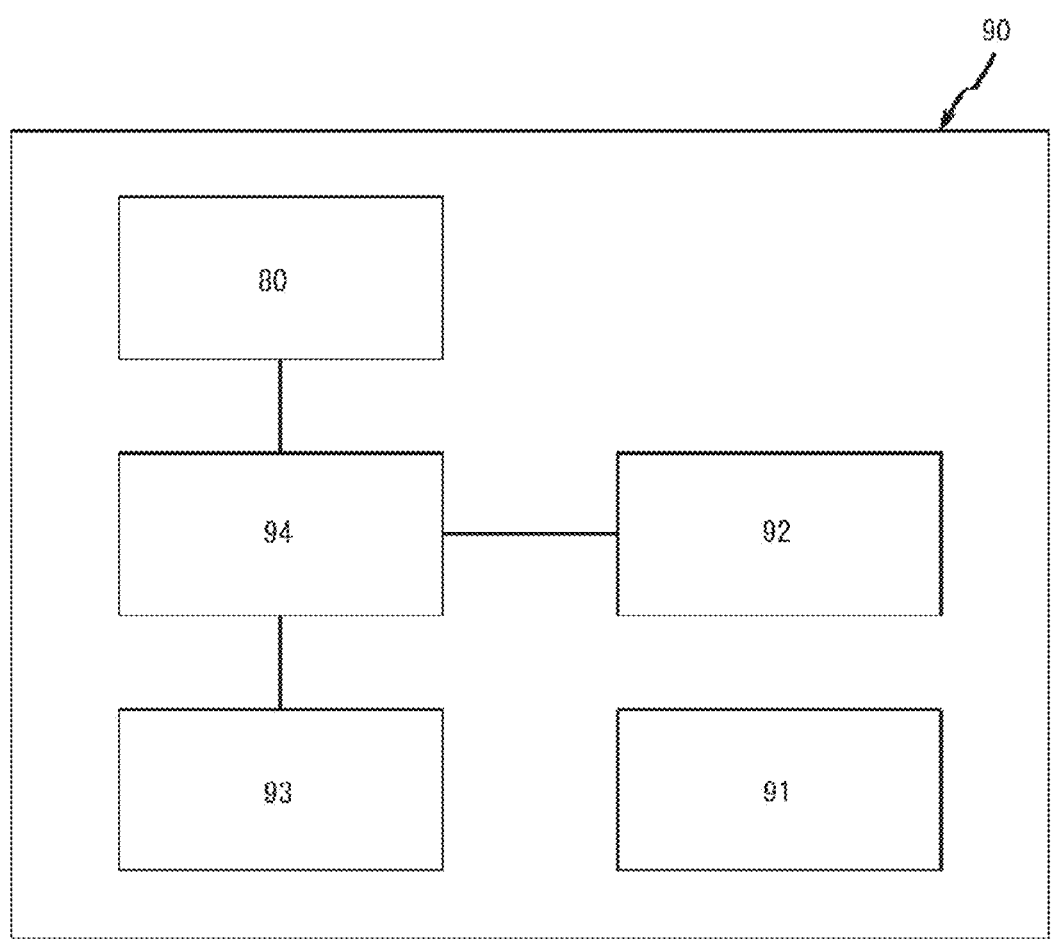
FIG. 81 is a block diagram illustrating an embodiment of a wireless communication device.
Figure 82:
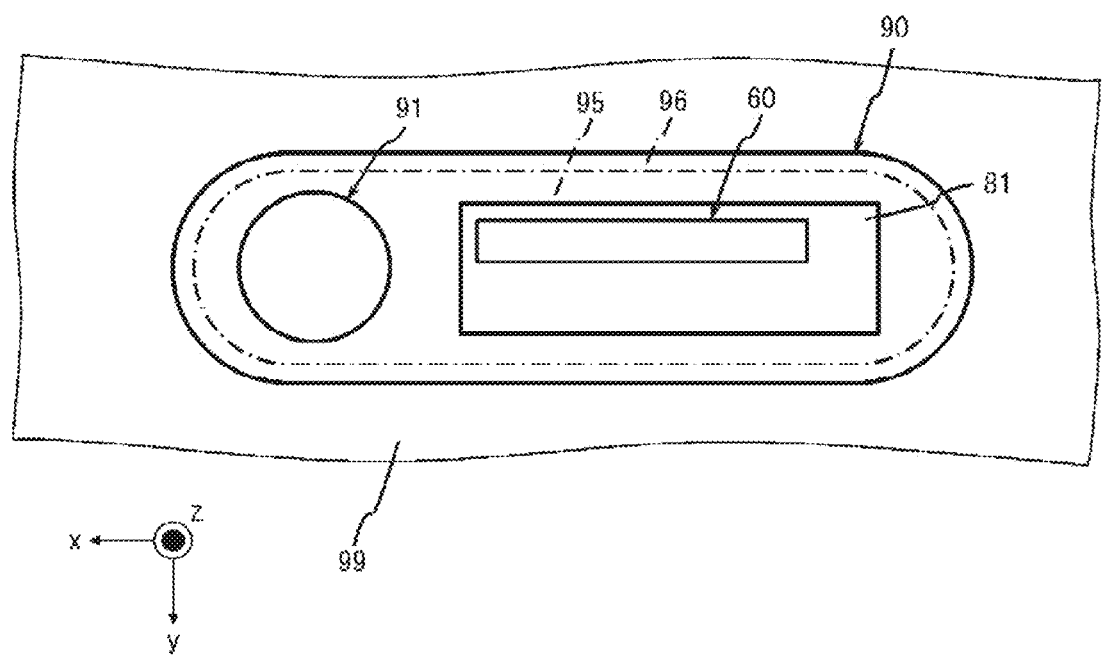
FIG. 82 is a planar view illustrating an embodiment of a wireless communication device.
Figure 83:
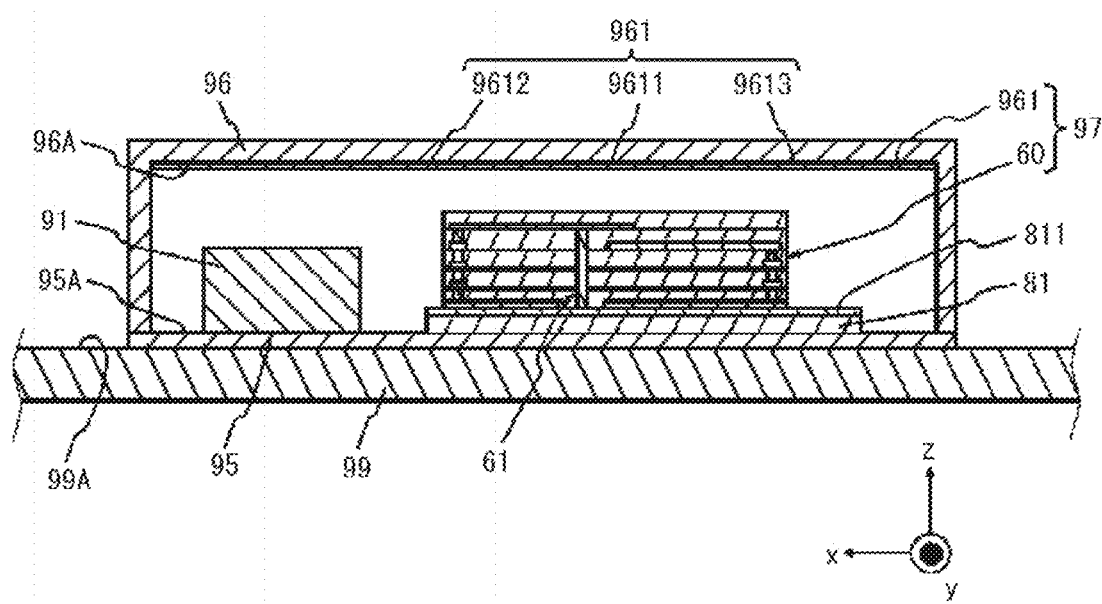
FIG. 83 is a cross-sectional view illustrating an embodiment of a wireless communication device.
Figure 84:
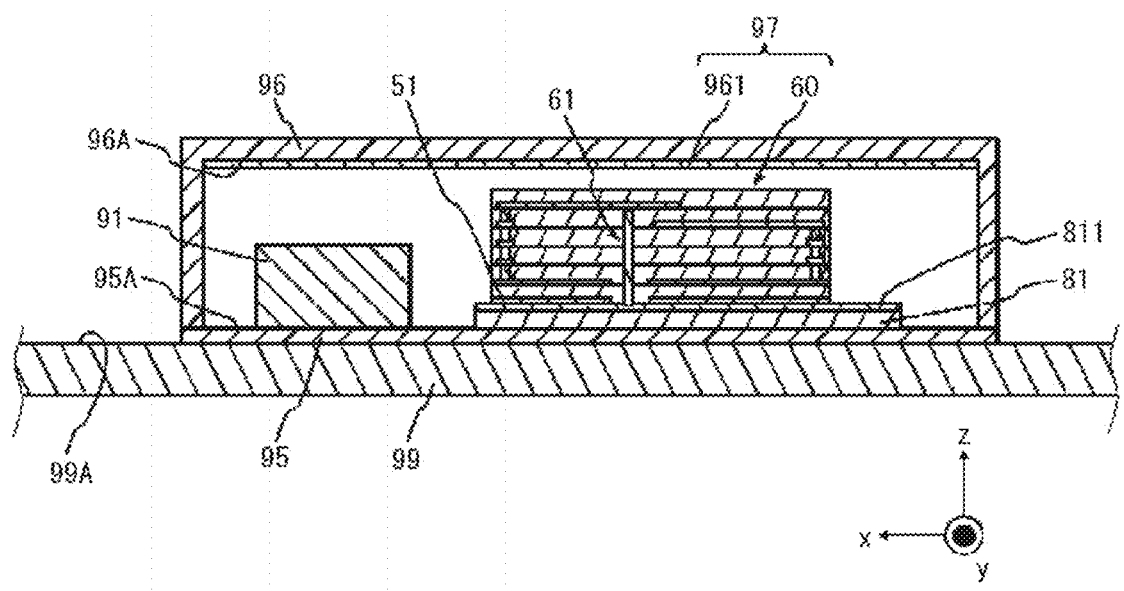
FIG. 84 is a planar view illustrating an embodiment of a wireless communication device.

A wireless communication device in the present disclosure includes a wireless communication device 90 as an example of a plurality of embodiments. FIG. 81 is a block structure diagram of the wireless communication device 90. FIG. 82 is a planar view of the wireless communication device 90. In the wireless communication device 90 illustrated in FIG. 82, a part of the configuration is omitted. FIG. 83 is a cross-sectional view of the wireless communication device 90. In the wireless communication device 90 illustrated in FIG. 83, a part of the configuration is omitted. The wireless communication device 90 includes a wireless communication module 80, a battery 91, a sensor 92, a memory 93, a controller 94, a first case 95, and a second case 96. The wireless communication module 80 of the wireless communication device 90 has the first antenna 60 but may have the second antenna 70. FIG. 84 illustrates one of other embodiments of the wireless communication device 90. The first antenna 60 of the wireless communication device 90 may have the reference potential layer 51.

The battery 91 supplies power to the wireless communication module 80. The battery 91 may supply power to at least one of the sensor 92, the memory 93, and the controller 94. The battery 91 may include at least one of a primary battery and a secondary battery. The negative electrode of the battery 91 is electrically connected to the ground terminal of the circuit board 81. The negative electrode of the battery 91 is electrically connected to the fourth conductor 50 of the first antenna 60.

Examples of the sensor 92 may include a speed sensor, a vibration sensor, an acceleration sensor, a gyro sensor, a rotation angle sensor, an angular velocity sensor, a geomagnetic sensor, a magnet sensor, a temperature sensor, a humidity sensor, an atmospheric pressure sensor, an optical sensor, an illuminance sensor, a UV sensor, a gas sensor, a gas concentration sensor, an atmosphere sensor, a level sensor, an odor sensor, a pressure sensor, an air pressure sensor, a contact sensor, a wind power sensor, an infrared sensor, a human detecting sensor, a displacement sensor, an image sensor, a weight sensor, a smoke sensor, a liquid leakage sensor, a vital sensor, a battery level sensor, an ultrasonic sensor, and a receiver device of Global Positioning System (GPS) signals. The sensor 92 may include a nine-axis sensor or a six-axis sensor. The nine-axis sensor includes an acceleration sensor, an angular velocity sensor, and a geomagnetic sensor, each capable of measurement in three axis directions. The six-axis sensor includes an acceleration sensor and an angular velocity sensor, each capable of measurement in three axis directions.

Examples of the memory 93 may include a semiconductor memory. The memory 93 may function as a work memory for the controller 94. The memory 93 may be included in the controller 94. The memory 93 stores, for example, a computer program describing the processing for implementing each function of the wireless communication device 90 and information used for processing in the wireless communication device 90.

The information stored in the memory 93 may include, for example, information used for the wireless communication device 90 installed on a movable body or the like to perform wireless communication with another wireless communication device. As the information used to perform wireless communication, the memory 93 may store, for example, identification information for uniquely identifying another wireless communication device or information such as a communication protocol for implementing communication with another wireless communication device. The memory 93 may store, for example, an interval or a condition with which measurement of data by the sensor 92 or transmission of data by the wireless communication module 80 is executed.

The controller 94 may include, for example, a processor. The controller 94 may include one or more processors. The processor may include a general-purpose processor that reads a specific computer program to execute a specific function and a dedicated processor dedicated to a certain process. The dedicated processor may include an IC dedicated to a specific application. The IC dedicated to a specific application may be called an application specific integrated circuit (ASIC). The processor may include a programmable logic device. The programmable logic device may be called a PLD. The PLD may include a field-programmable gate array (FPGA). The controller 94 may be one of a systemon-a-chip (SoC) and a system in a package (SiP), in which one or more processors cooperate. The controller 94 may store, for example, a variety of information or a computer program for operating each component of the wireless communication device 90 in the memory 93.

The controller 94 stores measurement data measured by the sensor 92 described above into the memory. The controller 94 may allow the sensor 92 to perform measurement at a predetermined interval or under a predetermined condition. The predetermined interval may be, for example, a time interval. The controller 94 may allow the sensor 92 to perform measurement at certain time intervals, such as every second, every minute, or every hour, and store the measured measurement data into the memory 93. The predetermined condition may be, for example, that a movable body equipped with the wireless communication device 90 has crashed. For example, the controller 94 determines whether a movable body has crashed, based on a predefined condition that the sensor 92 detects vibration with an intensity equal to or greater than a predetermined amount. When vibration with an intensity equal to or greater than a predetermined amount is measured by the sensor, the controller 94 may store the measurement data measured by the sensor 92 into the memory 93. This configuration reduces the power consumption and the memory consumption of the wireless communication device 90 installed in a movable body.

The controller 94 generates a transmission signal to be transmitted from the wireless communication device 90. The controller 94 may acquire, for example, measurement data from the sensor 92. The controller 94 may generate a transmission signal in accordance with measurement data. The controller 94 may transmit a baseband signal to the RF module 82 of the wireless communication module 80.

The controller 94 transmits a signal from the wireless communication device 90. The controller 94 may transmit a signal from the wireless communication device 90 at a predetermined interval or under a predetermined condition. The predetermined interval may be a time interval. For example, the controller 94 may reduce the time interval between signals transmitted from the wireless communication device 90 to achieve reception of information with high real-time performance. The predetermined condition may be that a predetermined electromagnetic wave is received by the antenna. For example, when wireless communication temporarily fails during movement of a movable body equipped with the wireless communication device 90, the controller 94 may store a signal into the memory 93 without transmitting a signal from the wireless communication device 90. Subsequently, when a predetermined electromagnetic wave is received by the antenna, the controller 94 may transmit the signal not yet transmitted that is stored in the memory 93. This configuration can prevent data loss in data transmitted from the wireless communication device 90 installed in a movable body.

The first case 95 and the second case 96 protect another device of the wireless communication device 90. The first case 95 may extend in the xy plane. The first case 95 supports the other devices. The first case 95 may support the wireless communication module 80. The wireless communication module 80 is positioned on an upper surface 95A of the first case 95. The first case 95 may support the battery 91. The battery 91 is positioned on the upper surface 95A of the first case 95. In an example of a plurality of embodiments, the wireless communication module 80 and the battery 91 are arranged along the x direction on the upper surface 95A of the first case 95. The first conductor 31 is positioned between the battery 91 and the third conductor 40. The battery 91 is positioned beyond the pair conductor 30 as viewed from the third conductor 40.

The second case 96 may cover the other devices. The second case 96 includes an under surface 96A positioned on the z direction side of the first antenna 60. The under surface 96A extends along the xy plane. The under surface 96A is not necessarily flat and may include protrusions and depressions. The second case 96 may have an eighth conductor 961. The eighth conductor 961 is positioned on at least one of the interior, the outside, and the inside of the second case 96. The eighth conductor 961 is positioned on at least one of the upper surface and the side surface of the second case 96.

The eighth conductor 961 is opposed to the first antenna 60. A first body 9611 of the eighth conductor 961 is opposed to the first antenna 60 in the z direction. The eighth conductor 961 may include, in addition to the first body 9611, at least one of a second body opposed to the first antenna 60 in the x direction and a third body opposed to the first antenna in the y direction. A part of the eighth conductor 961 is opposed to the battery 91.

The eighth conductor 961 may include a first extra-body 9612 extending to the outside of the first conductor 31 in the x direction. The eighth conductor 961 may include a second extra-body 9613 extending to the outside of the second conductor 32 in the x direction. The first extra-body 9612 may be electrically connected to the first body 9611. The second extra-body 9613 may be electrically connected to the first body 9611. The first extra-body 9612 of the eighth conductor 961 is opposed to the battery 91 in the z direction. The eighth conductor 961 may be capacitively coupled to the battery 91. Capacitance may exist between the eighth conductor 961 and the battery 91.

The eighth conductor 961 is spaced apart from the third conductor 40 of the first antenna 60. The eighth conductor 961 is not electrically connected to the conductors of the first antenna 60. The eighth conductor 961 may be spaced apart from the first antenna 60. The eighth conductor 961 may be electromagnetically coupled to any conductor of the first antenna 60. The first body 9611 of the eighth conductor 961 may be electromagnetically coupled to the first antenna 60. When viewed two-dimensionally from the z direction, the first body 9611 may overlap with the third conductor 40. When the first body 9611 overlaps with the third conductor 40, propagation by electromagnetic coupling may increase. The electromagnetic coupling of the eighth conductor 961 with the third conductor 40 may be mutual inductance.

The eighth conductor 961 extends in the x direction. The eighth conductor 961 extends along the xy plane. The length of the eighth conductor 961 is longer than the length along the x direction of the first antenna 60. The length along the x direction of the eighth conductor 961 is longer than the length along the x direction of the first antenna 60. The length of the eighth conductor 961 may be longer than ½ of the operating wavelength λ of the wireless communication device 90. The eighth conductor 961 may include a section extending in the y direction. The eighth conductor 961 may be curved in the xy plane. The eighth conductor 961 may include a section extending in the z direction. The eighth conductor 961 may be curved from the xy plane to the yz plane or the zx plane.

Figure 85:
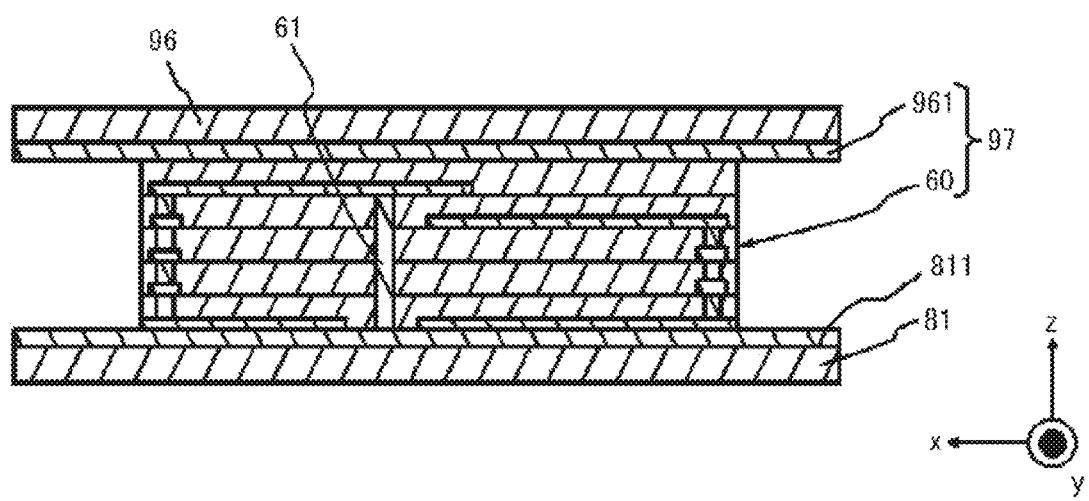
FIG. 85 is a cross-sectional view illustrating an embodiment of a wireless communication device.

In the wireless communication device 90 including the eighth conductor 961, the first antenna 60 and the eighth conductor 961 may be electromagnetically coupled to function as a third antenna 97. The operating frequency fc of the third antenna 97 may be different from the resonance frequency of the first antenna 60 alone. The operating frequency $f_c$ of the third antenna 97 may be closer to the resonance frequency of the first antenna 60 than to the resonance frequency of the eighth conductor 961 alone. The operating frequency $f_c$ of the third antenna 97 may fall within the resonance frequency band of the first antenna 60. The operating frequency $f_c$ of the third antenna 97 may fall outside the resonance frequency band of the eighth conductor 961 alone. FIG. 85 illustrates other embodiments of the third antenna 97. The eighth conductor 961 may be configured integrally with the first antenna 60. In FIG. 85, the configuration of a part of the wireless communication device 90 is omitted. In the example in FIG. 85, the second case 96 does not necessarily include the eighth conductor 961.

In the wireless communication device 90, the eighth conductor 961 is capacitively coupled to the third conductor 40. The eighth conductor 961 is electromagnetically coupled to the fourth conductor 50. The third antenna 97 includes the first extra-body 9612 and the second extra-body 9613 of the eighth conductor and thereby improves in gain compared with the first antenna 60 in the air.

Figure 86:
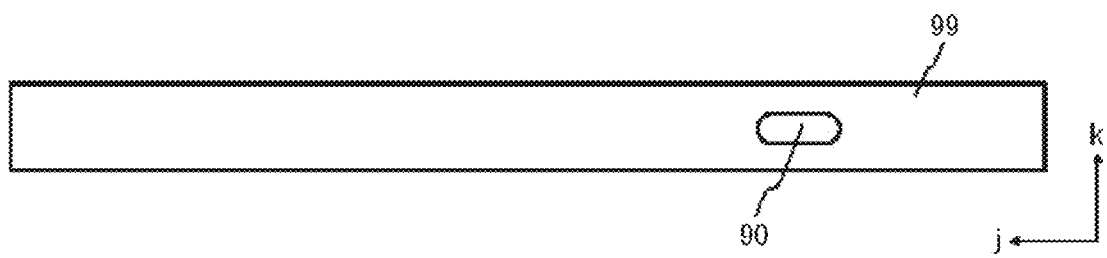
FIG. 86 is a cross-sectional view illustrating an embodiment of an antenna.

The wireless communication device 90 may be positioned on a variety of objects. The wireless communication device 90 may be positioned on an electrical conductive body 99. FIG. 86 is a planar view illustrating an embodiment of the wireless communication device 90. The electrical conductive body 99 is a conductor transmitting electricity. Examples of the material of the electrical conductive body 99 may include metal, highly doped semiconductor, conductive plastic, and liquid including ions. The electrical conductive body 99 may include a non-conductive layer that does not transmit electricity on its surface. The electricity-transmitting section and the non-conductive layer may include a common element. For example, the electrical conductive body 99 including aluminum may include a non-conductive layer of aluminum oxide on its surface. The electricity-transmitting section and the non-conductive layer may include different elements.

The shape of the electrical conductive body 99 is not limited to a flat plate and may include a three-dimensional shape such as a box shape. Examples of the three-dimensional shape of the electrical conductive body 99 include a rectangular parallelepiped and a cylinder. Examples of the three-dimensional shape may include a partially-recessed shape, a partially-penetrated shape, and a partially-protruding shape. For example, the electrical conductive body 99 may have an annular (torus) shape.

The electrical conductive body 99 includes an upper surface 99A on which the wireless communication device 90 may be rested. The upper surface 99A may extend all over the electrical conductive body 99. The upper surface 99A may be a part of the electrical conductive body 99. The surface integral of the upper surface 99A may be larger than that of the wireless communication device 90. The wireless communication device 90 may be placed on the upper surface 99A of the electrical conductive body 99. The surface integral of the upper surface 99A may be narrower than that of the wireless communication device 90. A part of the wireless communication device 90 may be placed on the upper surface 99A of the electrical conductive body 99. The wireless communication device 90 may be placed in various orientations on the upper surface 99A of the electrical conductive body 99. The wireless communication device 90 may be placed in any orientation. The wireless communication device 90 may be fixed as appropriate by a retainer on the upper surface 99A of the electrical conductive body 99. Examples of the retainer include those for surface fixing, such as double-sided tape and adhesive. The examples of the retainer include those for point fixing, such as screw and nail.

The upper surface 99A of the electrical conductive body 99 may include a section extending in the j direction. The section extending in the j direction has a length along the j direction longer than the length along the k direction. The j direction and the k direction are orthogonal to each other. The j direction is a direction in which the electrical conductive body 99 extends lengthwise. The k direction is the direction in which the length of the electrical conductive body 99 is shorter than the j direction. The wireless communication device 90 may be placed on the upper surface 99A such that the x direction extends in the j direction. The wireless communication device 90 may be placed on the upper surface 99A of the electrical conductive body 99 to be aligned with the x direction in which the first conductor 31 and the second conductor 32 are arranged. When the wireless communication device 90 is positioned on the electrical conductive body 99, the first antenna 60 may be electromagnetically coupled to the electrical conductive body 99. In the fourth conductor 50 of the first antenna 60, the second current flows along the x direction. In the electrical conductive body 99 electromagnetically coupled to the first antenna 60, current is induced by the second current. When the x direction of the first antenna 60 is aligned with the j direction of the electrical conductive body 99, current flowing along the j direction increases in the electrical conductive body 99. When the x direction of the first antenna 60 is aligned with the j direction of the electrical conductive body 99, radiation by induced current increases in the electrical conductive body 99. The angle of the x direction relative to the j direction may be equal to or smaller than 45 degrees.

The ground conductor 811 of the wireless communication device 90 is spaced apart from the electrical conductive body 99. The ground conductor 811 is spaced apart from the electrical conductive body 99. The wireless communication device 90 may be placed on the upper surface 99A such that the direction along the long side of the upper surface 99A is aligned with the x direction in which the first conductor 31 and the second conductor 32 are arranged. Examples of the shape of the upper surface 99A may include a rhombus shape and a circular shape, in addition to a quadrature surface. The electrical conductive body 99 may include a rhombus-shaped surface. This rhombus-shaped surface may be the upper surface 99A on which the wireless communication device 90 is rested. The wireless communication device 90 may be placed on the upper surface 99A such that the direction along the longer diagonal line of the upper surface 99A is aligned with the x direction in which the first conductor 31 and the second conductor 32 are arranged. The upper surface 99A is not necessarily flat. The upper surface 99A may include protrusions and depressions. The upper surface 99A may include a curved surface. The curved surface includes a ruled surface (ruled surface). The curved surface includes a columnar surface.

The electrical conductive body 99 extends along the xy plane. The electrical conductive body 99 may have a length along the x direction longer than the length along the y direction. The length along the y direction of the electrical conductive body 99 may be shorter than a half of the wavelength $\lambda_c$ at the operating frequency $f_c$ of the third antenna 97. The wireless communication device 90 may be positioned on the electrical conductive body 99. The electrical conductive body 99 is positioned away from the fourth conductor 50 in the z direction. The length along the x direction of the electrical conductive body 99 is longer than the fourth conductor 50. The electrical conductive body 99 has the surface integral in the xy plane larger than the fourth conductor 50. The electrical conductive body 99 is positioned away from the ground conductor 811 in the z direction. The length along the x direction of the electrical conductive body 99 is longer than the ground conductor 811. The surface integral in the xy plane of the electrical conductive body 99 is larger than the ground conductor 811.

The wireless communication device 90 may be placed on the electrical conductive body 99 in such an orientation that the x direction in which the first conductor 31 and the second conductor 32 are arranged is aligned with the direction in which the electrical conductive body 99 extends lengthwise. In other words, the wireless communication device 90 may be placed on the electrical conductive body 99 in such an orientation that the direction in which current of the first antenna 60 flows and the direction in which the electrical conductive body 99 extends lengthwise are aligned in the xy plane.

In the first antenna 60, variation in resonance frequency is small because of the conductor on the circuit board 81 side. The wireless communication device 90 has the first antenna 60 and thereby can reduce the effect from an external environment.

In the wireless communication device 90, the ground conductor 811 may be capacitively coupled to the electrical conductive body 99. The wireless communication device 90 has a section extending outward from the third antenna 97 in the electrical conductive body 99, thereby improving the gain compared with the first antenna 60.

Figure 87:
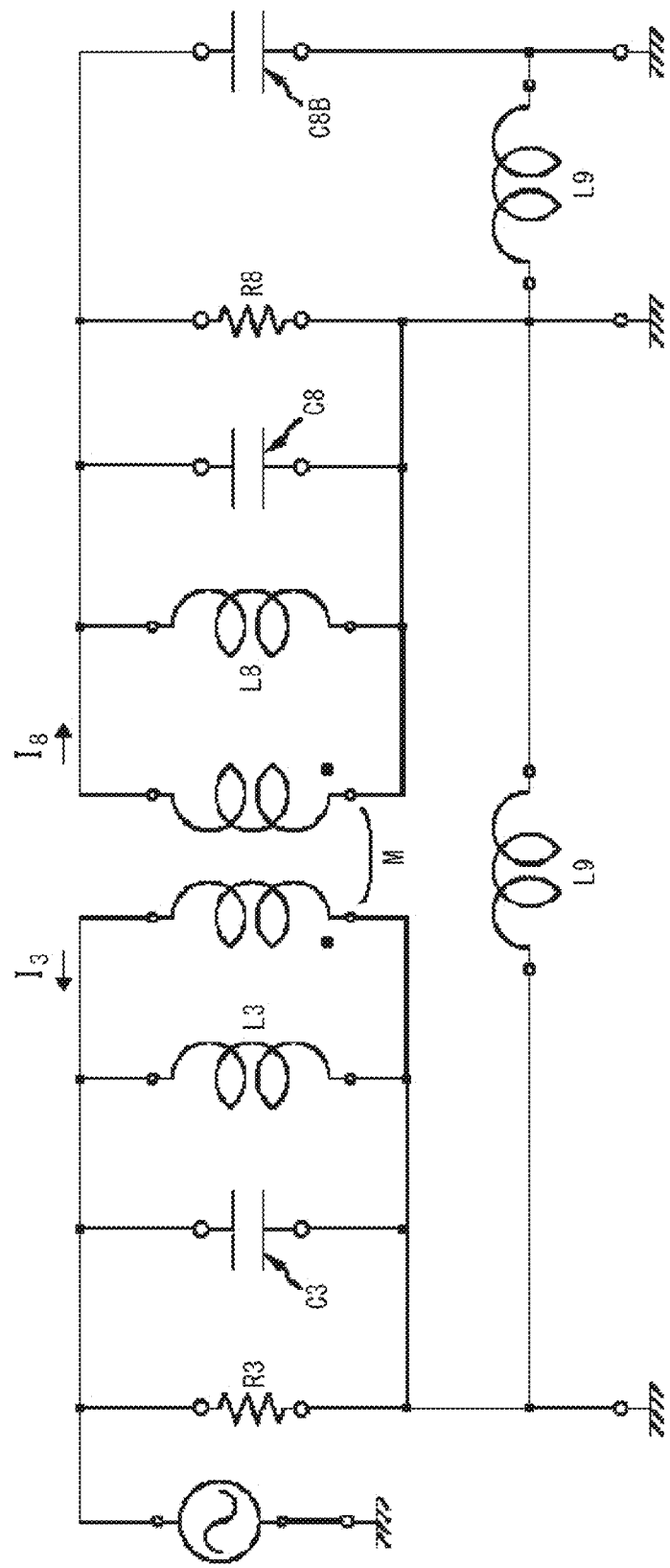
FIG. 87 is a diagram illustrating an overall circuit of a wireless communication device.
Figure 88:
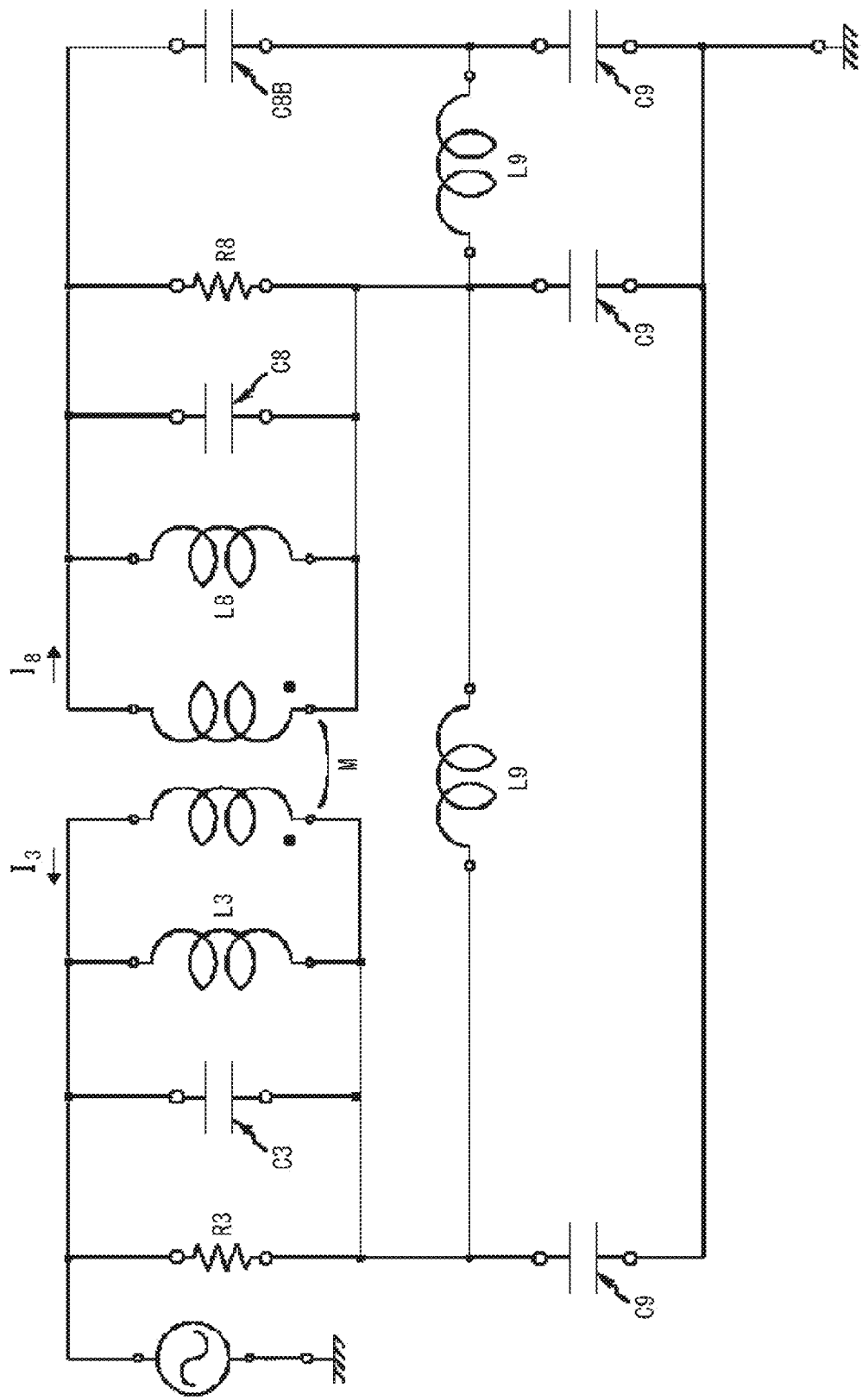
FIG. 88 is a diagram illustrating an overall circuit of a wireless communication device.

In the wireless communication device 90, the resonant circuit in the air may differ from the resonant circuit on the electrical conductive body 99. FIG. 87 illustrates a schematic circuit of a resonant structure formed in the air. FIG. 88 illustrates a schematic circuit of a resonant structure formed on the electrical conductive body 99. L3 is inductance of the resonator 10, L8 is inductance of the eighth conductor 961, L9 is inductance of the electrical conductive body 99, and M is mutual inductance of L3 and L8. C3 is capacitance of the third conductor 40, C4 is capacitance of the fourth conductor 50, C8 is capacitance of the eighth conductor 961, C8B is capacitance of the eighth conductor 961 and the battery 91, and C9 is capacitance of the electrical conductive body 99 and the ground conductor 811. R3 is radiation resistance of the resonator 10, and R8 is radiation resistance of the eighth conductor 961. The operating frequency of the resonator 10 is lower than the resonance frequency of the eighth conductor. In the wireless communication device 90 in the air, the ground conductor 811 functions as chassis ground. In the wireless communication device 90, the fourth conductor 50 is capacitively coupled to the electrical conductive body 99. In the wireless communication device 90 on the electrical conductive body 99, the electrical conductive body 99 functions as substantial chassis ground.

In a plurality of embodiments, the wireless communication device 90 has the eighth conductor 961. This eighth conductor 961 is electromagnetically coupled to the first antenna 60 and capacitively coupled to the fourth conductor 50. The capacitance C8B by capacitive coupling is increased whereby a higher operating frequency is achieved when the wireless communication device 90 is placed from the air onto the electrical conductive body 99. The mutual inductance M by electromagnetic coupling is increased whereby a lower operating frequency is achieved when the wireless communication device 90 is placed from the air onto the electrical conductive body 99. The balance between the capacitance C8B and the mutual inductance M is changed whereby variation in operating frequency can be adjusted when the wireless communication device 90 is placed from the air onto the electrical conductive body 99. The balance between the capacitance C8B and the mutual inductance M is changed whereby variation in operating frequency can be reduced when the wireless communication device 90 is placed from the air onto the electrical conductive body 99.

The wireless communication device 90 has the eighth conductor 961 electromagnetically coupled to the third conductor 40 and capacitively coupled to the fourth conductor 50. Having such an eighth conductor 961, the wireless communication device 90 can adjust variation in operating frequency when placed from the air onto the electrical conductive body 99. Having such an eighth conductor 961, the wireless communication device 90 can reduce variation in operating frequency when placed from the air onto the electrical conductive body 99.

Similarly, in the wireless communication device 90 that does not include the eighth conductor 961, the ground conductor 811 functions as chassis ground, in the air. Similarly, in the wireless communication device 90 that does not include the eighth conductor 961, the electrical conductive body 99 functions as substantial chassis ground, on the electrical conductive body 99. A resonant structure including the resonator 10 can oscillate even when chassis ground is changed. This corresponds to that the resonator 10 including the reference potential layer 51 and the resonator 10 including no reference potential layer 51 can oscillate.

(Wireless Communication System)

Figure 89:
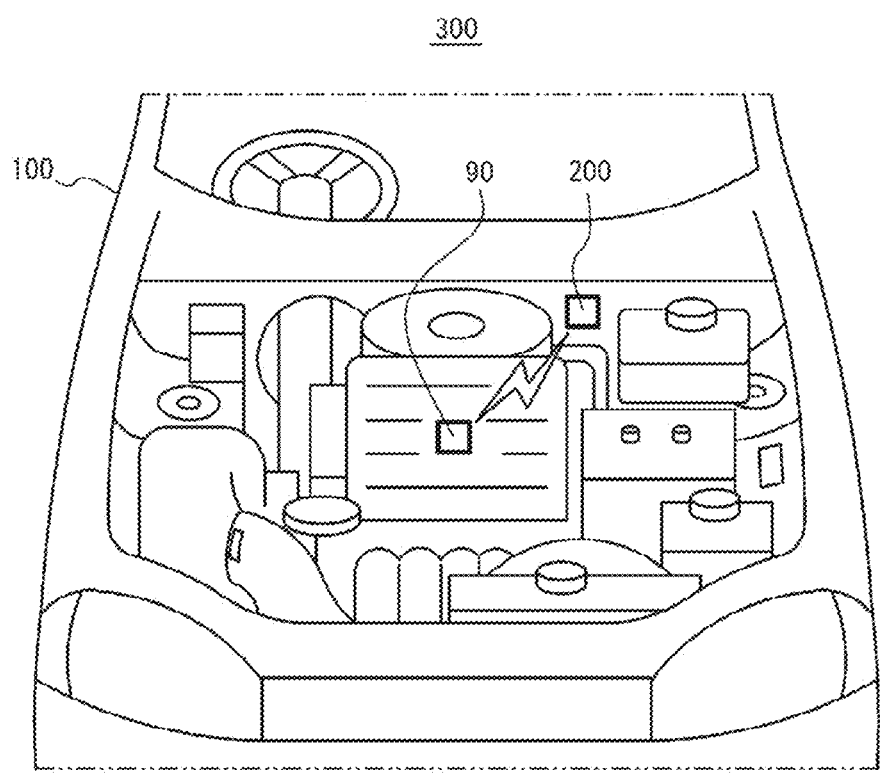
FIG. 89 is a schematic diagram illustrating an embodiment of a wireless communication system.

The detail of a wireless communication system 300 according to an embodiment of the present disclosure will be described below. FIG. 89 is a diagram illustrating an overall configuration of the wireless communication system 300 according to an embodiment of the present disclosure. The wireless communication system 300 includes a plurality of wireless communication devices. The wireless communication system 300 may include, for example, a wireless communication device 90 installed in a vehicle 100 and including an antenna and a sensor. The wireless communication system 300 may include another wireless communication device 200 installed in the same vehicle 100 as the wireless communication device 90. The wireless communication device 90 transmits a signal from the antenna to another wireless communication device 200, based on information detected by the sensor. Of the wireless communication devices included in the wireless communication system 300, some wireless communication devices are not necessarily installed in the vehicle 100. For example, another wireless communication device 200 may be a mobile device, another vehicle, a server, a satellite, a traffic light, etc. installed outside the vehicle 100.

The antenna according to an embodiment of the present disclosure has the configuration described above to form an artificial magnetic conductor and an electric conductor. With this configuration, the antenna is less affected by a conductive body in emitting electromagnetic waves even when installed on a conductive body such as metal. The wireless communication device 90 including the antenna therefore can be installed on a member of a conductive body such as metal that constitutes the vehicle 100 and used in various applications described later.

Examples of the vehicle 100 include, but is not limited to, an automobile, a railway vehicle, an industrial vehicle, and a household vehicle. Examples of the vehicle may include an airplane running on a runway. Examples of the automobile include, but is not limited to, a passenger automobile, a truck, a bus, a two-wheeled vehicle, and a trolley bus, and may include other vehicles running on a road. Examples of the rail vehicle include, but is not limited to, a locomotive, a freight car, a passenger car, a street car, a guided railway, a ropeway, a cable car, a linear motor car, and a monorail and may include other vehicles that move along a rail(s). Examples of the industrial vehicle include industrial vehicles for agriculture and construction. Examples of the industrial vehicle include, but is not limited to, a forklift and a golf cart. Examples of the industrial vehicle for agriculture include, but is not limited to, a tractor, a cultivator, a transplanter, a binder, a combine harvester, and a lawn mower. Examples of the industrial vehicle for construction include, but is not limited to, a bulldozer, a scraper, a digger, a crane, a dump truck, and a road roller. Examples of the household vehicle include, but is not limited to, a bicycle, a wheelchair, a baby carriage, a cart, and an electric two-wheeled vehicle for upright-riding. Examples of the engine of the vehicle include, but is not limited to, an internal combustion engine including a diesel engine, a gasoline engine, and a hydrogen engine, and an electric engine including a motor. Examples of the vehicle include a human-powered vehicle. The classification of the vehicle is not limited to the above. Examples of the automobile may include an industrial vehicle that can run on a road, and the same vehicle may fall into a plurality of categories.

Specific examples of the wireless communication system 300 according to an embodiment of the present disclosure will be illustrated below. As illustrated in FIG. 89, the wireless communication system 300 includes a first wireless communication device 90 that is the wireless communication device 90 installed in the vehicle 100 described above. The wireless communication system 300 includes a second wireless communication device 200. The second wireless communication device 200 may be installed in the same vehicle 100 as the first wireless communication device 90. The first wireless communication device 90 includes an antenna and a sensor. The first wireless communication device 90 transmits a signal from the antenna to the second wireless communication device 200, based on information detected by the sensor of the first wireless communication device 90. The second wireless communication device 200 controls the vehicle 100, based on the signal received from the first wireless communication device 90.

Figure 90:
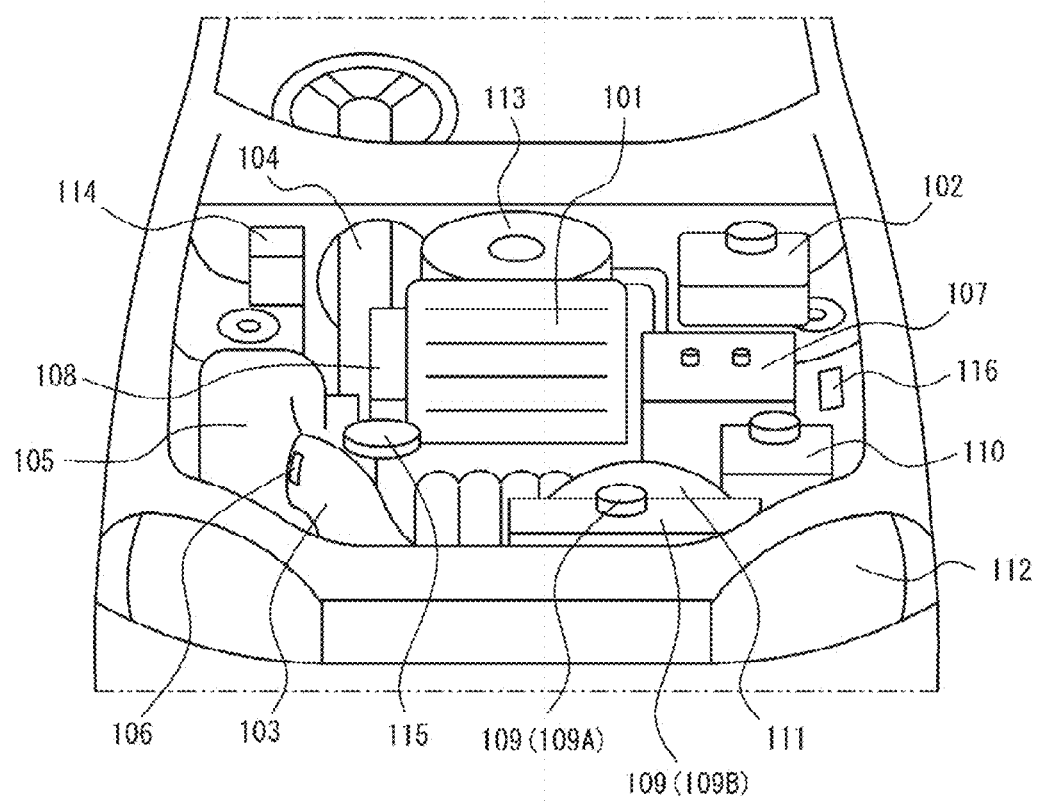
FIG. 90 is a schematic diagram illustrating members of a vehicle on which a wireless communication device may be installed.

The first wireless communication device 90 may be installed on any member of the vehicle 100. For example, the first wireless communication device 90 may be installed on a member of the vehicle 100 from which information is to be acquired by the sensor included in the first wireless communication device 90. FIG. 90 illustrates an example of the member of the vehicle 100 installed in the engine room of the vehicle 100. Examples of the member of the vehicle 100 may include an engine 101, a washer tank 102, a throttle body 103, a steering shaft 104, an air cleaner 105, an air flow sensor 106, a battery 107, a fan belt 108, a radiator 109 (radiator cap 109A, radiator core 109B), a reservoir tank 110, an air conditioner compressor 111, a light 112, a transmission 113, a brake fluid reservoir tank 114, an oil filler cap 115, and a fuse box 116. The member of the vehicle 100 is not limited to these. Examples of the member of the vehicle 100 include a fixture fixing the above member and a cover protecting the above member. The fixture includes a battery stay. The cover includes an engine head cover.

Figure 91:
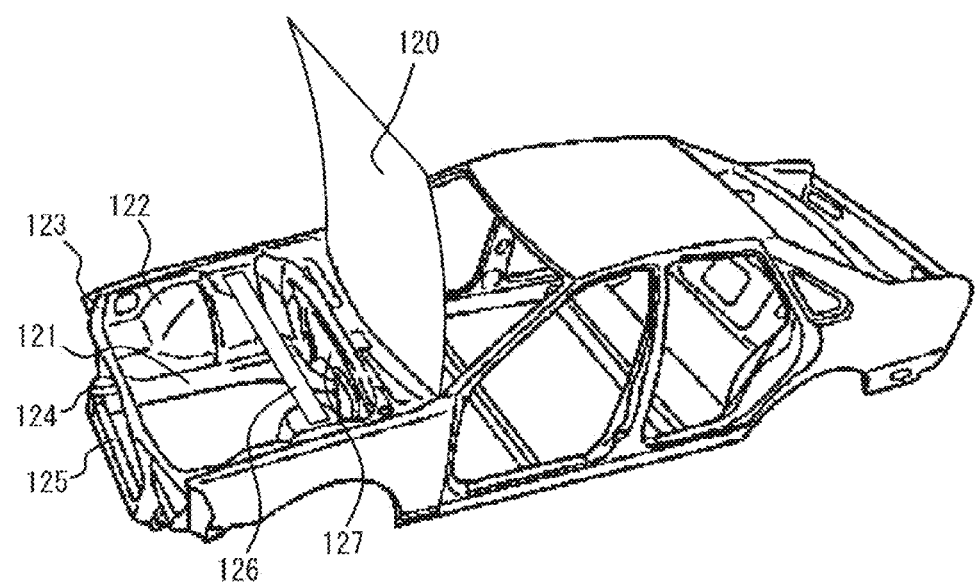
FIG. 91 is a schematic diagram illustrating members of a vehicle on which a wireless communication device may be installed.

The first wireless communication device 90 may be installed on a member such as a metal frame in the vicinity of the member of the vehicle 100 from which information is to be acquired by the sensor. FIG. 91 illustrates an example of the metal frame surrounding the engine room of the vehicle 100. For example, the first wireless communication device 90 may be installed at a hood 120, a side member 121, an inside panel 122, a radiator core support 123, a radiator upper support 124, a cross member 125, a strut bar 126, a dash panel 127, etc.

Figure 92:
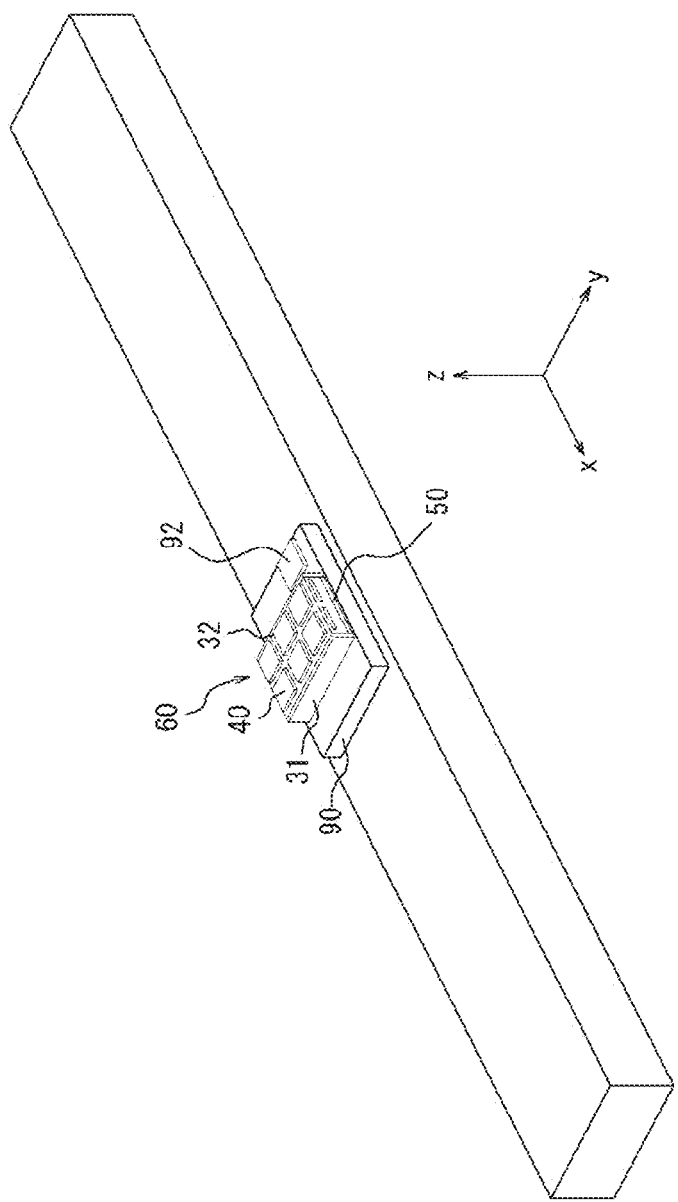
FIG. 92 is a schematic diagram illustrating an embodiment of a member on which a wireless communication device is installed.

FIG. 92 illustrates the first wireless communication device 90 installed on a member of the vehicle 100. The first wireless communication device 90 described above with reference to FIG. 81 includes a first antenna 60 and a sensor 92. Specifically, the first antenna 60 includes a first conductor 31, a second conductor 32, one or more third conductors 40, a fourth conductor 50, and a feeding line. The first conductor 31 and the second conductor 32 are opposed to each other in a first axis (the x direction in FIG. 92). One or more third conductors 40 are positioned between the first conductor 31 and the second conductor 32 and extend in the first axis. The fourth conductor 50 is connected to the first conductor 31 and the second conductor 32 and extends in the first axis. The feeding line is electromagnetically connected to the third conductor. The first conductor 31 and the second conductor 32 are capacitively connected to each other through the third conductor. A surface of the fourth conductor is arranged in such a manner as to be opposed to a surface of the member serving as an installation surface in a second axis (the z direction in FIG. 92) vertical to the first axis.

The first wireless communication device 90 may be installed at a predetermined position, depending on the shape of the member of the vehicle 100 on which the first wireless communication device 90 is installed. As illustrated in FIG. 92, when installed on an elongated member of a vehicle, the first wireless communication device 90 may be installed at or near a center portion of the member or at a position $(2n-1)\lambda/4$ ($n=1, 2, 3, \ldots$) from an end portion in the longitudinal direction thereof. Examples of the elongated member include the steering shaft 104, the radiator 109, the radiator upper support 124, and the strut bar 126. The first wireless communication device 90 is installed such that the first axis (the x direction in FIG. 92) in which the first conductor 31 and the second conductor 32 are opposed to each other is substantially parallel to the longitudinal direction of the member. This configuration improves the intensity of transmission/reception of electromagnetic waves by the antenna having the aforementioned configuration of the first wireless communication device 90 and improves the quality of communication.

Figure 93:
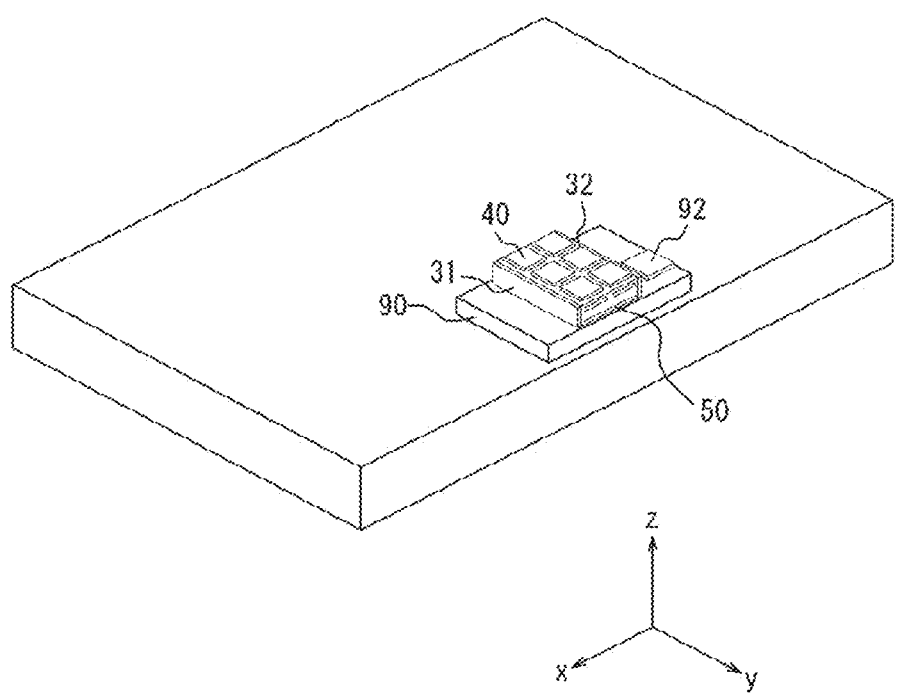
FIG. 93 is a schematic diagram illustrating an embodiment of a member on which a wireless communication device is installed.

As illustrated in FIG. 93, when installed on a large member of a vehicle, the first wireless communication device 90 may be installed at an end portion of the member. Examples of the large member include the engine 101, the battery 107, the hood 120, and the dash panel 127. The first wireless communication device 90 is installed such that the first axis (the x direction in FIG. 93) in which the first conductor 31 and the second conductor 32 are opposed to each other is substantially parallel to the outer peripheral line of the member. This configuration improves the intensity of transmission/reception of electromagnetic waves by the antenna having the aforementioned configuration of the first wireless communication device 90 and improves the quality of communication.

Referring to FIG. 81 and FIG. 89 again, the first wireless communication device 90 transmits a signal from the antenna to the second wireless communication device 200, based on information detected by the sensor 92. The controller 94 of the first wireless communication device 90 acquires information detected by the sensor 92. The controller 94 generates a transmission signal, based on information detected by the sensor 92. Subsequently, the controller 94 transmits the transmission signal from the antenna to the second wireless communication device 200. In generation of a transmission signal, the controller 94 may convert the whole or part of the information detected by the sensor 92 to a transmission signal. The controller 94 may perform predetermined computational processing on the information detected by the sensor 92 and convert the result to a transmission signal. For example, the controller 94 may calculate the charging rate of the battery based on data measured by a voltage sensor installed at the battery 107 and convert the charging rate to a transmission signal.

When the information detected by the sensor 92 satisfies a predetermined condition, the controller 94 of the first wireless communication device 90 may transmit a signal based on the information from the antenna to the second wireless communication device 200. For example, the controller 94 may store a predetermined threshold for the information detected by the sensor 92 into the memory 93 in advance. When information exceeding the predetermined threshold is detected by the sensor 92, the controller 94 may transmit a signal based on the information from the antenna to the second wireless communication device 200.

When transmitting a signal from the antenna, the controller 94 may activate the function related to wireless communication of the first wireless communication device 90. The function related to wireless communication of the first wireless communication device 90 may include the antenna and the wireless communication module 80. For example, the controller 94 stops the function related to wireless communication of the first wireless communication device 90. When information detected by the sensor 92 satisfies a predetermined condition, the controller 94 may activate the function related to wireless communication. This process can reduce power consumption of the first wireless communication device 90 installed in the vehicle 100.

The antenna and the sensor 92 may be integrated with the first wireless communication device 90 described above or may be separate therefrom. When they are separate, the first wireless communication device 90 may be connected to the antenna and the sensor 92 such that they can communicate with each other by wire. The antenna and the sensor 92 may be installed directly on the same member as or a member in the vicinity of the first wireless communication device 90.

The second wireless communication device 200 may be installed at any location. The second wireless communication device 200 may be installed on a member of the vehicle 100 that allows the antenna of the second wireless communication device 200 to be opposed to the antenna of the first wireless communication device 90. For example, the first wireless communication device 90 may be installed at an engine, and the second wireless communication device 200 may be installed on a surface of the hood 120 or the dash panel 127 opposed to the engine. The second wireless communication device 200 may be installed in the vicinity of a member of the vehicle 100 that is to be controlled and may be connected by wire to communicate with the member to be controlled. The second wireless communication device 200 may be a mobile device, another vehicle, a server, a satellite, a traffic light, etc. installed outside the vehicle 100. The second wireless communication device 200 receives a signal transmitted by the first wireless communication device 90.

The second wireless communication device 200 may control the vehicle 100, based on a signal received from the first wireless communication device 90. Examples of the control of the vehicle 100 may include control on running of the vehicle 100, such as acceleration, deceleration, stop, and steering of the vehicle 100. The control of the vehicle 100 may include turning on and off of the light, activation and stop of the wiper and the defroster, temperature control of the air conditioner, locking and unlocking of the door lock, turning on and off of the room lamp, and control of the functions provided by the vehicle 100.

The second wireless communication device 200 may transmit a signal for checking operation to the first wireless communication device 90 at the time of starting the vehicle 100. For example, when accepting an instruction to start the vehicle 100 based on a user operation or the like, the second wireless communication device 200 transmits a signal for checking operation to the first wireless communication device 90. The second wireless communication device 200 may determine whether the operational state of the first wireless communication device 90 is normal, based on a response to the operation checking from the first wireless communication device 90. If it is determined that the operational state of the first wireless communication device 90 is normal, the second wireless communication device 200 may start the vehicle 100. With this configuration, abnormality of the wireless communication device 90 can be detected before starting the vehicle 100, and safety in operation of the vehicle 100 is improved.

The second wireless communication device 200 may include any antenna. For example, when installed on a member of a conductive body such as metal of the vehicle 100, the second wireless communication device 200 may also include an antenna having a configuration similar to the first wireless communication device 90. In this case, referring to FIG. 92, the antenna may include a first conductor 31, a second conductor 32, one or more third conductors 40, a fourth conductor 50, and a feeding line. The first conductor 31 and the second conductor 32 are opposed to each other in a first axis (the x direction in FIG. 92). One or more third conductors 40 are positioned between the first conductor 31 and the second conductor 32 and extend in the first axis. The fourth conductor 50 is connected to the first conductor 31 and the second conductor 32 and extends in the first axis. The feeding line is electromagnetically connected to the third conductor. The first conductor 31 and the second conductor 32 are capacitively connected to each other through the third conductor. A surface of the fourth conductor is arranged in such a manner as to be opposed to the surface of the member serving as an installation surface in a second axis (the z direction in FIG. 92) vertical to the first axis.

Referring to FIG. 81 and FIG. 89, an example in which a state of the vehicle 100 is grasped by the wireless communication system 300 according to an embodiment of the present disclosure will be described. The wireless communication system 300 may be used to grasp the remaining amount of engine oil of the vehicle 100. The wireless communication system 300 includes a first wireless communication device 90 and a second wireless communication device 200. The first wireless communication device 90 may include a liquid level sensor 92 for measuring the remaining amount of engine oil. In this case, the first wireless communication device 90 is installed at an engine oil gauge of the engine 101 of the vehicle 100 illustrated in FIG. 90. The first wireless communication device 90 determines whether the value acquired by the liquid level sensor 92 is equal to or greater than a preset threshold of liquid level. If it is determined that the acquired value falls short of the threshold of liquid level, the wireless communication device 90 transmits information such as liquid level acquired by the liquid level sensor 92 to the second wireless communication device 200. When receiving the signal, the second wireless communication device 200 may turn on a sign indicating that the remaining amount of engine oil is insufficient, on the front panel in front of the driver's seat. For this, the second wireless communication device 200 may be installed at the dash panel 127 illustrated in FIG. 91 positioned in the vicinity of the front panel. When the sign appears on the front panel, the user adds engine oil. If it is determined that the value acquired by the liquid level sensor 92 is equal to or greater than the threshold of liquid level, the first wireless communication device 90 does not transmit information such as liquid level at present to the second wireless communication device 200. The second wireless communication device 200 then turns off the lighted sign on the front panel.

Referring to FIG. 81 and FIG. 89, an example in which vehicle body control of the vehicle 100 is performed by the wireless communication system 300 according to an embodiment of the present disclosure will be described. The wireless communication system 300 may be used to control the flow rate in the radiator of the vehicle 100. The wireless communication system 300 includes a first wireless communication device 90 and a second wireless communication device 200. The first wireless communication device 90 includes a water temperature sensor 92 for acquiring the temperature of coolant flowing through the radiator 109 illustrated in FIG. 90. The first wireless communication device 90 may be installed at the radiator 109 or the radiator core support 123 of the vehicle 100 illustrated in FIG. 90 or FIG. 91. The first wireless communication device 90 transmits information on the temperature of coolant in the radiator 109 acquired by the water temperature sensor 92 to the second wireless communication device 200 at predetermined intervals. The second wireless communication device 200 may be installed at the reservoir tank 110 temporarily storing the coolant flowing through the radiator 109. The second wireless communication device 200 regulates the flow rate of the coolant flowing through the radiator 109, based on the received information on the temperature.

As described above, the wireless communication system 300 according to an embodiment of the present disclosure includes a first wireless communication device 90 and a second wireless communication device 200. The first wireless communication device 90 is installed on an installation surface of the vehicle 100. The first wireless communication device 90 includes an antenna and a sensor 92. The antenna includes a first conductor 31, a second conductor 32, one or more third conductors 40, a fourth conductor 50, and a feeding line. The first conductor 31 and the second conductor 32 are opposed to each other in a first axis. One or more third conductors 40 are positioned between the first conductor 31 and the second conductor 32 and extend in the first axis. The fourth conductor 50 is connected to the first conductor 31 and the second conductor 32 and extends in the first axis. The feeding line is electromagnetically connected to the third conductor. The first conductor 31 and the second conductor 32 are capacitively connected to each other through the third conductor. A surface of the fourth conductor is opposed to the installation surface of the vehicle 100 in a second axis vertical to the first axis. The first wireless communication device 90 transmits a signal from the antenna to the second wireless communication device 200, based on information detected by the sensor 92. With this configuration, the first wireless communication device 90 is less affected by a conductive body in emitting electromagnetic waves even when installed on a conductive body such as metal. Information on a member of the vehicle made of a conductive body such as metal is therefore wirelessly transmitted using the wireless communication system 300. This leads to reduction in restrictions by wiring such as a communication cable and thereby enhances the flexibility of vehicle design such as arrangement of members in the vehicle 100.

The first wireless communication device 90 of the wireless communication system 300 according to an embodiment of the present disclosure transmits a signal from the antenna to the second wireless communication device 200 when information detected by the sensor 92 satisfies a predetermined condition. This process can reduce the number of times wireless communication is performed and can reduce power consumption of the first wireless communication device 90 and the second wireless communication device 200. The usability of wireless communication techniques using the antenna installed on a member of a conductive body such as metal of the vehicle is therefore improved.

The second wireless communication device 200 of the wireless communication system 300 according to an embodiment of the present disclosure controls the vehicle 100, based on a signal received from the first wireless communication device 90. With this configuration, the control of the vehicle 100 is automated, and the easiness of maintenance and the convenience of the vehicle are improved.

The second wireless communication device 200 of the wireless communication system 300 according to an embodiment of the present disclosure is installed on an installation surface of the vehicle 100. The second wireless communication device 200 includes an antenna. The antenna includes a first conductor 31, a second conductor 32, one or more third conductors 40, a fourth conductor 50, and a feeding line. The first conductor 31 and the second conductor 32 are opposed to each other in a first axis. One or more third conductors 40 are positioned between the first conductor 31 and the second conductor 32 and extend in the first axis. The fourth conductor 50 is connected to the first conductor 31 and the second conductor 32 and extends in the first axis. The feeding line is electromagnetically connected to the third conductor. The first conductor 31 and the second conductor 32 are capacitively connected to each other through the third conductor. A surface of the fourth conductor is opposed to the installation surface of the vehicle 100 in a second axis vertical to the first axis. This configuration enables wireless communication between the first wireless communication device 90 and the second wireless communication device 200 installed on members of conductive bodies such as metal of the vehicle 100. This configuration improves the usability of wireless communication techniques using an antenna installed on a member of a conductive body such as metal of the vehicle.

(Vehicle Equipped with Wireless Communication Device)

Figure 94:
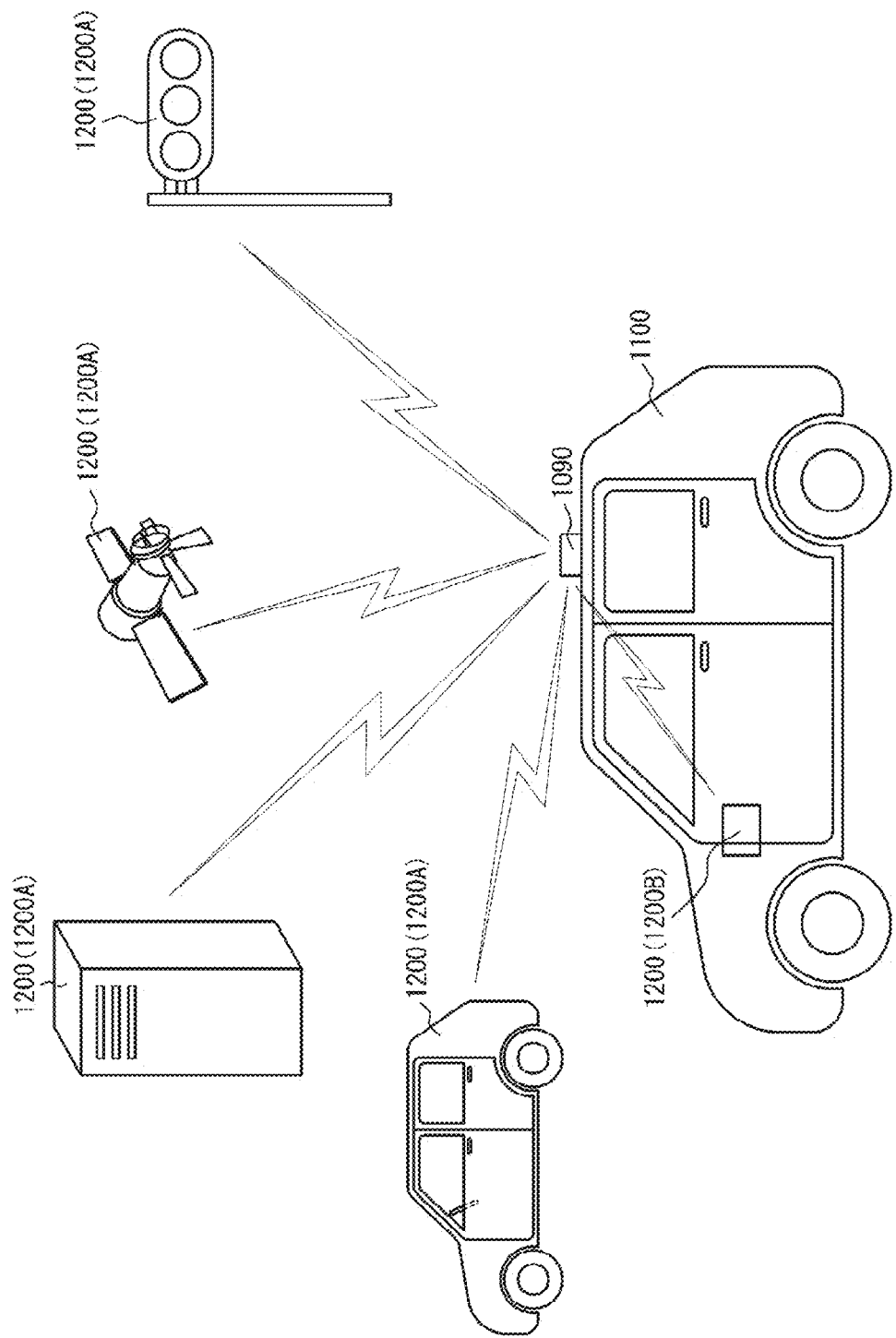
FIG. 94 is a schematic diagram illustrating an embodiment of a vehicle.
Figure 95:
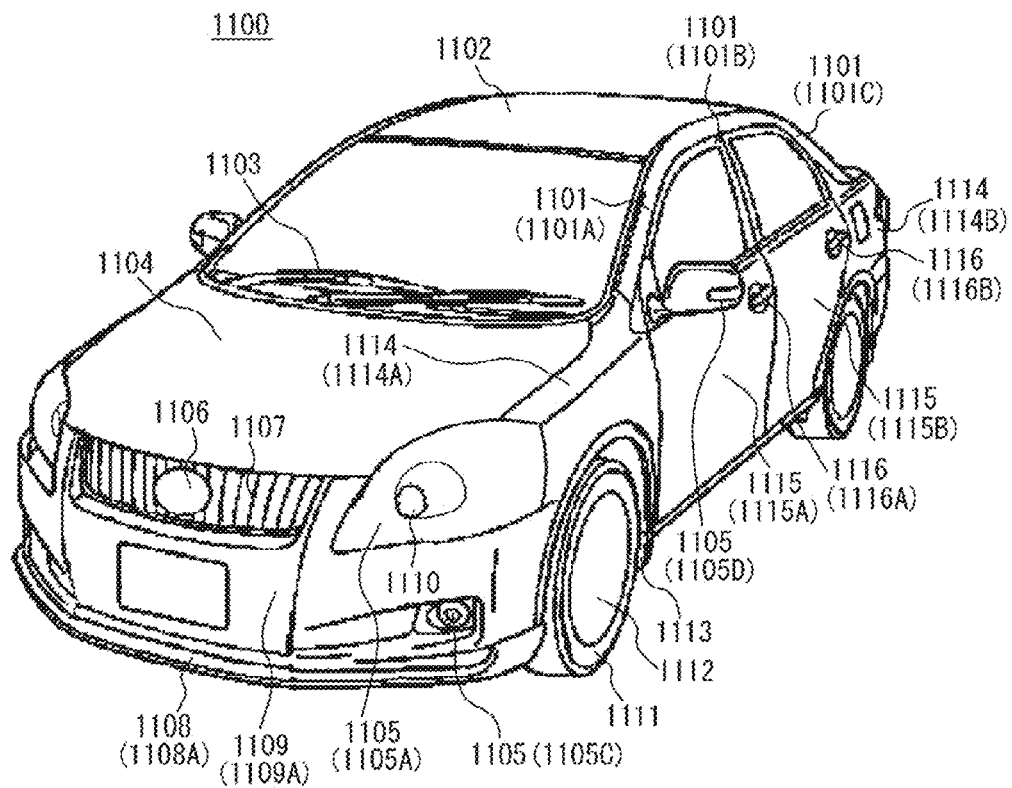
FIG. 95 is a schematic diagram illustrating members of a vehicle on which an antenna may be installed.
Figure 96:
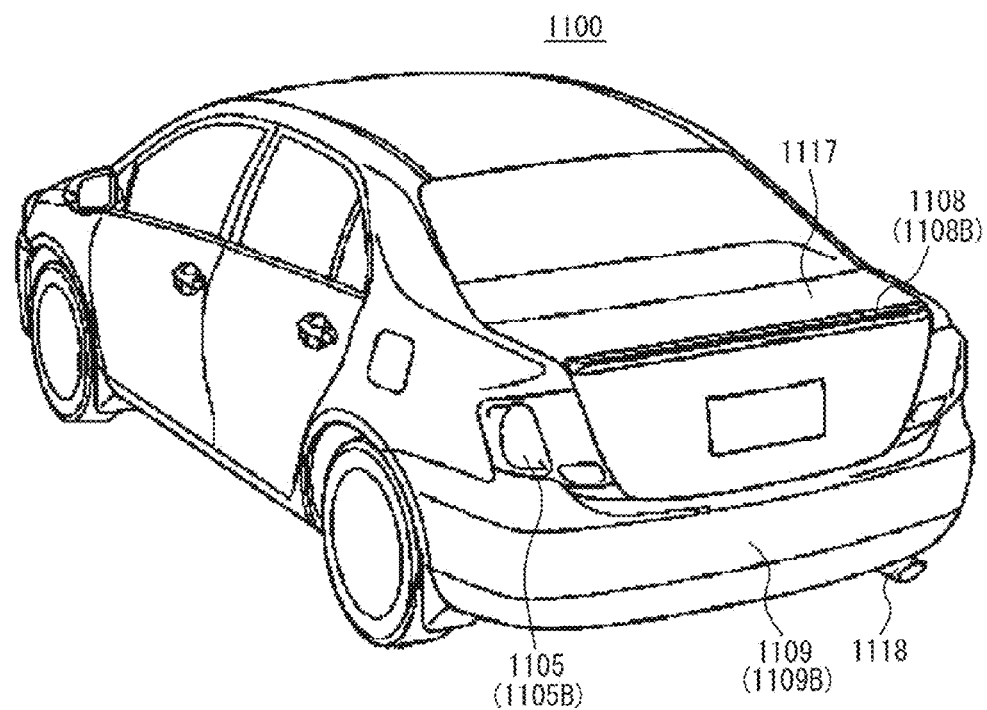
FIG. 96 is a schematic diagram illustrating members of a vehicle on which an antenna may be installed.
Figure 97:
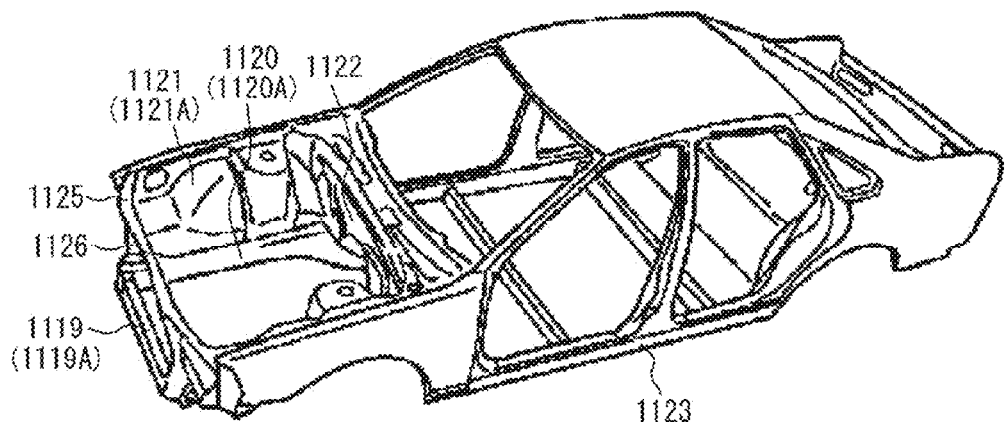
Figure 98:
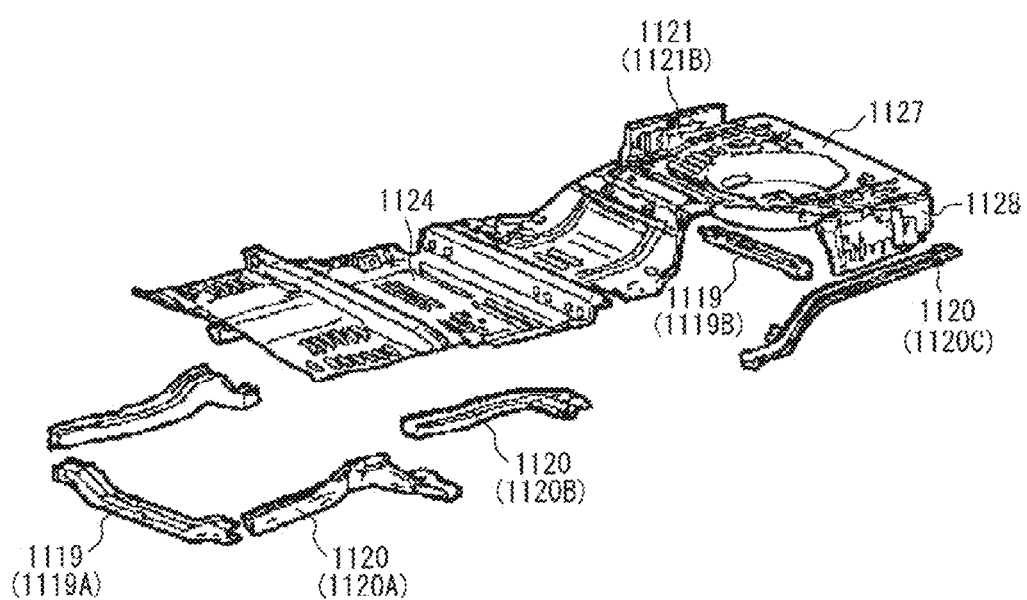

The detail of a vehicle 1100 equipped with a wireless communication device 1090 according to an embodiment of the present disclosure will be described below. FIG. 94 is a diagram illustrating an overall configuration of the vehicle 1100 according to an embodiment of the present disclosure. The wireless communication device 1090 including an antenna is installed in the vehicle 1100. The wireless communication device 1090 performs wireless communication with another wireless communication device 1200 through the antenna. Another wireless communication device 1200 may be, for example, an external device 1200A such as a vehicle, a server, a satellite, a traffic light, and a mobile device installed outside the vehicle 1100. Another wireless communication device 1200 may be, for example, a vehicle-mounted device 1200B installed in the same vehicle 1100 as the wireless communication device 1090.

The antenna according to an embodiment of the present disclosure has the configuration described above to serve as an artificial magnetic conductor having a ground conductor. With this configuration, the antenna is less affected by a conductive body in emitting electromagnetic waves even when installed on a conductive body such as metal. The wireless communication device 1090 including the antenna therefore may be installed on a member of a conductive body such as metal that constitutes the vehicle 1100 and used in various applications described later.

Examples of the vehicle 1100 include, but is not limited to, an automobile, a railway vehicle, an industrial vehicle, and a household vehicle. Examples of the vehicle may include an airplane running on a runway. Examples of the automobile include, but is not limited to, a passenger automobile, a truck, a bus, a two-wheeled vehicle, and a trolley bus, and may include other vehicles running on roads. Examples of the rail vehicle include, but is not limited to, a locomotive, a freight car, a passenger car, a street car, a guided railway, a ropeway, a cable car, a linear motor car, and a monorail and may include other vehicles that move along a rail(s). Examples of the industrial vehicle include industrial vehicles for agriculture and construction. Examples of the industrial vehicle include, but is not limited to, a forklift and a golf cart. Examples of the industrial vehicle for agriculture include, but is not limited to, a tractor, a cultivator, a transplanter, a binder, a combine harvester, and a lawn mower. Examples of the industrial vehicle for construction include, but is not limited to, a bulldozer, a scraper, a digger, a crane, a dump truck, and a road roller. Examples of the household vehicle include, but is not limited to, a bicycle, a wheelchair, a baby carriage, a cart, and an electric two-wheeled vehicle for upright riding. Examples of the engine of the vehicle include, but is not limited to, an internal combustion engine including a diesel engine, a gasoline engine, and a hydrogen engine, and an electric engine including a motor. Examples of the vehicle include a human-powered vehicle. The classification of the vehicle is not limited to the above. For example, the automobile may include an industrial vehicle that can run on a road, and the same vehicle may fall into a plurality of categories.

Specific examples of the vehicle 1100 equipped with the wireless communication device 1090 according to an embodiment of the present disclosure will be illustrated below.

FIG. 95, FIG. 96, FIG. 97, and FIG. 98 illustrate members of the vehicle 1100 on which the wireless communication device 1090 according to the present disclosure may be installed. Examples of the members of the vehicle include a pillar 1101 (front pillar 1101A, center pillar 1101B, rear pillar 1101C), a roof 1102, a wiper 1103, a hood 1104, a lamp 1105 (clearance lamp 1105A, tail lamp 1105B, fog lamp 1105C, side turning lamp 1105D), an emblem 1106, a grille 1107, a spoiler 1108 (front spoiler 1108A, rear spoiler 1108B), a bumper 1109 (front bumper 1109A, rear bumper 1109B), a headlamp 1110, a tire 1111, a wheel 1112, a mudguard 1113, a fender 1114 (front fender 1114A, rear fender 1114B), a door 1115 (front door 1115A, rear door 1115B), a door handle 1116 (front handle 116A, rear handle 116B), a trunk hood 1117, a muffler 1118, a cross member 1119 (front cross member 1119A, rear cross member 1119B), a side member 1120 (front side member 1120A, floor side member 1120B, rear side member 1120C), an inside panel 1121 (front inside panel 1121A, rear inside panel 1121B), a dash panel 1122, a rocker panel 1123, a floor panel 1124, a radiator core support 1125, a radiator upper support 1126, a trunk floor 1127, and a side pocket 1128.

The wireless communication device 1090 may be installed on any member of the vehicle 1100 according to its applications. A plurality of wireless communication devices 1090 may be installed in one vehicle. For example, a plurality of antennas may be mounted on opposing positions, such as front doors 1115A on both sides or the hood 1104 and the trunk hood 1117 illustrated in FIG. 95 and FIG. 96, thereby improving the quality of communication with MIMO and/or antenna diversity or controlling electromagnetic waves by beamforming.

Figure 99:
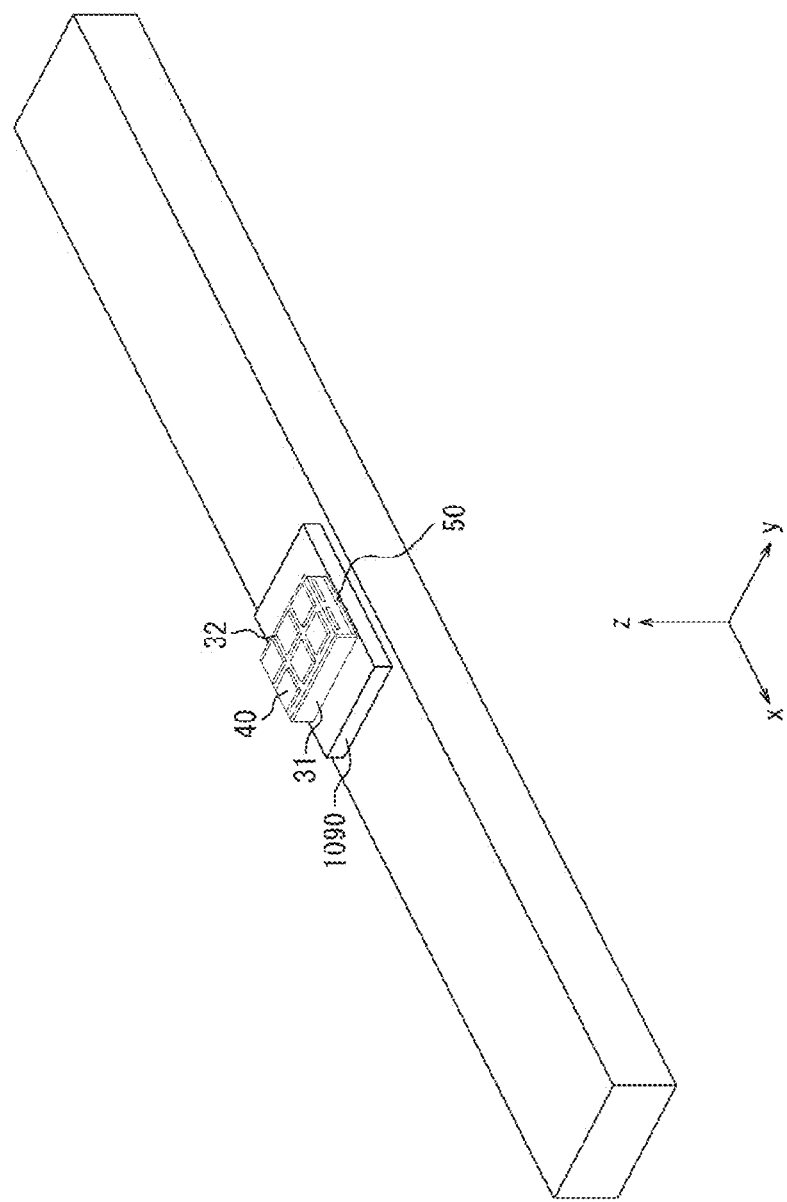

FIG. 99 illustrates the wireless communication device 1090 installed on a member of the vehicle 1100. The wireless communication device 1090 may be the wireless communication device 90 described above with reference to FIG. 81. The wireless communication device 1090 includes an antenna. Specifically, the antenna includes a first conductor 31, a second conductor 32, one or more third conductors 40, a fourth conductor 50, and a feeding line. The first conductor 31 and the second conductor 32 are opposed to each other in a first axis (the x direction in FIG. 99). One or more third conductors 40 are positioned between the first conductor 31 and the second conductor 32 and extend in the first axis. The fourth conductor 50 is connected to the first conductor 31 and the second conductor 32 and extends in the first axis. The feeding line is connected to the third conductor. The first conductor 31 and the second conductor 32 are capacitively connected to each other through the third conductor. A surface of the fourth conductor is arranged in such a manner as to be opposed to the surface of the member serving as the installation surface in a second axis (the z direction in FIG. 99) vertical to the first axis.

The wireless communication device 1090 may be installed at a predetermined position, depending on the shape of the member of the vehicle 1100 on which the wireless communication device 1090 is installed. As illustrated in FIG. 99, when installed on an elongated conductive member of a vehicle, the wireless communication device 1090 may be installed at or near a center portion or at a position $(2n-1)\lambda/4$ ($n=1, 2, 3, \ldots$) from an end portion in the longitudinal direction of the member. With the installation in this way, a standing wave of current is induced in the conductive member. The conductive member becomes a radiation source of electromagnetic waves due to the induced standing wave. With such installation, the wireless communication device 1090 improves in communication performance. Examples of the elongated conductive member include the pillar 1101, the spoiler 1108, the muffler 1118, the cross member 1119, and the side member 1120 illustrated in FIG. 95 to FIG. 98. The wireless communication device 1090 is installed such that the first axis (the x direction in FIG. 99) in which the first conductor 31 and the second conductor 32 are opposed to each other is substantially parallel to the longitudinal direction of the member. This configuration improves the intensity of transmission/reception of electromagnetic waves by the antenna having the aforementioned configuration of the wireless communication device 1090 and improves the quality of communication.

Figure 100:
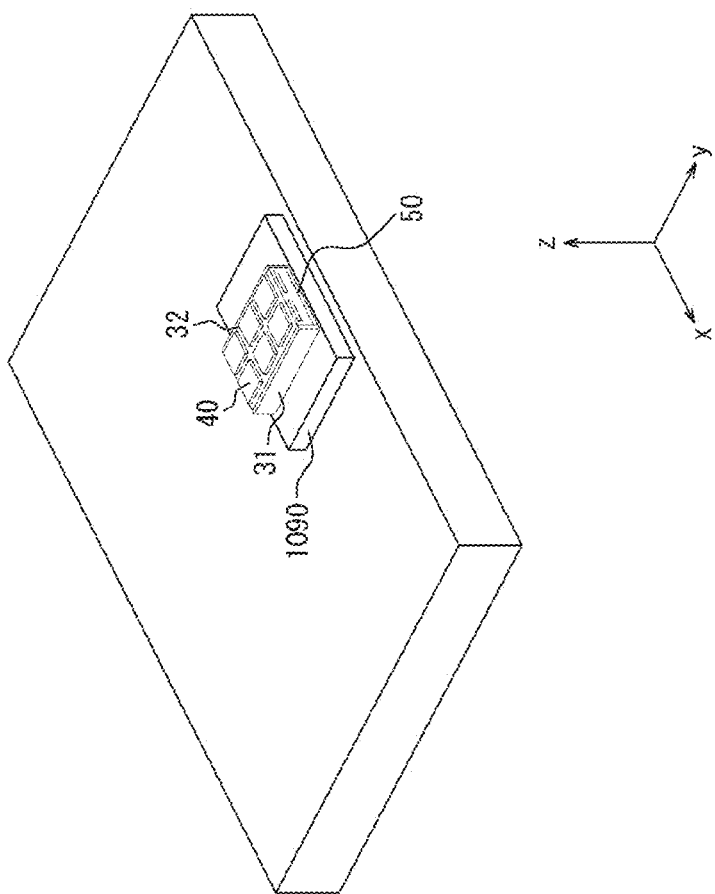

As illustrated in FIG. 100, when installed on a large member of a vehicle, the wireless communication device 1090 may be installed at an end portion of the member. Examples of the large member include the roof 1102, the hood 1104, the fender 1114, the door 1115, the trunk hood 1117, the floor panel 1124, and the trunk floor 1127 illustrated in FIG. 95 to FIG. 98. The wireless communication device 1090 is installed such that the first axis (the x direction in FIG. 100) in which the first conductor 31 and the second conductor 32 are opposed to each other is substantially parallel to the outer peripheral line of the member. This configuration improves the intensity of transmission/reception of electromagnetic waves by the antenna having the aforementioned configuration of the wireless communication device 1090 and improves the quality of communication.

The wireless communication device 1090 may further include a battery 91 that supplies power to the antenna, as illustrated in FIG. 81. The electrode terminals of the battery 91 are electrically connected to the fourth conductor. With this configuration, the wireless communication device 1090 can operate without being externally supplied with power.

As illustrated in FIG. 81, the wireless communication device 1090 may include a sensor 92 and a controller 94. The controller 94 transmits a signal from the antenna, based on information detected by the sensor 92. The controller 94 of the wireless communication device 1090 acquires information detected by the sensor 92. The controller 94 generates a transmission signal, based on information detected by the sensor 92. Subsequently, the controller 94 transmits the transmission signal from the antenna to another wireless communication device. In generation of a transmission signal, the controller 94 may convert the whole or part of the information detected by the sensor 92 to a transmission signal. The controller 94 may perform predetermined computational processing on the information detected by the sensor 92 and convert the result to a transmission signal. For example, the controller 94 may calculate the average or the sum of data measured by the sensor 92 for a predetermined time and convert the calculated average or sum to a transmission signal.

As illustrated in FIG. 81, the wireless communication module 80 is communicatively connected to the sensor 92. The controller 94 may be able to transmit information detected by the sensor 92 from the first antenna 60 included in the wireless communication module 80. The wireless communication module 80 may be separate from the other configuration of the wireless communication device 1090. In this case, the antenna may be installed directly on a member of the vehicle, and the other configuration of the wireless communication device 1090 and the wireless communication module 80 may be connected through a signal line.

The operation of the wireless communication device 1090 installed in the vehicle 1100 according to an embodiment of the present disclosure will be described below with examples.

First Example: State Grasp

The wireless communication device 1090 installed in the vehicle 1100 according to an embodiment of the present disclosure may be used for grasping a state of the vehicle 1100. The information for grasping a state of the vehicle 1100 includes information such as speed, acceleration, angular velocity, geomagnetism, temperature, humidity, atmospheric pressure, illuminance, and sound. The wireless communication device 1090 may include a sensor 92 for acquiring these pieces of information. The wireless communication device 1090 may be installed at any position in the vehicle 1100, according to the applications of the sensor 92. For example, in order to acquire information on temperature in the engine room, the wireless communication device 1090 including a temperature sensor may be installed at the front side member 1120A of the vehicle 1100. Alternatively, in order to acquire information on acceleration, angular velocity, and orientation of the vehicle 1100, the wireless communication device 1090 including a nine-axis sensor may be installed at the front pillar 1101A of the vehicle 1100. In order to acquire information on illuminance of the headlamp 1110, the wireless communication device 1090 including an illuminance sensor may be installed in the vicinity of the headlamp 1110 of the vehicle 1100. The wireless communication device 1090 may transmit these pieces of acquired information on the vehicle 1100 to the external device 1200A or the vehicle-mounted device 1200B. In this way, information used for grasping a state of the vehicle 1100 may be acquired by the wireless communication device 1090 and provided wirelessly.

Second Example: Information Provision

The wireless communication device 1090 installed in the vehicle 1100 according to an embodiment of the present disclosure may be used for providing information on the vehicle 1100. The information on the vehicle 1100 includes information such as distance traveled, speed, engine speed, water temperature, hydraulic pressure, battery voltage, average fuel economy, instantaneous fuel economy, shift position, transmission mode, suspension mode, vehicle height, turn-on or turn-off of lighting, whether the seat belt is fastened, and battery level. These pieces of information may be acquired by a sensor external to the wireless communication device 1090, such as existing sensors in the vehicle 1100. The wireless communication device 1090 therefore may be installed in the vicinity of the vehicle-mounted device 1200B for presenting information acquired by an existing sensor or the sensor and may be connected to the vehicle-mounted device 1200B. The vehicle-mounted device 1200B may be, for example, a radiator. In order to acquire information on a water temperature sensor for the radiator that is indicated in the radiator, the wireless communication device 1090 may be installed at the radiator core support 1125 in the vicinity of the radiator. For example, the vehicle-mounted device 1200B may be the front panel in front of the driver's seat. In order to acquire information on a speed meter, a tachometer, a fuel gauge, and a distance meter, etc. that appears on the front panel, the wireless communication device 1090 may be installed at the dash panel in such a manner as to be positioned in the vicinity of the front panel. The wireless communication device 1090 may transmit these pieces of acquired information on the vehicle 1100 to the external device 1200A or the vehicle-mounted device 1200B. In this way, information on the vehicle 1100 acquired by an existing sensor having no wireless function can be wirelessly provided by the wireless communication device 1090.

Third Example: Vehicle Body Control

The wireless communication device 1090 installed in the vehicle 1100 according to an embodiment of the present disclosure may be used for vehicle body control of the vehicle 1100. The wireless communication device 1090 acquires information on a camera or a radar, etc. installed in the vehicle 1100. The wireless communication device 1090 may transmit a control signal to the vehicle-mounted device 1200B such as accelerator, steering wheel, brake, or light, based on these pieces of information. For example, in order to perform autonomous driving control, the wireless communication device 1090 including an infrared radar may be installed at the front cross member 1119A. The wireless communication device 1090 may acquire information on the distance to a vehicle 1100 ahead with the infrared radar and transmit a control signal to the accelerator based on the acquired information. In order to avoid collision damage behind the vehicle 1100, the wireless communication device 1090 may be installed together with a camera at the rear cross member 1119B. The wireless communication device 1090 may acquire image information on a view behind the vehicle from the camera and transmit a control signal to the accelerator based on the acquired information, if a human, a wall, etc. is detected. In this way, the vehicle-mounted device 1200B can be controlled wirelessly by the wireless communication device 1090, based on information on the sensor installed in the vehicle 1100.

Fourth Example: GPS Communication

The wireless communication device 1090 installed in the vehicle 1100 according to an embodiment of the present disclosure may be used for communication with the Global Positioning System (GPS). The wireless communication device 1090 may acquire a radio signal from a GPS satellite using the wireless communication module. In order to receive a signal from a GPS satellite, the wireless communication device 1090 may be installed, for example, on a member open on the upper side of the vehicle 1100, such as the roof 1102, the hood 1104, the fender 1114, and the trunk hood 1117. In this way, position information of the vehicle 1100 may be calculated by the wireless communication device 1090, based on radio signals received from GPS satellites. The directivity of the antenna installed on a metal plate is a direction vertical to the metal plate and has a maximum value in the direction of the antenna. The wireless communication device 1090 receiving a radio signal from a GPS satellite may be installed on a section horizontal to the ground in the metal plate.

Fifth Example: Antitheft Measures

The wireless communication device 1090 installed in the vehicle 1100 according to an embodiment of the present disclosure may be used for antitheft applications. The wireless communication device 1090 may perform user authentication as antitheft measures. In order to perform user authentication, the wireless communication device 1090 may include a sensor for performing fingerprint authentication and vein authentication. Only when information acquired by the sensor matches user information registered in advance, the wireless communication device 1090 may unlock the door 1115 or transmit an instruction to start the engine to another vehicle-mounted device. For this, the wireless communication device 1090 may be installed on a member to be touched by the user when the user rides in the vehicle, such as the door handle 1116 and the door 1115. In this way, unauthorized operation of the vehicle 1100 by those other than the registered user can be prevented by the wireless communication device 1090. The wireless communication device 1090 may further transmit position information of the vehicle 1100 to an external device 1200A such as a smartphone of the owner of the vehicle 1100. For example, when unauthorized operation of the vehicle 1100 by those other than the registered user is detected, the wireless communication device 1090 may transmit position information of the vehicle 1100 to the owner's smartphone. When an instruction to transmit position information is received from the owner's smartphone through the Internet or the like, the wireless communication device 1090 may transmit position information of the vehicle 1100. The wireless communication device 1090 may specify position information of the vehicle 1100 using the GPS described above, based on the received instruction to transmit position information, and transmit the specified position information to the owner's smartphone. The wireless communication device 1090 may additionally transmit information such as the speed of the vehicle 1100 and the latest travel route, together with the position information of the vehicle 1100. In this way, the owner of the vehicle 1100 can be informed of information for early detection of car theft by the wireless communication device 1090.

Sixth Example: V2X

The wireless communication device 1090 installed in the vehicle 1100 according to an embodiment of the present disclosure may be used in the application called vehicle-to-everything (V2X) in which information is transmitted to/received from an external device 1200A in the surroundings. Examples of the external device 1200A include another vehicle 1100, an electronic device, a traffic signal, a road sign, and a roadside device. For this application, for example, wireless communication in a horizontal direction may be mainly performed with the external device 1200A such as a vehicle 1100 ahead or behind, a road sign installed on the roadside, or an electronic device used by a pedestrian walking on a sidewalk. For this, in order to increase radiation of electromagnetic waves in the horizontal direction, the wireless communication device 1090 may be installed on a member of the vehicle 1100 extending vertically to the ground, such as the pillar 1101. In this way, information can be wirelessly exchanged between the vehicle 1100 and the external device 1200A in the surroundings by the wireless communication device 1090.

Seventh Example: Keyless Entry

The wireless communication device 1090 installed in the vehicle 1100 according to an embodiment of the present disclosure may be used in the application of keyless entry. The wireless communication device 1090 receives a signal for unlocking or locking the door 1115 from a smart key. The wireless communication device 1090 may transmit an instruction to unlock or lock the door 1115 to a vehicle-mounted device 1200B controlling unlocking and locking, based on the received signal from the smart key. In this way, unlocking and locking of the door 1115 are performed by the wireless communication device 1090. When the vehicle-mounted device 1200B is installed in the vicinity of the dash panel 1122, the wireless communication device 1090 is installed at the dash panel 1122, whereby the wiring between the wireless communication device 1090 and the vehicle-mounted device 1200B can be shortened. The directivity of the antenna installed on a metal plate is a direction vertical to the metal plate and has a maximum value in the direction of the antenna. In order to increase radiation of electromagnetic waves in the horizontal direction, the wireless communication device 1090 may be installed at a section extending vertically to the ground. An example of the section extending vertically to the ground is the pillar 1101. The wireless communication device 1090 is installed at a section extending vertically to the ground and thereby can effectively receive a signal from the smart key located in the horizontal direction.

Eighth Example: Broadcast Signal Reception

The wireless communication device 1090 installed in the vehicle 1100 according to an embodiment of the present disclosure may be used in the application of reception of broadcast signals for radio, television, etc. The wireless communication device 1090 may acquire a radio signal transmitted from an antenna of a broadcast station, using the wireless communication module 80. In order to receive a signal from an antenna of a broadcast station, the wireless communication device 1090 may be installed, for example, on a member open on the upper side of the vehicle 1100, such as the roof 1102, the hood 1104, the fender 1114, and the trunk hood 1117. In this way, a broadcast signal for radio, television, etc. is received by the wireless communication device 1090. The directivity of the antenna installed on a metal plate is a direction vertical to the metal plate and has a maximum value in the direction of the antenna. In order to increase reception of electromagnetic waves in the horizontal direction, the wireless communication device 1090 may be installed at a section extending vertically to the ground.

Ninth Example: Emergency Call Transmission

The wireless communication device 1090 installed in the vehicle 1100 according to an embodiment of the present disclosure may be used in the application of transmission of emergency calls. The wireless communication device 1090 may transmit an emergency call automatically when the airbag is activated, when shock is detected by a shock sensor, or when overturn of the vehicle 1100 is detected by a gyro sensor. In order to transmit a signal in a wider range, the wireless communication device 1090 may be installed, for example, at a position open on the upper side of the vehicle 1100, such as the roof 1102, the hood 1104, the fender 1114, and the trunk hood 1117. In this way, an emergency call may be transmitted by the wireless communication device 1090. The directivity of the antenna installed on a metal plate is a direction vertical to the metal plate and has a maximum value in the direction of the antenna. In order to increase radiation of electromagnetic waves in the horizontal direction, the wireless communication device 1090 may be installed at a section extending vertically to the ground.

Tenth Example: ETC Vehicle-Mounted Device

The wireless communication device 1090 installed in the vehicle 1100 according to an embodiment of the present disclosure may be used as an ETC vehicle-mounted device of the electronic toll collection (ETC) system. In order to facilitate communication with an antenna installed on a gate of a tollgate located ahead of the vehicle 1100, the wireless communication device 1090 may be installed, for example, on a member visible from the front, such as the front pillar 1101A, the roof 1102, and the hood 1104. In this way, communication for ETC may be implemented by the wireless communication device 1090.

Eleventh Example: Road Surface Sensing

The wireless communication device 1090 installed in the vehicle 1100 according to an embodiment of the present disclosure may be used in the application of road surface sensing. The wireless communication device 1090 may have functions for sensing a road surface state, such as asphalt, unpaved soil, snow, ice, or rainfall, using ultrasound, laser, images, etc. The wireless communication device 1090 transmits information on a road surface state detected by these functions to another vehicle-mounted device 1200B installed in the vehicle 1100. Another vehicle-mounted device 1200B controls the vehicle 1100, based on these pieces of information. The wireless communication device 1090 may be installed at a position in the vehicle 1100 facing a road surface, such as the floor panel 1124, the cross member 1119, the side member 1120, and the trunk floor 1127. In this way, sensing of a road surface may be implemented by the wireless communication device 1090.

Twelfth Example: Glass Fogging Detection

The wireless communication device 1090 installed in the vehicle 1100 according to an embodiment of the present disclosure may be used in the application of glass fogging detection. The wireless communication device 1090 may detect that the inner surface of glass of the vehicle 1100 is foggy by detecting the amount of reflection of laser and humidity using a sensor. Upon detecting fogging of glass, the wireless communication device 1090 transmits the information to another vehicle-mounted device 1200B. The vehicle-mounted device 1200B removes fogging of the inner surface of glass, for example, by automatically controlling the defroster for the front window or the rear window. The wireless communication device 1090 may be installed on the periphery of the front window or the rear window, such as the pillar 1101, the roof 1102, the hood 1104, the door 1115, or the trunk hood 1117. In this way, glass fogging detection may be implemented by the wireless communication device 1090.

Thirteenth Example: Tire Wear Detection

The wireless communication device 1090 installed in the vehicle 1100 according to an embodiment of the present disclosure may be used in the application of detection of wear of the tire 1111. The wireless communication device 1090 may have functions for detecting a wear state of the tire 1111, for example, by ultrasound, laser, images, etc. With this, the wireless communication device 1090 detects the depth of grooves of four tires 1111. The wireless communication device 1090 transmits information on wear of the tires 1111 detected by these functions to another vehicle-mounted device 1200B installed in the vehicle 1100. The vehicle-mounted device 1200B may be, for example, the front panel. The front panel then displays tire wear information. The wireless communication device 1090 may predict the time for tire rotation and tire replacement based on the detected information on the tires 1111 and display the predicted time on the front panel, for example. The wireless communication device 1090 may be installed on the tire side of the front fender 1114A and the rear fender 1114B. In this way, tire wear detection may be implemented by the wireless communication device 1090.

As described above, the antenna according to some embodiments of the present disclosure is installed on an installation surface of the vehicle 1100. The antenna includes a first conductor 31, a second conductor 32, one or more third conductors 40, a fourth conductor 50, and a feeding line. The first conductor 31 and the second conductor 32 are opposed to each other in a first axis. One or more third conductors 40 are positioned between the first conductor 31 and the second conductor 32 and extend in the first axis. The fourth conductor 50 is connected to the first conductor 31 and the second conductor 32 and extends in the first axis. The feeding line is connected to the third conductor. The first conductor 31 and the second conductor 32 are capacitively connected to each other through the third conductor. A surface of the fourth conductor is opposed to the installation surface of the vehicle 1100 in a second axis vertical to the first axis. The antenna having such a configuration serves as an artificial magnetic conductor having a ground conductor. With this configuration, the antenna is less affected by a conductive body in emitting electromagnetic waves even when installed on a conductive body such as metal. The intensity of transmission/reception of electromagnetic waves by the antenna is therefore improved, and the quality of communication is improved. In this way, the usability of wireless communication techniques using an antenna installed on a member of a conductive body such as metal of the vehicle is improved.

The installation surface of the vehicle 1100 on which the antenna according to an embodiment of the present disclosure is installed is a surface of a member that constitutes the vehicle. The first axis is substantially parallel to the longitudinal direction of the member. This configuration improves the intensity of transmission/reception of electromagnetic waves by the antenna and improves the quality of communication.

The installation surface of the vehicle 1100 on which the antenna according to an embodiment of the present disclosure is installed is an end portion of a surface of a member that constitutes the vehicle. The first axis is substantially parallel to the outer peripheral line of the member. This configuration improves the intensity of transmission/reception of electromagnetic waves by the antenna and improves the quality of communication.

The wireless communication device 1090 according to an embodiment of the present disclosure further includes a battery 91 that supplies power to the antenna. The electrode terminals of the battery 91 are electrically connected to the fourth conductor. With this configuration, the wireless communication device 1090 can operate without being externally supplied with power. The usability of the wireless communication device 1090 installed on a member of the vehicle is therefore improved.

The wireless communication device 1090 according to an embodiment of the present disclosure further includes a sensor 92 and a controller 94. The controller 94 transmits information detected by the sensor 92 as an electromagnetic wave from the antenna. This configuration improves the usability of the wireless communication device 1090 installed on a member of the vehicle.

(Movable Body Equipped with Wireless Communication Device)

Figure 101:
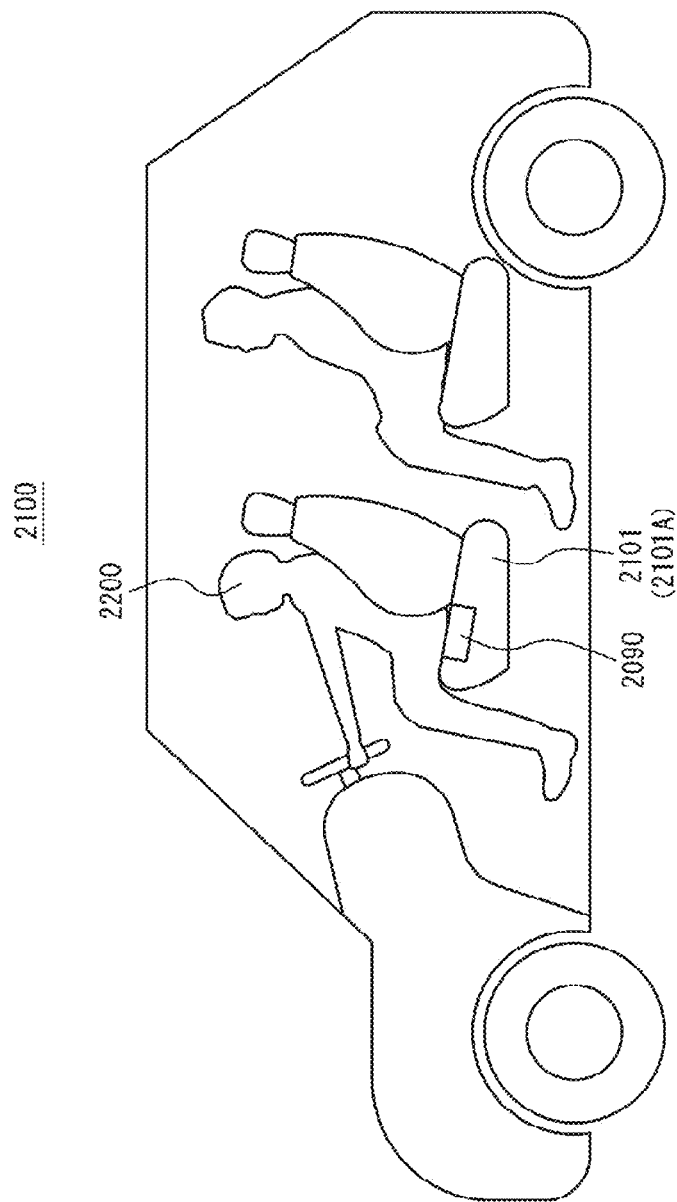

The detail of a movable body 2100 equipped with a wireless communication device 2090 according to an embodiment of the present disclosure will be described below. FIG. 101 is a diagram illustrating an overall configuration of the interior of the movable body 2100 according to an embodiment of the present disclosure. The movable body 2100 may be an automobile. The wireless communication device 2090 including an antenna and a sensor is installed at an interior member of the movable body 2100. For example, the wireless communication device 2090 is installed at a seating portion 2101A of a seat 2101. The wireless communication device 2090 transmits information detected by the sensor to another wireless communication device through the antenna.

The antenna according to an embodiment of the present disclosure has the configuration described above to serve as an artificial magnetic conductor having a ground conductor. With this configuration, the antenna is less affected by a conductive body or a dielectric body in emitting electromagnetic waves even when installed in the vicinity of a conductive body such as metal or a dielectric body such as human body. The wireless communication device 2090 including the antenna therefore may be installed at an interior member of the movable body 2100 placed in the vicinity of a dielectric body such as human body when an occupant 2200 rides in the movable body 2100, and used in various applications described later.

Examples of the movable body 2100 include a vehicle, a ship, and an aircraft. Examples of the vehicle include, but is not limited to, an automobile, a railway vehicle, an industrial vehicle, and a household vehicle. Examples of the vehicle may include an airplane running on a runway. Examples of the automobile include, but is not limited to, a passenger automobile, a truck, a bus, a two-wheeled vehicle, and a trolley bus and may include other vehicles running on a road. Examples of the rail vehicle include, but is not limited to, a locomotive, a freight car, a passenger car, a street car, a guided railway, a ropeway, a cable car, a linear motor car, and a monorail and may include other vehicles that move along a rail(s). Examples of the industrial vehicle include industrial vehicles for agriculture and construction. Examples of the industrial vehicle include, but is not limited to, a forklift and a golf cart. Examples of the industrial vehicle for agriculture include, but is not limited to, a tractor, a cultivator, a transplanter, a binder, a combine harvester, and a lawn mower. Examples of the industrial vehicle for construction include, but is not limited to, a bulldozer, a scraper, a digger, a crane, a dump truck, and a road roller. Examples of the household vehicle include, but is not limited to, a bicycle, a wheelchair, a baby carriage, a cart, and an electric two-wheeled vehicle for upright riding. Examples of the engine of the vehicle include, but is not limited to, an internal combustion engine including a diesel engine, a gasoline engine, and a hydrogen engine, and an electric engine including a motor. Examples of the vehicle include a human-powered vehicle. The classification of the vehicle is not limited to the above. For example, the automobile may include an industrial vehicle that can run on a road, and the same vehicle may fall into a plurality of categories.

Specific examples of the movable body 2100 equipped with the wireless communication device 2090 according to an embodiment of the present disclosure will be described below.

Figure 102:
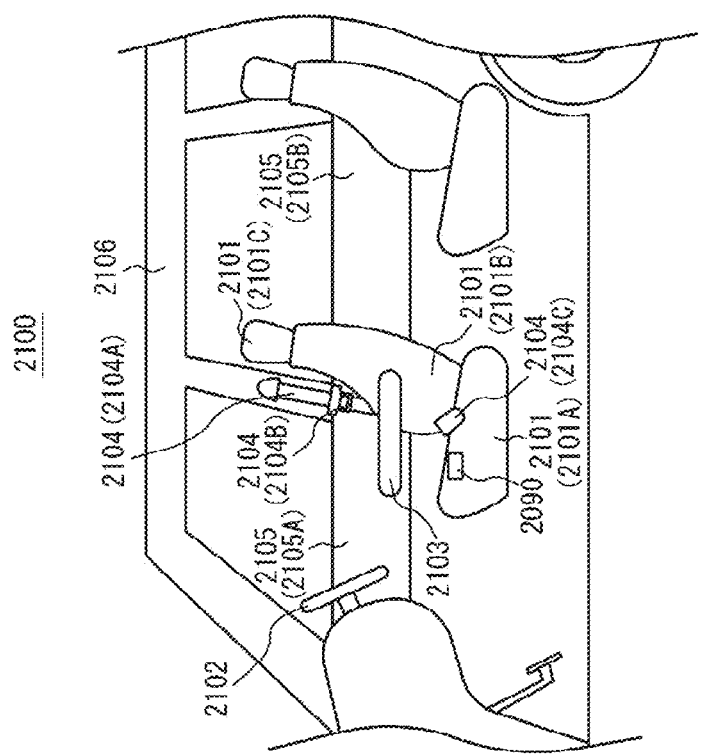

FIG. 102 illustrates interior members of the movable body 2100 on which the wireless communication device 2090 according to the present disclosure may be installed. In FIG. 102, the movable body 2100 is an automobile. Examples of the interior members of the movable body 2100 include a seat 2101 (seating portion 2101A, back portion 2101B, headrest 2101C), a steering wheel 2102, an armrest 2103, a seat belt 2104 (belt 2104A, buckle 2104B, buckle receptacle 2104C), a door 2105 (front door 2105A, rear door 2105B), and a roof 2106.

Figure 103:
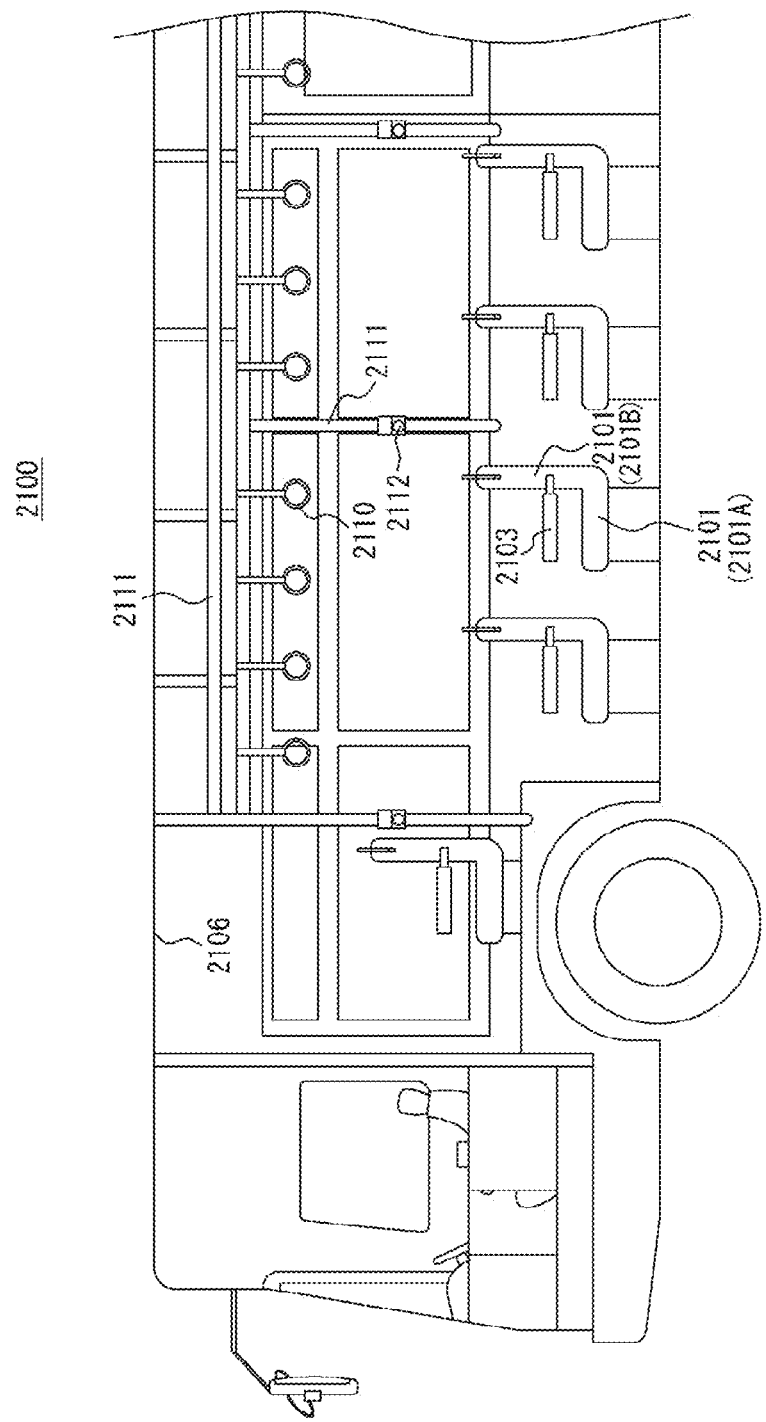

FIG. 103 illustrates interior members of another movable body 2100 on which the wireless communication device 2090 according to the present disclosure may be installed. In FIG. 103, the movable body 2100 is a bus. Examples of the interior members of the movable body 2100 include a seat 2101 (seating portion 2101A, back portion 2101B), an armrest 2103, a roof 2106, a strap 2110, a handrail 2111, and a getting-off button 2112.

The interior members of the movable body 2100 on which the wireless communication device 2090 according to the present disclosure may be installed are not limited to the examples above. Examples of the interior members of the movable body 2100 may include, for example, a member installed and used in the interior of the movable body 2100, such as a child safety seat and a vehicle-mounted display.

The wireless communication device 2090 may be installed at any interior member of the movable body 2100, according to its applications. A plurality of wireless communication devices 2090 and antennas may be installed in one movable body 2100.

Figure 104:
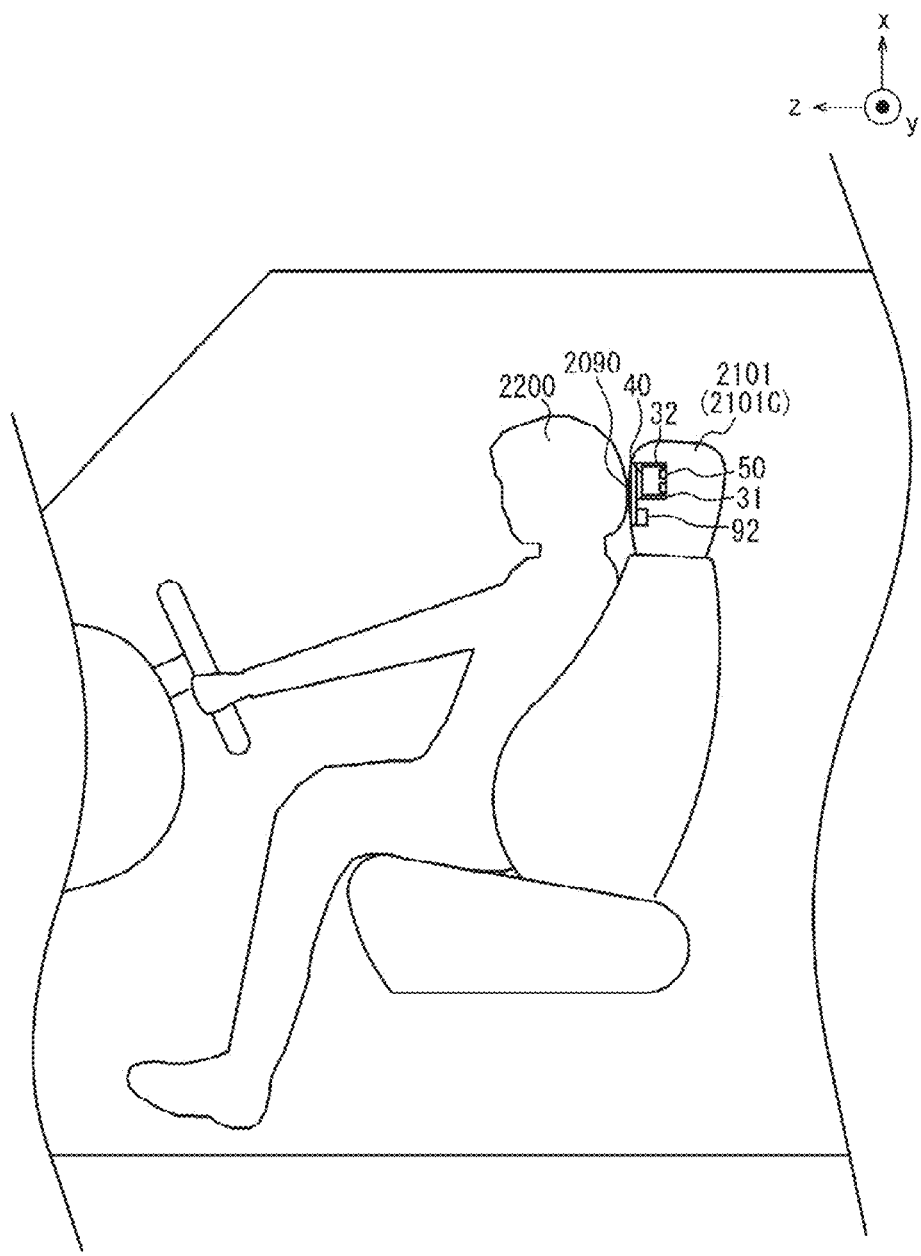

FIG. 104 illustrates the wireless communication device 2090 installed at the seat 2101 that is an example of the interior members of the movable body 2100. The wireless communication device 2090 may be the wireless communication device 90 as described above with reference to FIG. 81. The wireless communication device 2090 includes an antenna. Specifically, the antenna includes a first conductor 31, a second conductor 32, one or more third conductors 40, a fourth conductor 50, and a feeding line. The first conductor 31 and the second conductor 32 are opposed to each other in a first axis (the x direction in FIG. 104). One or more third conductors 40 are positioned between the first conductor 31 and the second conductor 32 and extend in the first axis. The fourth conductor 50 is connected to the first conductor 31 and the second conductor 32 and extends in the first axis. The feeding line is electromagnetically connected to the third conductor. The first conductor 31 and the second conductor 32 are capacitively connected to each other through the third conductor. A surface of the fourth conductor 50 is opposed to the occupant 2200 in a second axis (the z axis in FIG. 104) vertical to the first axis when the occupant 2200 rides in the movable body 2100.

The wireless communication device 2090 may be installed at the seat 2101 such that a surface of the fourth conductor 50 is opposed to the occupant 2200 in the second axis vertical to the first plane when the occupant 2200 is seated on the seat 2101. In FIG. 104, the surface of the fourth conductor 50 of the wireless communication device 2090 arranged at the headrest 2101C of the seat 2101 is opposed to the head of the occupant 2200.

Figure 105A:
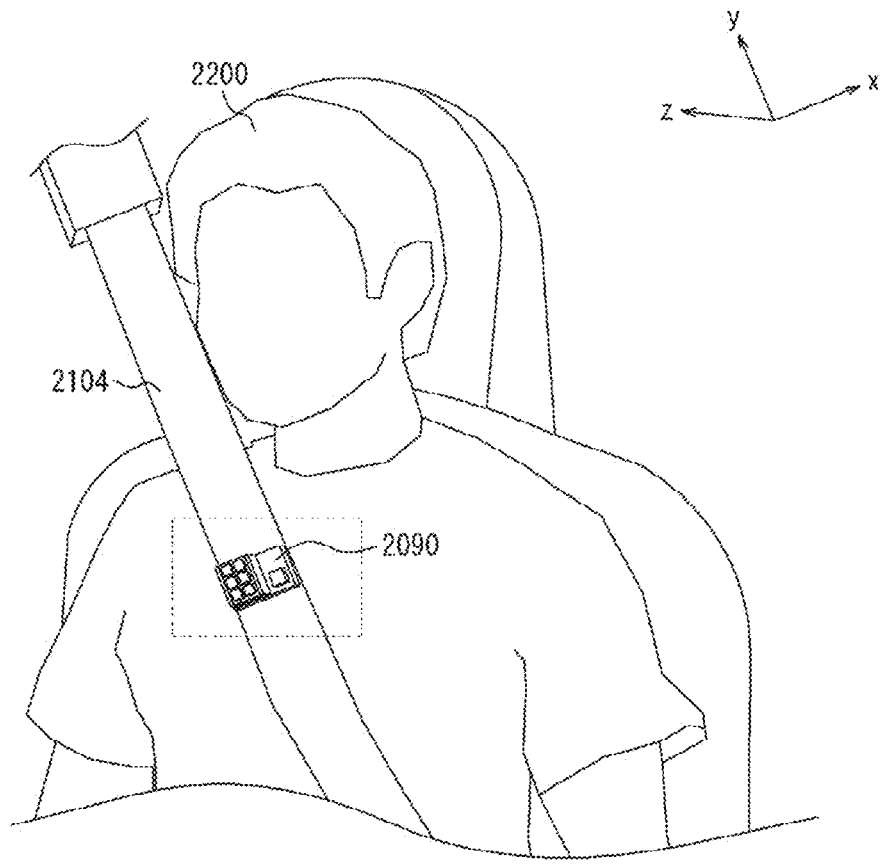
Figure 105B:
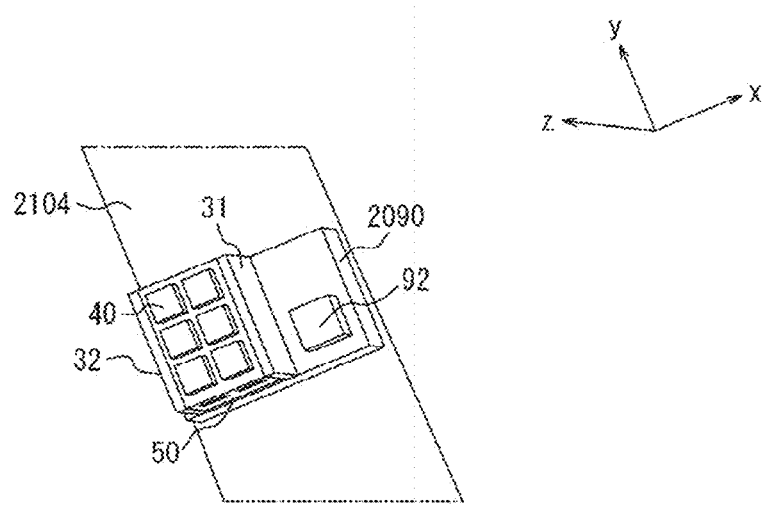

FIG. 105A illustrates a schematic diagram of the seat belt 2104 that is an example of the interior members of the movable body 2100. FIG. 105B illustrates an enlarged view of a portion of the seat belt 2104 at which the wireless communication device 2090 is installed. The wireless communication device 2090 may be installed at the seat belt 2104 such that a surface of the fourth conductor 50 is opposed to the occupant 2200 in the second axis vertical to the first axis when the occupant 2200 wears the seat belt 2104.

Figure 106:
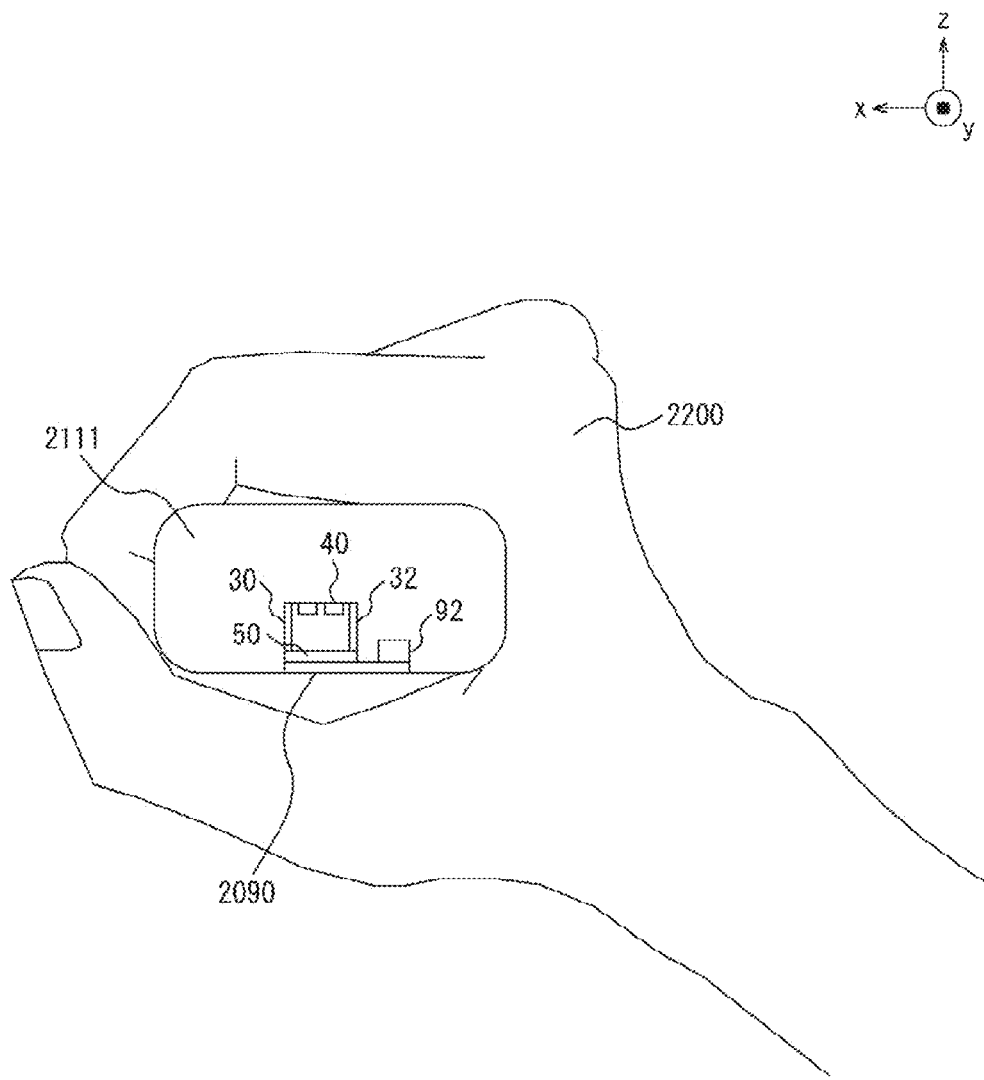

FIG. 106 illustrates a cross section of the handrail 2111 that is an example of the interior members of the movable body 2100. The wireless communication device 2090 is installed at the handrail 2111 such that a surface of the fourth conductor 50 is opposed to the occupant 2200 in the second axis vertical to the first axis when the occupant 2200 grabs the handrail 2111.

Referring to FIG. 104 to FIG. 106, the wireless communication device 2090 may further include a sensor 92 and a controller 94. The controller 94 transmits a signal from the antenna, based on information detected by the sensor 92. The controller 94 of the wireless communication device 2090 acquires information detected by the sensor 92. The controller 94 generates a transmission signal, based on information detected by the sensor 92. Subsequently, the controller 94 transmits the transmission signal from the antenna to another wireless communication device. In generation of a transmission signal, the controller 94 may convert the whole or part of the information detected by the sensor 92 to a transmission signal. The controller 94 may perform predetermined computational processing on the information detected by the sensor 92 and convert the result to a transmission signal. For example, the controller 94 may calculate the degree of tension of the occupant 2200 based on data measured by a humidity sensor installed at the seat belt 2104 and convert the degree of tension to a transmission signal.

Another wireless communication device described above may be installed at any place. Another wireless communication device may be another vehicle-mounted device installed in the vehicle 100 equipped with the wireless communication device 2090. Another wireless communication device may be a mobile device, another vehicle, a radio base station, a satellite, and a traffic light installed outside the vehicle. Another wireless communication device receives a signal transmitted by the wireless communication device 2090. Another wireless communication device may be connected to a server, for example.

Figure 107:
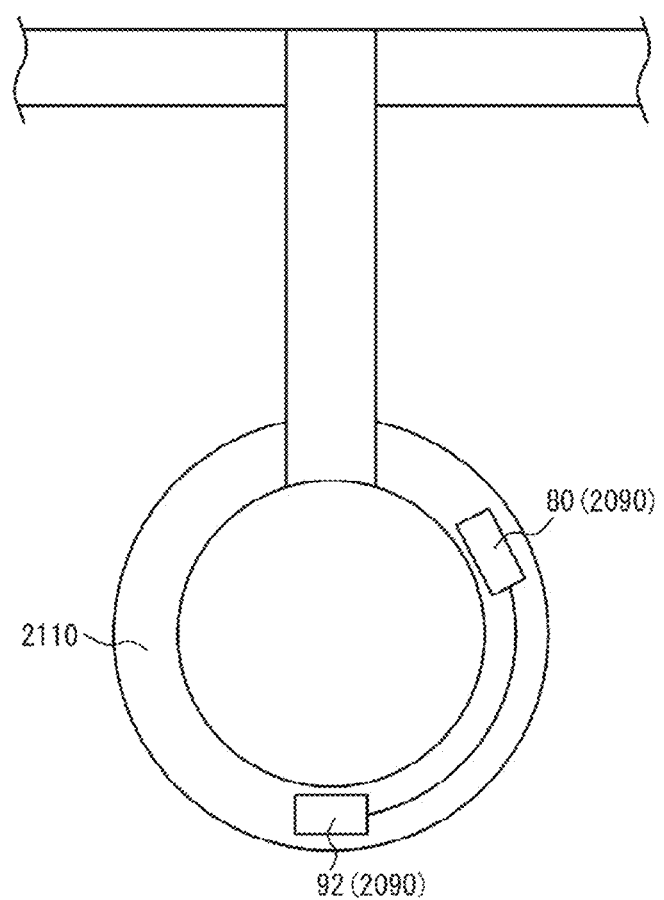

In the wireless communication device 2090, the wireless communication module 80 including an antenna and the sensor 92 may be integrated as illustrated in FIG. 81 or may be separate from each other. In the strap 2110 schematically illustrated in FIG. 107, the wireless communication module 80 including an antenna and the sensor 92 are installed separately. When provided separately, the wireless communication module 80 including an antenna and the sensor 92 may be connected to communicate with each other by wire. The wireless communication module 80 including an antenna and the sensor 92 may be directly installed at the same member as or a member in the vicinity of the wireless communication device 2090. In this way, the wireless communication module 80 including an antenna and the sensor provided separately are installed at optimum positions for individual operations. This configuration improves the usability of information transmitted from the wireless communication device 2090.

The operation of the wireless communication device 2090 installed at an interior member of the movable body 2100 according to an embodiment of the present disclosure will be described below with examples.

The wireless communication device 2090 installed at an interior member of the movable body 2100 according to an embodiment of the present disclosure can be used for grasping a state of the occupant 2200. The information for grasping a state of the occupant 2200 includes information such as speed, acceleration, angular velocity, geomagnetism, temperature, humidity, pressure, image, ultrasound, and sound. The wireless communication device 2090 may include a sensor 92 for acquiring these pieces of information.

For example, as illustrated in FIG. 104, in order to acquire position information of the head of the occupant 2200 that is a driver, the wireless communication device 2090 including an ultrasonic sensor 92 may be installed at the headrest 2101C of the movable body 2100. When position information of the head acquired by the ultrasonic sensor 92 is displaced by a predetermined amount or greater from the position of the head at the start of driving, the wireless communication device 2090 determines that the occupant 2200 is asleep at the wheel. If it is determined that the occupant 2200 is asleep at the wheel, the wireless communication device 2090 transmits information acquired by the ultrasonic sensor 92 to another vehicle-mounted device. When receiving the information, another vehicle-mounted device may turn on a sign for prompting to take a rest on the front panel in front of the driver's seat.

As illustrated in FIG. 105A and FIG. 105B, in order to acquire information on body temperature of the occupant 2200, the wireless communication device 2090 including a temperature sensor 92 may be installed at the seat belt 2104 of the backseat of the movable body 2100. The wireless communication device 2090 may further include a pressure sensor 92 for acquiring information on the heart rate of the occupant 2200. If information on body temperature and information on heart rate of the occupant 2200 acquired by these sensors 92 change by a predetermined amount or greater, the wireless communication device 2090 determines that abnormal change has occurred in physical condition of the occupant 2200 on the backseat. If it is determined that abnormal change has occurred in physical condition of the occupant 2200 on the backseat, the wireless communication device 2090 transmits information acquired by these sensors 92 to another vehicle-mounted device. When receiving the information, another vehicle-mounted device may turn on a sign on the front panel in front of the driver's seat to give a warning that abnormal change has occurred in physical condition of the occupant 2200.

The wireless communication device 2090 including the sensor 92 described above may be installed at an interior member such as a child safety seat installed later in the movable body 2100. This configuration enables communication between the movable body 2100 and the interior member such as a child safety seat without making connection through a wire cable for performing communication.

The wireless communication device 2090 installed at an interior member of the movable body 2100 according to an embodiment of the present disclosure may be used for providing information on the interior of the movable body 2100. For example, in the movable body 2100 that is a bus illustrated in FIG. 103, in order to acquire the seated state of occupants, the wireless communication device 2090 including a pressure sensor 92 may be installed, for example, at the seating portion 2101A, the strap 2110, and the handrail 2111 of the movable body 2100 that is a bus. When a pressure equal to or greater than a predetermined amount is detected by the pressure sensor 92, the wireless communication device 2090 determines that the occupant 2200 is seated or holding. When it is determined that the occupant 2200 is seated or holding, the wireless communication device 2090 transmits information acquired by the pressure sensor 92 to another wireless communication device installed at, for example, a bus stop outside the movable body 2100. The wireless communication device at the bus stop may display a crowdedness state of the bus.

As described above, the antenna according to some embodiments of the present disclosure is installed at an interior member of the movable body 2100. The antenna includes a first conductor 31, a second conductor 32, one or more third conductors 40, a fourth conductor 50, and a feeding line. The first conductor 31 and the second conductor 32 are opposed to each other in a first axis. One or more third conductors 40 are positioned between the first conductor 31 and the second conductor 32 and extend in the first axis. The fourth conductor 50 is connected to the first conductor 31 and the second conductor 32 and extends in the first axis. The feeding line is electromagnetically connected to the third conductor. The first conductor 31 and the second conductor 32 are capacitively connected to each other through the third conductor. A surface of the fourth conductor 50 is opposed to the occupant 2200 in a second axis vertical to the first axis when the occupant 2200 rides in the movable body 2100. The antenna having such a configuration serves as an artificial magnetic conductor having a ground conductor. This configuration reduces radiation of electromagnetic waves emitted from the antenna to the back side of the artificial magnetic conductor. The antenna is less affected by a dielectric body in emitting electromagnetic waves even when installed in the vicinity of a dielectric body such as human body. The intensity of transmission/reception of electromagnetic waves by the antenna is therefore improved, and the quality of communication is improved. In this way, the usability of wireless communication techniques in installation on an interior member of a movable body is improved.

The interior member of the movable body on which the antenna according to an embodiment of the present disclosure is installed is the seat 2101. A surface of the fourth conductor 50 is opposed to the occupant 2200 in the second axis vertical to the first axis when the occupant 2200 is seated on the seat 2101. This configuration improves the intensity of transmission/reception of electromagnetic waves by the antenna also in the vicinity of the occupant 2200 and improves the quality of communication.

The interior member of the movable body on which the antenna according to an embodiment of the present disclosure is installed is the seat belt 2104. A surface of the fourth conductor 50 is opposed to the occupant 2200 in the second axis vertical to the first axis when the occupant 2200 wears the seat belt 2104. This configuration improves the intensity of transmission/reception of electromagnetic waves by the antenna also in the vicinity of the occupant 2200 and improves the quality of communication.

A surface of the fourth conductor 50 of the antenna according to an embodiment of the present disclosure is opposed to the occupant 2200 in the second axis vertical to the first axis when the occupant 2200 of the movable body 2100 grabs the interior member. This configuration improves the intensity of transmission/reception of electromagnetic waves by the antenna also in the vicinity of the occupant 2200 and improves the quality of communication.

The wireless communication device 2090 according to an embodiment of the present disclosure includes the antenna described above, a sensor 92, and a controller 94. The controller 94 transmits information detected by the sensor 92 as an electromagnetic wave from the antenna. This configuration improves the usability of the wireless communication device 2090 installed on a member of the movable body.

(Motorcycle Equipped with Antenna)

The detail of a motorcycle 3001 equipped with an antenna 3060 according to an embodiment of the present disclosure will be described below.

[Configuration Example of Motorcycle]

FIG. 108 is an external view illustrating an embodiment of the motorcycle 3001. FIG. 109 is a diagram illustrating a brake lever 3001Q illustrated in FIG. 108. FIG. 110 is a diagram illustrating a clutch lever 3001R illustrated in FIG. 108.

The motorcycle 3001 runs on gasoline as a fuel. The "motorcycle" in the present disclosure is not limited to the type running on gasoline as a fuel. Examples of the "motorcycle" may include a motorcycle of a type running on hydrogen as a fuel. Examples of the "motorcycle" may include an electric motorcycle.

The motorcycle 3001 may be privately owned. The motorcycle 3001 may be owned by a business operator providing home delivery service of goods. The motorcycle 3001 may be the one used in competitions such as road races. Hereinafter those authorized to use the motorcycle 3001 are referred to as "users". Those who are currently driving the motorcycle 3001 are referred to as "drivers".

The motorcycle 3001 includes a frame and a motorcycle part. The frame of the motorcycle 3001 may be of any conductive material. The motorcycle part of the motorcycle 3001 may be formed of any member according to its application. Hereinafter the frame and the motorcycle part of the motorcycle 3001 may be collectively referred to as "parts of the motorcycle 3001".

The parts of the motorcycle 3001 may include a handle bar 3001A, a fuel tank 3001B, a frame cover 3001C, a rear cowl 3001D, a rear fender 3001E, an identification plate 3001F, a muffler cover 3001G, a crankcase 3001H, and a cylinder head cover 3001J. The parts of the motorcycle 3001 may include a front fender 3001K, a wheel 3001L, a front fork 3001M, a lamp 3001N, a rear lamp 3001P, a brake lever 3001Q, a clutch lever 3001R, and a shift lever 3001S. The parts of the motorcycle 3001 are not limited to these parts. For example, the parts of the motorcycle 3001 may include a brake, a clutch, a transmission, and a wind shield.

The rear cowl 3001D may include metal. The rear cowl 3001D extends in an extending direction D from the frame cover 3001C toward the rear of the motorcycle 3001.

The rear fender 3001E may include metal. The rear fender 3001E extends in an extending direction E dependent on the outer shape of the tire.

The muffler cover 3001G may include metal. The muffler cover 3001G extends in an extending direction G from the exhaust pipe of the engine toward the rear of the motorcycle 3001.

The wheel 3001L includes a rim 3001L-1. The rim 3001L-1 may include metal. The rim 3001L-1 extends in a circumferential direction L.

The front fork 3001M may include metal. The front fork 3001M extends in an extending direction M from the center of the wheel 3001L toward the handle bar 3001A.

The brake lever 3001Q may include metal. As illustrated in FIG. 109, the brake lever 3001Q extends in an extending direction Q. The extending direction Q is a direction from the connecting portion of the brake lever 3001Q and the handle bar 3001A toward the grip held by the driver with his/her hand.

The clutch lever 3001R may include metal. As illustrated in FIG. 110, the clutch lever 3001R extends in an extending direction R. The extending direction R is a direction from the connecting portion of the clutch lever 3001R and the handle bar 3001A toward the grip held by the driver with his/her hand.

The motorcycle 3001 includes at least one first antenna 3060a. The first antenna 3060a has a structure similar to the first antenna 60 described above. The motorcycle 3001 may include a second antenna 70 in addition to the first antenna 3060a or instead of the first antenna 3060a.

The first antenna 3060a may be disposed at any one of the parts of the motorcycle 3001. The first antenna 3060a may be disposed at the part such that the fourth conductor 50 included in the first antenna 3060a is opposed to the part of the motorcycle 3001. The fourth conductor 50 of the first antenna 3060a is opposed to the part of the motorcycle 3001, whereby the direction in which the part is positioned relative to the fourth conductor 50 may be the opposite direction to the direction in which the third conductor 40 is positioned relative to the fourth conductor 50. The effective traveling direction of an electromagnetic wave emitted by the first antenna 3060a may be the direction in which the third conductor 40 is positioned relative to the fourth conductor 50. The fourth conductor 50 of the first antenna 3060a is opposed to the part of the motorcycle 3001, whereby the part of the motorcycle 3001 may be positioned in the opposite direction to the effective traveling direction of an electromagnetic wave emitted by the first antenna 3060a. The part of the motorcycle 3001 is positioned in the opposite direction to the effective traveling direction of the electromagnetic wave from the first antenna 3060a, whereby the radiation efficiency of the first antenna 3060a can be maintained.

For example, as illustrated in FIG. 108, the first antennas 3060a may be disposed at the handle bar 3001A, the fuel tank 3001B, the identification plate 3001F, and the crankcase 3001H such that the fourth conductor 50 is opposed thereto.

When the part of the motorcycle 3001 includes a conductive long-length portion, the first antenna 3060a may be disposed at the part. The first antenna 3060a may be disposed at the long-length portion such that the first axis is along the conductive long-length portion. The long-length portion may include the rear cowl 3001D, the rear fender 3001E, the muffler cover 3001G, the rim 3001L-1 of the wheel 3001L, the front fork 3001M, the brake lever 3001Q, and the clutch lever 3001R. The first antenna 3060a is disposed at a conductive long-length portion included in the part of the motorcycle 3001, whereby the first antenna 3060a and the long-length portion can be electromagnetically coupled. The first antenna 3060a and the long-length portion are electromagnetically coupled, whereby current is induced in the long-length portion when the first antenna 3060a emits electromagnetic waves. The long-length portion can emit electromagnetic waves due to the current induced in the long-length portion. The long-length portion emits the current induced in the long-length portion as an electromagnetic wave, whereby the total radiation efficiency of the first antenna 3060a can be improved when the first antenna 3060a emits an electromagnetic wave. The electromagnetic wave emitted from the long-length portion may be emitted isotropically from the long-length portion.

For example, when the first antenna 3060a is disposed at the rear cowl 3001D as the long-length portion, the first antenna 3060a may be disposed at the rear cowl 3001D such that the first axis is along the extending direction D.

For example, when the first antenna 3060a is disposed at the rear fender 3001E as the long-length portion, the first antenna 3060a may be disposed at the rear fender 3001E such that the first axis is along the extending direction E.

For example, when the first antenna 3060a is disposed at the muffler cover 3001G as the long-length portion, the first antenna 3060a may be disposed at the muffler cover 3001G such that the first axis is along the extending direction G.

For example, when the first antenna 3060a is disposed at the rim 3001L-1 of the wheel 3001L as the long-length portion, the first antenna 3060a may be disposed at the rim 3001L-1 such that the first axis is along the circumferential direction L.

For example, when the first antenna 3060a is disposed at the front fork 3001M as the long-length portion, the first antenna 3060a may be disposed at the front fork 3001M such that the first axis is along the extending direction M.

For example, when the first antenna 3060a is disposed at the brake lever 3001Q as the long-length portion, the first antenna 3060a may be disposed at the brake lever 3001Q such that the first axis is along the extending direction Q, as illustrated in FIG. 109.

For example, when the first antenna 3060a is disposed at the clutch lever 3001R as the long-length portion, the first antenna 3060a may be disposed at the clutch lever 3001R such that the first axis is along the extending direction R, as illustrated in FIG. 110.

The first antenna 3060a may be disposed at a part of the motorcycle 3001 that may be in contact with the driver. The first antenna 3060a may be disposed at a portion less in contact with the driver, of the portions included in a part of the motorcycle 3001 that may be in contact with the driver. As an example, the part of the motorcycle 3001 that may be in contact with the driver may include the handle bar 3001A, the brake lever 3001Q, and the clutch lever 3001R.

For example, when the first antenna 3060a is disposed at the handle bar 3001A, the first antenna 3060a may be disposed at a section less held by the driver with his/her hand, of the sections included in the handle bar 3001A. The section may be an end portion of the handle bar 3001A or may be a base portion of the handle bar 3001A.

For example, when the first antenna 3060a is disposed at the brake lever 3001Q, the first antenna 3060a may be disposed at a section less held by the driver with his/her hand, of the sections included in the brake lever 3001Q. The section may be a portion excluding the grip, of the sections included in the brake lever 3001Q. The section may be an end portion of the brake lever 3001Q or may be a base portion of the brake lever 3001Q.

For example, when the first antenna 3060a is disposed at the clutch lever 3001R, the first antenna 3060a may be disposed at a section less held by the driver with his/her hand, of the sections included in the clutch lever 3001R. The section may be a portion excluding the grip, of the sections included in the clutch lever 3001R. The section may be an end portion of the clutch lever 3001R or may be a base portion of the clutch lever 3001R.

When the first antenna 3060a is disposed, for example, at a part of the motorcycle 3001 that may become relatively hot, the first antenna 3060a may be configured to be adapted to a predetermined frequency band at a predetermined temperature. The predetermined frequency band may be a frequency band used for communication between the first antenna 3060a and the other end of communication. The part of the motorcycle 3001 that may become relatively hot may be a part of which temperature may rise when the motor of the motorcycle 3001 is actuated. For example, the part of the motorcycle 3001 that may become relatively hot may include the crankcase 3001H and the cylinder head cover 3001J. As an example, the predetermined temperature may be 80 degrees. The first antenna 3060a is configured to be adapted to a predetermined frequency band at a predetermined temperature, whereby communication of the motorcycle 3001 can be stabilized even when the temperature of the part provided with the first antenna 3060a becomes relatively high while the motorcycle 3001 is running.

[Example of Arrangement of First Antenna]

FIG. 111 is a diagram illustrating an example of the arrangement of the first antenna 3060a illustrated in FIG. 108. The motorcycle 3001 includes a metal portion 3001X, a first antenna 3060a, a magnet 3100, and a sealing portion 3101.

The metal portion 3001X is any one of the parts illustrated in FIG. 108 that are included in the motorcycle 3001. The metal portion 3001X may be a part exposed to wind, for example, while the motorcycle 3001 is running, of the parts included in the motorcycle 3001. As an example, the metal portion 3001X may include the rear cowl 3001D, the rear fender 3001E, and the front fork 3001M.

The first antenna 3060a is disposed at the metal portion 3001X with the magnet 3100 interposed therebetween. The first antenna 3060a may be attracted to the magnet 3100.

The magnet 3100 may attract the surface of the metal portion 3001X by magnetic force. The magnet 3100 may attract the fourth conductor 50 of the first antenna 3060a by magnetic force. The magnet 3100 may have any shape according to the shape of the first antenna 3060a. For example, the first surface integral of the magnet 3100 may be equivalent to the first surface integral of the fourth conductor 50 of the first antenna 3060a.

In this way, the magnet 3100 can affix the first antenna 3060a to the metal portion 3001X. The first antenna 3060a is affixed to the metal portion 3001X by the magnet 3100, whereby the first antenna 3060a can be easily detached from the metal portion 3001X, for example, in maintenance of the motorcycle 3001.

The sealing portion 3101 may be any synthetic resin material. The surface of the sealing portion 3101 may have a smooth shape. The sealing portion 3101 covers the first antenna 3060a and the magnet 3100. The sealing portion 3101 covers the first antenna 3060a and the like, thereby reducing the air drag on the first antenna 3060a and the like even when the metal portion 3001X is a part exposed to wind, such as the rear cowl 3001D.

The motorcycle 3001 may include a double-sided tape instead of the magnet 3100, depending on the applications of the first antenna 3060a. The first antenna 3060a is disposed at the metal portion 3001X using a double-sided tape, whereby the first antenna 3060a can be secured to the metal portion 3001X more firmly.

[Another Example of Arrangement of First Antenna]

FIG. 112 is a diagram illustrating another example of the arrangement of the first antenna 3060a illustrated in FIG. 108. The motorcycle 3001 includes a metal portion 3001X, a first antenna 3060a, a magnet 3100a, a sealing portion 3101, and a member 3102. The motorcycle 3001 may include the magnet 3100 illustrated in FIG. 111, in addition to the magnet 3100a. The motorcycle 3001 may include a double-sided tape instead of the magnet 3100a, depending on the applications of the first antenna 3060a.

The first antenna 3060a is disposed at the metal portion 3001X. The side surfaces of the first antenna 3060a may be attracted to the magnet 3100a. The first antenna 3060a may be secured to the metal portion 3001X by the magnet 3100a.

The magnet 3100a surrounds the periphery of the first antenna 3060a. The magnet 3100a may be shaped like a ring. The magnet 3100a may have a hole at its center in which the first antenna 3060a can be fitted. The magnet 3100a may attract the first antenna 3060a by magnetic force. The magnet 3100a may attract the surface of the metal portion 3001X by magnetic force. The magnet 3100a may have any shape according to the shape of the first antenna 3060a.

The member 3102 may be any member. Examples of the member 3102 may include an element included in a sensor device 3110 described later, an element included in a communication device 3120 described later, an element included in a display device 3130 described later, an element included in a detection device 3140 described later, and an element included in a control device 3150 described later.

The sealing portion 3101 covers the first antenna 3060a and the magnets 3100a and 3100b. The sealing portion 3101 covers a portion of the member 3102. The sealing portion 3101 covers the first antenna 3060a and the like, whereby the air drag on the first antenna 3060a and the like can be reduced even when the metal portion 3001X is a part exposed to wind, such as the rear cowl 3001D.

[Yet Another Example of Arrangement of First Antenna]

FIG. 113 is a diagram illustrating yet another example of the arrangement of the first antenna 3060a illustrated in FIG. 108. The motorcycle 3001 includes a metal portion 3001Y, a first antenna 3060a, and a shock absorber 3103. The motorcycle 3001 may include a sealing portion 3101 in addition to these elements.

The metal portion 3001Y is any of the parts illustrated in FIG. 108 that are included in the motorcycle 3001. The metal portion 3001Y may be, for example, a part that may be vibrated by actuation of the motor of the motorcycle 3001, of the parts included in the motorcycle 3001. For example, the metal portion 3001Y may be a part that may be vibrated at 10 G or greater. Examples of the metal portion 3001Y may include the muffler cover 3001G, the crankcase 3001H, and the cylinder head cover 3001J.

The first antenna 3060a is disposed at the metal portion 3001Y with the shock absorber 3103 interposed therebetween.

The shock absorber 3103 may be formed with a sponge material. The sponge material may have adhesive surfaces on both sides thereof. One adhesive surface of the shock absorber 3103 may affix the shock absorber 3103 to the metal portion 3001Y. The other adhesive surface of the shock absorber 3103 may affix the shock absorber 3103 to the first antenna 3060a.

The shock absorber 3103 is positioned between the metal portion 3001Y and the first antenna 3060a. The shock absorber 3103 is positioned between the metal portion 3001Y and the first antenna 3060a, whereby, even when the metal portion 3001Y is a part that may be vibrated, such as the muffler cover 3001G, vibration from the part to the first antenna 3060a can be reduced. Since vibration from the part to the first antenna 3060a is reduced, the probability that the first antenna 3060a is broken is reduced.

[Yet Another Example of Arrangement of First Antenna]

FIG. 114 is a diagram illustrating yet another example of the arrangement of the first antenna 3060a illustrated in FIG. 108. The motorcycle 3001 includes a part 3001Z-1, a part 3001Z-2, a first antenna 3060a, a member 3102, and an elastic member 3104.

The part 3001Z-1 and the part 3001Z-2 are any of the parts illustrated in FIG. 108 that are included in the motorcycle 3001.

One of the part 3001Z-1 and the part 3001Z-2 may be, for example, a part that may be vibrated by actuation of the motor of the motorcycle 3001, of the parts included in the motorcycle 3001. For example, one of the part 3001Z-1 and the part 3001Z-2 may be a part that may be vibrated at 10 G or greater. Examples of one of the part 3001Z-1 and the part 3001Z-2 may include the muffler cover 3001G, the crankcase 3001H, and the cylinder head cover 3001J.

The other of the part 3001Z-1 and the part 3001Z-2 may be a part that is relatively less vibrated, of the parts included in the motorcycle 3001. Examples of the other of the part 3001Z-1 and the part 3001Z-2 may include the rear cowl 3001D, the rear fender 3001E, the identification plate 3001F, the front fender 3001K, the lamp 3001N, the rear lamp 3001P, and the front fork 3001M.

The first antenna 3060a is disposed at the part 3001Z-1. A first feeding line 3061 included in the first antenna 3060a includes a mounting point 3061a. The member 3102 is disposed at the part 3001Z-2.

The elastic member 3104 electrically connects the mounting point 3061a to the member 3102. The elastic member 3104 may be formed to include a spring member and a coil member.

In the part 3001Z-1 and the part 3001Z-2, when one is vibrated and the other is relatively not vibrated, the vibration difference between the part 3001Z-1 and the part 3001Z-2 may be large. Disposing the elastic member 3104 between the mounting point 3061a and the member 3102 can reduce vibration to the first feeding line 3061. Since the vibration to the first feeding line 3061 is reduced, for example, the probability that the first feeding line 3061 is disconnected can be reduced.

[Example of Functions of Motorcycle]

FIG. 115 is a functional block diagram of an example of the motorcycle 3001 illustrated in FIG. 108. The motorcycle 3001 can communicate with an information processing device 3003 through a network 3002. The motorcycle 3001 can directly communicate with a movable body 3004. The network 3002 may include a wireless network. A part of the network 3002 may include a wired network.

The motorcycle 3001 includes a sensor device 3110 and a communication device 3120. The sensor device 3110 and the communication device 3120 may be configured integrally. For example, the sensor device 3110 and the communication device 3120 may be configured integrally by integrating a sensor 3112 of the sensor device 3110 into the communication device 3120.

The information processing device 3003 may be managed, for example, by any business operator. For example, when a business operator providing home delivery service of goods owns the motorcycle 3001, the information processing device 3003 may be managed by the business operator providing home delivery service. For example, when the motorcycle 3001 is used in a competition such as a road race, the information processing device 3003 may be managed by the organizer of the competition. For example, when the owner of the motorcycle 3001 has a contract with an insurance company, the information processing device 3003 may be managed by the insurance company.

The information processing device 3003 may be configured with a computer system and other hardware that can execute computer program instructions. The computer and other hardware may include a general-purpose computer, a personal computer (PC), a dedicated computer, a workstation, a personal communications system (PCS), a cellular phone, a mobile phone with a data processing function, a radio frequency identification (RFID) receiver, a game machine, an electronic notepad, a laptop computer, a Global Positioning System (GPS) receiver, or other programmable data processing devices.

The movable body 3004 is a movable body present in a communication range of the motorcycle 3001, among movable bodies. Examples of the movable body 3004 include a vehicle, a ship, and an aircraft. For example, the movable body 3004 may be a vehicle that runs in the communication area of the motorcycle 3001. Examples of the "vehicle" in the present disclosure include, but is not limited to, an automobile, a railway vehicle, an industrial vehicle, and a household vehicle. Examples of the vehicle may include an airplane running on a runway. Examples of the automobile include, but is not limited to, a passenger automobile, a truck, a bus, a two-wheeled vehicle, and a trolley bus and may include other vehicles running on a road. Examples of the rail vehicle include, but is not limited to, a locomotive, a freight car, a passenger car, a street car, a guided railway, a ropeway, a cable car, a linear motor car, and a monorail and may include other vehicles that move along a rail(s). Examples of the industrial vehicle include industrial vehicles for agriculture and construction. Examples of the industrial vehicle include, but is not limited to, a forklift and a golf cart. Examples of the industrial vehicle for agriculture include, but is not limited to, a tractor, a cultivator, a transplanter, a binder, a combine harvester, and a lawn mower. Examples of the industrial vehicle for construction include, but is not limited to, a bulldozer, a scraper, a digger, a crane, a dump truck, and a road roller. Examples of the household vehicle include, but is not limited to, a bicycle, a wheelchair, a baby carriage, a cart, and an electric two-wheeled vehicle for upright-riding. Examples of the engine of the vehicle include, but is not limited to, an internal combustion engine including a diesel engine, a gasoline engine, and a hydrogen engine, and an electric engine including a motor. Examples of the vehicle includes a human-powered vehicle. The classification of the vehicle is not limited to the above. For example, the automobile may include an industrial vehicle that can run on a road, and the same vehicle may fall into a plurality of categories.

The sensor device 3110 can directly communicate with the communication device 3120. The sensor device 3110 and the communication device 3120 may communicate by wire or may communicate wirelessly. Wireless communication may be based on near field communication standards. Examples of the near field communication standards may include WiFi (registered trademark), Bluetooth (registered trademark), and a wireless local area network (LAN).

The sensor device 3110 includes a battery 3111, a sensor 3112, a memory 3113, and a controller 3114. For example, when the sensor device 3110 and the communication device 3120 wirelessly communicate, the sensor device 3110 may have at least one first antenna 3060b. The sensor device 3110 may have the first antenna 3060b on the outside or the outer surface of the sensor device 3110. When the sensor device 3110 does not have a battery 3111, the sensor device 3110 may operate on power supplied from another battery provided in the motorcycle 3001.

The first antenna 3060b may be the first antenna 3060a described above independent of the first antenna 3060c of the communication device 3120.

The first antenna 3060b may be configured as appropriate in accordance with the frequency band used in communication between the sensor device 3110 and another device. In other words, each of the first conductor 31, the second conductor 32, the third conductor 40, and the fourth conductor 50 included in the first antenna 3060b may be configured as appropriate in accordance with the frequency band used in communication between the sensor device 3110 and another device. For example, the first antenna 3060b may be configured in accordance with the frequency band used in near field communication between the sensor device 3110 and the communication device 3120. For example, the first antenna 3060b may be configured in accordance with the frequency band used in communication between the sensor device 3110 and GPS satellites.

The location of the first antenna 3060b may be selected as appropriate from among the locations described above with reference to FIG. 108, depending on the other end of communication of the sensor device 3110 or depending on data acquired by the sensor 3112.

For example, when the other end of communication of the sensor device 3110 is a GPS satellite, the location of the first antenna 3060b may be the fuel tank 3001B illustrated in FIG. 108. The first antenna 3060b is disposed at the fuel tank 3001B illustrated in FIG. 108, whereby the first antenna 3060b easily receives electromagnetic waves from GPS satellites.

An example of the location of the first antenna 3060b depending on data acquired by the sensor 3112 will be described later.

The first antenna 3060b may receive an electromagnetic wave from another device as a reception signal. The reception signal received by the first antenna 3060b is transmitted to the controller 3114 via the first feeding line 3061 of the first antenna 3060b. Power is supplied to the first feeding line 3061 of the first antenna 3060b, whereby the first antenna 3060b can emit an electromagnetic wave as a transmission signal to another device.

The battery 3111 may supply power to at least one of the first antenna 3060b, the sensor 3112, the memory 3113, and the controller 3114. For example, the battery 3111 may include at least one of a primary battery and a secondary battery. The negative electrode of the battery 3111 is electrically connected to the fourth conductor 50 of the first antenna 3060b.

The sensor 3112 may be configured as appropriate according to the applications of the sensor device 3110. The sensor 3112 may include at least one of a speed sensor, an acceleration sensor, a gyro sensor, a rotation angle sensor, a pressure sensor, a geomagnetic sensor, a temperature sensor, a humidity sensor, an atmospheric pressure sensor, an illuminance sensor, a float, a camera, and a biometric sensor. As previously mentioned, the location of the first antenna 3060b may be selected as appropriate from among the locations described above with reference to FIG. 108, depending on data measured by the sensor 3112.

For example, when the sensor 3112 includes a speed sensor, the sensor 3112 may measure the speed of the motorcycle 3001. The sensor 3112 outputs the measured speed of the motorcycle 3001 to the controller 3114. In this example, the sensor device 3110 including the sensor 3112 may be disposed at the rear cowl 3001D, the rear fender 3001E, the muffler cover 3001G, or the rear lamp 3001P illustrated in FIG. 108. The location of the first antenna 3060b may be the rear cowl 3001D, the rear fender 3001E, the muffler cover 3001G, or the rear lamp 3001P.

For example, when the sensor 3112 includes an acceleration sensor, the sensor 3112 may measure the acceleration exerted on the motorcycle 3001. The sensor 3112 outputs the measured acceleration to the controller 3114. In this example, the sensor device 3110 including the sensor 3112 may be disposed at the rear cowl 3001D, the rear fender 3001E, the muffler cover 3001G, or the rear lamp 3001P illustrated in FIG. 108. In this example, the location of the first antenna 3060b may be the rear cowl 3001D, the rear fender 3001E, the muffler cover 3001G, or the rear lamp 3001P.

For example, when the sensor 3112 includes a gyro sensor, the sensor 3112 may measure the angular velocity of the motorcycle 3001. The sensor 3112 outputs the measured angular velocity to the controller 3114. In this example, the sensor device 3110 including the sensor 3112 may be disposed at the rear cowl 3001D, the rear fender 3001E, the muffler cover 3001G, or the rear lamp 3001P illustrated in FIG. 108. In this example, the location of the first antenna 3060b may be the rear cowl 3001D, the rear fender 3001E, the muffler cover 3001G, or the rear lamp 3001P.

For example, when the sensor 3112 includes a rotation angle sensor, the sensor 3112 may measure the rotational speed of the wheel 3001L of the motorcycle 3001. In this example, the sensor device 3110 including the sensor 3112 may be disposed at the wheel 3001L illustrated in FIG. 108. The sensor 3112 outputs the measured rotational speed to the controller 3114. In this example, the location of the first antenna 3060*b* may be the rim 3001L-1 of the wheel 3001L.

For example, when the sensor 3112 includes a pressure sensor, the sensor 3112 may detect a pressure exerted on the brake lever 3001Q illustrated in FIG. 108. The driver may hold the brake lever 3001Q with his/her hand to exert a pressure on the brake lever. In this example, the sensor device 3110 including the sensor 3112 may be disposed at the brake lever 3001Q. The sensor 3112 outputs the detected pressure to the controller 3114. In this example, the location of the first antenna 3060*b* may be the brake lever 3001Q.

For example, when the sensor 3112 includes a pressure sensor, the sensor 3112 may detect a pressure exerted on the clutch lever 3001R illustrated in FIG. 108. The driver may hold the clutch lever 3001R with his/her hand to exert a pressure on the clutch lever 3001R. In this example, the sensor device 3110 including the sensor 3112 may be disposed at the clutch lever 3001R. The sensor 3112 outputs the measured pressure to the controller 3114. In this example, the location of the first antenna 3060*b* may be the clutch lever 3001R.

For example, when the sensor 3112 includes a pressure sensor, the sensor 3112 may detect a pressure exerted on the shift lever 3001S illustrated in FIG. 108. The driver may step on the shift lever 3001S with his/her foot to exert a pressure on the shift lever 3001S. In this example, the sensor device 3110 including the sensor 3112 may be disposed at the shift lever 3001S. The sensor 3112 outputs the detected pressure to the controller 3114. In this example, the location of the first antenna 3060*b* may be the shift lever 3001S.

For example, when the sensor 3112 includes a geomagnetic sensor, the sensor 3112 may measure the magnitude and the direction of magnetism around the motorcycle 3001. In this example, the sensor device 3110 including the sensor 3112 may be disposed at any of the parts of the motorcycle 3001. The sensor 3112 outputs the measured magnitude and direction of magnetism to the controller 3114. In this example, the location of the first antenna 3060*b* may be any of the parts of the motorcycle 3001 in the vicinity of the sensor device 3110.

For example, when the sensor 3112 includes a temperature sensor, the sensor 3112 may measure the temperature around the motorcycle 3001. In this example, the sensor device 3110 including the sensor 3112 may be disposed at any of the parts of the motorcycle 3001. The sensor 3112 outputs the measured temperature to the controller 3114. In this example, the location of the first antenna 3060*b* may be any of the parts of the motorcycle 3001 in the vicinity of the sensor device 3110.

For example, when the sensor 3112 includes a temperature sensor, the sensor 3112 may measure the temperature of coolant of the motor of the motorcycle 3001. In this example, the sensor device 3110 including the sensor 3112 may be disposed near the container containing coolant. The sensor 3112 outputs the measured temperature to the controller 3114. In this example, the location of the first antenna 3060*b* may be any of the parts of the motorcycle 3001 near the container containing coolant.

For example, when the sensor 3112 includes a temperature sensor, the sensor 3112 may measure the oil temperature of the motor of the motorcycle 3001. In this example, the sensor device 3110 including the sensor 3112 may be disposed near the container containing oil of the motor. The sensor 3112 outputs the measured temperature to the controller 3114. In this example, the location of the first antenna 3060*b* may be any of the parts of the motorcycle 3001 near the container containing oil of the motor.

For example, when the sensor 3112 includes a humidity sensor, the sensor 3112 may measure the humidity around the motorcycle 3001. In this example, the sensor device 3110 including the sensor 3112 may be disposed at any of the parts of the motorcycle 3001. The sensor 3112 outputs the measured humidity to the controller 3114. In this example, the location of the first antenna 3060*b* may be any of the parts of the motorcycle 3001 in the vicinity of the sensor device 3110.

For example, when the sensor 3112 includes an atmospheric pressure sensor, the sensor 3112 measures the atmospheric pressure around the motorcycle 3001. In this example, the sensor device 3110 including the sensor 3112 may be disposed at any of the parts of the motorcycle 3001. The sensor 3112 outputs the measured atmospheric pressure to the controller 3114. In this example, the location of the first antenna 3060*b* may be any of the parts of the motorcycle 3001 in the vicinity of the sensor device 3110.

For example, when the sensor 3112 includes an illuminance sensor, the sensor 3112 may measure the illuminance around the motorcycle 3001. In this example, the sensor device 3110 including the sensor 3112 may be disposed at any of the parts of the motorcycle 3001. The sensor 3112 outputs the measured illuminance to the controller 3114. In this example, the location of the first antenna 3060*b* may be any of the parts of the motorcycle 3001 in the vicinity of the sensor device 3110.

For example, when the sensor 3112 includes a float, the sensor 3112 may measure the fuel level of the motor of the motorcycle 3001. In this example, the sensor device 3110 including the sensor 3112 may be disposed inside the fuel tank 3001B illustrated in FIG. 108. The sensor 3112 outputs the measured fuel level to the controller 3114. In this example, the location of the first antenna 3060*b* may be the fuel tank 3001B.

For example, when the sensor 3112 includes a float, the sensor 3112 may measure the lubricating oil level of the motor of the motorcycle 3001. In this example, the sensor device 3110 including the sensor 3112 may be disposed inside or near the container containing lubricating oil. The sensor 3112 outputs the measured lubricating oil level to the controller 3114. In this example, the location of the first antenna 3060*b* may be the fuel tank 3001B illustrated in FIG. 108.

For example, when the sensor 3112 includes a camera, the sensor 3112 captures (measures) a facial image of the driver. In this example, the sensor device 3110 including the sensor 3112 may be disposed at the handle bar 3001A or the fuel tank 3001B illustrated in FIG. 108. The sensor 3112 outputs the measured facial image of the driver to the controller 3114. In this example, the location of the first antenna 3060*b* may be the handle bar 3001A or the fuel tank 3001B.

For example, when the sensor 3112 includes a biometric sensor, the sensor 3112 measures at least one of the heart rate and the pulse rate of the driver. The biometric sensor may be a microwave sensor. In this example, the sensor device 3110 including the sensor 3112 may be disposed at the handle bar 3001A, or the fuel tank 3001B, or the front fork 3001M illustrated in FIG. 108. The sensor 3112 outputs the measured heart rate and pulse rate to the controller 3114. In this example, the location of the first antenna 3060*b* may be the handle bar 3001A, the fuel tank 3001B, or the front fork 3001M.

Referring to FIG. 115 again, the memory 3113 may be configured with, for example, a semiconductor memory. The memory 3113 may function as a work memory for the controller 3114. The memory 3113 may be included in the controller 3114.

The controller 3114 may include, for example, a processor. The controller 3114 may include one or more processors. The processor may include a general-purpose processor that reads a specific computer program to execute a specific function and a dedicated processor dedicated to a certain process. The dedicated processor may include an application specific IC. The processor may include a programmable logic device. The PLD may include an FPGA. The controller 3114 may be one of a SoC and a SiP in which one or more processors cooperate. The controller 3114 may store, for example, a variety of information or a computer program for operating each component of the sensor device 3110 in the memory 3113.

The controller 3114 acquires data on the motorcycle 3001 from the sensor 3112. The data on the motorcycle 3001 may include the speed of the motorcycle 3001, the acceleration exerted on the motorcycle 3001, the angular velocity of the motorcycle 3001, the magnetism around the motorcycle 3001, the temperature around the motorcycle 3001, the humidity around the motorcycle 3001, the atmospheric pressure around the motorcycle 3001, and the illuminance around the motorcycle 3001. The data on the motorcycle 3001 may include a pressure exerted on the brake lever 3001Q, a pressure exerted on the clutch lever 3001R, and a pressure exerted on the shift lever 3001S. The data on the motorcycle 3001 may include the fuel level, the temperature of coolant of the motor, the oil temperature of the motor, and the lubricating oil level of the motor.

The controller 3114 may acquire biometric data of the driver from the sensor 3112. The biometric data of driver may include facial image, heart rate, and pulse rate.

When the first antenna 3060b is configured to communicate with GPS satellites, the controller 3114 may acquire position information of the motorcycle 3001 based on a GPS signal received by the first antenna 3060b.

The controller 3114 generates a transmission signal corresponding to data on the motorcycle 3001. The controller 3114 may generate a transmission signal corresponding to biometric data of the driver. The controller 3114 may generate a transmission signal corresponding to position information of the motorcycle 3001. This transmission signal may be transmitted from the sensor device 3110 to the communication device 3120. The controller 3114 may generate a transmission signal in accordance with the communication standards between the sensor device 3110 and the communication device 3120. The controller 3114 supplies power corresponding to the generated transmission signal to the first feeding line 3061 of the first antenna 3060b. The controller 3114 transmits the transmission signal as an electromagnetic wave to the communication device 3120 by supplying power corresponding to the transmission signal to the first feeding line 3061 of the first antenna 3060b.

The communication device 3120 can communicate with the information processing device 3003 through the network 3002. The communication standards between the communication device 3120 and the information processing device 3003 may be long distance communication standards. The long distance communication standards may include 2nd Generation (2G), 3rd Generation (3G), 4th Generation (4G), Long Term Evolution (LTE), Worldwide Interoperability for Microwave Access (WiMAX), and Personal Handy-phone System (PHS). The communication device 3120 can directly communicate with the movable body 3004. The communication standards between the communication device 3120 and the movable body 3004 may be near field communication standards. The near field communication standards may include WiFi (registered trademark), Bluetooth (registered trademark), and a wireless LAN.

The communication device 3120 has at least one first antenna 3060c, a battery 3121, a memory 3123, and a controller 3124. The communication device 3120 may have the first antenna 3060c on the outside or the outer surface of the communication device 3120. When the communication device 3120 does not have a battery 3121, the communication device 3120 may operate on power supplied from another battery provided in the motorcycle 3001.

The first antenna 3060c may be the first antenna 3060a described above independent of the first antenna 3060b of the sensor device 3110.

The first antenna 3060c may be configured as appropriate in accordance with the frequency band used in communication between the communication device 3120 and another device. In other words, each of the first conductor 31, the second conductor 32, the third conductor 40, and the fourth conductor 50 included in the first antenna 3060c may be configured as appropriate in accordance with the frequency band used in communication between the communication device 3120 and another device.

The location of the first antenna 3060c may be selected as appropriate from among the locations described above with reference to FIG. 108, depending on the other end of communication of the communication device 3120.

For example, when the other end of communication is the information processing device 3003 and the movable body 3004, the location of the first antenna 3060c may be the rear fender 3001E, the identification plate 3001F, the front fender 3001K, the lamp 3001N, the front fork 3001M, and the rear lamp 3001P illustrated in FIG. 108. The first antenna 3060c is disposed at the rear fender 3001E, the identification plate 3001F, or the rear lamp 3001P, whereby the electromagnetic wave from the first antenna 3060c can be easily emitted toward the back of the motorcycle 3001. The first antenna 3060c is disposed at the front fork 3001M or the lamp 3001N, whereby the electromagnetic wave from the first antenna 3060c can be easily emitted toward the front of the motorcycle 3001. Since the electromagnetic wave from the first antenna 3060c can be easily emitted toward the front or the back of the motorcycle 3001, communication of the communication device 3120 with the information processing device 3003 and the movable body 3004 can be stabilized.

For example, when the other end of communication is a GPS satellite, the location of the first antenna 3060c may be the fuel tank 3001B illustrated in FIG. 108. The first antenna 3060c is disposed at the fuel tank 3001B illustrated in FIG. 108, whereby the first antenna 3060c easily receives electromagnetic waves from GPS satellites.

The first antenna 3060c may receive an electromagnetic wave from another device as a reception signal. The reception signal received by the first antenna 3060c is transmitted to the controller 3124 via the first feeding line 3061 of the first antenna 3060c. Power is supplied to the first feeding line 3061 of the first antenna 3060c, whereby the first antenna 3060c can emit an electromagnetic wave as a transmission signal to another device.

The battery 3121 may supply power to at least one of the first antenna 3060c, the memory 3123, and the controller 3124. For example, the battery 3121 may include at least one of a primary battery and a secondary battery. The negative electrode of the battery 3121 is electrically connected to the fourth conductor 50 of the first antenna 3060c.

The memory 3123 may be configured with, for example, a semiconductor memory. The memory 3123 may function as a work memory for the controller 3124. The memory 3123 may be included in the controller 3124. The memory 3123 may store identification information of the motorcycle 3001 and biometric data of the user. The identification information of the motorcycle 3001 may be information unique to the motorcycle 3001. The identification information of the motorcycle 3001 may be configured with a combination of numerals and/or characters.

The controller 3124 may include, for example, a processor. The processor may include a general-purpose processor that reads a specific computer program to execute a specific function and a dedicated processor dedicated to a certain process. The dedicated processor may include an application specific IC. The processor may include a programmable logic device. The PLD may include an FPGA. The controller 3124 may include one or more processors. The controller 3124 may be one of a SoC and a SiP in which one or more processors cooperate. The controller 3124 may store, for example, a variety of information or a computer program for operating each component of the communication device 3120 in the memory 3123. The controller 3124 may store the identification information of the motorcycle 3001 acquired from, for example, the external information processing device 3003, in the memory 3123. The controller 3124 may store the biometric data of the user acquired from, for example, the external information processing device 3003, in the memory 3123.

The controller 3124 may acquire a reception signal from the sensor device 3110, for example, via the first feeding line 3061 of the first antenna 3060c. The reception signal may include data on the motorcycle 3001 and biometric data of the driver measured by the sensor device 3110. When the sensor device 3110 is configured to measure position information of the motorcycle 3001, the reception signal may include position information of the motorcycle 3001.

The controller 3124 may detect the driving state of the motorcycle 3001, based on data on the motorcycle 3001. The driving state of the motorcycle 3001 may include the distance traveled of the motorcycle 3001, the turning direction of the motorcycle 3001, a rollover of the motorcycle 3001 during running, and a halt during driving of the motorcycle 3001.

For example, the controller 3124 may calculate the distance traveled of the motorcycle 3001, based on the acceleration included in data on the motorcycle 3001.

For example, the controller 3124 may detect the turning direction of the motorcycle 3001, based on the speed and the angular velocity of the motorcycle 3001 included in data on the motorcycle 3001.

For example, the controller 3124 may detect a rollover of the motorcycle 3001 during running, based on the speed and the angular velocity of the motorcycle 3001 included in data on the motorcycle 3001. If the motorcycle 3001 rolls over during running, the motorcycle 3001 is inclined and therefore the angular velocity equal to or greater than a predetermined value can be measured.

For example, the controller 3124 may detect a halt of the motorcycle 3001 during driving, based on the speed and the angular velocity of the motorcycle 3001 included in data on the motorcycle 3001. The driver puts his/her foot on the ground, with the motorcycle 3001 leaned, when halting the motorcycle 3001 during driving of the motorcycle 3001. When the driver puts his/her foot on the ground with the motorcycle 3001 leaned, the speed lower than a predetermined speed may be measured, and the angular velocity equal to or higher than a predetermined speed may be measured.

The controller 3124 may detect the driving operation of the driver, based on data on the motorcycle 3001. The driving operation may include the driver's operation on the brake lever 3001Q, the driver's operation on the clutch lever 3001R, and the driver's operation on the shift lever 3001S.

For example, the controller 3124 may detect the driver's operation on the brake lever 3001Q, based on a pressure exerted on the brake lever 3001Q included in data on the motorcycle 3001.

For example, the controller 3124 may detect the driver's operation on the clutch lever 3001R, based on a pressure exerted on the clutch lever 3001R included in data on the motorcycle 3001.

For example, the controller 3124 may detect the driver's operation on the shift lever 3001S, based on a pressure exerted on the shift lever 3001S included in data on the motorcycle 3001.

The controller 3124 may detect a fuel state of the motorcycle 3001, based on data on the motorcycle 3001. The fuel state of the motorcycle 3001 may include fuel level, fuel consumption, temperature of coolant of the motor, oil temperature of the motor, and lubricating oil level of the motor. For example, the controller 3124 may calculate fuel consumption based on the fuel level included in data on the motorcycle 3001.

When the first antenna 3060c is configured to communicate with GPS satellites, the controller 3124 may acquire position information of the motorcycle 3001, based on a GPS signal received by the first antenna 3060c.

The controller 3124 may generate a transmission signal from the communication device 3120 to the information processing device 3003. The controller 3124 may generate a transmission signal corresponding to at least one of data on the motorcycle 3001, a driving state of the motorcycle 3001, a driving operation of the motorcycle 3001, a fuel state of the motorcycle 3001, and position information of the motorcycle 3001. The controller 3124 may generate a transmission signal such that the identification information of the motorcycle 3001 stored in the memory 3123 is included. The controller 3124 may generate a transmission signal in accordance with the communication standards between the communication device 3120 and the information processing device 3003. The controller 3124 supplies power corresponding to the generated transmission signal to the first feeding line 3061 of the first antenna 3060c. The controller 3124 transmits the transmission signal as an electromagnetic wave from the communication device 3120 to the information processing device 3003 by supplying power corresponding to the transmission signal to the first feeding line 3061 of the first antenna 3060c.

For example, the controller 3124 may generate a transmission signal indicating position information of the motorcycle 3001 and identification information of the motorcycle 3001, as a transmission signal from the communication device 3120 to the information processing device 3003. The communication device 3120 transmits the transmission signal to the information processing device 3003, whereby the information processing device 3003 can acquire the transmission signal from the communication device 3120 via the network 3002. The information processing device 3003 may acquire position information of the motorcycle 3001 and identification information of the motorcycle 3001 by acquiring the transmission signal. For example, when a business operator providing home delivery service owns the motorcycle 3001, the business operator can grasp the position of the motorcycle 3001 on delivery by viewing the identification information and the position information of the motorcycle 3001 acquired by the information processing device 3003. For example, when the motorcycle is stolen, the owner of the motorcycle can grasp the position of the stolen motorcycle 3001 by viewing the identification information and the position information of the motorcycle 3001 acquired by the information processing device 3003.

For example, the controller 3124 may generate a transmission signal indicating the driving operation of the motorcycle 3001, the fuel state of the motorcycle 3001, and the identification information of the motorcycle 3001, as a transmission signal from the communication device 3120 to the information processing device 3003. The communication device 3120 transmits the transmission signal to the information processing device 3003, whereby the information processing device 3003 can acquire the transmission signal from the communication device 3120 via the network 3002. The information processing device 3003 may acquire the driving operation of the motorcycle 3001, the fuel state of the motorcycle 3001, and the identification information of the motorcycle 3001 by acquiring the transmission signal. For example, when the motorcycle 3001 is used in an auto race, the organizer of the auto race can grasp the state of the motorcycle 3001 by viewing the driving operation and the fuel state of the motorcycle 3001 acquired by the information processing device 3003.

The controller 3124 may generate a transmission signal from the communication device 3120 to the movable body 3004 around the motorcycle 3001. The controller 3124 may generate a transmission signal corresponding to at least one of data on the motorcycle 3001 and the driving state of the motorcycle 3001. The controller 3124 may generate a transmission signal in accordance with near field communication standards. The controller 3124 supplies power corresponding to the generated transmission signal to the first feeding line 3061 of the first antenna 3060c. The controller 3124 transmits the transmission signal as an electromagnetic wave from the communication device 3120 to the movable body 3004 by supplying power corresponding to the transmission signal to the first feeding line 3061 of the first antenna 3060c.

For example, the controller 3124 may generate a transmission signal indicating the turning direction of the motorcycle 3001, as a transmission signal from the communication device 3120 to the movable body 3004 in the surroundings. The controller 3124 may generate a transmission signal when detecting the turning direction of the motorcycle 3001. The movable body 3004 may acquire information on the turning direction of the motorcycle 3001 by acquiring the transmission signal from the communication device 3120. For example, when the movable body 3004 is an automobile, the driver of the automobile can grasp the turning direction of the motorcycle 3001. The driver of the automobile can avoid an accident between the movable body 3004 and the motorcycle 3001 by grasping the turning direction of the motorcycle 3001.

For example, the controller 3124 may generate a transmission signal indicating a rollover of the motorcycle 3001 during running, as a transmission signal from the communication device 3120 to the movable body 3004 in the surroundings. The controller 3124 may generate a transmission signal when detecting a rollover of the motorcycle 3001 during running. The movable body 3004 may acquire information on a rollover of the motorcycle 3001 during running by acquiring the transmission signal from the communication device 3120. For example, when the movable body 3004 is an automobile, the driver of the automobile can grasp the rollover of the motorcycle 3001 and promptly stop the automobile in order to avoid a collision with the motorcycle 3001.

The controller 3124 may determine whether the driver and the user are the same person, based on biometric data of the driver of the motorcycle 3001 and biometric data of the user stored in the memory 3123. If it is determined that the driver of the motorcycle 3001 and the user of the motorcycle 3001 are not the same person, the controller 3124 may generate a transmission signal indicating a warning. This transmission signal may be transmitted from the communication device 3120 to the information processing device 3003. The controller 3124 may generate a transmission signal such that position information of the motorcycle 3001 stored in the memory 3123 is included. The information processing device 3003 may acquire a signal indicating a warning and position information of the motorcycle 3001 by acquiring the transmission signal. For example, the user of the motorcycle 3001 can know that the motorcycle 3001 has been stolen, from the signal indicating a warning acquired by the information processing device 3003. The user informed of the theft of the motorcycle 3001 can know the location of the motorcycle 3001 from the position information of the motorcycle 3001 acquired by the information processing device 3003.

[Another Example of Functions of Motorcycle]

FIG. 116 is a functional block diagram of another example of the motorcycle 3001 illustrated in FIG. 108. The motorcycle 3001 includes a sensor device 3110 and a display device 3130. The sensor device 3110 and the display device 3130 can wirelessly communicate with each other. Wireless communication may be based on near field communication standards. The near field communication standards may include WiFi (registered trademark), Bluetooth (registered trademark), and a wireless LAN.

The sensor device 3110 may transmit data on the motorcycle 3001 to the display device 3130. The sensor device 3110 may transmit biometric data of the driver to the display device 3130. The sensor device 3110 may transmit position information of the motorcycle 3001 to the display device 3130. The sensor device 3110 may employ a similar configuration to the sensor device 3110 illustrated in FIG. 108.

The display device 3130 presents a variety of data to the driver. The display device 3130 may be a car navigation system. The display device 3130 may be disposed at any of the parts of the motorcycle 3001 illustrated in FIG. 108. As an example, the display device 3130 may be disposed at the handle bar 3001A or the fuel tank 3001B illustrated in FIG. 108.

The display device 3130 has at least one first antenna 3060d, a battery 3131, a display 3132, a memory 3133, and a controller 3134. The display device 3130 may have the first antenna 3060d on the outside or the outer surface of the display device 3130. When the display device 3130 does not have a battery 3131, the display device 3130 may operate on power supplied from another battery provided in the motorcycle 3001.

The first antenna 3060d may be the first antenna 3060a described above independent of the first antenna 3060b of the sensor device 3110.

The first antenna 3060d may be configured as appropriate in accordance with the frequency band used in communication between the display device 3130 and another device. In other words, each of the first conductor 31, the second conductor 32, the third conductor 40, and the fourth conductor 50 included in the first antenna 3060d may be configured as appropriate in accordance with the frequency band used in communication between the display device 3130 and another device. For example, the first antenna 3060d may be configured as appropriate in accordance with the frequency band used in near field communication between the display device 3130 and the sensor device 3110. For example, the first antenna 3060d may be configured in accordance with the frequency band used in communication between the display device 3130 and GPS satellites.

The first antenna 3060d may receive an electromagnetic wave from another device as a reception signal. The reception signal received by the first antenna 3060d is transmitted to the controller 3134 via the first feeding line 3061 of the first antenna 3060d. Power is supplied to the first feeding line 3061 of the first antenna 3060d, whereby the first antenna 3060d can emit an electromagnetic wave as a transmission signal to another device.

The location of the first antenna 3060d may be selected as appropriate from among the locations described above with reference to FIG. 108, depending on the location of the display device 3130 or depending on the other end of communication of the display device 3130.

For example, when the display device 3130 is disposed at the handle bar 3001A illustrated in FIG. 108, the location of the first antenna 3060d may be the handle bar 3001A. For example, when the display device 3130 is disposed at the fuel tank 3001B illustrated in FIG. 108, the place of the first antenna 3060d may be the fuel tank 3001B.

For example, when the other end of communication of the display device 3130 is a GPS satellite, the location of the first antenna 3060d may be the fuel tank 3001B illustrated in FIG. 108. The first antenna 3060d is disposed at the fuel tank 3001B illustrated in FIG. 108, whereby the first antenna 3060d easily receives electromagnetic waves from GPS satellites.

The battery 3131 may supply power to at least one of the first antenna 3060d, the display 3132, the memory 3133, and the controller 3134. For example, the battery 3131 may include at least one of a primary battery and a secondary battery. The negative electrode of the battery 3131 is electrically connected to the fourth conductor 50 of the first antenna 3060d.

The display 3132 may include a liquid crystal display (LCD), organic electro luminescence (EL), or inorganic EL. The display 3132 displays characters, images, objects for operation, a pointer, and the like, based on the control by the controller 3134.

The memory 3133 may be configured with, for example, a semiconductor memory. The memory 3133 may function as a work memory for the controller 3134. The memory 3133 may be included in the controller 3134.

The controller 3134 may include, for example, a processor. The processor may include a general-purpose processor that reads a specific computer program to execute a specific function and a dedicated processor dedicated to a certain process. The dedicated processor may include an application specific IC. The processor may include a programmable logic device. The PLD may include an FPGA. The controller 3134 may include one or more processors. The controller 3134 may be one of a SoC and a SiP in which one or more processors cooperate. The controller 3134 may store, for example, a variety of information or a computer program for operating each component of the display device 3130 in the memory 3133.

The controller 3134 acquires a reception signal from the sensor device 3110, for example, via the first feeding line 3061 of the first antenna 3060d. The reception signal may include data on the motorcycle 3001 measured by the sensor device 3110 and biometric data of the driver. When the sensor device 3110 is configured to measure position information of the motorcycle 3001, the reception signal may include position information of the motorcycle 3001.

When the first antenna 3060d is configured to communicate with GPS satellites, the controller 3134 may acquire position information of the motorcycle 3001, based on a GPS signal received by the first antenna 3060d.

The controller 3134 may calculate the distance traveled of the motorcycle 3001, based on the acceleration included in data on the motorcycle 3001. The controller 3134 may calculate fuel consumption based on the fuel level included in data on the motorcycle 3001.

The controller 3134 may display a variety of information on the display 3132. For example, the controller 3134 may display the speed of the motorcycle 3001 included in data on the motorcycle 3001 on the display 3132. For example, the controller 3134 may display position information of the motorcycle 3001 on the display 3132. For example, the controller 3134 may display the fuel state of the motorcycle 3001 included in data on the motorcycle 3001 on the display 3132. For example, the controller 3134 may display the calculated fuel consumption on the display 3132. For example, the controller 3134 may display the heart rate and the pulse rate included in biometric data of the driver on the display 3132.

The controller 3134 may generate a transmission signal from the display device 3130 to the sensor device 3110. The controller 3134 may generate a transmission signal in accordance with the near field communication standards between the display device 3130 and the sensor device 3110. The controller 3134 supplies power corresponding to the generated transmission signal to the first feeding line 3061 of the first antenna 3060d. The controller 3134 transmits a transmission signal from the display device 3130 to the sensor device 3110 by supplying power corresponding to the transmission signal to the first feeding line 3061 of the first antenna 3060d.

In this way, the sensor device 3110 and the display device 3130 have independent first antenna 3060b and first antenna 3060d, respectively, and thereby can wirelessly communicate with each other. Wireless communication between the sensor device 3110 and the display device 3130 can reduce cables, etc. mounted on the motorcycle 3001. Reducing cables, etc. mounted on the motorcycle 3001 can lead to weight reduction of the motorcycle 3001. Weight reduction of the motorcycle 3001 can improve the convenience of the motorcycle 3001.

[Yet Another Example of Functions of Motorcycle]

FIG. 117 is a functional block diagram of yet another example of the motorcycle 3001 illustrated in FIG. 108. The motorcycle 3001 includes a detection device 3140 and a control device 3150. The detection device 3140 and the control device 3150 can wirelessly communicate with each other. Wireless communication may be based on near field communication standards. The near field wireless communication standards may include WiFi (registered trademark), Bluetooth (registered trademark), and a wireless LAN.

The detection device 3140 may detect the driver's operation. The detection device 3140 may be a part of the motorcycle 3001.

For example, the detection device 3140 may be the brake lever 3001Q illustrated in FIG. 108. In this example, the detection device 3140 can detect the driver's operation on the brake lever 3001Q.

For example, the detection device 3140 may be the clutch lever 3001R illustrated in FIG. 108. In this example, the detection device 3140 can detect the driver's operation on the clutch lever 3001R.

For example, the detection device 3140 may be the shift lever 3001S illustrated in FIG. 108. In this example, the detection device 3140 can detect the driver's operation on the shift lever 3001S.

The detection device 3140 may detect the environment around the motorcycle 3001. For example, the detection device 3140 may detect the illuminance around the motorcycle 3001.

The detection device 3140 has at least one first antenna 3060e, a battery 3141, a detector 3142, a memory 3143, and a controller 3144. The detection device 3140 may have the first antenna 3060e on the outside or the outer surface of the detection device 3140. When the detection device 3140 does not have a battery 3141, the detection device 3140 may operate on power supplied from another battery provided in the motorcycle 3001.

The first antenna 3060e may be the first antenna 3060a described above independent of the first antenna 3060f of the control device 3150.

The location of the first antenna 3060e may be selected as appropriate from among the locations described above with reference to FIG. 108, depending on the part of the motorcycle 3001 that may be the detection device 3140 or depending on the applications of the detection device 3140.

For example, when the detection device 3140 is the brake lever 3001Q illustrated in FIG. 108, the location of the first antenna 3060e may be the brake lever 3001Q or may be the front fork 3001M in the vicinity of the brake lever 3001Q.

For example, when the detection device 3140 is the clutch lever 3001R illustrated in FIG. 108, the location of the first antenna 3060e may be the clutch lever 3001R or the front fork 3001M in the vicinity of the clutch lever 3001R.

For example, when the detection device 3140 is the shift lever 3001S illustrated in FIG. 108, the location of the first antenna 3060e may be the shift lever 3001S or the crankcase 3001H in the vicinity of the shift lever 3001S.

For example, when the application of the detection device 3140 is detection of the illuminance around the motorcycle 3001, the location of the first antenna 3060e may be any of the parts of the motorcycle 3001.

The first antenna 3060e may be configured as appropriate in accordance with the frequency band used in communication between the detection device 3140 and another device. In other words, each of the first conductor 31, the second conductor 32, the third conductor 40, and the fourth conductor 50 included in the first antenna 3060e may be configured as appropriate in accordance with the frequency band used in communication between the detection device 3140 and another device.

The first antenna 3060e may receive an electromagnetic wave from another device as a reception signal. The reception signal received by the first antenna 3060e is transmitted to the controller 3144 via the first feeding line 3061 of the first antenna 3060e. Power is supplied to the first feeding line 3061 of the first antenna 3060e, whereby the first antenna 3060e can emit an electromagnetic wave as a transmission signal to another device.

The battery 3141 may supply power to at least one of the first antenna 3060e, the detector 3142, the memory 3143, and the controller 3144. For example, the battery 3141 may include at least one of a primary battery and a secondary battery. The negative electrode of the battery 3141 is electrically connected to the fourth conductor 50 of the first antenna 3060e.

The detector 3142 detects the driver's operation. The detector 3142 may be configured as appropriate, depending on the specifications of the part of the motorcycle 3001 that may be the detection device 3140.

For example, the detection device 3140 may be the brake lever 3001Q illustrated in FIG. 108. The specification of the brake lever 3001Q may be fulfilling the brake function of the motorcycle 3001 in accordance with a pressure exerted on the brake lever 3001Q. In this example, the detector 3142 may include a pressure sensor. The detector 3142 detects a pressure exerted on the brake lever 3001Q with the pressure sensor. The detector 3142 outputs the detected pressure to the controller 3144.

For example, the detection device 3140 may be the clutch lever 3001R illustrated in FIG. 108. The specification of the clutch lever 3001R is disconnecting the motor of the motorcycle 3001 and the transmission of the motorcycle 3001 from each other, in accordance with a pressure exerted on the clutch lever 3001R. In this example, the detector 3142 may include a pressure sensor. The detector 3142 detects a pressure exerted on the clutch lever 3001R with the pressure sensor. The detector 3142 outputs the detected pressure to the controller 3144.

For example, the detection device 3140 may be the shift lever 3001S illustrated in FIG. 108. The specification of the shift lever 3001S is changing the transmission ratio of the motorcycle 3001, in accordance with a pressure exerted on the shift lever 3001S. The transmission ratio is the efficiency in converting motive power of the motor of the motorcycle 3001 to rotation of the rear wheel of the motorcycle 3001. In this example, the detector 3142 may include a pressure sensor. The detector 3142 detects a pressure exerted on the shift lever 3001S with the pressure sensor. The detector 3142 outputs the detected pressure to the controller 3144.

The detector 3142 may detect the environment around the motorcycle 3001. The detector 3142 may be configured as appropriate depending on the environment around the motorcycle 3001.

For example, when the detection device 3140 detects the illuminance around the motorcycle 3001, the detector 3142 may include an illuminance sensor. The detector 3142 detects the illuminance around the motorcycle 3001 with the illuminance sensor. The detector 3142 outputs the detected illuminance to the controller 3144.

The memory 3143 may be configured with, for example, a semiconductor memory. The memory 3143 may function as a work memory for the controller 3144. The memory 3143 may be included in the controller 3144.

The controller 3144 may include, for example, a processor. The processor may include a general-purpose processor that reads a specific computer program to execute a specific function and a dedicated processor dedicated to a certain process. The dedicated processor may include an application specific IC. The processor may include a programmable logic device. The PLD may include an FPGA. The controller 3144 may include one or more processors. The controller 3144 may be one of a SoC and a SiP in which one or more processors cooperate. The controller 3144 may store, for example, a variety of information or a computer program for operating each component of the detection device 3140 in the memory 3143. The controller 3144 may acquire a reception signal from the control device 3150 via the first feeding line 3061 of the first antenna 3060e.

The controller 3144 generates a control signal, based on a detection result of the detector 3142.

For example, the controller 3144 generates a signal indicating execution of the brake function as a control signal, based on the pressure exerted on the brake lever 3001Q that is detected by the detector 3142.

For example, the controller 3144 generates a signal indicating disconnection or connection between the motor and the transmission of the motorcycle 3001 as a control signal, based on the pressure exerted on the clutch lever 3001R that is detected by the detector 3142.

For example, the controller 3144 generates a signal indicating the transmission ratio as a control signal, based on the pressure exerted on the shift lever 3001S that is detected by the detector 3142.

For example, the controller 3144 generates a signal indicating turn-on of the lamp 3001N or turn-off of the lamp 3001N as a control signal, based on the illuminance detected by the detector 3142. When the illuminance detected by the detector 3142 is less than a predetermined value, the controller 3114 may generate a signal indicating turn-on of the lamp 3001N as a control signal. When the illuminance detected by the detector 3142 is equal to or greater than a predetermined value during turn-on of the lamp 3001N, the controller 3144 may generate a signal indicating turn-off of the lamp 3001N as a control signal.

The controller 3144 generates a transmission signal in accordance with the generated control signal. This transmission signal may be transmitted from the detection device 3140 to the control device 3150. The controller 3144 may generate a transmission signal in accordance with the near field communication standards between the detection device 3140 and the control device 3150. The controller 3144 supplies power corresponding to the generated transmission signal to the first feeding line 3061 of the first antenna 3060e.

The controller 3144 may acquire a reception signal from the control device 3150 via the first feeding line 3061 of the first antenna 3060e.

The control device 3150 controls a function of the motorcycle 3001, based on the control signal acquired from the detection device 3140. The control device 3150 may be a part of the motorcycle 3001. For example, the control device 3150 may be the brake, the clutch, or the transmission of the motorcycle 3001. For example, the control device 3150 may be the lamp 3001N.

The control device 3150 includes at least one first antenna 3060f, a battery 3151, a mechanism 3152, a memory 3153, and a controller 3154. The control device 3150 may have the first antenna 3060f on the outside or the outer surface of the control device 3150. When the control device 3150 does not have a battery 3151, the control device 3150 may operate on power supplied from another battery provided in the motorcycle 3001.

The first antenna 3060f may be the first antenna 3060a described above independent of the first antenna 3060e of the detection device 3140.

The first antenna 3060f may be configured as appropriate in accordance with the frequency band used in communication between the control device 3150 and another device. In other words, each of the first conductor 31, the second conductor 32, the third conductor 40, and the fourth conductor 50 included in the first antenna 3060f may be configured as appropriate in accordance with the frequency band used in communication between the control device 3150 and another device.

The first antenna 3060f may receive an electromagnetic wave from another device as a reception signal. The reception signal received by the first antenna 3060f is transmitted to the controller 3154 via the first feeding line 3061 of the first antenna 3060f. Power is supplied to the first feeding line 3061 of the first antenna 3060f, whereby the first antenna 3060f can emit an electromagnetic wave as a transmission signal to another device.

The location of the first antenna 3060f may be selected as appropriate from among the locations described above with reference to FIG. 108, depending on the part of the motorcycle 3001 that may be the control device 3150.

For example, when the control device 3150 is the brake, the location of the first antenna 3060f may be the rim 3001L-1 of the wheel 3001L illustrated in FIG. 108.

For example, when the control device 3150 is the clutch, the location of the first antenna 3060f may be the muffler cover 3001G, the crankcase 3001H, or the cylinder head cover 3001J illustrated in FIG. 108 in the vicinity of the clutch.

For example, when the control device 3150 is the transmission, the location of the first antenna 3060f may be the muffler cover 3001G, the crankcase 3001H, or the cylinder head cover 3001J illustrated in FIG. 108 in the vicinity of the transmission.

For example, when the control device 3150 is the lamp 3001N illustrated in FIG. 108, the location of the first antenna 3060f may be the lamp 3001N or the front fork 3001M in the vicinity of the lamp 3001N.

The battery 3151 may supply power to at least one of the first antenna 3060f, the mechanism 3152, the memory 3153, and the controller 3154. For example, the battery 3151 may include at least one of a primary battery and a secondary battery. The negative electrode of the battery 3151 is electrically connected to the fourth conductor 50 of the first antenna 3060f.

The mechanism 3152 may include any member depending on the part of the motorcycle 3001 that may be the control device 3150.

For example, when the control device 3150 is the brake, the mechanism 3152 may include a brake pad that can sandwich the wheel 3001L, etc. illustrated in FIG. 108.

For example, when the control device 3150 is the clutch, the mechanism 3152 may include a spring, a plate, and a disc.

For example, when the control device 3150 is the transmission, the mechanism 3152 may include a gear, and a chain.

For example, when the control device 3150 is the lamp 3001N, the mechanism 3152 may include an LED.

The memory 3153 may be configured with, for example, a semiconductor memory. The memory 3153 may function as a work memory for the controller 3154. The memory 3153 may be included in the controller 3154.

The controller 3154 may include, for example, a processor. The processor may include a general-purpose processor that reads a specific computer program to execute a specific function and a dedicated processor dedicated to a certain process. The dedicated processor may include an application specific IC. The processor may include a programmable logic device. The PLD may include an FPGA. The controller 3154 may include one or more processors. The controller 3154 may be one of a SoC and a SiP in which one or more processors cooperate. The controller 3154 may store, for example, a variety of information or a computer program for operating each component of the control device 3150 in the memory 3153.

The controller 3154 acquires a reception signal from the detection device 3140 via the feeding line of the first antenna 3060f. The reception signal may include a control signal. The control signal may include a signal indicating execution of the brake function, a signal indicating disconnection or connection between the motor and the transmission of the motorcycle 3001, a signal indicating a transmission ratio, a signal indicating turn-on of the lamp 3001N, and a signal indicating turn-off of the lamp 3001N. The controller 3154 controls the mechanism 3152 in accordance with a control signal.

For example, when the control device 3150 is the brake, the controller 3154 controls the mechanism 3152 in accordance with a signal indicating execution of the brake function.

For example, when the control device 3150 is the clutch, the controller 3154 controls the mechanism 3152 in accordance with a signal indicating disconnection or connection between the motor and the transmission of the motorcycle 3001.

For example, when the control device 3150 is the transmission, the controller 3154 controls the mechanism 3152 in accordance with a signal indicating a transmission ratio.

For example, when the control device 3150 is the lamp 3001N illustrated in FIG. 108, the controller 3154 turns on the LED of the mechanism 3152 in accordance with a signal indicating turn-on of the lamp 3001N. The controller 3154 turns off the LED of the mechanism 3152 in accordance with a signal indicating turn-off of the lamp 3001N.

The controller 3154 may generate a transmission signal from the control device 3150 to the detection device 3140. The controller 3154 may generate a transmission signal in accordance with the near field communication standards between the control device 3150 and the detection device 3140. The controller 3154 supplies power corresponding to the generated transmission signal to the first feeding line 3061 of the first antenna 3060f. The controller 3154 transmits the transmission signal as an electromagnetic wave from the control device 3150 to the detection device 3140 by supplying power corresponding to the transmission signal to the first feeding line 3061 of the first antenna 3060f.

In this way, the detection device 3140 and the control device 3150 have independent first antenna 3060e and first antenna 3060f, respectively, and thereby can wirelessly communicate with each other. Wireless communication between the detection device 3140 and the control device 3150 can reduce cables, etc. mounted on the motorcycle 3001. Reducing cables, etc. mounted on the motorcycle 3001 can lead to weight reduction of the motorcycle 3001. Weight reduction of the motorcycle 3001 can improve the convenience of the motorcycle 3001.

The configuration according to the present disclosure is not limited to the embodiments described above and is susceptible to various modifications and changes. For example, the functions included in the components may be rearranged without logical contradiction, or a plurality of components may be combined into one or may be divided.

For example, in the foregoing embodiments, an example in which the antenna or the wireless communication device is installed on a surface of a vehicle, a movable body, or a member included therein has been described. However, the antenna or the wireless communication device is not necessarily installed on a surface of the vehicle, the movable body, or the member included therein. For example, the antenna or the wireless communication device may be included as a part of a member of the vehicle, the movable body, or the member included therein such that the antenna or the wireless communication device is positioned on a surface of the vehicle, the movable body, or the member included therein.

For example, when the motorcycle 3001 is an electric motorcycle, data on the motorcycle 3001 may include the remaining amount of power and the amount of power consumed.

The drawings that illustrate the configurations according to the present disclosure are schematic. The dimensional ratio and the like on the drawings does not necessarily agree with the actual one.

In the present disclosure, the notation such as "first", "second", and "third" is an example of the identifier for distinguishing the configuration. The configurations distinguished by the notation such as "first" and "second" in the present disclosure may have the numerals interchangeable. For example, the identifiers "first" and "second" of the first frequency and the second frequency are interchangeable. The identifiers are interchanged simultaneously. The configurations are distinguished even after the identifiers are interchanged. The identifiers may be deleted. The configuration with the identifier deleted is distinguished by a reference sign. For example, the first conductor 31 may be denoted as conductor 31. The notation of identifiers such as "first" and "second" alone should not be used for interpretation of the order of the configurations, the ground that an identifier with a smaller number exists, and the ground that an identifier with a larger number exists. In the present disclosure, although the second conductive layer 42 has the second unit slot 422, the configuration in which the first conductive layer 41 does not have a first unit slot is intended to be embraced.

The invention claimed is:

1. An antenna installed on an installation surface of a vehicle, the antenna comprising:
   a first conductor and a second conductor opposed to each other in a first axis;
   one or more third conductors positioned between the first conductor and the second conductor and extending in the first axis;
   a fourth conductor connected to the first conductor and the second conductor and extending in the first axis; and
   a feeding line connected to the third conductor, wherein
   the first conductor and the second conductor are capacitively connected to each other through the third conductor,
   a surface of the fourth conductor is opposed to the installation surface of the vehicle in a second axis vertical to the first axis,
   the one or more third conductors include a first conductive layer and a second conductive layer opposing to the first conductive layer in a third axis vertical to the first and second axes, and
   the first and second conductive layers are capacitively coupled to each other and have different lengths in the second axis.

2. The antenna according to claim 1, wherein
   the installation surface of the vehicle is a surface of a member that constitutes the vehicle, and
   the first axis is substantially parallel to a longitudinal direction of the member.

3. The antenna according to claim 1, wherein
   the installation surface of the vehicle is an end portion of a surface of a member that constitutes the vehicle, and
   the first axis is substantially parallel to an outer peripheral line of the member.

4. A wireless communication device installed on an installation surface of a vehicle, the wireless communication device comprising: an antenna,
the antenna comprising:
a first conductor and a second conductor opposed to each other in a first axis;
one or more third conductors positioned between the first conductor and the second conductor and extending in the first axis;
a fourth conductor connected to the first conductor and the second conductor and extending in the first axis; and
a feeding line connected to the third conductor,
wherein
the first conductor and the second conductor are capacitively connected to each other through the third conductor,
a surface of the fourth conductor is opposed to the installation surface of the vehicle in a second axis vertical to the first axis,
the one or more third conductors include a first conductive layer and a second conductive layer opposing to the first conductive layer in a third axis vertical to the first and second axes, and
the first and second conductive layers are capacitively coupled to each other and have different lengths in the second axis.

5. The wireless communication device according to claim 4, wherein
the installation surface of the vehicle is a surface of a member that constitutes the vehicle, and
the first axis is substantially parallel to a longitudinal direction of the member.

6. The wireless communication device according to claim 4, wherein
the installation surface of the vehicle is an end portion of a surface of a member that constitutes the vehicle, and the first axis is substantially parallel to an outer peripheral line of the member.

7. The wireless communication device according to claim 4, further comprising a battery configured to supply power to the antenna, wherein
an electrode terminal of the battery is electrically connected to the fourth conductor.

8. The wireless communication device according to claim 4, further comprising a sensor and a controller, wherein
the controller is configured to transmit a signal from the antenna, based on information detected by the sensor.

9. A vehicle comprising: an antenna,
the antenna comprising:
a first conductor and a second conductor opposed to each other in a first axis;
one or more third conductors positioned between the first conductor and the second conductor and extending in the first axis;
a fourth conductor connected to the first conductor and the second conductor and extending in the first axis; and
a feeding line connected to the third conductor,
wherein
the first conductor and the second conductor are capacitively connected to each other through the third conductor,
a surface of the fourth conductor is opposed to an installation surface of the vehicle in a second axis vertical to the first axis,
the one or more third conductors include a first conductive layer and a second conductive layer opposing to the first conductive layer in a third axis vertical to the first and second axes, and
the first and second conductive layers are capacitively coupled to each other and have different lengths in the second axis.

* * * * *